US012608981B2

(12) United States Patent
Huergo Wagner et al.

(10) Patent No.: US 12,608,981 B2
(45) Date of Patent: Apr. 21, 2026

(54) DEVICES, METHODS, AND GRAPHICAL USER INTERFACES FOR BIOMETRIC FEATURE ENROLLMENT

(71) Applicant: Apple Inc., Cupertino, CA (US)

(72) Inventors: Alfred B. Huergo Wagner, Redwood City, CA (US); Adam L. Amadio, San Francisco, CA (US); Adam Roben, Swarthmore, PA (US); Amy E. Dedonato, San Francisco, CA (US); Karen El Asmar, San Francisco, CA (US); Seung Wook Kim, San Jose, CA (US); Peter D. Anton, Portola Valley, CA (US); William A. Sorrentino, III, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 18/615,634

(22) Filed: Mar. 25, 2024

(65) Prior Publication Data

US 2024/0395073 A1    Nov. 28, 2024

Related U.S. Application Data

(60) Provisional application No. 63/537,942, filed on Sep. 12, 2023, provisional application No. 63/470,710, (Continued)

(51) Int. Cl.
| | |
|---|---|
| *G06V 40/60* | (2022.01) |
| *G06V 40/16* | (2022.01) |
| *G06V 40/50* | (2022.01) |

(52) U.S. Cl.
CPC .............. *G06V 40/67* (2022.01); *G06V 40/16* (2022.01); *G06V 40/50* (2022.01)

(58) Field of Classification Search
CPC ......... G06V 40/67; G06V 40/16; G06V 40/50
See application file for complete search history.

(56) References Cited

U.S. PATENT DOCUMENTS

| | | | |
|---|---|---|---|
| 6,088,040 A | 7/2000 | Oda et al. | |
| 8,254,647 B1 | 8/2012 | Nechyba et al. | |
| | (Continued) | | |

FOREIGN PATENT DOCUMENTS

| | | |
|---|---|---|
| CN | 101472158 A | 7/2009 |
| CN | 101930284 A | 12/2010 |
| | (Continued) | |

OTHER PUBLICATIONS

A Day in the Life of Mike, "Snapchat Vs #Msqrd", Available Online at: <https://www.youtube.com/watch?v=vS_1mrWXmC8>, See especially 4:22-6:05, Mar. 9, 2016, 4 pages.

(Continued)

*Primary Examiner* — Tadesse Hailu
(74) *Attorney, Agent, or Firm* — YHE Law LLP

(57) ABSTRACT

The present disclosure provides various user interfaces and techniques for enrolling a biometric feature of a user. In some embodiments, a biometric feature is enrolled using an enrollment interface that includes a progress indicator. In some embodiments, a biometric feature is enrolled using an enrollment interface that includes a cropped video feed. In some embodiments, a biometric feature is enrolled using an enrollment interface that includes a plurality of layers that provide alignment information. In some embodiments, an enrollment interface outputs feedback to correct errors based on a priority of the errors.

36 Claims, 54 Drawing Sheets

Related U.S. Application Data filed on Jun. 2, 2023, provisional application No. 63/468,504, filed on May 23, 2023.

(56) References Cited

U.S. PATENT DOCUMENTS

| | | | |
|---|---|---|---|
| 8,498,453 | B1 | 7/2013 | Benson et al. |
| 8,601,379 | B2 | 12/2013 | Marks et al. |
| 9,035,999 | B2 | 5/2015 | Carpenter et al. |
| 9,083,844 | B2 | 7/2015 | Tamiya et al. |
| 9,104,908 | B1 | 8/2015 | Rogers et al. |
| 9,628,697 | B2 | 4/2017 | Choukroun |
| 9,639,974 | B2 | 5/2017 | Smith et al. |
| 9,747,716 | B1 | 8/2017 | Mallet et al. |
| 10,341,113 | B2 | 7/2019 | Starner et al. |
| 10,395,128 | B2 * | 8/2019 | Van Os ............... G06V 40/67 |
| 10,521,579 | B2 * | 12/2019 | Van Os ............... G06F 1/1686 |
| 10,962,777 | B1 | 3/2021 | Wheelwright et al. |
| 11,270,672 | B1 | 3/2022 | Lee et al. |
| 12,124,675 | B2 | 10/2024 | Berliner et al. |
| 2001/0033675 | A1 | 10/2001 | Maurer et al. |
| 2005/0248582 | A1 | 11/2005 | Scheepers et al. |
| 2007/0127844 | A1 | 6/2007 | Watanabe |
| 2008/0267459 | A1 | 10/2008 | Nakada et al. |
| 2009/0132371 | A1 | 5/2009 | Strietzel et al. |
| 2009/0195545 | A1 | 8/2009 | Debevec et al. |
| 2009/0202114 | A1 | 8/2009 | Morin et al. |
| 2009/0300525 | A1 | 12/2009 | Jolliff et al. |
| 2010/0035682 | A1 | 2/2010 | Gentile et al. |
| 2010/0153847 | A1 | 6/2010 | Fama |
| 2010/0322111 | A1 | 12/2010 | Li |
| 2011/0080356 | A1 | 4/2011 | Kang et al. |
| 2011/0306420 | A1 | 12/2011 | Nishimoto et al. |
| 2011/0306422 | A1 | 12/2011 | Nishimoto et al. |
| 2012/0069028 | A1 | 3/2012 | Bouguerra |
| 2012/0079377 | A1 | 3/2012 | Goossens |
| 2012/0079378 | A1 | 3/2012 | Goossens |
| 2012/0139830 | A1 | 6/2012 | Hwang et al. |
| 2012/0154557 | A1 | 6/2012 | Perez et al. |
| 2012/0289290 | A1 | 11/2012 | Chae et al. |
| 2013/0015946 | A1 | 1/2013 | Lau et al. |
| 2013/0044128 | A1 | 2/2013 | Liu et al. |
| 2013/0147933 | A1 | 6/2013 | Kulas et al. |
| 2013/0342672 | A1 | 12/2013 | Gray et al. |
| 2014/0085293 | A1 | 3/2014 | Konoplev et al. |
| 2014/0085487 | A1 | 3/2014 | Park et al. |
| 2014/0092130 | A1 | 4/2014 | Anderson et al. |
| 2014/0152758 | A1 | 6/2014 | Tong et al. |
| 2014/0198121 | A1 | 7/2014 | Tong et al. |
| 2014/0213318 | A1 | 7/2014 | Leem et al. |
| 2014/0218459 | A1 | 8/2014 | Wenlong et al. |
| 2014/0324600 | A1 | 10/2014 | Soffin |
| 2014/0358475 | A1 | 12/2014 | Boulkenafed et al. |
| 2014/0361974 | A1 | 12/2014 | Li et al. |
| 2014/0362091 | A1 | 12/2014 | Bouaziz et al. |
| 2015/0024592 | A1 | 1/2015 | Chandrashekar et al. |
| 2015/0029097 | A1 | 1/2015 | Craig |
| 2015/0084950 | A1 | 3/2015 | Li et al. |
| 2015/0172238 | A1 | 6/2015 | Ahmed et al. |
| 2015/0172584 | A1 | 6/2015 | Park et al. |
| 2015/0213307 | A1 | 7/2015 | Beeler et al. |
| 2015/0312185 | A1 | 10/2015 | Langholz et al. |
| 2015/0312523 | A1 | 10/2015 | Li et al. |
| 2015/0317831 | A1 | 11/2015 | Ebstyne et al. |
| 2015/0325029 | A1 | 11/2015 | Li et al. |
| 2015/0346912 | A1 | 12/2015 | Yang et al. |
| 2015/0348269 | A1 | 12/2015 | Dedhia et al. |
| 2015/0350125 | A1 | 12/2015 | Henderson |
| 2016/0005206 | A1 | 1/2016 | Li et al. |
| 2016/0006987 | A1 | 1/2016 | Li et al. |
| 2016/0042548 | A1 | 2/2016 | Du et al. |
| 2016/0050169 | A1 | 2/2016 | Ben Atar et al. |
| 2016/0105388 | A1 | 4/2016 | Bin Mahfooz et al. |
| 2016/0110922 | A1 | 4/2016 | Haring |
| 2016/0134840 | A1 | 5/2016 | Mcculloch |
| 2016/0163084 | A1 | 6/2016 | Corazza et al. |
| 2016/0191958 | A1 | 6/2016 | Nauseef et al. |
| 2016/0227115 | A1 | 8/2016 | Bin Mahfooz et al. |
| 2016/0247308 | A1 | 8/2016 | Jiao et al. |
| 2016/0267699 | A1 | 9/2016 | Borke et al. |
| 2016/0284123 | A1 | 9/2016 | Hare et al. |
| 2016/0291822 | A1 | 10/2016 | Ahuja et al. |
| 2016/0292901 | A1 | 10/2016 | Li et al. |
| 2016/0292903 | A1 | 10/2016 | Li et al. |
| 2016/0328874 | A1 | 11/2016 | Tong et al. |
| 2016/0328875 | A1 | 11/2016 | Fang et al. |
| 2016/0328876 | A1 | 11/2016 | Tong et al. |
| 2016/0350957 | A1 | 12/2016 | Woods et al. |
| 2017/0018289 | A1 | 1/2017 | Morgenstern |
| 2017/0046045 | A1 | 2/2017 | Tung et al. |
| 2017/0046065 | A1 | 2/2017 | Zeng et al. |
| 2017/0069124 | A1 | 3/2017 | Tong et al. |
| 2017/0076142 | A1 | 3/2017 | Chang |
| 2017/0080346 | A1 | 3/2017 | Abbas |
| 2017/0083524 | A1 | 3/2017 | Huang et al. |
| 2017/0083586 | A1 | 3/2017 | Huang et al. |
| 2017/0098122 | A1 | 4/2017 | El Kaliouby et al. |
| 2017/0132828 | A1 | 5/2017 | Zelenin et al. |
| 2017/0140214 | A1 | 5/2017 | Matas et al. |
| 2017/0186236 | A1 | 6/2017 | Kawamoto |
| 2017/0206694 | A1 | 7/2017 | Jiao et al. |
| 2017/0255823 | A1 | 9/2017 | Abe et al. |
| 2017/0285764 | A1 | 10/2017 | Kim et al. |
| 2018/0047200 | A1 | 2/2018 | O'hara et al. |
| 2018/0063603 | A1 | 3/2018 | Tang et al. |
| 2018/0098056 | A1 | 4/2018 | Bohn |
| 2018/0101227 | A1 | 4/2018 | Frueh et al. |
| 2018/0157901 | A1 | 6/2018 | Arbatman et al. |
| 2018/0165862 | A1 | 6/2018 | Sawaki |
| 2018/0189549 | A1 | 7/2018 | Inomata |
| 2018/0225263 | A1 | 8/2018 | Zhong et al. |
| 2018/0232934 | A1 | 8/2018 | Schmidt |
| 2018/0267627 | A1 | 9/2018 | Kaneko |
| 2018/0335927 | A1 | 11/2018 | Anzures et al. |
| 2018/0335929 | A1 | 11/2018 | Scapel et al. |
| 2018/0335930 | A1 | 11/2018 | Scapel et al. |
| 2018/0336715 | A1 | 11/2018 | Rickwald et al. |
| 2019/0079597 | A1 | 3/2019 | Kada et al. |
| 2019/0080070 | A1 | 3/2019 | Van Os et al. |
| 2019/0080072 | A1 | 3/2019 | Van Os et al. |
| 2019/0080189 | A1 * | 3/2019 | Van Os ............... G06V 10/98 |
| 2019/0107990 | A1 | 4/2019 | Spivack et al. |
| 2019/0188895 | A1 | 6/2019 | Miller et al. |
| 2019/0199761 | A1 | 6/2019 | Felman |
| 2019/0370448 | A1 | 12/2019 | Devine et al. |
| 2019/0370583 | A1 | 12/2019 | Van Os et al. |
| 2020/0074711 | A1 | 3/2020 | Barlier et al. |
| 2020/0082157 | A1 | 3/2020 | Susskind et al. |
| 2020/0104620 | A1 | 4/2020 | Cohen et al. |
| 2020/0302669 | A1 | 9/2020 | Barlier et al. |
| 2020/0311429 | A1 | 10/2020 | Chen |
| 2020/0401687 | A1 | 12/2020 | Mak |
| 2021/0056747 | A1 | 2/2021 | Hefny et al. |
| 2021/0097875 | A1 | 4/2021 | Alexander et al. |
| 2021/0173206 | A1 | 6/2021 | Das et al. |
| 2021/0191600 | A1 | 6/2021 | Lemay et al. |
| 2021/0192187 | A1 | 6/2021 | Kim et al. |
| 2021/0264656 | A1 | 8/2021 | Barlier et al. |
| 2021/0312684 | A1 | 10/2021 | Zimmermann et al. |
| 2021/0382544 | A1 * | 12/2021 | Butcher ............... G06T 7/73 |
| 2022/0129882 | A1 | 4/2022 | Spender |
| 2022/0137724 | A1 | 5/2022 | Schliemann et al. |
| 2022/0262080 | A1 | 8/2022 | Burton et al. |
| 2022/0269333 | A1 | 8/2022 | Dedonato et al. |
| 2022/0351549 | A1 | 11/2022 | Van Os et al. |
| 2023/0012288 | A1 | 1/2023 | Mamishin |
| 2023/0026638 | A1 | 1/2023 | Schoen |
| 2023/0090342 | A1 | 3/2023 | Barlier et al. |
| 2023/0095816 | A1 | 3/2023 | Cohen et al. |
| 2023/0273985 | A1 | 8/2023 | Suchan et al. |
| 2023/0350489 | A1 | 11/2023 | Butcher et al. |
| 2023/0384860 | A1 | 11/2023 | Dedonato et al. |
| 2024/0020371 | A1 | 1/2024 | Dedonato et al. |
| 2024/0078846 | A1 | 3/2024 | Chyn et al. |
| 2024/0214208 | A1 | 6/2024 | Herman et al. |

(56) References Cited

U.S. PATENT DOCUMENTS

| | | |
|---|---|---|
| 2024/0220009 A1 | 7/2024 | Dryer et al. |
| 2024/0289007 A1 | 8/2024 | Mckenzie et al. |
| 2024/0372968 A1 | 11/2024 | Rickwald et al. |
| 2024/0393871 A1 | 11/2024 | Thiebot et al. |
| 2025/0022237 A1 | 1/2025 | Burton et al. |
| 2025/0216931 A1 | 7/2025 | Butcher et al. |
| 2025/0356064 A1 | 11/2025 | El Asmar et al. |

FOREIGN PATENT DOCUMENTS

| | | |
|---|---|---|
| CN | 102479388 A | 5/2012 |
| CN | 102999934 A | 3/2013 |
| CN | 103116902 A | 5/2013 |
| CN | 103886632 A | 6/2014 |
| CN | 104011738 A | 8/2014 |
| CN | 104115503 A | 10/2014 |
| CN | 104170318 A | 11/2014 |
| CN | 104170358 A | 11/2014 |
| CN | 105139438 A | 12/2015 |
| CN | 105374055 A | 3/2016 |
| CN | 105528805 A | 4/2016 |
| CN | 106575444 A | 4/2017 |
| CN | 109769397 A | 5/2019 |
| CN | 110945405 A | 3/2020 |
| CN | 114270312 A | 4/2022 |
| CN | 114760907 A | 7/2022 |
| CN | 115053270 A | 9/2022 |
| DE | 112020006065 T5 | 12/2022 |
| DK | 179695 B1 | 3/2019 |
| EP | 2394711 A1 | 12/2011 |
| EP | 3528173 A1 | 8/2019 |
| EP | 3537378 B1 | 11/2021 |
| JP | 10-116351 A | 5/1998 |
| JP | 2001-334071 A | 12/2001 |
| JP | 2004-287558 A | 10/2004 |
| JP | 2006-65683 A | 3/2006 |
| JP | 2011-70623 A | 4/2011 |
| JP | 2011-186816 A | 9/2011 |
| JP | 2011-258159 A | 12/2011 |
| JP | 2013-97814 A | 5/2013 |
| JP | 2014-149856 A | 8/2014 |
| JP | 2014-225801 A | 12/2014 |
| JP | 2015-75915 A | 4/2015 |
| JP | 2016-189120 A | 11/2016 |
| JP | 2017-68589 A | 4/2017 |
| JP | 2017-117159 A | 6/2017 |
| JP | 2017-531228 A | 10/2017 |
| JP | 2018-84878 A | 5/2018 |
| JP | 2018-109924 A | 7/2018 |
| JP | 2018-181256 A | 11/2018 |
| JP | 2019-192266 A | 10/2019 |
| JP | 2019-204494 A | 11/2019 |
| JP | 2020-9152 A | 1/2020 |
| JP | 6789170 B2 | 11/2020 |
| JP | 2020-194546 A | 12/2020 |
| JP | 2021-47864 A | 3/2021 |
| JP | 2022-3545 A | 1/2022 |
| KR | 10-2011-0014224 A | 2/2011 |
| KR | 10-2011-0063741 A | 6/2011 |
| KR | 10-2011-0089429 A | 8/2011 |
| KR | 10-2012-0006610 A | 1/2012 |
| KR | 10-2012-0018479 A | 3/2012 |
| KR | 10-2012-0047616 A | 5/2012 |
| KR | 10-2012-0130627 A | 12/2012 |
| KR | 10-2013-0032620 A | 4/2013 |
| KR | 10-2014-0039737 A | 4/2014 |
| KR | 10-2017-0012384 A | 2/2017 |
| KR | 10-2019-0029706 A | 3/2019 |
| KR | 10-2020-0044983 A | 4/2020 |
| KR | 10-2020-0136504 A | 12/2020 |
| WO | 2010/037956 A1 | 4/2010 |
| WO | 2010/059306 A2 | 5/2010 |
| WO | 2010/143359 A1 | 12/2010 |
| WO | 2013/097139 A1 | 7/2013 |
| WO | 2013/097264 A1 | 7/2013 |
| WO | 2013/152453 A1 | 10/2013 |
| WO | 2013/152454 A1 | 10/2013 |
| WO | 2014/094199 A1 | 6/2014 |
| WO | 2015/065928 A1 | 5/2015 |
| WO | 2015/167590 A1 | 11/2015 |
| WO | 2015/194017 A1 | 12/2015 |
| WO | 2016/013269 A1 | 1/2016 |
| WO | 2016/026402 A2 | 2/2016 |
| WO | 2016/080031 A1 | 5/2016 |
| WO | 2016/101132 A1 | 6/2016 |
| WO | 2017/013936 A1 | 1/2017 |
| WO | 2017/015949 A1 | 2/2017 |
| WO | 2018/226265 A1 | 12/2018 |
| WO | 2019/033129 A2 | 2/2019 |
| WO | 2019/176236 A1 | 9/2019 |
| WO | 2019/217177 A1 | 11/2019 |
| WO | 2020/112561 A1 | 6/2020 |
| WO | 2021/071532 A1 | 4/2021 |
| WO | 2021/117409 A1 | 6/2021 |
| WO | 2021/119212 A1 | 6/2021 |

OTHER PUBLICATIONS

Androidslide, "Camera Zoom FX", Available at: <https://www.youtube.com/watch?v=AHmPn8y74wY>, Nov. 5, 2011, 3 pages.

Appes Stela, "Gif Me! Camera [Android] Video review by Stelapps", Available Online at: <https://www.youtube.com/watch?v=uae0xUucOyY>, Jul. 17, 2014, 3 pages.

Applicant Initiated Interview Summary received for U.S. Appl. No. 15/940,017, mailed on Dec. 26, 2019, 5 pages.

Applicant-Initiated Interview Summary received for U.S. Appl. No. 15/940,017, mailed on Jun. 30, 2020, 5 pages.

Applicant-Initiated Interview Summary received for U.S. Appl. No. 17/220,752, mailed on Jul. 22, 2022, 3 pages.

Applicant-Initiated Interview Summary received for U.S. Appl. No. 17/337,164, mailed on Nov. 23, 2022, 2 pages.

Beyouravatar, "Faceshift studio tutorial part 4.8: tracking—fbx export", Available online at: https://www.youtube.com/watch?v=_yqmc9yzKLM, Nov. 19, 2012, 3 pages.

Chan et al., "FrontFace", Facilitating Communication Between HMD Users and Outsiders Using Front-Facing-Screen HMDs, Sep. 4-7, 2017, 5 pages.

Chicaview,"What is New! Make Funny GIFs Clips—Gif Me (Phone App)", Available online at: <https://www.youtube.com/watch?v=0LPGSFFP-V0>, See especially 1:15-2:25, Sep. 20, 2016, 3 pages.

Corrected Notice of Allowance received for U.S. Appl. No. 15/940,017, mailed on Aug. 27, 2020, 2 pages.

Corrected Notice of Allowance received for U.S. Appl. No. 15/940,017, mailed on Oct. 21, 2020, 3 pages.

Corrected Notice of Allowance received for U.S. Appl. No. 15/981,754, mailed on Oct. 15, 2019, 2 pages.

Corrected Notice of Allowance received for U.S. Appl. No. 15/981,754, mailed on Oct. 24, 2019, 2 pages.

Corrected Notice of Allowance received for U.S. Appl. No. 16/676,087, mailed on Aug. 3, 2020, 2 pages.

Corrected Notice of Allowance received for U.S. Appl. No. 16/676,087, mailed on Aug. 19, 2020, 2 pages.

Corrected Notice of Allowance received for U.S. Appl. No. 16/676,087, mailed on Jul. 8, 2020, 2 pages.

Corrected Notice of Allowance received for U.S. Appl. No. 16/896,457, mailed on Apr. 6, 2021, 3 pages.

Corrected Notice of Allowance received for U.S. Appl. No. 16/896,457, mailed on Feb. 24, 2021, 2 pages.

Corrected Notice of Allowance received for U.S. Appl. No. 16/896,457, mailed on Jan. 28, 2021, 2 pages.

Corrected Notice of Allowance received for U.S. Appl. No. 17/220,752, mailed on Oct. 14, 2022, 2 pages.

Corrected Notice of Allowance received for U.S. Appl. No. 18/071,434, mailed on Mar. 21, 2024, 2 pages.

Decision to Grant received for Danish Patent Application No. PA201770720, mailed on Aug. 8, 2019, 2 pages.

Decision to Grant received for Danish Patent Application No. PA201770721, mailed on Jun. 17, 2019, 2 pages.

(56) References Cited

OTHER PUBLICATIONS

Decision to Grant received for Danish Patent Application No. PA201870381, mailed on Oct. 14, 2019, 2 pages.

Decision to Grant received for Japanese Patent Application No. 2019-563408, mailed on Aug. 25, 2021, 3 pages (1 page of English Translation and 2 pages of Official Copy).

European Search Report received for European Patent Application No. 19186042.8, mailed on Sep. 12, 2019, 4 pages.

European Search Report received for European Patent Application No. 19211833.9, mailed on Jul. 1, 2020, 4 pages.

Facerig, "FaceRig Mobile Selfie Tip", Available online at: https://www.youtube.com/watch?v=x3DZHnXWZ3U, Oct. 18, 2016, 3 pages.

Facerig, "FaceRig Mobile Tip: How to record with and without the camera feed", Available Online at: https://www.youtube.com/watch?v=lwk9FIWGvVM, Nov. 8, 2016, 3 pages.

Final Office Action received for U.S. Appl. No. 15/870,195, mailed on Dec. 13, 2018, 27 pages.

Final Office Action received for U.S. Appl. No. 15/940,017, mailed on Apr. 15, 2020, 19 pages.

Final Office Action received for U.S. Appl. No. 15/940,017, mailed on Dec. 20, 2018, 17 pages.

Final Office Action received for U.S. Appl. No. 15/940,232, mailed on Jan. 10, 2019, 27 pages.

Giphy Inc. Communication, "Giphy Cam. The GIF Camera", Available at: <https://web.archive.org/web/20170309234909/https://play.google.com/store/apps/details?id=com.giphy.camera>, Mar. 9, 2017, pp. 1-3.

Holotech Studios Entertainment, "FaceRig", Available at: <https://web.archive.org/web/20161120090627/https://play.google.com/store/apps/details?id=com.holotech.facerig&hl=da>, Nov. 9, 2016, 3 pages.

How to Use MSQRD, Available Online at: <https://web.archive.org/web/20160505072814/https:/www.wikihow.com/Use-MSQRD>, May 5, 2016, 3 pages.

Intention to Grant received for Danish Patent Application No. PA201770720, mailed on Apr. 4, 2019, 2 pages.

Intention to Grant received for Danish Patent Application No. PA201770720, mailed on Jun. 21, 2019, 2 pages.

Intention to Grant received for Danish Patent Application No. PA201770721, mailed on Apr. 4, 2019, 2 pages.

Intention to Grant received for Danish Patent Application No. PA201870381, mailed on Jul. 18, 2019, 2 pages.

Intention to Grant received for European Patent Application No. 18732519.6, mailed on Dec. 15, 2023, 10 pages.

International Preliminary Report on Patentability received for PCT Patent Application No. PCT/US2018/014892, mailed on Nov. 28, 2019, 8 pages.

International Preliminary Report on Patentability received for PCT Patent Application No. PCT/US2018/033044, mailed on Nov. 28, 2019, 8 pages.

International Preliminary Report on Patentability received for PCT Patent Application No. PCT/US2021/033320, mailed on Dec. 22, 2022, 14 pages.

International Search Report and Written Opinion received for PCT Patent Application No. PCT/US2018/014892, mailed on Mar. 7, 2018, 10 pages.

International Search Report and Written Opinion received for PCT Patent Application No. PCT/US2018/033044, mailed on Sep. 11, 2018, 13 pages.

International Search Report and Written Opinion received for PCT Patent Application No. PCT/US2021/033320, mailed on Nov. 2, 2021, 19 pages.

International Search Report and Written Opinion received for PCT Patent Application No. PCT/US2021/049989, mailed on Dec. 6, 2021, 11 pages.

International Search Report and Written Opinion received for PCT Patent Application No. PCT/US2023/023273, mailed on Sep. 15, 2023, 19 pages.

International Search Report and Written Opinion received for PCT Patent Application No. PCT/US2023/023626, mailed on Nov. 9, 2023, 25 pages.

International Search Report and Written Opinion received for PCT Patent Application No. PCT/US2023/023627, mailed on Nov. 28, 2023, 25 pages.

Invitation to Pay Additional Fees and Partial International Search Report received for PCT Patent Application No. PCT/US2023/023626, mailed on Sep. 19, 2023, 21 pages.

Invitation to Pay Additional Fees and Partial International Search Report received for PCT Patent Application No. PCT/US2023/023627, mailed on Sep. 21, 2023, 21 pages.

Invitation to Pay Additional fees received for PCT Patent Application No. PCT/US2021/033320, mailed on Sep. 10, 2021, 12 pages.

Krotov Ilya, "Bellus3D app experience", Available online at: https://www.youtube.com/watch?v=aSu688IY26c&t=45s, Aug. 17, 2021, 2 pages.

Liebers et al., "Using Gaze Behavior and Head Orientation for Implicit Identification in Virtual Reality", VRST '21: Proceedings of the 27th ACM Symposium on Virtual Reality Software and Technology, Available online at: https://doi.org/10.1145/3489849.3489880, Dec. 8-10, 2021, 9 pages.

Mai et al., "Frontal Screens on Head-Mounted Displays to Increase Awareness of the HMD Users' State in Mixed Presence Collaboration", May 15, 2019, 10 pages.

Mai et al., "TransparentHMD", Revealing the HMD User's Face to Bystanders, Nov. 26-29, 2017, 6 pages.

Mega Ninja, "Face rig review", Available online at: https://www.youtube.com/watch?v=8YqeeiEVkRg, Feb. 6, 2017, 3 pages.

NCCU DCT, "Faceshift", Available online at: https://www.youtube.com/watch?v=4Ph0_SP8tpA, Dec. 1, 2014, 3 pages.

Non-Final Office Action received for U.S. Appl. No. 15/940,017, mailed on Jun. 18, 2018, 15 pages.

Non-Final Office Action received for U.S. Appl. No. 15/940,017, mailed on Sep. 30, 2019, 16 pages.

Non-Final Office Action received for U.S. Appl. No. 15/940,232, mailed on Jun. 18, 2018, 23 pages.

Non-Final Office Action received for U.S. Appl. No. 16/676,087, mailed on Apr. 9, 2020, 55 pages.

Non-Final Office Action received for U.S. Appl. No. 17/220,752, mailed on Apr. 15, 2022, 21 pages.

Non-Final Office Action received for U.S. Appl. No. 17/337,164, mailed on Sep. 21, 2022, 43 pages.

Non-Final Office Action received for U.S. Appl. No. 18/071,434, mailed on Sep. 22, 2023, 27 pages.

Non-Final Office Action received for U.S. Appl. No. 15/870,195, mailed on May 2, 2018, 22 pages.

Notice of Acceptance received for Australian Patent Application No. 2018269375, mailed on Dec. 3, 2020, 3 pages.

Notice of Acceptance received for Australian Patent Application No. 2021201681, mailed on Feb. 3, 2022, 3 pages.

Notice of Acceptance received for Australian Patent Application No. 2021290132, mailed on Sep. 29, 2023, 3 pages.

Notice of Acceptance received for Australian Patent Application No. 2022203285, mailed on Jun. 16, 2023, 3 pages.

Notice of Acceptance received for Australian Patent Application No. 2023233200, mailed on Oct. 17, 2023, 3 pages.

Notice of Allowance received for Chinese Patent Application No. 201880022585.3, mailed on Oct. 28, 2020, 6 pages (3 pages of English Translation and 3 pages of Official Copy).

Notice of Allowance received for Chinese Patent Application No. 201910563974.3, mailed on Jun. 2, 2021, 2 pages (1 page of English Translation and 1 page of Official Copy).

Notice of Allowance received for Chinese Patent Application No. 201910692958.4, mailed on Jul. 21, 2020, 2 pages (1 page of English Translation and 1 page of Official Copy).

Notice of Allowance received for Chinese Patent Application No. 201911219517.9, mailed on Jul. 4, 2022, 6 pages (3 pages of English Translation and 3 pages of Official Copy).

Notice of Allowance received for Korean Patent Application No. 10-2019-7033634, mailed on Aug. 20, 2021, 4 pages (1 page of English Translation and 3 pages of Official Copy).

(56) References Cited

OTHER PUBLICATIONS

Notice of Allowance received for Korean Patent Application No. 10-2021-7038284, mailed on Feb. 25, 2022, 5 pages (1 page of English Translation and 4 pages of Official Copy).

Notice of Allowance received for Korean Patent Application No. 10-2022-7017766, mailed on Jun. 14, 2022, 6 pages (2 pages of English Translation and 4 pages of Official Copy).

Notice of Allowance received for Korean Patent Application No. 10-2022-7017767, mailed on Jun. 14, 2022, 6 pages (2 pages of English Translation and 4 pages of Official Copy).

Notice of Allowance received for Korean Patent Application No. 10-2022-7029803, mailed on Mar. 23, 2023, 8 pages (2 pages of English Translation and 6 pages of Official Copy).

Notice of Allowance received for Korean Patent Application No. 10-2023-7021441, mailed on Jul. 6, 2023, 8 pages (2 pages of English Translation and 6 pages of Official Copy).

Notice of Allowance received for U.S. Appl. No. 15/870,195, mailed on Sep. 23, 2019, 13 pages.

Notice of Allowance received for U.S. Appl. No. 15/940,017, mailed on Aug. 6, 2020, 10 pages.

Notice of Allowance received for U.S. Appl. No. 15/940,232, mailed on Jun. 4, 2019, 12 pages.

Notice of Allowance received for U.S. Appl. No. 15/981,754, mailed on Jul. 17, 2019, 15 pages.

Notice of Allowance received for U.S. Appl. No. 15/981,754, mailed on Sep. 18, 2019, 14 pages.

Notice of Allowance received for U.S. Appl. No. 16/676,087, mailed on Jun. 19, 2020, 9 pages.

Notice of Allowance received for U.S. Appl. No. 16/676,087, mailed on Oct. 21, 2020, 9 pages.

Notice of Allowance received for U.S. Appl. No. 16/896,457, mailed on Jan. 8, 2021, 22 pages.

Notice of Allowance received for U.S. Appl. No. 17/220,752, mailed on Sep. 7, 2022, 8 pages.

Notice of Allowance received for U.S. Appl. No. 17/337,164, mailed on Feb. 7, 2023, 9 pages.

Notice of Allowance received for U.S. Appl. No. 17/337,164, mailed on Jun. 6, 2023, 11 pages.

Notice of Allowance received for U.S. Appl. No. 18/071,434, mailed on Jan. 31, 2024, 10 pages.

Office Action received for Australian Patent Application No. 2018269375, mailed on Jun. 19, 2020, 4 pages.

Office Action received for Australian Patent Application No. 2018269375, mailed on Sep. 7, 2020, 3 pages.

Office Action received for Australian Patent Application No. 2021201681, mailed on Nov. 11, 2021, 4 pages.

Office Action received for Australian Patent Application No. 2021290132, mailed on Jul. 25, 2023, 3 pages.

Office Action received for Australian Patent Application No. 2021290132, mailed on Jun. 3, 2023, 3 pages.

Office Action received for Australian Patent Application No. 2022203285, mailed on Apr. 20, 2023, 4 pages.

Office Action received for Australian Patent Application No. 2022203285, mailed on Jan. 18, 2023, 3 pages.

Office Action received for Chinese Patent Application No. 201880004632.1, mailed on Jan. 31, 2024, 7 pages (3 pages of English Translation and 4 pages of Official Copy).

Office Action received for Chinese Patent Application No. 201880022585.3, mailed on May 22, 2020, 11 pages (6 pages of English Translation and 5 pages of Official Copy).

Office Action received for Chinese Patent Application No. 201910563974.3, mailed on Feb. 7, 2021, 7 pages (4 pages of English Translation and 3 pages of Official Copy).

Office Action received for Chinese Patent Application No. 201910563974.3, mailed on May 8, 2020, 18 pages (8 pages of English Translation and 10 pages of Official Copy).

Office Action received for Chinese Patent Application No. 201910692958.4, mailed on Mar. 19, 2020, 20 pages (9 pages of English Translation and 11 pages of Official Copy).

Office Action received for Chinese Patent Application No. 201911219517.9, mailed on Jan. 19, 2022, 11 pages (6 pages of English Translation and 5 pages of Official Copy).

Office Action received for Chinese Patent Application No. 201911219517.9, mailed on Mar. 2, 2021, 20 pages (11 pages of English Translation and 9 pages of Official Copy).

Office Action received for Danish Patent Application No. PA201770393, mailed on Dec. 12, 2018, 7 pages.

Office Action received for Danish Patent Application No. PA201770393, mailed on Jan. 31, 2020, 6 pages.

Office Action received for Danish Patent Application No. PA201770393, mailed on Jul. 11, 2019, 2 pages.

Office Action received for Danish Patent Application No. PA201770393, mailed on Mar. 19, 2018, 8 pages.

Office Action received for Danish Patent Application No. PA201770720, mailed on Apr. 26, 2018, 3 pages.

Office Action received for Danish Patent Application No. PA201770720, mailed on Nov. 16, 2018, 3 pages.

Office Action received for Danish Patent Application No. PA201770720, mailed on Oct. 18, 2017, 8 pages.

Office Action received for Danish Patent Application No. PA201770721, mailed on Apr. 26, 2018, 3 pages.

Office Action received for Danish Patent Application No. PA201770721, mailed on Nov. 16, 2018, 3 Pages.

Office Action received for Danish Patent Application No. PA201770721, mailed on Oct. 19, 2017, 8 pages.

Office Action received for European Patent Application No. 18703184.4, mailed on Dec. 14, 2021, 4 pages.

Office Action received for European Patent Application No. 18703184.4, mailed on Jul. 2, 2021, 6 pages.

Office Action received for European Patent Application No. 18703184.4, mailed on Jul. 13, 2022, 4 pages.

Office Action received for European Patent Application No. 18703184.4, mailed on May 6, 2020, 7 pages.

Office Action received for European Patent Application No. 18703184.4, mailed on Nov. 23, 2020, 8 pages.

Office Action received for European Patent Application No. 18732519.6, mailed on Apr. 24, 2020, 6 pages.

Office Action received for European Patent Application No. 18732519.6, mailed on Oct. 6, 2020, 5 pages.

Office Action received for European Patent Application No. 19186042.8, mailed on Dec. 2, 2021, 5 pages.

Office Action received for European Patent Application No. 19186042.8, mailed on May 12, 2020, 5 pages.

Office Action received for European Patent Application No. 19186042.8, mailed on Oct. 10, 2023, 6 pages.

Office Action received for European Patent Application No. 19186042.8, mailed on Sep. 24, 2019, 6 pages.

Office Action received for European Patent Application No. 19211833.9, mailed on Jan. 29, 2021, 5 pages.

Office Action received for European Patent Application No. 19211833.9, mailed on Jul. 13, 2020, 7 pages.

Office Action received for European Patent Application No. 21733268.3, mailed on Aug. 8, 2023, 7 pages.

Office Action received for European Patent Application No. 21733268.3, mailed on Jan. 29, 2024, 7 pages.

Office Action received for European Patent Application No. 18703184.4, mailed on Oct. 29, 2019, 6 pages.

Office Action received for Indian Patent Application No. 201917046737, mailed on Aug. 9, 2021, 8 pages.

Office Action received for Japanese Patent Application No. 2019-563408, mailed on Nov. 2, 2020, 4 pages (2 pages of English Translation and 2 pages of Official Copy).

Office Action received for Japanese Patent Application No. 2021-173713, mailed on Jun. 15, 2023, 4 pages (2 pages of English Translation and 2 pages of Official Copy).

Office Action received for Japanese Patent Application No. 2021-173713, mailed on Nov. 16, 2022, 9 pages (5 pages of English Translation and 4 pages of Official Copy).

Office Action received for Japanese Patent Application No. 2022-573765, mailed on Feb. 5, 2024, 14 pages (7 pages of English Translation and 7 pages of Official Copy).

(56) References Cited

OTHER PUBLICATIONS

Office Action received for Korean Patent Application No. 10-2019-7033634, mailed on Sep. 28, 2020, 15 pages (7 pages of English Translation and 8 pages of Official Copy).

Office Action received for Korean Patent Application No. 10-2022-7029803, mailed on Sep. 3, 2022, 5 pages (2 pages of English Translation and 3 pages of Official Copy).

Opuni Kojo, "FaceShift Studio Demo", Available online at: https://www.youtube.com/watch?v=72ty7PYKwGU, Oct. 1, 2012, 3 pages.

Pang et al., "Approaches to uncertainty visualization", The Visual Computer, vol. 13, No. 8, 1997, pp. 370-390.

Pre-Appeal Review Report received for Japanese Patent Application No. 2021-173713, mailed on Nov. 10, 2023, 4 pages (2 pages of English Translation and 2 pages of Official Copy).

Rekimoto et al., "Behind-the-Mask", A Face-Through Head-Mounted Display, 18, May 29-Jun. 1, 2018, 5 pages.

Result of Consultation received for European Patent Application No. 19211833.9, mailed on Jul. 15, 2021, 3 pages.

Sambrook Jade, "Video Selfie Filters with MSQRD for Facebook Live", Available Online at: <https://www.youtube.com/watch?v=JZrWK2NEFeg>, See especially 2:44-3:03, Jul. 2, 2016, 3 pages.

Search Report and Opinion received for Danish Patent Application No. PA201770393, mailed on Jun. 21, 2017, 9 pages.

Search Report received for Danish Patent Application No. PA201870381, mailed on Sep. 13, 2018, 7 pages.

Stephenson et al., "SoK: Authentication in Augmented and Virtual Reality", 2022 IEEE Symposium on Security and Privacy (SP), Available online at: https://pages.cs.wisc.edu/~chatterjee/papers/sok-arvr.pdf, 2022, 18 pages.

Supplemental Notice of Allowance received for U.S. Appl. No. 15/870,195, mailed on Nov. 14, 2019, 9 pages.

Supplemental Notice of Allowance received for U.S. Appl. No. 17/337,164, mailed on Jun. 26, 2023, 3 pages.

Ting, "Giphy Cam (iOS) | Ting Download", Available online at: https://www.youtube.com/watch?v=mykfBpyD3gg, Oct. 2, 2015, 3 pages.

Twins Tornado, "New Tutorial: Add Facial Expressions to your Game Characters!", Available online at: https://www.youtube.com/watch?v=wKSjByNyaKA, Mar. 14, 2014, 4 pages.

Yom Mama, "SnapChat Tutorial for Beginners!", Available Online at: <https://www.youtube.com/watch?v=zUmj039NNOU>, See especially 6:55-7:22, Jun. 6, 2016, 3 pages.

Applicant-Initiated Interview Summary received for U.S. Appl. No. 18/737,710, mailed on May 22, 2025, 3 pages.

Corrected Notice of Allowance received for U.S. Appl. No. 18/374,606, mailed on Aug. 11, 2025, 7 pages.

Applicant-Initiated Interview Summary received for U.S. Appl. No. 18/220,200, mailed on Jul. 17, 2024, 2 pages.

Applicant-Initiated Interview Summary received for U.S. Appl. No. 18/220,200, mailed on Nov. 15, 2024, 2 pages.

Chun et al., "3D face pose estimation by a robust real time tracking of facial features", Multimedia Tools and Applications, Kluwer Academic Publishers, Boston, US vol. 75, No. 23, Available online at 10.1007/S11042-014-2356-9, Nov. 18, 2014, pp. 15693-15708.

Chun et al., "Real-Time Face Pose Tracking and Facial Expression Synthesizing for the Animation of 3D Avatar", Technologies for E-Learning and Digital Entertainment, Springer Berlin Heidelberg, Jun. 11, 2007, pp. 191-201.

Corrected Notice of Allowance received for U.S. Appl. No. 18/071,434, mailed on Apr. 24, 2024, 2 pages.

Corrected Notice of Allowance received for U.S. Appl. No. 18/071,434, mailed on May 29, 2024, 2 pages.

Decision on Appeal received for Japanese Patent Application No. 2021-173713, mailed on Nov. 5, 2024, 8 pages (1 page of English Translation and 7 pages of Official Copy).

Decision to Grant received for European Patent Application No. 18703184.4, mailed on Nov. 21, 2024, 4 pages.

Decision to Grant received for European Patent Application No. 18732519.6, mailed on Mar. 28, 2024, 4 pages.

Decision to Grant received for Japanese Patent Application No. 2023-169627, mailed on Nov. 5, 2024, 3 pages (1 page of English Translation and 2 pages of Official Copy).

Extended European Search Report received for European Patent Application No. 24165004.3, mailed on Jul. 5, 2024, 8 pages.

Final Office Action received for U.S. Appl. No. 18/220,200, mailed on Aug. 23, 2024, 39 pages.

Intention to Grant received for European Patent Application No. 18703184.4, mailed on Jul. 24, 2024, 12 pages.

Intention to Grant received for European Patent Application No. 21733268.3, mailed on Nov. 20, 2024, 9 pages.

International Preliminary Report on Patentability received for PCT Patent Application No. PCT/US2023/023273, mailed on Dec. 5, 2024, 13 pages.

International Preliminary Report on Patentability received for PCT Patent Application No. PCT/US2023/023626, mailed on Dec. 5, 2024, 18 pages.

International Preliminary Report on Patentability received for PCT Patent Application No. PCT/US2023/023627, mailed on Dec. 5, 2024, 18 pages.

International Search Report and Written Opinion received for PCT Patent Application No. PCT/US2024/025380, mailed on Sep. 23, 2024, 23 pages.

International Search Report and Written Opinion received for PCT Patent Application No. PCT/US2024/028208, mailed on Nov. 13, 2024, 20 pages.

To Pay Additional Fees and Partial International Search Report received for PCT Patent Application No. PCT/US2024/025380, mailed on Aug. 1, 2024, 15 pages.

To Pay Additional Fees and Partial International Search Report received for PCT Patent Application No. PCT/US2024/028208, mailed on Sep. 23, 2024, 12 pages.

Office Action received for U.S. Appl. No. 18/220,200, mailed on Mar. 27, 2024, 38 pages.

Office Action received for U.S. Appl. No. 18/737,710, mailed on Mar. 14, 2025, 39 pages.

Notice of Allowance received for Japanese Patent Application No. 2022-573765, mailed on Aug. 9, 2024, 4 pages (1 page of English Translation and 3 pages of Official Copy).

Notice of Allowance received for U.S. Appl. No. 18/071,434, mailed on May 20, 2024, 9 pages.

Notice of Allowance received for U.S. Appl. No. 18/220,200, mailed on Jan. 21, 2025, 10 pages.

Office Action received for Australian Patent Application No. 2024200190, mailed on Jan. 15, 2025, 3 pages.

Office Action received for Australian Patent Application No. 2024200460, mailed on Nov. 14, 2024, 3 pages.

Office Action received for Chinese Patent Application No. 201880004632.1, mailed on Apr. 3, 2024, 13 pages (7 pages of English Translation and 6 pages of Official Copy).

Office Action received for Chinese Patent Application No. 201880004632.1, mailed on Jul. 16, 2024, 11 pages (5 pages of English Translation and 6 pages of Official Copy).

Office Action received for European Patent Application No. 19186042.8, mailed on Jul. 18, 2024, 8 pages.

Office Action received for European Patent Application No. 19186042.8, mailed on Nov. 13, 2024, 7 pages.

Office Action received for European Patent Application No. 19211833.9, mailed on Aug. 23, 2024, 5 pages.

Office Action received for European Patent Application No. 21733268.3, mailed on Jun. 13, 2024, 4 pages.

Office Action received for European Patent Application No. 21733268.3, mailed on Jun. 25, 2024, 4 pages.

Office Action received for European Patent Application No. 24165004.3, mailed on Dec. 5, 2024, 5 pages.

Office Action received for Indian Patent Application No. 202218005498, mailed on May 31, 2024, 6 pages.

Office Action received for Japanese Patent Application No. 2021-173713, mailed on Jun. 18, 2024, 4 pages (2 pages of English Translation and 2 pages of Official Copy).

Office Action received for Japanese Patent Application No. 2023-169627, mailed on Jul. 29, 2024, 4 pages (2 pages of English Translation and 2 pages of Official Copy).

(56) References Cited

OTHER PUBLICATIONS

Office Action received for Korean Patent Application No. 10-2022-7041713, mailed on Oct. 28, 2024, 11 pages (5 pages of English Translation and 6 pages of Official Copy).

Office Action received for Korean Patent Application No. 10-2024-7023682, mailed on Aug. 5, 2024, 6 pages (2 pages of English Translation and 4 pages of Official Copy).

Supplemental Notice of Allowance received for U.S. Appl. No. 18/220,200, mailed Feb. 7, 2025, 2 pages.

Supplemental Notice of Allowance received for U.S. Appl. No. 18/220,200, mailed on Jan. 29, 2025, 2 pages.

Notice of Allowance received for U.S. Appl. No. 18/374,606, mailed on Jun. 16, 2025, 9 pages.

International Preliminary Report on Patentability received for PCT Patent Application No. PCT/US2024/025380, mailed on Nov. 13, 2025, 17 pages.

International Search Report and Written Opinion received for PCT Patent Application No. PCT/US2025/029178, mailed on Sep. 23, 2025, 26 pages.

Invitation to Pay Additional Fees and Partial International Search Report received for PCT Patent Application No. PCT/US2025/029178, mailed on Jul. 30, 2025, 19 pages.

Notice of Allowance received for Japanese Patent Application No. 2024-154177, mailed on Nov. 7, 2025, 4 pages (1 page of English Translation and 3 pages of Official Copy).

Office Action received for Japanese Patent Application No. 2024-212271, mailed on Oct. 6, 2025, 4 pages (2 pages of English Translation and 2 pages of Official Copy).

Notice of Allowance received for U.S. Appl. No. 18/408,492, mailed on Sep. 10, 2025, 9 pages.

Office Action received for Japanese Patent Application No. 2024-568148, mailed on Sep. 16, 2025, 40 pages (18 pages of English Translation and 22 pages of Official Copy).

Applicant-Initiated Interview Summary received for U.S. Appl. No. 18/131,833, mailed on Jun. 27, 2025, 2 pages.

Corrected Notice of Allowance received for U.S. Appl. No. 18/737,710, mailed on Aug. 13, 2025, 2 pages.

Corrected Notice of Allowance received for U.S. Appl. No. 18/737,710, mailed on Jul. 1, 2025, 2 pages.

Corrected Notice of Allowance received for U.S. Appl. No. 18/737,710, mailed on Sep. 23, 2025, 2 pages.

Decision to Grant received for European Patent Application No. 21733268.3, mailed on Mar. 27, 2025, 2 pages.

Extended European Search Report received for European Patent Application No. 25164730.1, mailed on Jun. 2, 2025, 8 pages.

Final Office Action received for U.S. Appl. No. 18/125,277, mailed on Oct. 16, 2025, 28 pages.

Final Office Action received for U.S. Appl. No. 18/131,833, mailed on Aug. 19, 2025, 14 pages.

Intention to Grant received for European Patent Application No. 24165004.3, mailed on Jun. 5, 2025, 9 pages.

Intention to Grant received for European Patent Application No. 24165004.3, mailed on Sep. 11, 2025, 9 pages.

Jonathan et al., "Using Gaze Behavior and Head Orientation for Implicit Identification in Virtual Reality", Online Available at: https://dl.acm.org/doi/10.1145/3489849.3489880, Proceedings of the 1ST Workshop on Digital Twin & Edge AI for Industrial IoT, ACMPUB27, New York, NY, USA, DOI: 10.1145/3489849.348988, Dec. 8, 2021, 9 pages.

Non-Final Office Action received for U.S. Appl. No. 18/131,833, mailed on Apr. 3, 2025, 15 pages.

Non-Final Office Action received for U.S. Appl. No. 18/737,710, mailed on Mar. 14, 2025, 39 pages.

Notice of Acceptance received for Australian Patent Application No. 2024200190, mailed on Jun. 16, 2025, 3 pages.

Notice of Acceptance received for Australian Patent Application No. 2024200460, mailed on Mar. 20, 2025, 3 pages.

Notice of Allowance received for Chinese Patent Application No. 201880004632.1, mailed .on Mar. 20, 2025, 4 pages (1 page of English translation and 3 pages of Official Copy).

Notice of Allowance received for Chinese Patent Application No. 202411117608.2, mailed on Jul. 1, 2025, 4 pages (1 page of English Translation and 3 pages of Official Copy).

Notice of Allowance received for Korean Patent Application No. 10-2022-7041713, mailed on Jun. 4, 2025, 7 pages (2 pages of English translation and 5 pages of Official Copy).

Notice of Allowance received for Korean Patent Application No. 10-2023-7033560, mailed on Mar. 6, 2025, 8 pages (2 pages of English translation and 6 pages of Official Copy).

Notice of Allowance received for Korean Patent Application No. 10-2024-7023682, mailed on Feb. 3, 2025, 8 pages (2 pages of English translation and 6 pages of Official Copy).

Notice of Allowance received for U.S. Appl. No. 18/737,710, mailed on Jun. 20, 2025, 8 pages.

Notice of Allowance received for U.S. Appl. No. 18/737,710, mailed on Sep. 4, 2025, 9 pages.

Office Action received for Chinese Patent Application No. 201880004632.1, mailed on Jan. 6, 2025, 2 pages (1 page of English translation and 1 page of Official Copy).

Office Action received for European Patent Application No. 19186042.8 mailed on Feb. 13, 2025, 7 pages.

Office Action received for Indian Patent Application No. 202217068796, mailed on May 22, 2025, 8 pages.

Office Action received for Japanese Patent Application No. 2024-154177, mailed on Jul. 7, 2025, 11 pages (5 pages of English Translation and 6 pages of Official Copy).

Office Action received for Japanese Patent Application No. 2024-569641, mailed on Nov. 21, 2025, 4 pages (2 pages of English Translation and 2 pages of Official Copy).

Office Action received for Korean Patent Application No. 10-2024-7037278, mailed on Nov. 13, 2025, 14 pages (6 pages of English Translation and 8 pages of Official Copy).

Office Action received for Korean Patent Application No. 10-2024-7039064, mailed on Nov. 15, 2025, 18 pages (8 pages of English Translation and 10 pages of Official Copy).

Result of Consultation received for European Patent Application No. 24165004.3, mailed on Feb. 4, 2025, 3 pages.

International Preliminary Report on Patentability received for PCT Patent Application No. PCT/US2024/028208, mailed on Dec. 4, 2025, 14 pages.

* cited by examiner

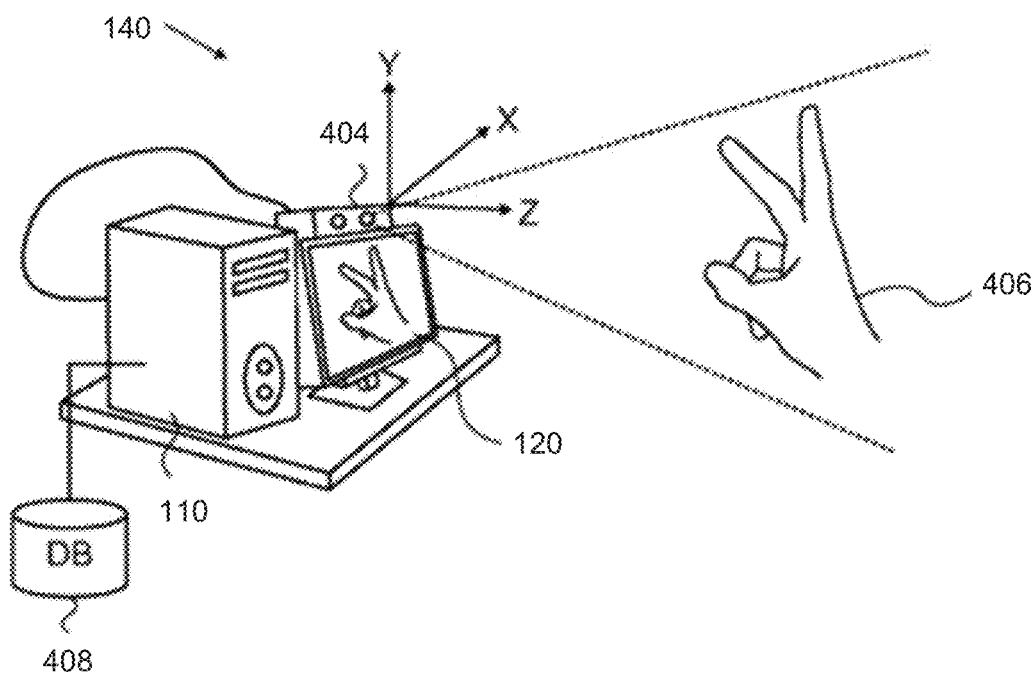
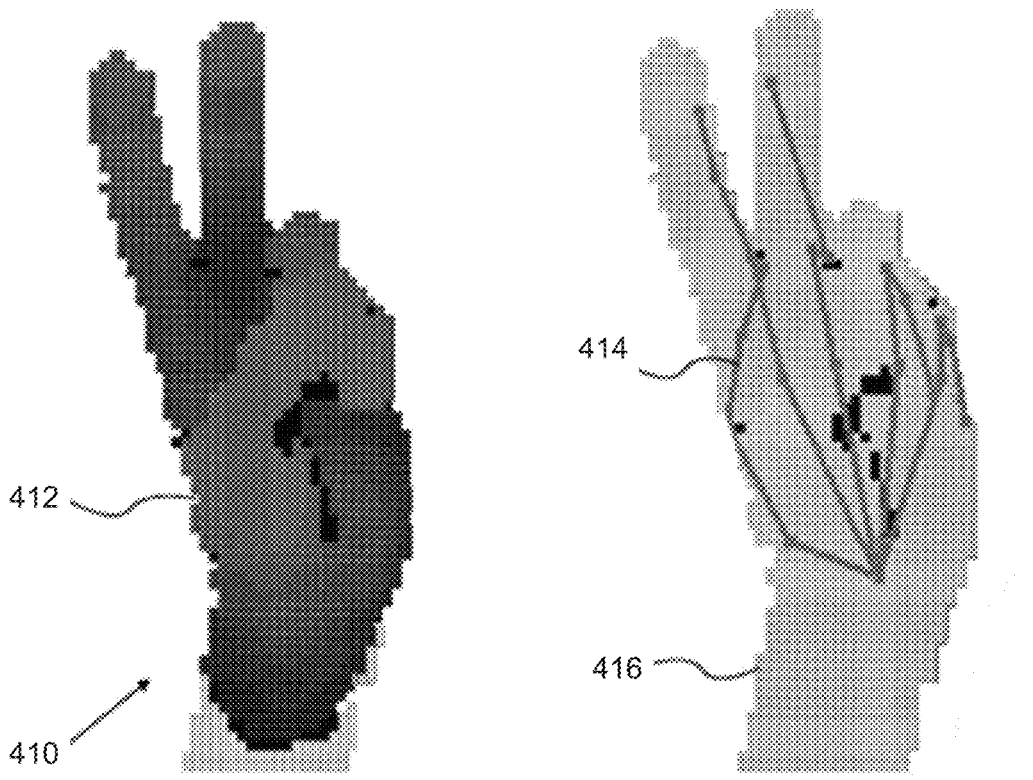
*FIG. 4*

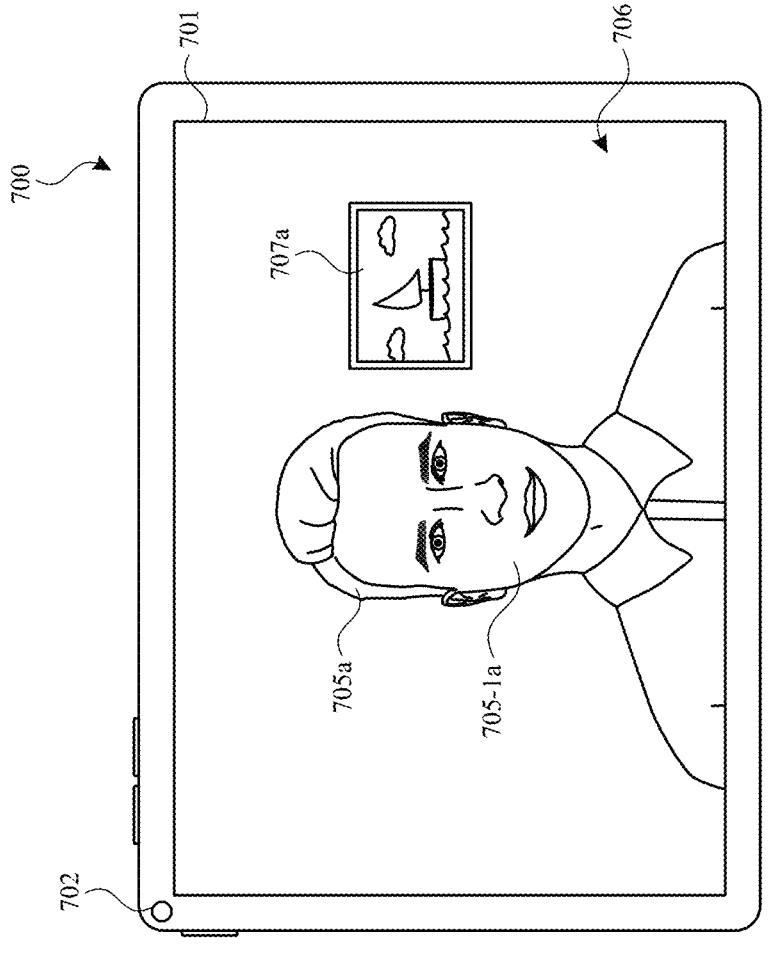
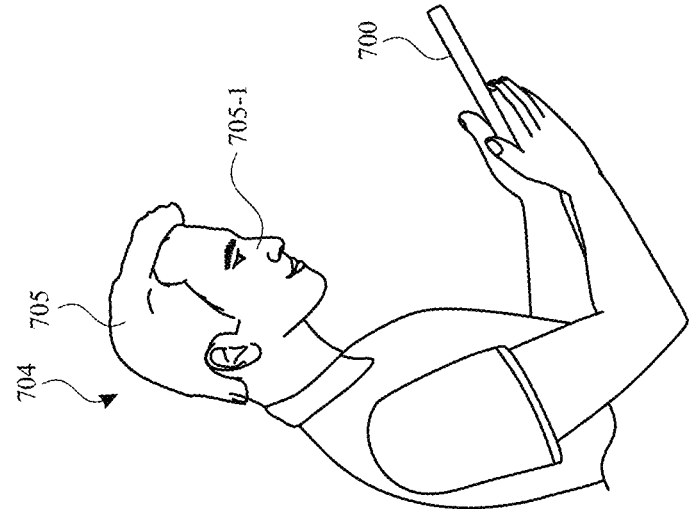
*FIG. 7A*

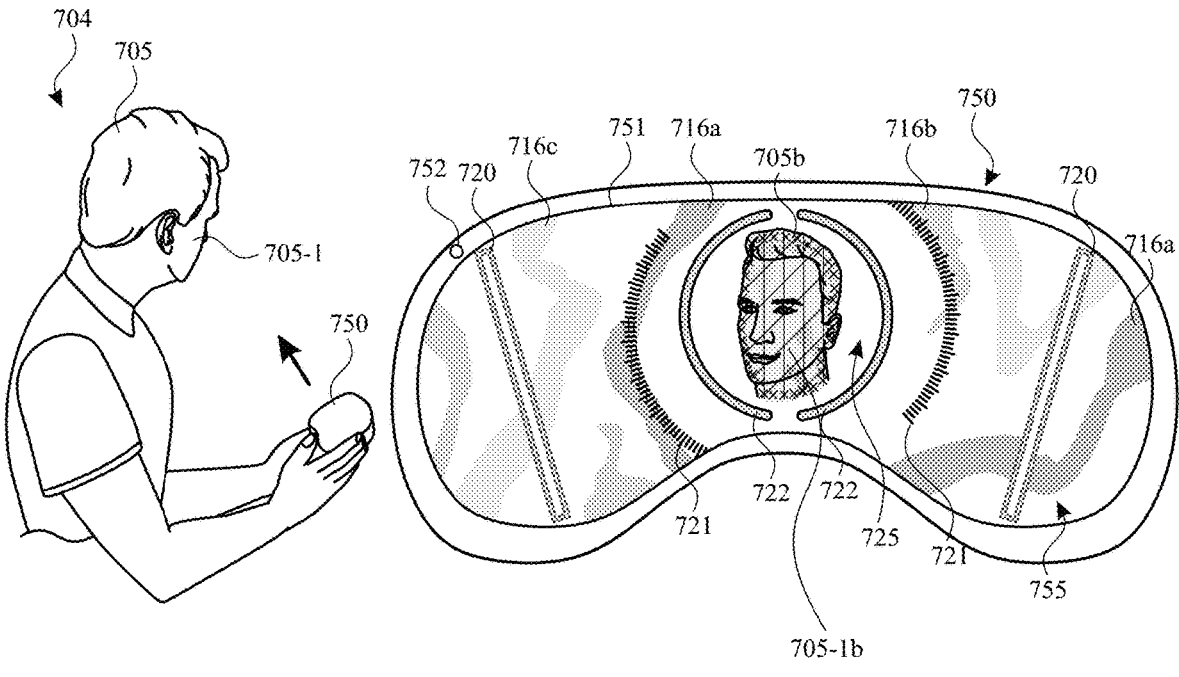
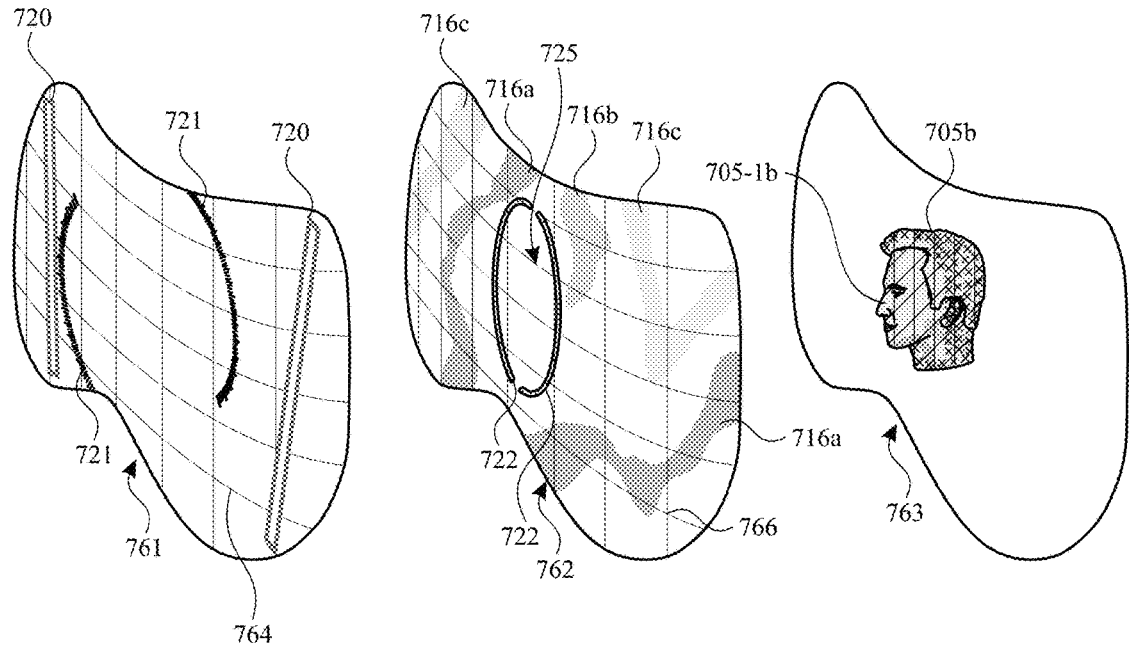
*FIG. 7N1*

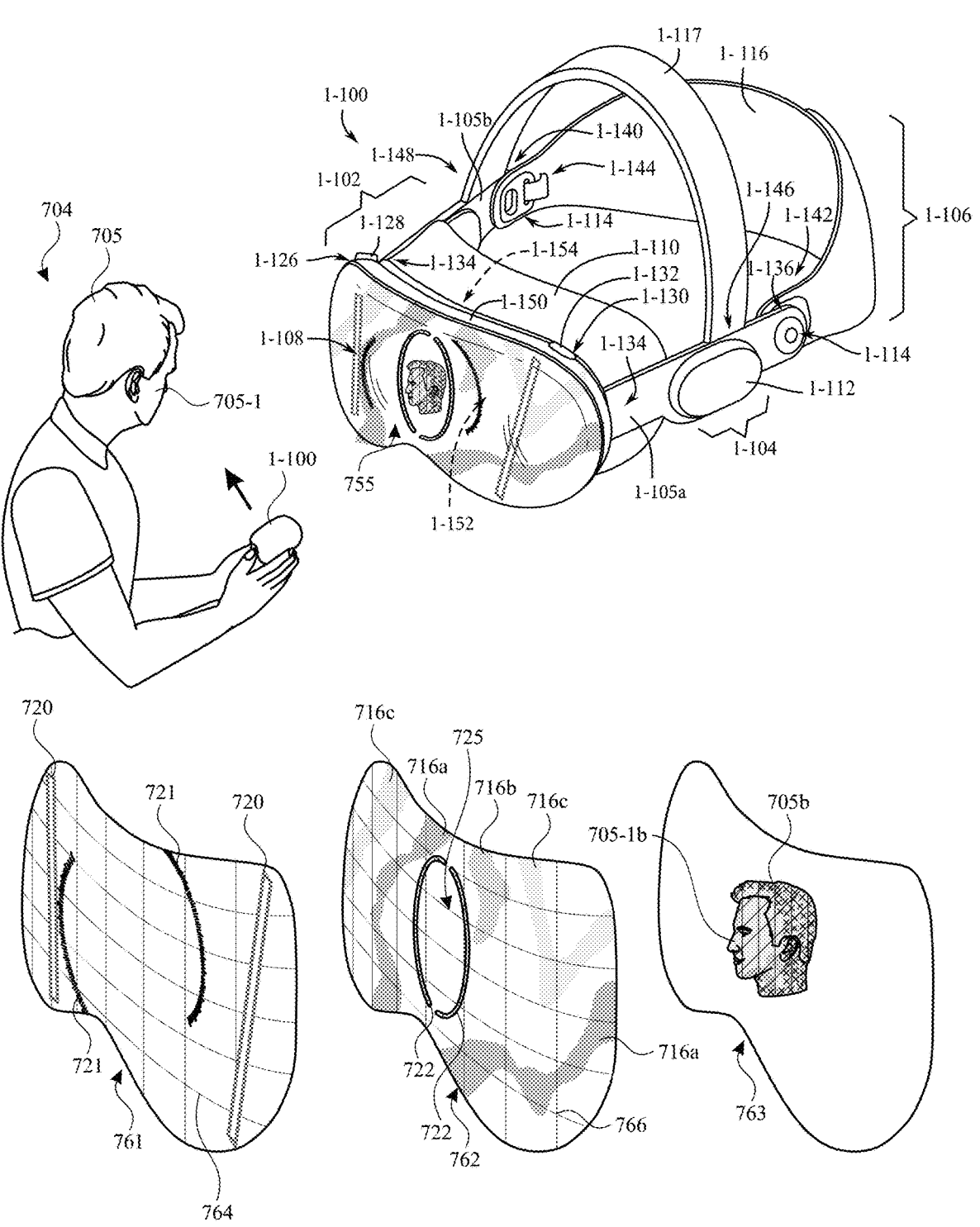
*FIG. 7N2*

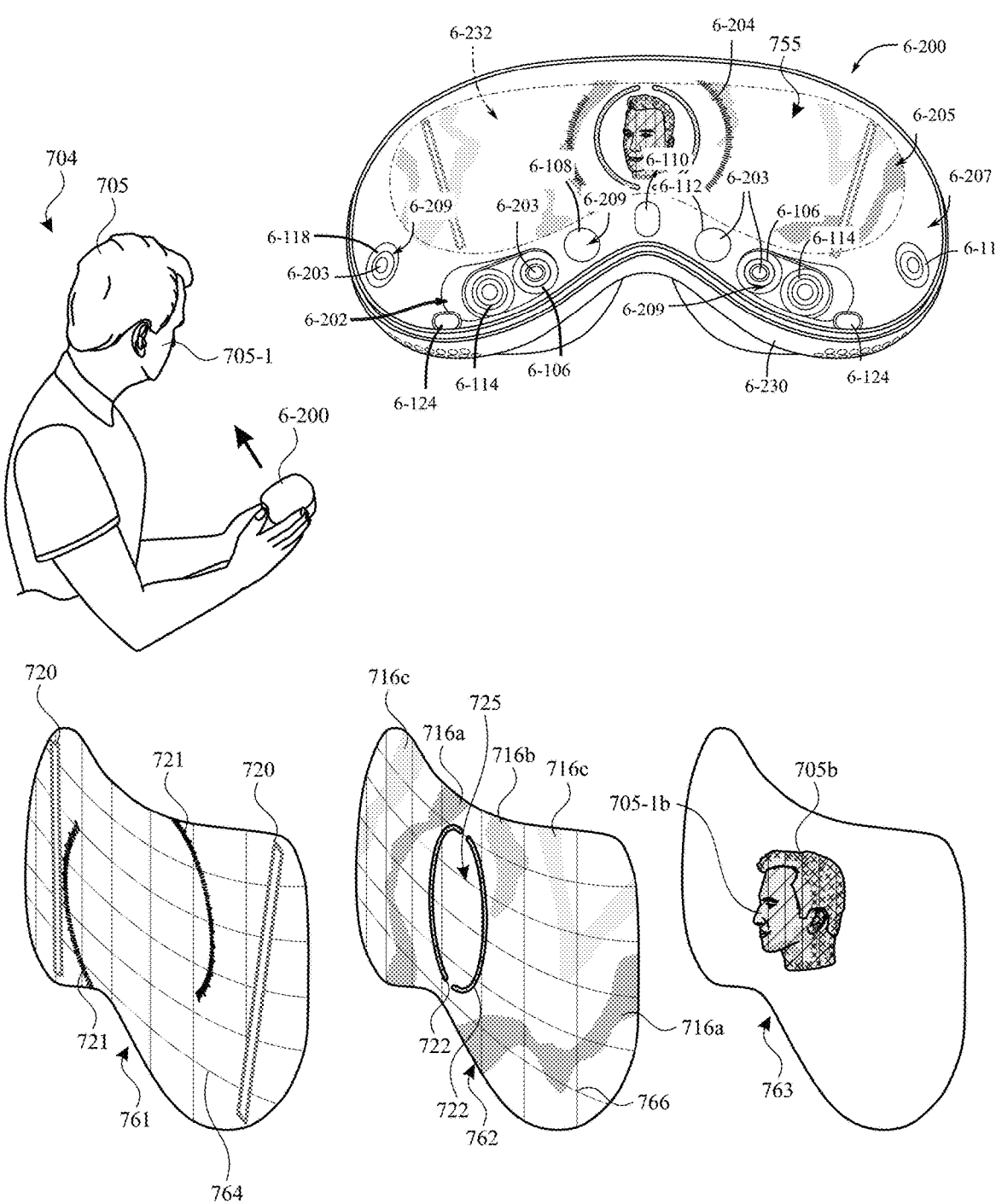
*FIG. 7N3*

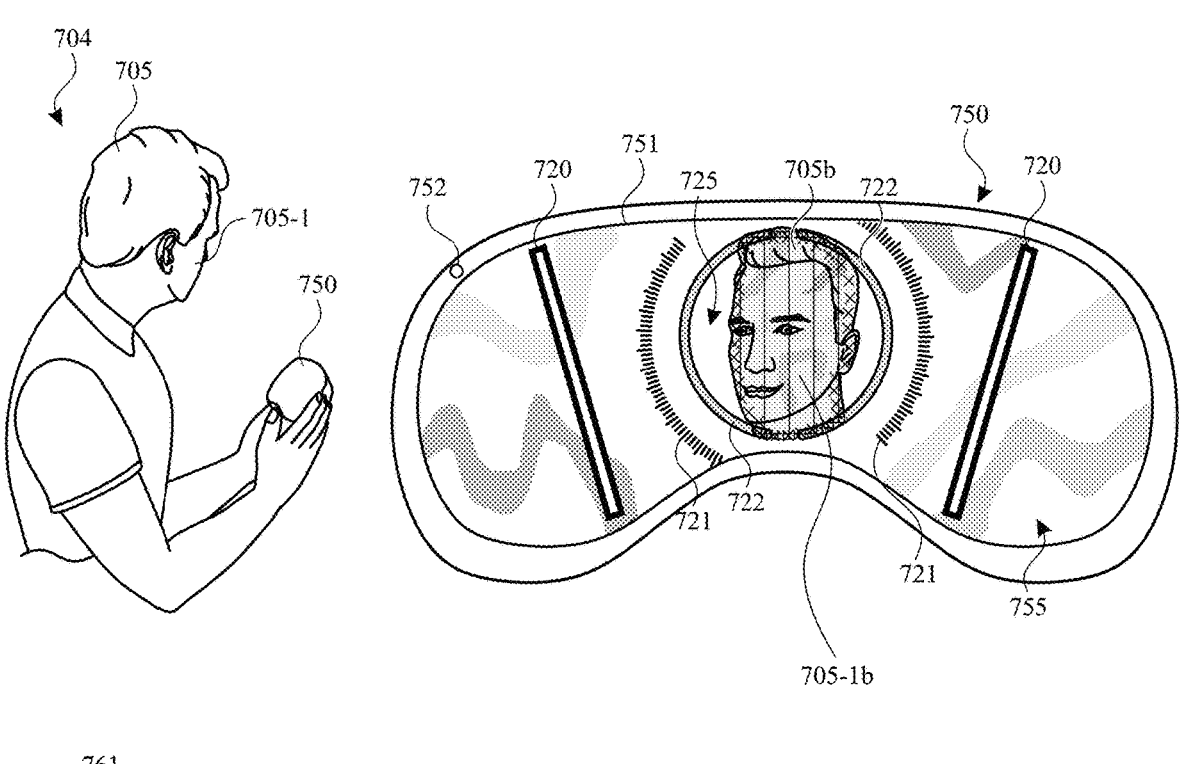
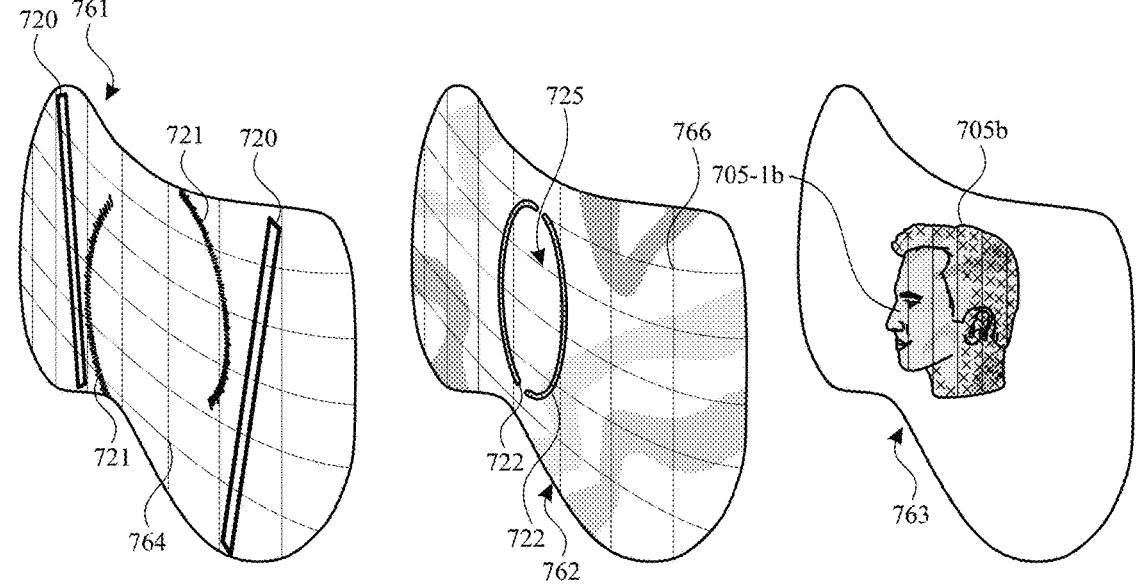
*FIG.7O1*

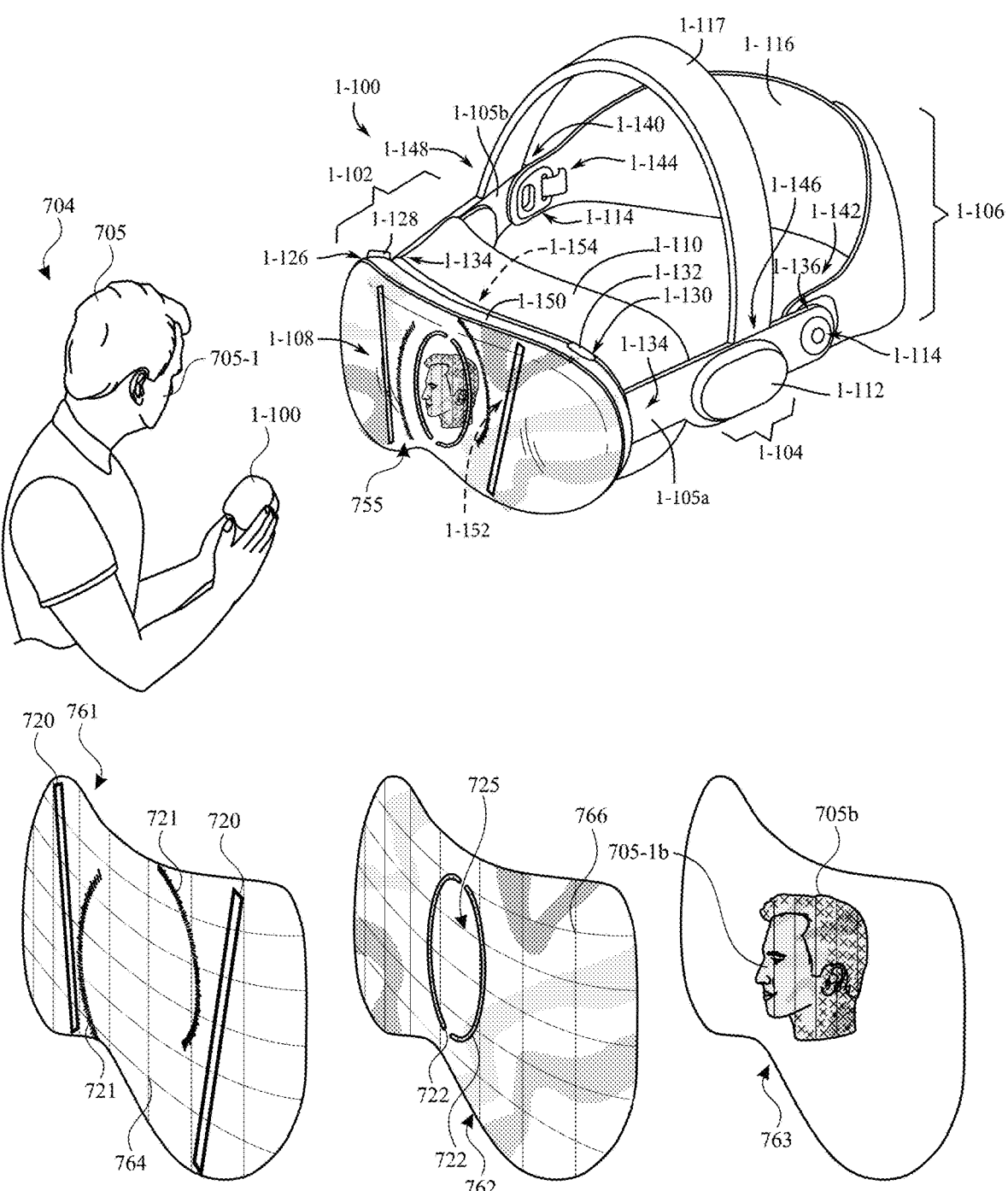
*FIG. 7O2*

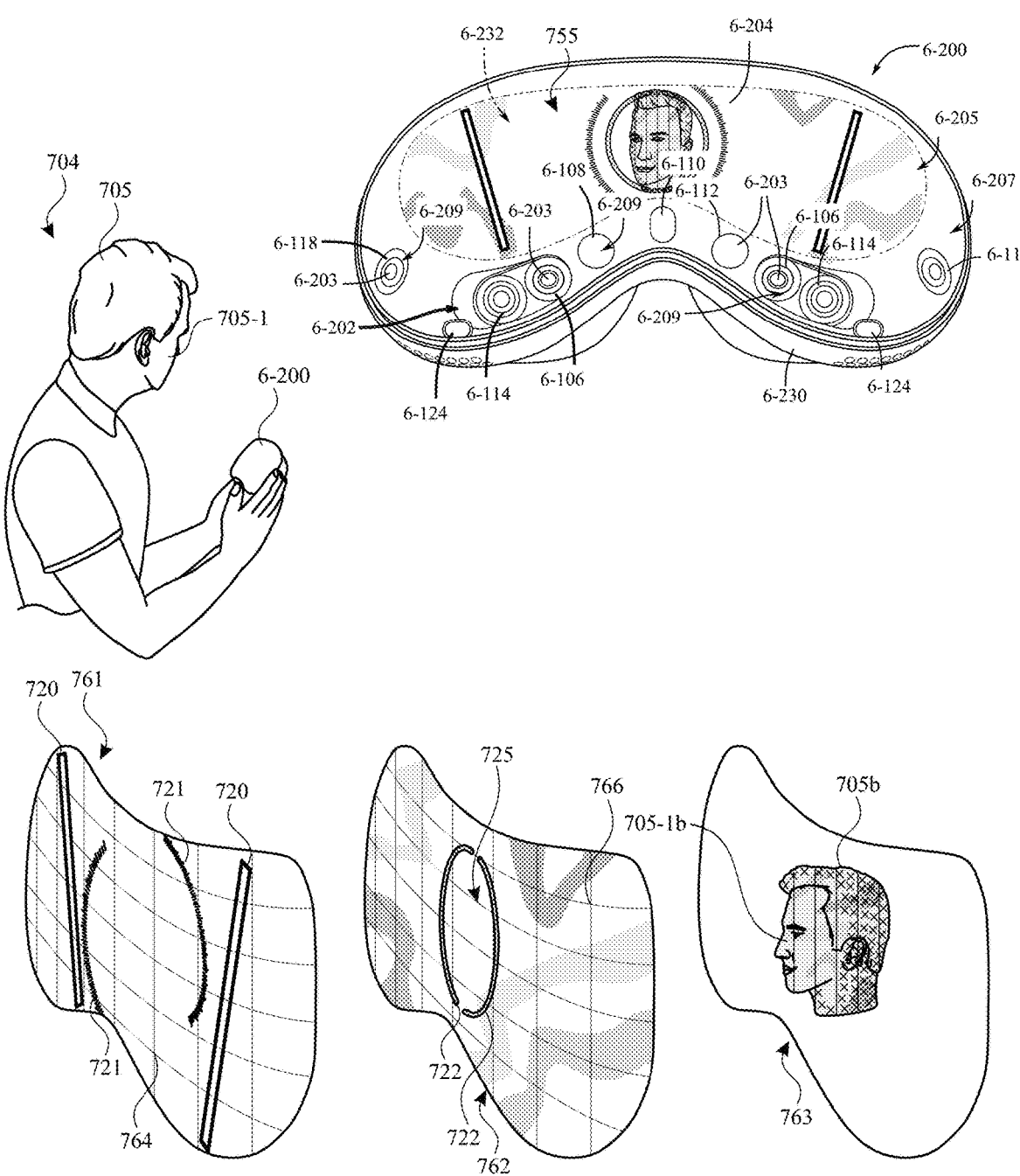
*FIG. 7O3*

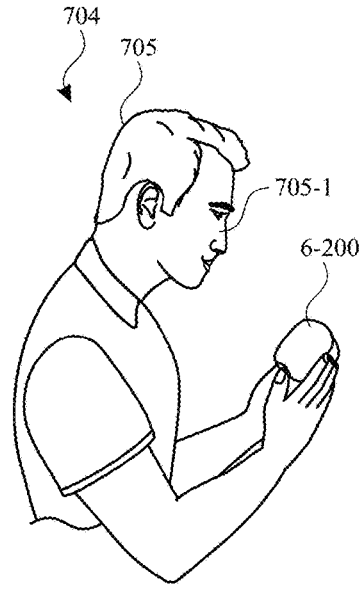
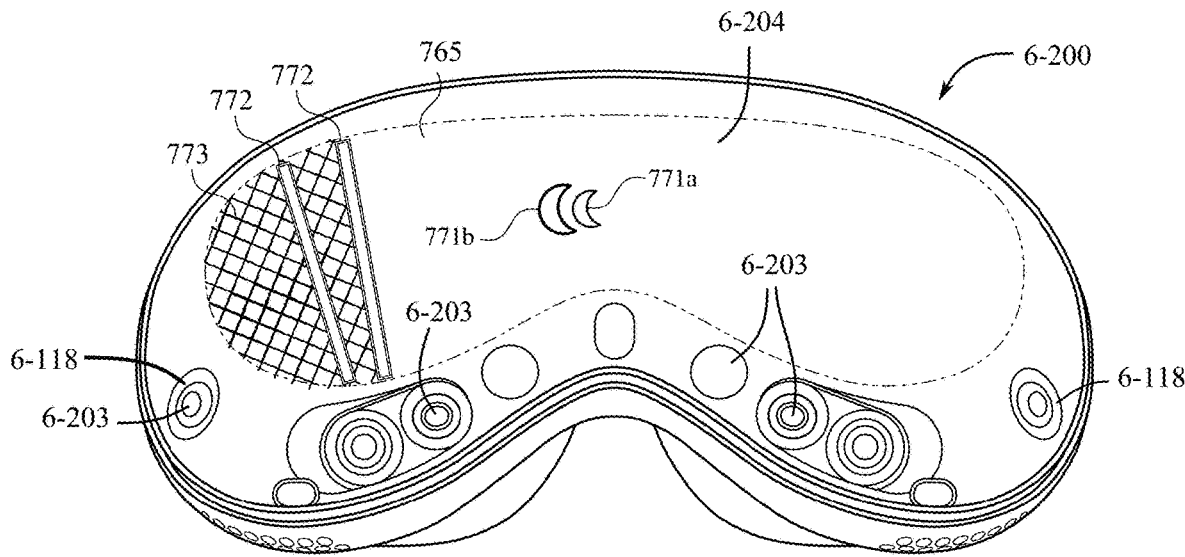
*FIG. 7Q*

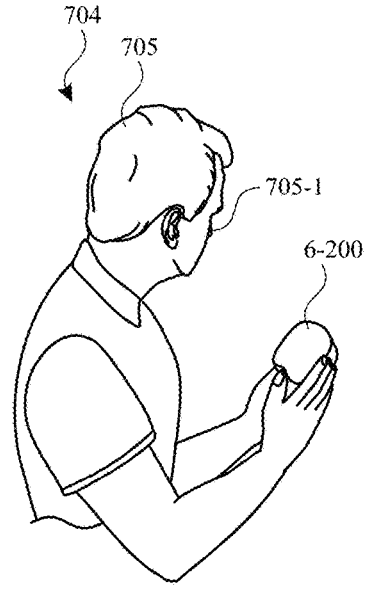
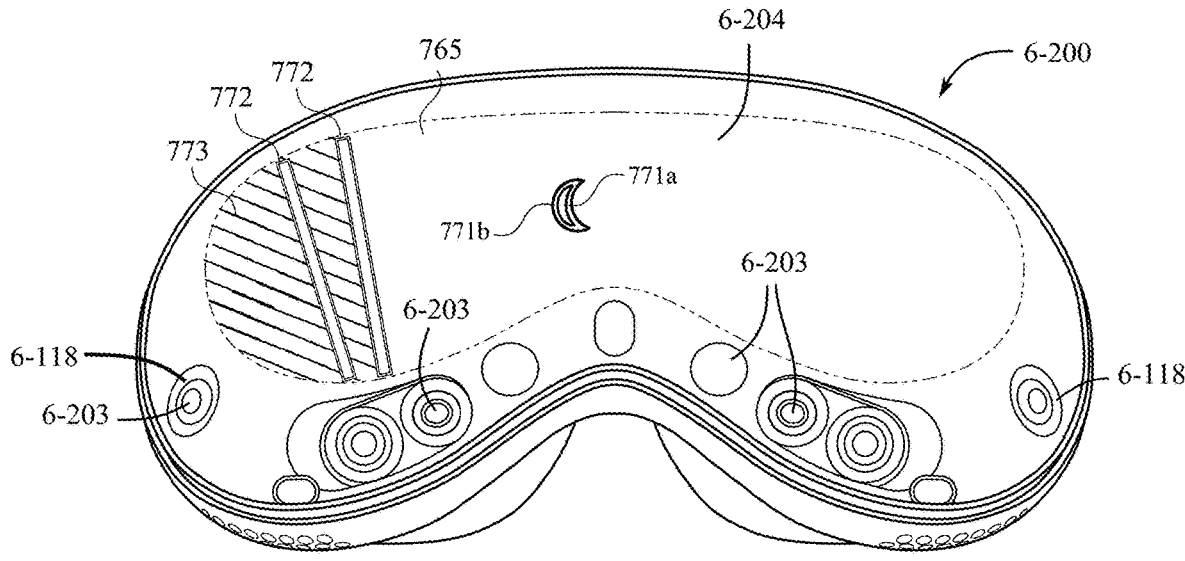
*FIG. 7R*

800

802
During a biometric enrollment process that includes capturing information about a biometric feature of a person, display an enrollment user interface that includes: an enrollment progress indicator that represents progress of the biometric enrollment process and a representation of a view of the biometric feature captured by the one or more cameras.

804
While displaying the enrollment user interface, detect a change in enrollment progress.

806
In response to detecting the change in the enrollment progress, change an appearance of the enrollment user interface, including:

808
In accordance with a determination that the enrollment progress is in a first state:

810
Display the enrollment progress indicator with a first appearance.

812
Display the representation of the view of the biometric feature having a first visual effect that changes an appearance of visible portions of the representation of the view of the biometric feature, wherein the first visual effect is based on the first appearance of the progress indicator.

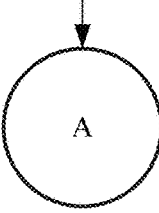

806
In response to detecting the change in the enrollment progress, change an appearance of the enrollment user interface, including:

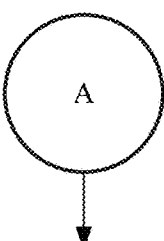

A

814
In accordance with a determination that the enrollment progress is in a second state:

816
Display the enrollment progress indicator with a second appearance.

818
Display the representation of the view of the biometric feature having a second visual effect that changes an appearance of visible portions of the representation of the view of the biometric feature, wherein the second visual effect is based on the second appearance of the progress indicator.

Figure 9:
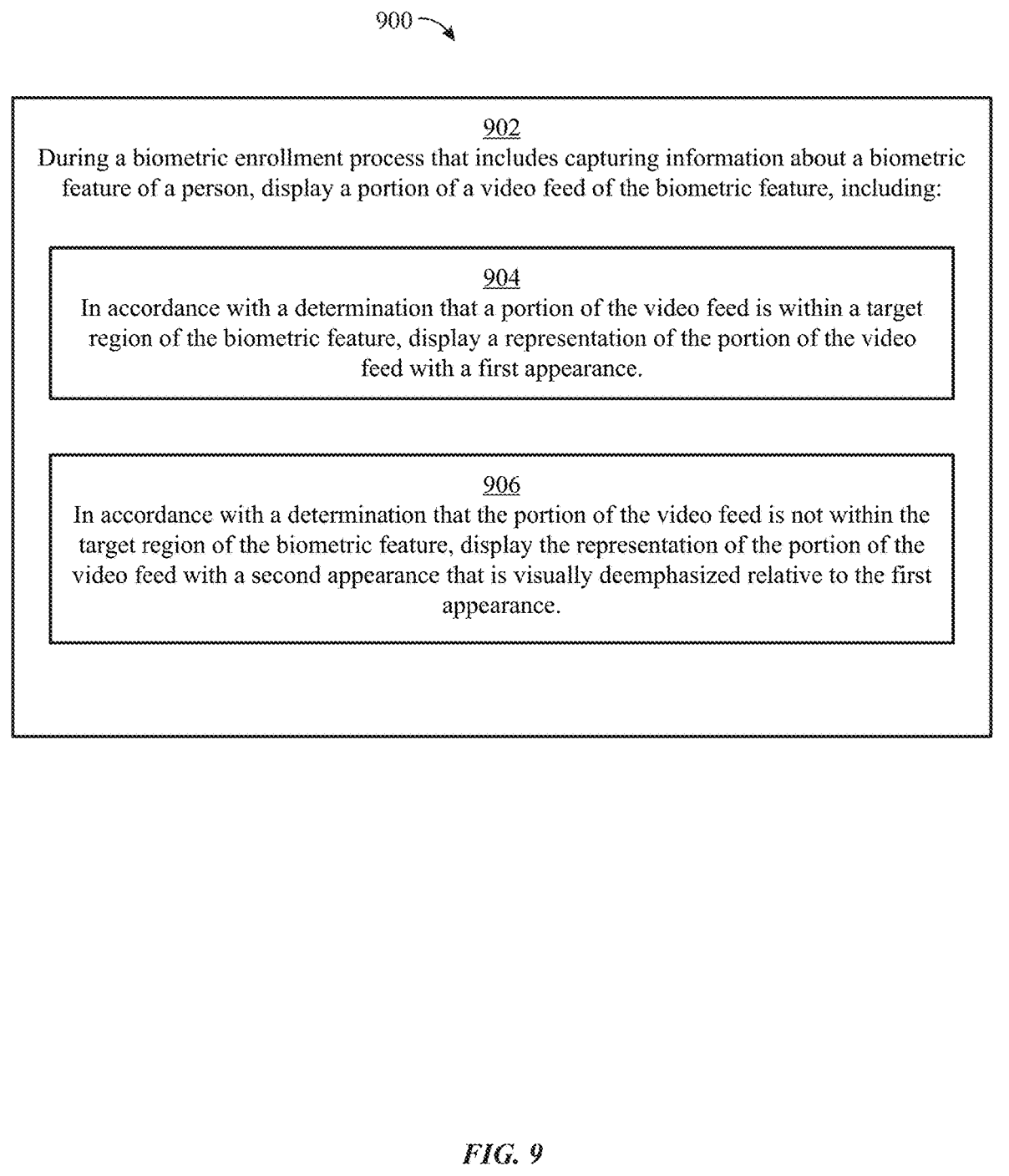

902
During a biometric enrollment process that includes capturing information about a biometric feature of a person, display a portion of a video feed of the biometric feature, including:

904
In accordance with a determination that a portion of the video feed is within a target region of the biometric feature, display a representation of the portion of the video feed with a first appearance.

906
In accordance with a determination that the portion of the video feed is not within the target region of the biometric feature, display the representation of the portion of the video feed with a second appearance that is visually deemphasized relative to the first appearance.

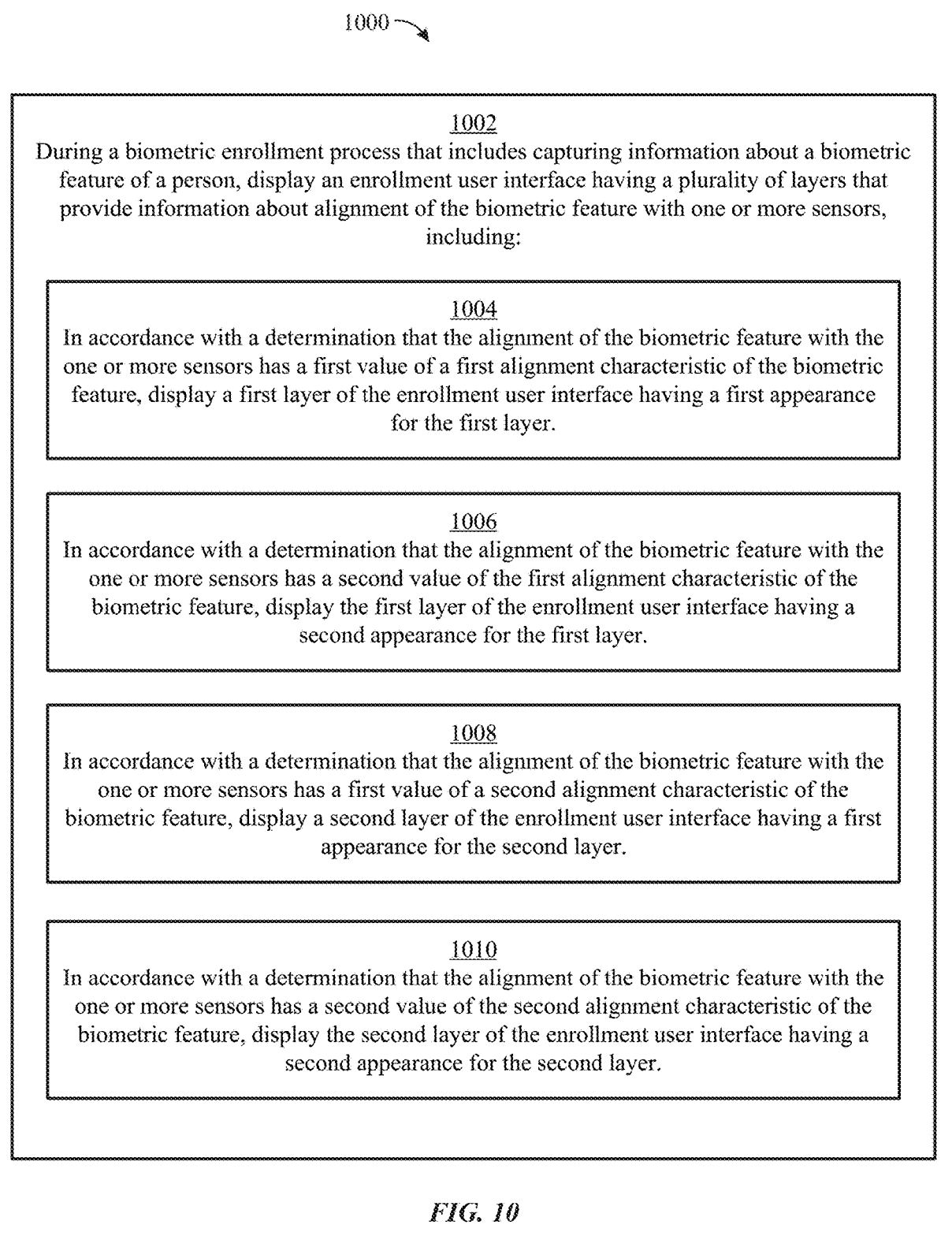

1002
During a biometric enrollment process that includes capturing information about a biometric feature of a person, display an enrollment user interface having a plurality of layers that provide information about alignment of the biometric feature with one or more sensors, including:

1004
In accordance with a determination that the alignment of the biometric feature with the one or more sensors has a first value of a first alignment characteristic of the biometric feature, display a first layer of the enrollment user interface having a first appearance for the first layer.

1006
In accordance with a determination that the alignment of the biometric feature with the one or more sensors has a second value of the first alignment characteristic of the biometric feature, display the first layer of the enrollment user interface having a second appearance for the first layer.

1008
In accordance with a determination that the alignment of the biometric feature with the one or more sensors has a first value of a second alignment characteristic of the biometric feature, display a second layer of the enrollment user interface having a first appearance for the second layer.

1010
In accordance with a determination that the alignment of the biometric feature with the one or more sensors has a second value of the second alignment characteristic of the biometric feature, display the second layer of the enrollment user interface having a second appearance for the second layer.

*FIG. 10*

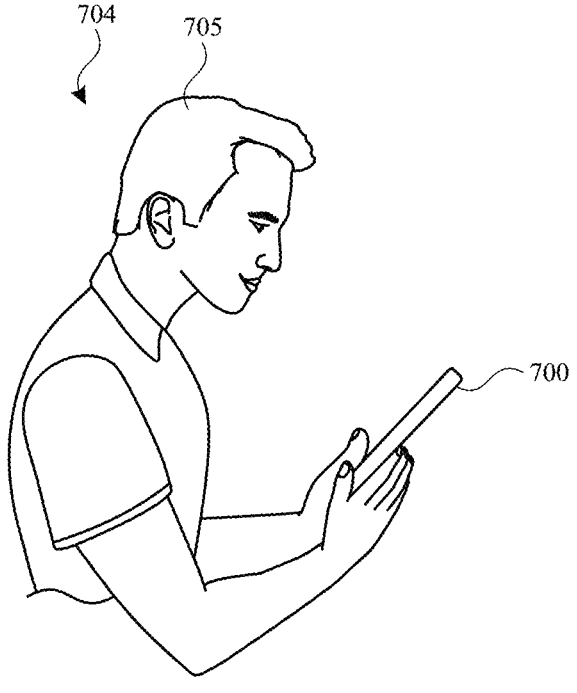
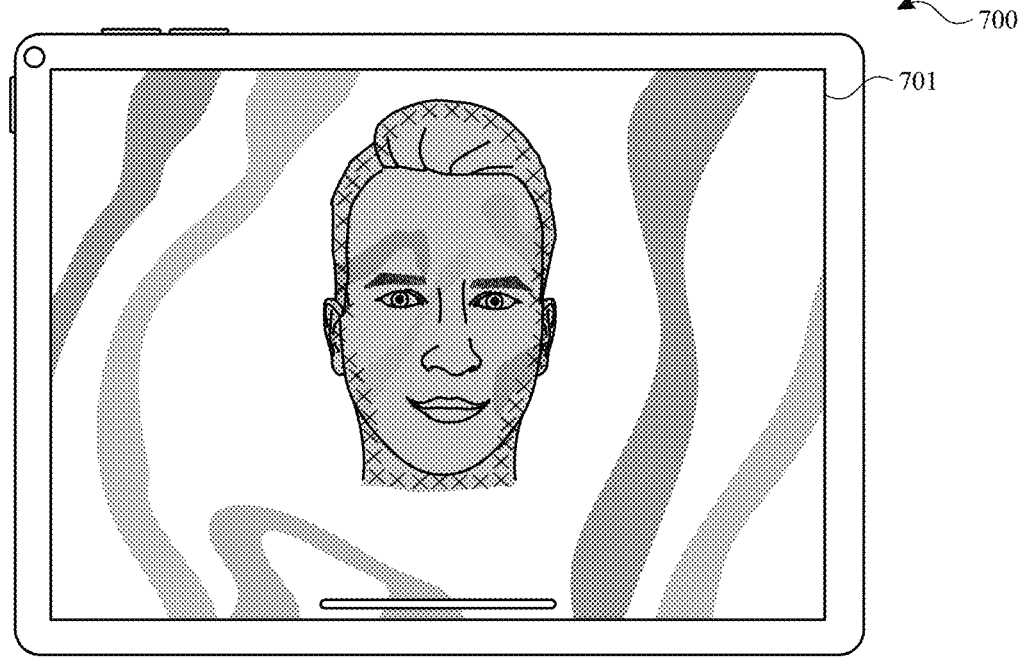
*FIG. 11F*

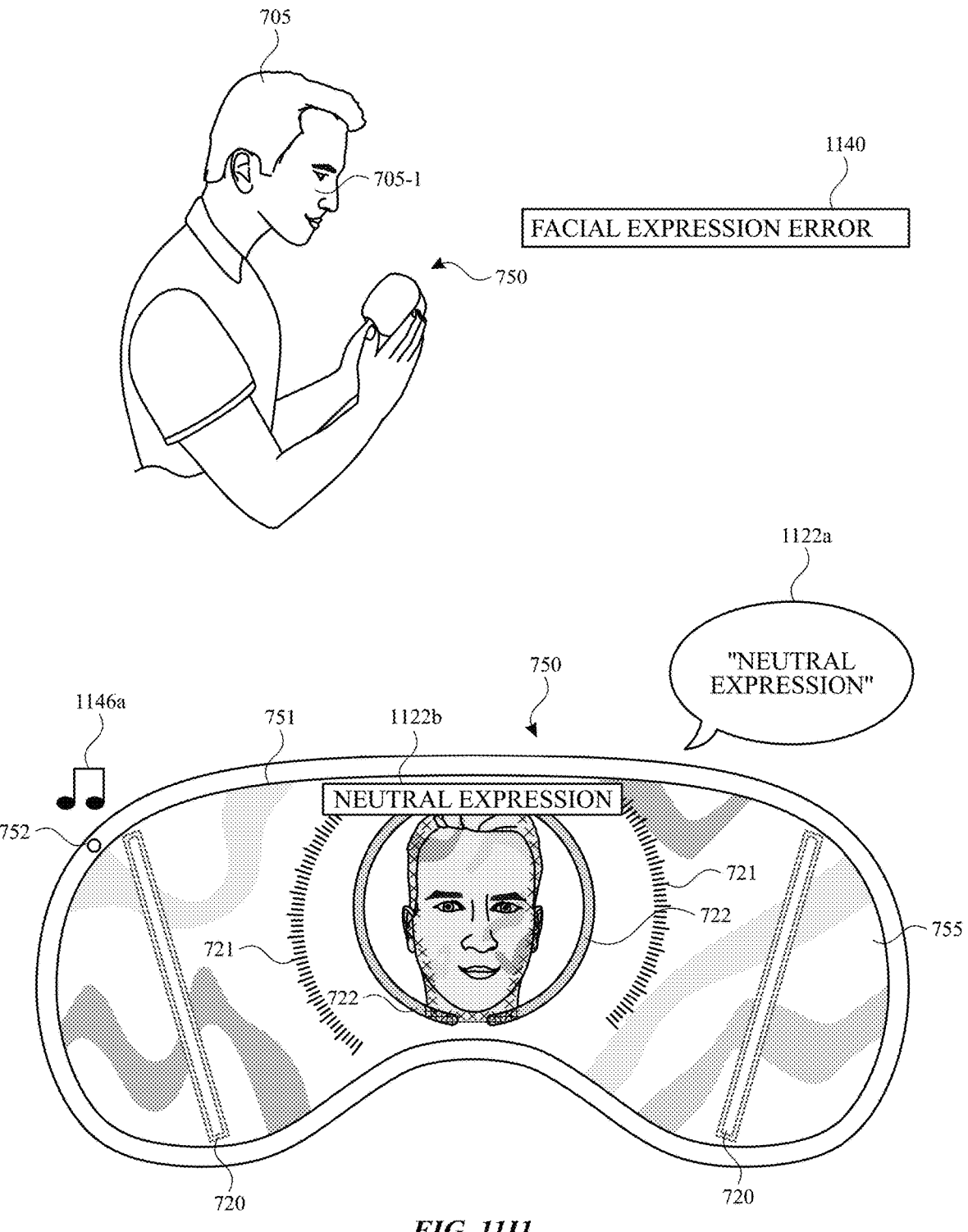
*FIG. 1111*

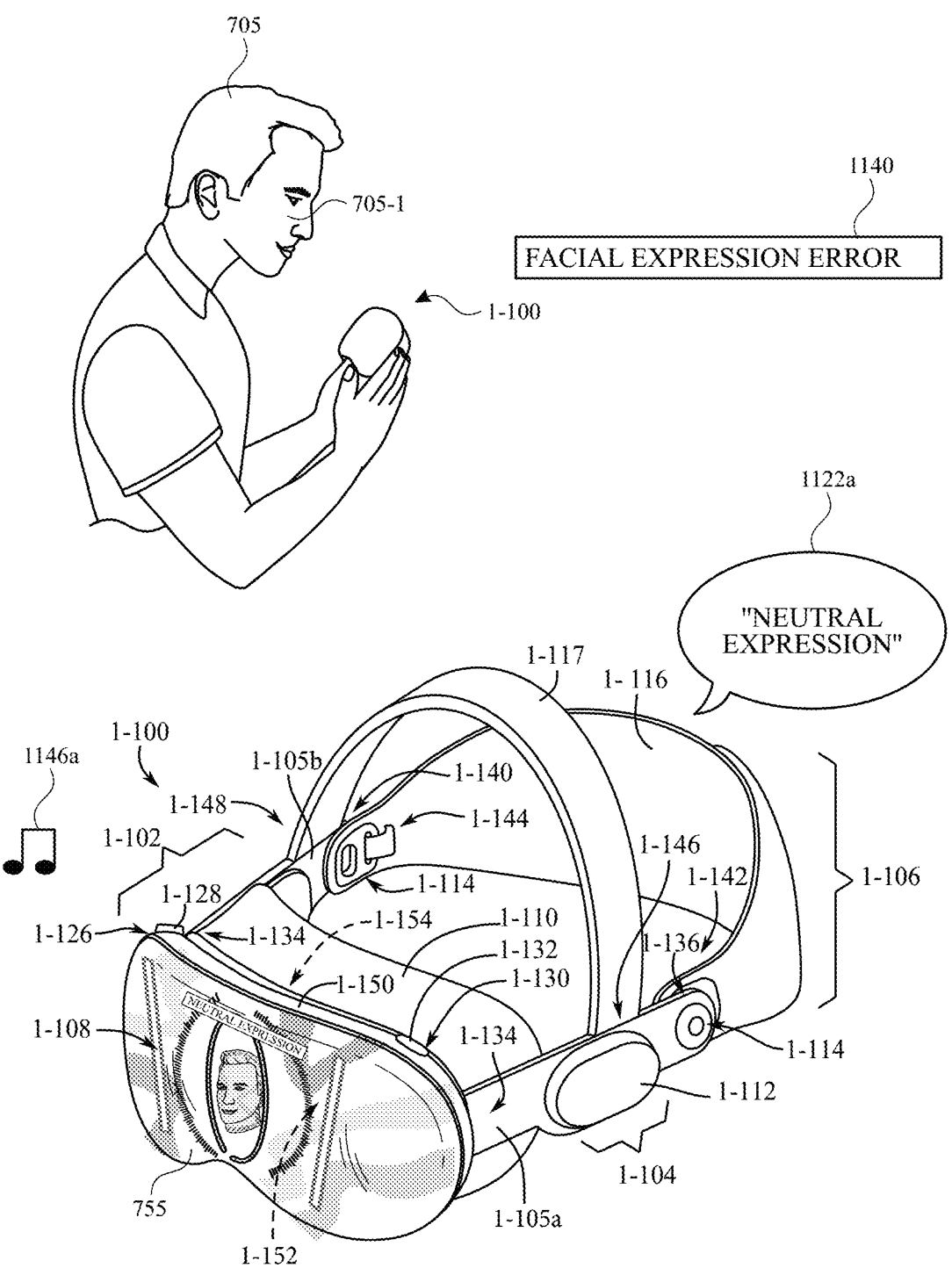
*FIG. 11I2*

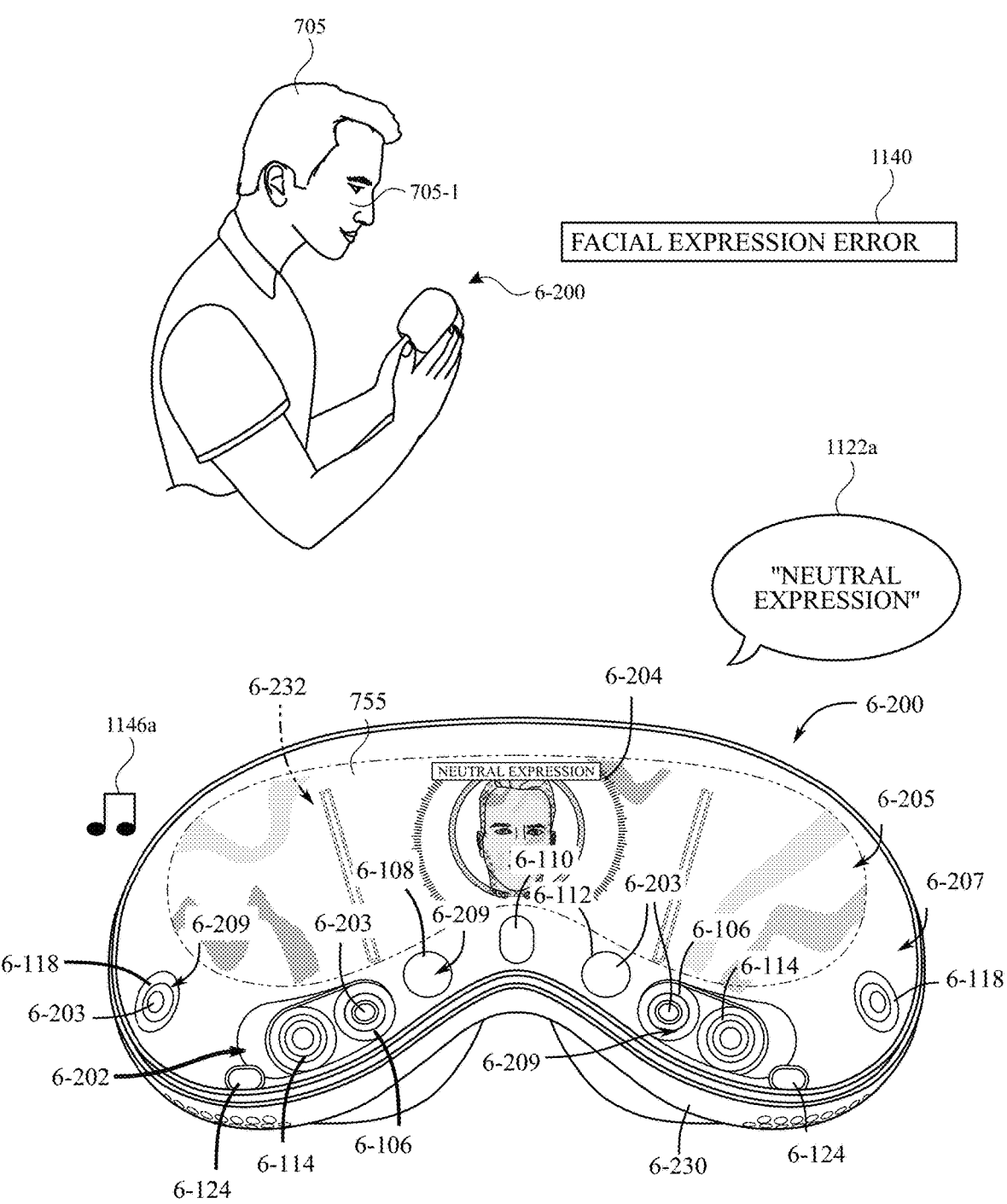
*FIG. 11I3*

Figure 12:
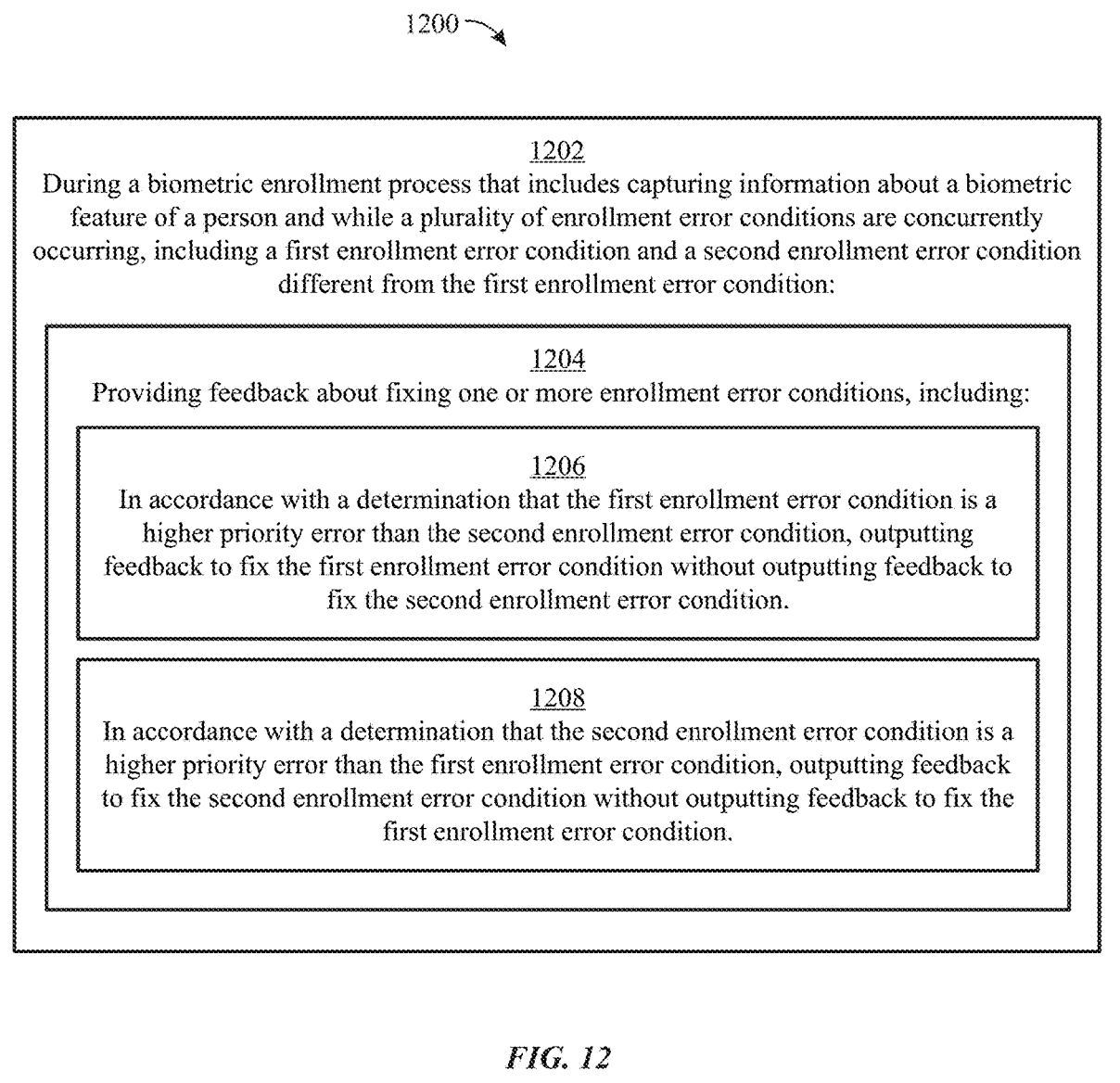

1200 ⟍

---

1202
During a biometric enrollment process that includes capturing information about a biometric feature of a person and while a plurality of enrollment error conditions are concurrently occurring, including a first enrollment error condition and a second enrollment error condition different from the first enrollment error condition:

1204
Providing feedback about fixing one or more enrollment error conditions, including:

1206
In accordance with a determination that the first enrollment error condition is a higher priority error than the second enrollment error condition, outputting feedback to fix the first enrollment error condition without outputting feedback to fix the second enrollment error condition.

1208
In accordance with a determination that the second enrollment error condition is a higher priority error than the first enrollment error condition, outputting feedback to fix the second enrollment error condition without outputting feedback to fix the first enrollment error condition.

DEVICES, METHODS, AND GRAPHICAL USER INTERFACES FOR BIOMETRIC FEATURE ENROLLMENT

CROSS-REFERENCE TO RELATED APPLICATIONS

This application claims priority to the following co-pending provisional applications: U.S. Provisional Patent Application Ser. No. 63/468,504, entitled "DEVICES, METHODS, AND GRAPHICAL USER INTERFACES FOR BIOMETRIC FEATURE ENROLLMENT", filed May 23, 2023; U.S. Provisional Patent Application Ser. No. 63/470,710, entitled "DEVICES, METHODS, AND GRAPHICAL USER INTERFACES FOR BIOMETRIC FEATURE ENROLLMENT", filed Jun. 2, 2023; and U.S. Provisional Patent Application Ser. No. 63/537,942, entitled "DEVICES, METHODS, AND GRAPHICAL USER INTERFACES FOR BIOMETRIC FEATURE ENROLL-MENT", filed Sep. 12, 2023. The contents of these applications are hereby incorporated by reference in their entireties for all purposes.

TECHNICAL FIELD

The present disclosure relates generally to computer systems that are in communication with a set of one or more display generation components and, optionally, one or more cameras, one or more sensors, and/or one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touchscreen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for enrolling a biometric feature are cumbersome, inefficient, and limited. For example, systems that provide insufficient feedback for performing biometric feature enrollment are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for enrolling a biometric feature that are more efficient and intuitive for a user. Such methods and interfaces optionally complement or replace conventional methods for enrolling a biometric feature. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touchscreen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for enrolling a biometric feature. Such methods and interfaces may complement or replace conventional methods for enrolling a biometric feature. Such methods and interfaces reduce the number, extent, and/or the nature of the inputs from a user and produce a more efficient human-machine interface. For battery-operated computing devices, such methods and interfaces conserve power, reduce inputs at the device, enable real-time communication, improve ergonomics of the device, provide more varied, detailed, and/or realistic user experiences, conserve and/or effectively utilize real estate on the device, and increase the time between battery charges. In some embodiments, such methods and interfaces are related to providing guidance for biometric enrollment, which can be a power-intensive process. Providing guidance using the methods and interfaces provided herein shortens the biometric enrollment process and conserves power, making the biometric enrollment process more efficient and accurate.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In accordance with some embodiments, a method is described. The method comprises: at a computer system that is in communication with a set of one or more display generation components and one or more cameras: during a biometric enrollment process that includes capturing information about a biometric feature of a person, displaying an enrollment user interface, including displaying, in the enrollment user interface: an enrollment progress indicator that represents progress of the biometric enrollment process; and a representation of a view of the biometric feature captured by the one or more cameras; while displaying the enrollment user interface with the representation of the view of the biometric feature, detecting a change in enrollment progress; and in response to detecting the change in enrollment progress, changing an appearance of the enrollment user interface, including: in accordance with a determination that the enrollment progress is in a first state: displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the progress indicator; and in accordance with a determination that the enrollment progress is in a second state that is different from the first state: displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the progress indicator.

In accordance with some embodiments, a non-transitory computer-readable storage medium is described. The non-transitory computer-readable storage medium stores one or more programs configured to be executed by one or more processors of a computer system that is in communication with a set of one or more display generation components and one or more cameras. The one or more programs include instructions for: during a biometric enrollment process that includes capturing information about a biometric feature of a person, displaying an enrollment user interface, including displaying, in the enrollment user interface: an enrollment progress indicator that represents progress of the biometric enrollment process; and a representation of a view of the biometric feature captured by the one or more cameras; while displaying the enrollment user interface with the representation of the view of the biometric feature, detecting a change in enrollment progress; and in response to detecting the change in enrollment progress, changing an appearance of the enrollment user interface, including: in accordance with a determination that the enrollment progress is in a first state: displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the progress indicator; and in accordance with a determination that the enrollment progress is in a second state that is different from the first state: displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the progress indicator.

In accordance with some embodiments, a transitory computer-readable storage medium is described. The transitory computer-readable storage medium stores one or more programs configured to be executed by one or more processors of a computer system that is in communication with a set of one or more display generation components and one or more cameras. The one or more programs include instructions for: during a biometric enrollment process that includes capturing information about a biometric feature of a person, displaying an enrollment user interface, including displaying, in the enrollment user interface: an enrollment progress indicator that represents progress of the biometric enrollment process; and a representation of a view of the biometric feature captured by the one or more cameras; while displaying the enrollment user interface with the representation of the view of the biometric feature, detecting a change in enrollment progress; and in response to detecting the change in enrollment progress, changing an appearance of the enrollment user interface, including: in accordance with a determination that the enrollment progress is in a first state: displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the progress indicator; and in accordance with a determination that the enrollment progress is in a second state that is different from the first state: displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the progress indicator.

In accordance with some embodiments, a computer system configured to communicate with a set of one or more display generation components and one or more cameras is described. The computer system comprises: one or more processors; and memory storing one or more programs configured to be executed by the one or more processors, the one or more programs including instructions for: during a biometric enrollment process that includes capturing information about a biometric feature of a person, displaying an enrollment user interface, including displaying, in the enrollment user interface: an enrollment progress indicator that represents progress of the biometric enrollment process; and a representation of a view of the biometric feature captured by the one or more cameras; while displaying the enrollment user interface with the representation of the view of the biometric feature, detecting a change in enrollment progress;

and in response to detecting the change in enrollment progress, changing an appearance of the enrollment user interface, including: in accordance with a determination that the enrollment progress is in a first state: displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the progress indicator; and in accordance with a determination that the enrollment progress is in a second state that is different from the first state: displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the progress indicator.

In accordance with some embodiments, a computer system configured to communicate with a set of one or more display generation components and one or more cameras is described. The computer system comprises: means for, during a biometric enrollment process that includes capturing information about a biometric feature of a person, displaying an enrollment user interface, including displaying, in the enrollment user interface: an enrollment progress indicator that represents progress of the biometric enrollment process; and a representation of a view of the biometric feature captured by the one or more cameras; means for, while displaying the enrollment user interface with the representation of the view of the biometric feature, detecting a change in enrollment progress; and means for, in response to detecting the change in enrollment progress, changing an appearance of the enrollment user interface, including: in accordance with a determination that the enrollment progress is in a first state: displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the progress indicator; and in accordance with a determination that the enrollment progress is in a second state that is different from the first state: displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the progress indicator.

In accordance with some embodiments, a computer program product is described. The computer program product comprises one or more programs configured to be executed by one or more processors of a computer system that is in communication with a set of one or more display generation components and one or more cameras. The one or more programs include instructions for: during a biometric enrollment process that includes capturing information about a biometric feature of a person, displaying an enrollment user interface, including displaying, in the enrollment user interface: an enrollment progress indicator that represents progress of the biometric enrollment process; and a representation of a view of the biometric feature captured by the one or more cameras; while displaying the enrollment user interface with the representation of the view of the biometric feature, detecting a change in enrollment progress; and in response to detecting the change in enrollment progress, changing an appearance of the enrollment user interface, including: in accordance with a determination that the enrollment progress is in a first state: displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the progress indicator; and in accordance with a determination that the enrollment progress is in a second state that is different from the first state: displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the progress indicator.

In accordance with some embodiments, a method is described. The method comprises: at a computer system that is in communication with a set of one or more display generation components and one or more cameras: during a biometric enrollment process that includes capturing information about a biometric feature of a person, displaying a portion of a video feed of the biometric feature, wherein displaying the portion of the video feed of the biometric feature includes: in accordance with a determination that a portion of the video feed is within a target region of the biometric feature, displaying a representation of the portion of the video feed with a first appearance; and in accordance with a determination that the portion of the video feed is not within the target region of the biometric feature, displaying the representation of the portion of the video feed with a second appearance that is visually deemphasized relative to the first appearance.

In accordance with some embodiments, a non-transitory computer-readable storage medium is described. The non-transitory computer-readable storage medium stores one or more programs configured to be executed by one or more processors of a computer system that is in communication with a set of one or more display generation components and one or more cameras. The one or more programs include instructions for: during a biometric enrollment process that includes capturing information about a biometric feature of a person, displaying a portion of a video feed of the biometric feature, wherein displaying the portion of the video feed of the biometric feature includes: in accordance with a determination that a portion of the video feed is within a target region of the biometric feature, displaying a representation of the portion of the video feed with a first appearance; and in accordance with a determination that the portion of the video feed is not within the target region of the biometric feature, displaying the representation of the portion of the video feed with a second appearance that is visually deemphasized relative to the first appearance.

In accordance with some embodiments, a transitory computer-readable storage medium is described. The transitory computer-readable storage medium stores one or more programs configured to be executed by one or more processors of a computer system that is in communication with a set of one or more display generation components and one or more cameras. The one or more programs include instructions for: during a biometric enrollment process that includes capturing information about a biometric feature of a person, displaying a portion of a video feed of the biometric feature, wherein displaying the portion of the video feed of the biometric feature includes: in accordance with a determination that a portion of the video feed is within a target region of the biometric feature, displaying a representation of the portion of the video feed with a first appearance; and in accordance with a determination that the portion of the video feed is not within the target region of the biometric feature, displaying the representation of the portion of the video feed with a second appearance that is visually deemphasized relative to the first appearance.

In accordance with some embodiments, a computer system configured to communicate with a set of one or more display generation components and one or more cameras is described. The computer system comprises: one or more processors; and memory storing one or more programs configured to be executed by the one or more processors, the one or more programs including instructions for: during a biometric enrollment process that includes capturing information about a biometric feature of a person, displaying a portion of a video feed of the biometric feature, wherein displaying the portion of the video feed of the biometric feature includes: in accordance with a determination that a portion of the video feed is within a target region of the biometric feature, displaying a representation of the portion of the video feed with a first appearance; and in accordance with a determination that the portion of the video feed is not within the target region of the biometric feature, displaying the representation of the portion of the video feed with a second appearance that is visually deemphasized relative to the first appearance.

In accordance with some embodiments, a computer system configured to communicate with a set of one or more display generation components and one or more cameras is described. The computer system comprises: means for, during a biometric enrollment process that includes capturing information about a biometric feature of a person, displaying a portion of a video feed of the biometric feature, wherein displaying the portion of the video feed of the biometric feature includes: in accordance with a determination that a portion of the video feed is within a target region of the biometric feature, displaying a representation of the portion of the video feed with a first appearance; and in accordance with a determination that the portion of the video feed is not within the target region of the biometric feature, displaying the representation of the portion of the video feed with a second appearance that is visually deemphasized relative to the first appearance.

In accordance with some embodiments, a computer program product is described. The computer program product comprises one or more programs configured to be executed by one or more processors of a computer system that is in communication with a set of one or more display generation components and one or more cameras. The one or more programs include instructions for: during a biometric enrollment process that includes capturing information about a biometric feature of a person, displaying a portion of a video feed of the biometric feature, wherein displaying the portion of the video feed of the biometric feature includes: in accordance with a determination that a portion of the video feed is within a target region of the biometric feature, displaying a representation of the portion of the video feed with a first appearance; and in accordance with a determination that the portion of the video feed is not within the target region of the biometric feature, displaying the representation of the portion of the video feed with a second appearance that is visually deemphasized relative to the first appearance.

In accordance with some embodiments, a method is described. The method comprises: at a computer system that is in communication with a set of one or more display generation components and one or more sensors: during a biometric enrollment process that includes capturing information about a biometric feature of a person, displaying an enrollment user interface having a plurality of layers that provide information about alignment of the biometric feature with the one or more sensors, including: in accordance with a determination that the alignment of the biometric feature with the one or more sensors has a first value of a first alignment characteristic of the biometric feature, displaying a first layer of the enrollment user interface having a first appearance for the first layer; in accordance with a determination that the alignment of the biometric feature with the one or more sensors has a second value of the first alignment characteristic of the biometric feature that is different from the first value of the first alignment characteristic of the biometric feature, displaying the first layer of the enrollment user interface having a second appearance for the first layer that is different from the first appearance for the first layer; in accordance with a determination that the alignment of the biometric feature with the one or more sensors has a first value of a second alignment characteristic of the biometric feature, displaying a second layer of the enrollment user interface having a first appearance for the second layer; and in accordance with a determination that the alignment of the biometric feature with the one or more sensors has a second value of the second alignment characteristic of the biometric feature that is different from the first value of the second alignment characteristic of the biometric feature, displaying the second layer of the enrollment user interface having a second appearance for the second layer that is different from the first appearance for the second layer.

In accordance with some embodiments, a non-transitory computer-readable storage medium is described. The non-transitory computer-readable storage medium stores one or more programs configured to be executed by one or more processors of a computer system that is in communication with a set of one or more display generation components and one or more sensors. The one or more programs include instructions for: during a biometric enrollment process that includes capturing information about a biometric feature of a person, displaying an enrollment user interface having a plurality of layers that provide information about alignment of the biometric feature with the one or more sensors, including: in accordance with a determination that the alignment of the biometric feature with the one or more sensors has a first value of a first alignment characteristic of the biometric feature, displaying a first layer of the enrollment user interface having a first appearance for the first layer; in accordance with a determination that the alignment of the biometric feature with the one or more sensors has a second value of the first alignment characteristic of the biometric feature that is different from the first value of the first alignment characteristic of the biometric feature, displaying the first layer of the enrollment user interface having a second appearance for the first layer that is different from the first appearance for the first layer; in accordance with a determination that the alignment of the biometric feature with the one or more sensors has a first value of a second alignment characteristic of the biometric feature, displaying a second layer of the enrollment user interface having a first appearance for the second layer; and in accordance with a determination that the alignment of the biometric feature with the one or more sensors has a second value of the second alignment characteristic of the biometric feature that is different from the first value of the second alignment characteristic of the biometric feature, displaying the second layer of the enrollment user interface having a second appearance for the second layer that is different from the first appearance for the second layer.

In accordance with some embodiments, a transitory computer-readable storage medium is described. The transitory computer-readable storage medium stores one or more programs configured to be executed by one or more processors of a computer system that is in communication with a set of one or more display generation components and one or more sensors. The one or more programs include instructions for: during a biometric enrollment process that includes capturing information about a biometric feature of a person, displaying an enrollment user interface having a plurality of layers that provide information about alignment of the biometric feature with the one or more sensors, including: in accordance with a determination that the alignment of the biometric feature with the one or more sensors has a first value of a first alignment characteristic of the biometric feature, displaying a first layer of the enrollment user interface having a first appearance for the first layer; in accordance with a determination that the alignment of the biometric feature with the one or more sensors has a second value of the first alignment characteristic of the biometric feature that is different from the first value of the first alignment characteristic of the biometric feature, displaying the first layer of the enrollment user interface having a second appearance for the first layer that is different from the first appearance for the first layer; in accordance with a determination that the alignment of the biometric feature with the one or more sensors has a first value of a second alignment characteristic of the biometric feature, displaying a second layer of the enrollment user interface having a first appearance for the second layer; and in accordance with a determination that the alignment of the biometric feature with the one or more sensors has a second value of the second alignment characteristic of the biometric feature that is different from the first value of the second alignment characteristic of the biometric feature, displaying the second layer of the enrollment user interface having a second appearance for the second layer that is different from the first appearance for the second layer.

In accordance with some embodiments, a computer system configured to communicate with a set of one or more display generation components and one or more sensors is described. The computer system comprises: one or more processors; and memory storing one or more programs configured to be executed by the one or more processors, the one or more programs including instructions for: during a biometric enrollment process that includes capturing information about a biometric feature of a person, displaying an enrollment user interface having a plurality of layers that provide information about alignment of the biometric feature with the one or more sensors, including: in accordance with a determination that the alignment of the biometric feature with the one or more sensors has a first value of a first alignment characteristic of the biometric feature, displaying a first layer of the enrollment user interface having a first appearance for the first layer; in accordance with a determination that the alignment of the biometric feature with the one or more sensors has a second value of the first alignment characteristic of the biometric feature that is different from the first value of the first alignment characteristic of the biometric feature, displaying the first layer of the enrollment user interface having a second appearance for the first layer that is different from the first appearance for the first layer;

in accordance with a determination that the alignment of the biometric feature with the one or more sensors has a first value of a second alignment characteristic of the biometric feature, displaying a second layer of the enrollment user interface having a first appearance for the second layer; and in accordance with a determination that the alignment of the biometric feature with the one or more sensors has a second value of the second alignment characteristic of the biometric feature that is different from the first value of the second alignment characteristic of the biometric feature, displaying the second layer of the enrollment user interface having a second appearance for the second layer that is different from the first appearance for the second layer.

In accordance with some embodiments, a computer system configured to communicate with a set of one or more display generation components and one or more sensors is described. The computer system comprises: means for, during a biometric enrollment process that includes capturing information about a biometric feature of a person, displaying an enrollment user interface having a plurality of layers that provide information about alignment of the biometric feature with the one or more sensors, including: in accordance with a determination that the alignment of the biometric feature with the one or more sensors has a first value of a first alignment characteristic of the biometric feature, displaying a first layer of the enrollment user interface having a first appearance for the first layer; in accordance with a determination that the alignment of the biometric feature with the one or more sensors has a second value of the first alignment characteristic of the biometric feature that is different from the first value of the first alignment characteristic of the biometric feature, displaying the first layer of the enrollment user interface having a second appearance for the first layer that is different from the first appearance for the first layer; in accordance with a determination that the alignment of the biometric feature with the one or more sensors has a first value of a second alignment characteristic of the biometric feature, displaying a second layer of the enrollment user interface having a first appearance for the second layer; and in accordance with a determination that the alignment of the biometric feature with the one or more sensors has a second value of the second alignment characteristic of the biometric feature that is different from the first value of the second alignment characteristic of the biometric feature, displaying the second layer of the enrollment user interface having a second appearance for the second layer that is different from the first appearance for the second layer.

In accordance with some embodiments, a computer program product is described. The computer program product comprises one or more programs configured to be executed by one or more processors of a computer system that is in communication with a set of one or more display generation components and one or more sensors. The one or more programs include instructions for: during a biometric enrollment process that includes capturing information about a biometric feature of a person, displaying an enrollment user interface having a plurality of layers that provide information about alignment of the biometric feature with the one or more sensors, including: in accordance with a determination that the alignment of the biometric feature with the one or more sensors has a first value of a first alignment characteristic of the biometric feature, displaying a first layer of the enrollment user interface having a first appearance for the first layer; in accordance with a determination that the alignment of the biometric feature with the one or more sensors has a second value of the first alignment characteristic of the biometric feature that is different from the first value of the first alignment characteristic of the biometric feature, displaying the first layer of the enrollment user interface having a second appearance for the first layer that is different from the first appearance for the first layer; in accordance with a determination that the alignment of the biometric feature with the one or more sensors has a first value of a second alignment characteristic of the biometric feature, displaying a second layer of the enrollment user interface having a first appearance for the second layer; and in accordance with a determination that the alignment of the biometric feature with the one or more sensors has a second value of the second alignment characteristic of the biometric feature that is different from the first value of the second alignment characteristic of the biometric feature, displaying the second layer of the enrollment user interface having a second appearance for the second layer that is different from the first appearance for the second layer.

In accordance with some embodiments, a method is described. The method comprises: at a computer system that is in communication with a set of one or more display generation components: during a biometric enrollment process that includes capturing information about a biometric feature of a person and while a plurality of enrollment error conditions are concurrently occurring, including a first enrollment error condition and a second enrollment error condition different from the first enrollment error condition, providing feedback about fixing one or more enrollment error conditions, including: in accordance with a determination that the first enrollment error condition is a higher priority error than the second enrollment error condition, outputting feedback to fix the first enrollment error condition without outputting feedback to fix the second enrollment error condition; and in accordance with a determination that the second enrollment error condition is a higher priority error than the first enrollment error condition, outputting feedback to fix the second enrollment error condition without outputting feedback to fix the first enrollment error condition.

In accordance with some embodiments, a non-transitory computer-readable storage medium is described. The non-transitory computer-readable storage medium stores one or more programs configured to be executed by one or more processors of a computer system that is in communication with a set of one or more display generation components, the one or more programs including instructions for: during a biometric enrollment process that includes capturing information about a biometric feature of a person and while a plurality of enrollment error conditions are concurrently occurring, including a first enrollment error condition and a second enrollment error condition different from the first enrollment error condition, providing feedback about fixing one or more enrollment error conditions, including: in accordance with a determination that the first enrollment error condition is a higher priority error than the second enrollment error condition, outputting feedback to fix the first enrollment error condition without outputting feedback to fix the second enrollment error condition; and in accordance with a determination that the second enrollment error condition is a higher priority error than the first enrollment error condition, outputting feedback to fix the second enrollment error condition without outputting feedback to fix the first enrollment error condition.

In accordance with some embodiments, a transitory computer-readable storage medium is described. The transitory computer-readable storage medium stores one or more programs configured to be executed by one or more processors of a computer system that is in communication with a set of one or more display generation components, the one or more programs including instructions for: during a biometric enrollment process that includes capturing information about a biometric feature of a person and while a plurality of enrollment error conditions are concurrently occurring, including a first enrollment error condition and a second enrollment error condition different from the first enrollment error condition, providing feedback about fixing one or more enrollment error conditions, including: in accordance with a determination that the first enrollment error condition is a higher priority error than the second enrollment error condition, outputting feedback to fix the first enrollment error condition without outputting feedback to fix the second enrollment error condition; and in accordance with a determination that the second enrollment error condition is a higher priority error than the first enrollment error condition, outputting feedback to fix the second enrollment error condition without outputting feedback to fix the first enrollment error condition.

In accordance with some embodiments, a computer system configured to communicate with a set of one or more display generation components and one or more sensors, the computer system comprising: one or more processors; and memory storing one or more programs configured to be executed by the one or more processors, the one or more programs including instructions for: during a biometric enrollment process that includes capturing information about a biometric feature of a person and while a plurality of enrollment error conditions are concurrently occurring, including a first enrollment error condition and a second enrollment error condition different from the first enrollment error condition, providing feedback about fixing one or more enrollment error conditions, including: in accordance with a determination that the first enrollment error condition is a higher priority error than the second enrollment error condition, outputting feedback to fix the first enrollment error condition without outputting feedback to fix the second enrollment error condition; and in accordance with a determination that the second enrollment error condition is a higher priority error than the first enrollment error condition, outputting feedback to fix the second enrollment error condition without outputting feedback to fix the first enrollment error condition.

In accordance with some embodiments, a computer system is described. The computer system is configured to communicate with a set of one or more display generation components and one or more sensors, the computer system comprising: means, during a biometric enrollment process that includes capturing information about a biometric feature of a person and while a plurality of enrollment error conditions are concurrently occurring, including a first enrollment error condition and a second enrollment error condition different from the first enrollment error condition, for providing feedback about fixing one or more enrollment error conditions, including: in accordance with a determination that the first enrollment error condition is a higher priority error than the second enrollment error condition, outputting feedback to fix the first enrollment error condition without outputting feedback to fix the second enrollment error condition; and in accordance with a determination that the second enrollment error condition is a higher priority error than the first enrollment error condition, outputting feedback to fix the second enrollment error condition without outputting feedback to fix the first enrollment error condition.

In accordance with some embodiments, a computer program product is described. The computer program product comprises one or more programs configured to be executed by one or more processors of a computer system that is in communication with a set of one or more display generation components and one or more sensors, the one or more programs including instructions for: during a biometric enrollment process that includes capturing information about a biometric feature of a person and while a plurality of enrollment error conditions are concurrently occurring, including a first enrollment error condition and a second enrollment error condition different from the first enrollment error condition, providing feedback about fixing one or more enrollment error conditions, including: in accordance with a determination that the first enrollment error condition is a higher priority error than the second enrollment error condition, outputting feedback to fix the first enrollment error condition without outputting feedback to fix the second enrollment error condition; and in accordance with a determination that the second enrollment error condition is a higher priority error than the first enrollment error condition, outputting feedback to fix the second enrollment error condition without outputting feedback to fix the first enrollment error condition.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIGS. 8A-8B are a flow diagram of methods of enrolling a biometric feature using a progress indicator, in accordance with some embodiments.

FIG. 9 is a flow diagram of methods of enrolling a biometric feature using a cropped video feed, in accordance with some embodiments.

FIG. 10 is a flow diagram of methods of enrolling a biometric feature using a multi-layer enrollment interface, in accordance with some embodiments.

FIGS. 11A-11I3 illustrate example techniques for providing feedback about fixing one or more enrollment error conditions, in accordance with some embodiments.

FIG. 12 is a flow diagram of methods of providing feedback about fixing one or more enrollment error conditions, in accordance with some embodiments.

DESCRIPTION OF EMBODIMENTS

Figure 1A:
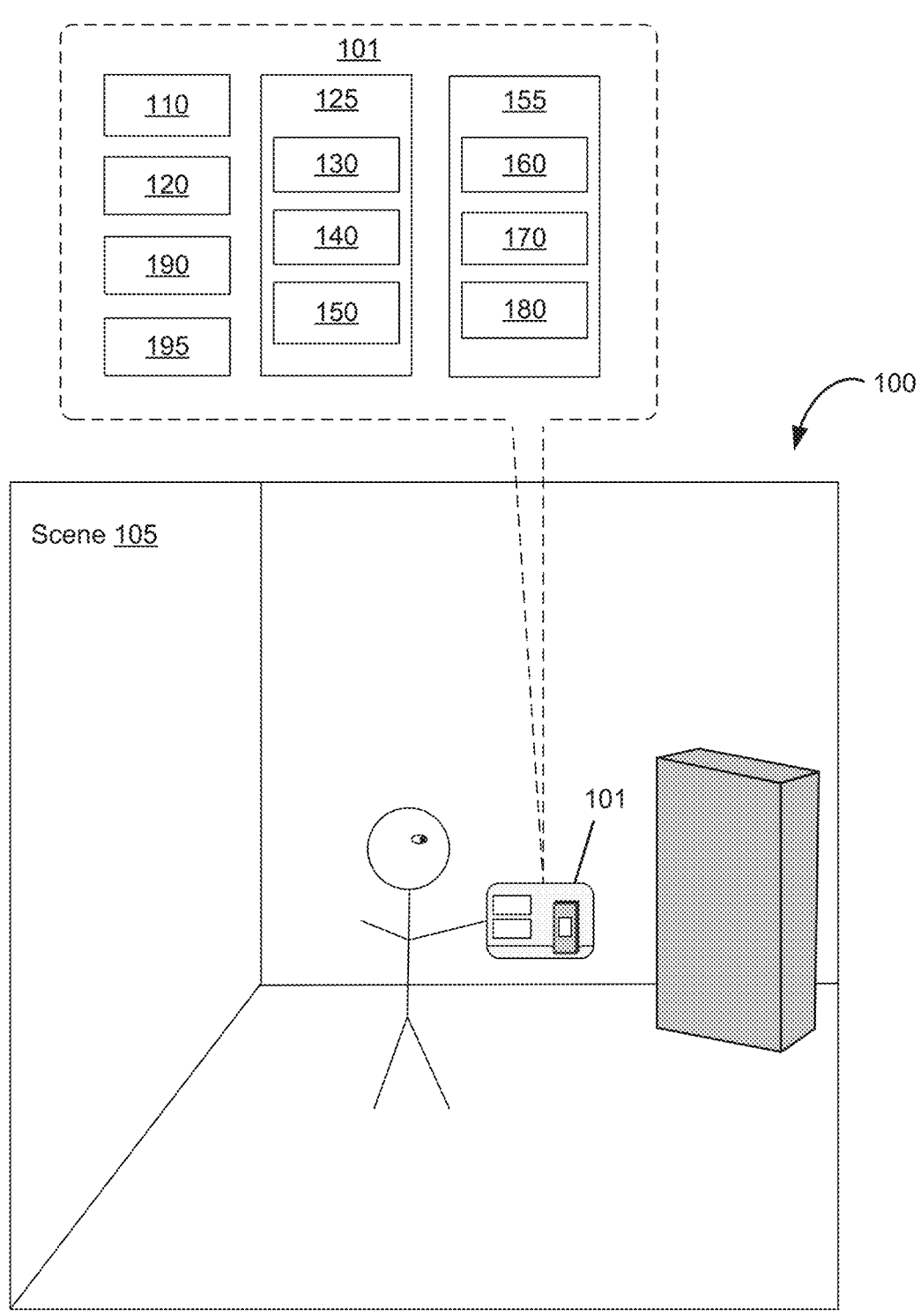
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system allows a user to enroll a biometric feature of the user (e.g., the user's face or eye(s)) using a progress indicator. The biometric enrollment process includes capturing information about the biometric feature of the user. The computer system displays an enrollment user interface that includes an enrollment progress indicator that represents progress of the biometric enrollment process and a representation of a view of the biometric feature captured by one or more cameras. The computer system detects a change in enrollment progress while displaying the enrollment user interface with the representation of the view of the biometric feature and, in response, changes an appearance of the enrollment user interface. In accordance with a determination that the enrollment progress is in a first state, the computer system displays the enrollment progress indicator with a first appearance and displays the representation of the view of the biometric feature having a first visual effect that changes an appearance of visible portions of the representation of the view of the biometric feature, wherein the first visual effect is based on the first appearance of the progress indicator. In accordance with a determination that the enrollment progress is in a second state, the computer system displays the enrollment progress indicator with a second appearance and displays the representation of the view of the biometric feature having a second visual effect that changes an appearance of visible portions of the representation of the view of the biometric feature, wherein the second visual effect is based on the second appearance of the progress indicator.

In some embodiments, a computer system allows a user to enroll a biometric feature of the user (e.g., the user's face or eye(s)) using a cropped video feed. The biometric enrollment process includes capturing information about the biometric feature of the user. The computer system displays a portion of a video feed of the biometric feature. In accordance with a determination that a portion of the video feed is within a target region of the biometric feature, the computer system displays a representation of the portion of the video feed with a first appearance. In accordance with a determination that the portion of the video feed is not within the target region of the biometric feature, the computer system displays the representation of the portion of the video feed with a second appearance that is visually deemphasized relative to the first appearance.

In some embodiments, a computer system allows a user to enroll a biometric feature of the user (e.g., the user's face or eye(s)) using a multi-layer enrollment interface. The biometric enrollment process includes capturing information about the biometric feature of the user. The computer system displays an enrollment user interface having a plurality of layers that provide information about alignment of the biometric feature with one or more sensors. In accordance with a determination that the alignment of the biometric feature with the one or more sensors has a first value of a first alignment characteristic of the biometric feature, the computer system displays a first layer of the enrollment user interface having a first appearance for the first layer. In accordance with a determination that the alignment of the biometric feature with the one or more sensors has a second value of the first alignment characteristic of the biometric feature that is different from the first value of the first alignment characteristic of the biometric feature, the computer system displays the first layer of the enrollment user interface having a second appearance for the first layer. In accordance with a determination that the alignment of the biometric feature with the one or more sensors has a first value of a second alignment characteristic of the biometric feature, the computer system displays a second layer of the enrollment user interface having a first appearance for the second layer. In accordance with a determination that the alignment of the biometric feature with the one or more sensors has a second value of the second alignment characteristic of the biometric feature, the computer system displays the second layer of the enrollment user interface having a second appearance for the second layer.

In some embodiments, a computer system is performing a biometric enrollment process. The biometric enrollment process includes capturing information about a biometric feature of a user. When multiple enrollment error conditions are concurrently occurring, the computer system provides feedback (e.g., spoken feedback with instructions) to the user to fix one or more of the enrollment error conditions, while prioritizing which enrollment error condition is presented. By prioritizing which enrollment error condition of the multiple enrollment error conditions is presented to the user, the computer system avoids confusing the user by giving too many instructions. Additionally, the enrollment error conditions are optionally ordered/prioritized so that it is more likely that lower priority enrollment error conditions are fixed while fixing higher priority enrollment error conditions.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

Figure 1B:
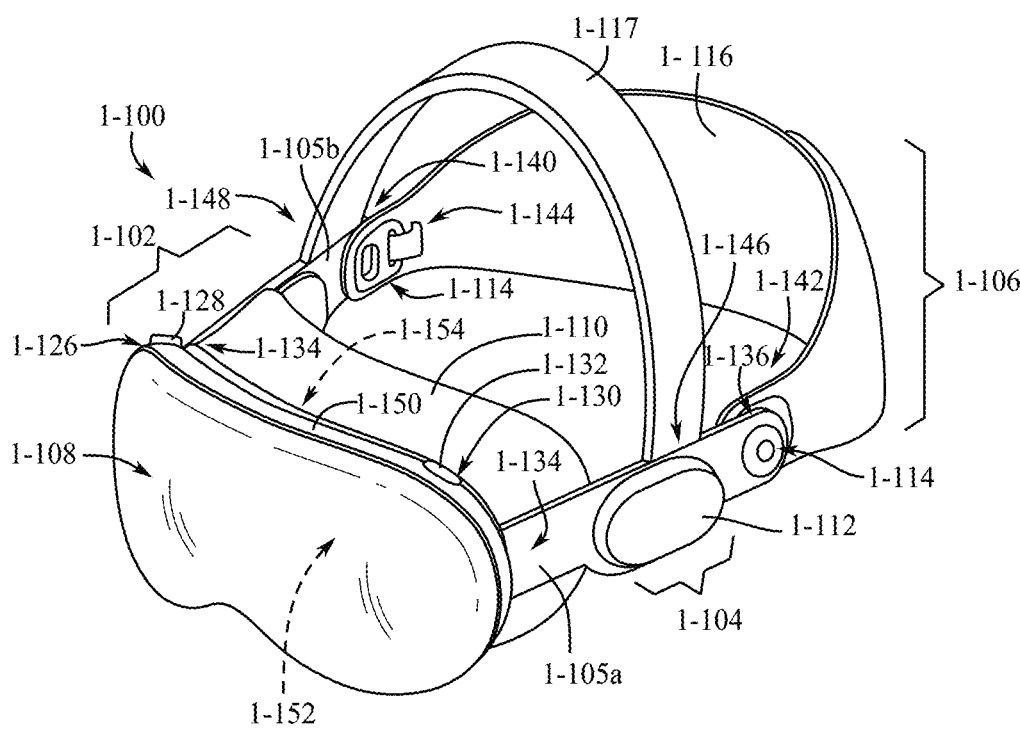
FIGS. 1B-1P are examples of a computer system for providing XR experiences in the operating environment of FIG. 1A.
Figure 1C:
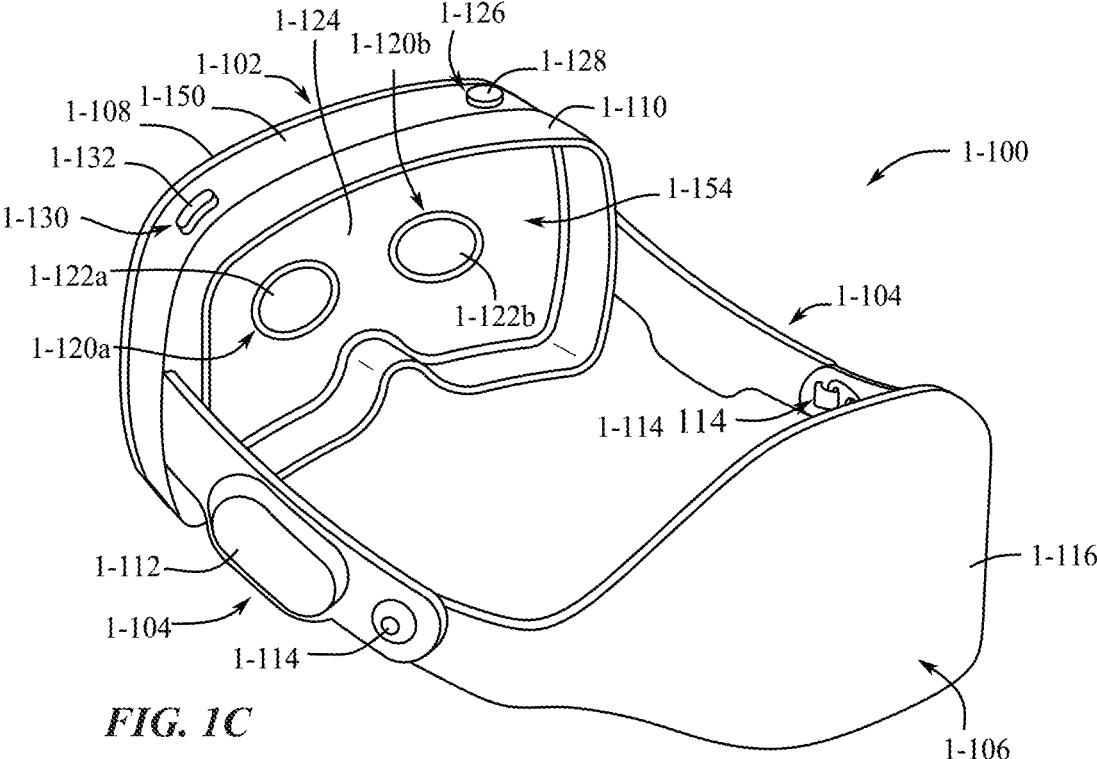
Figure 1D:
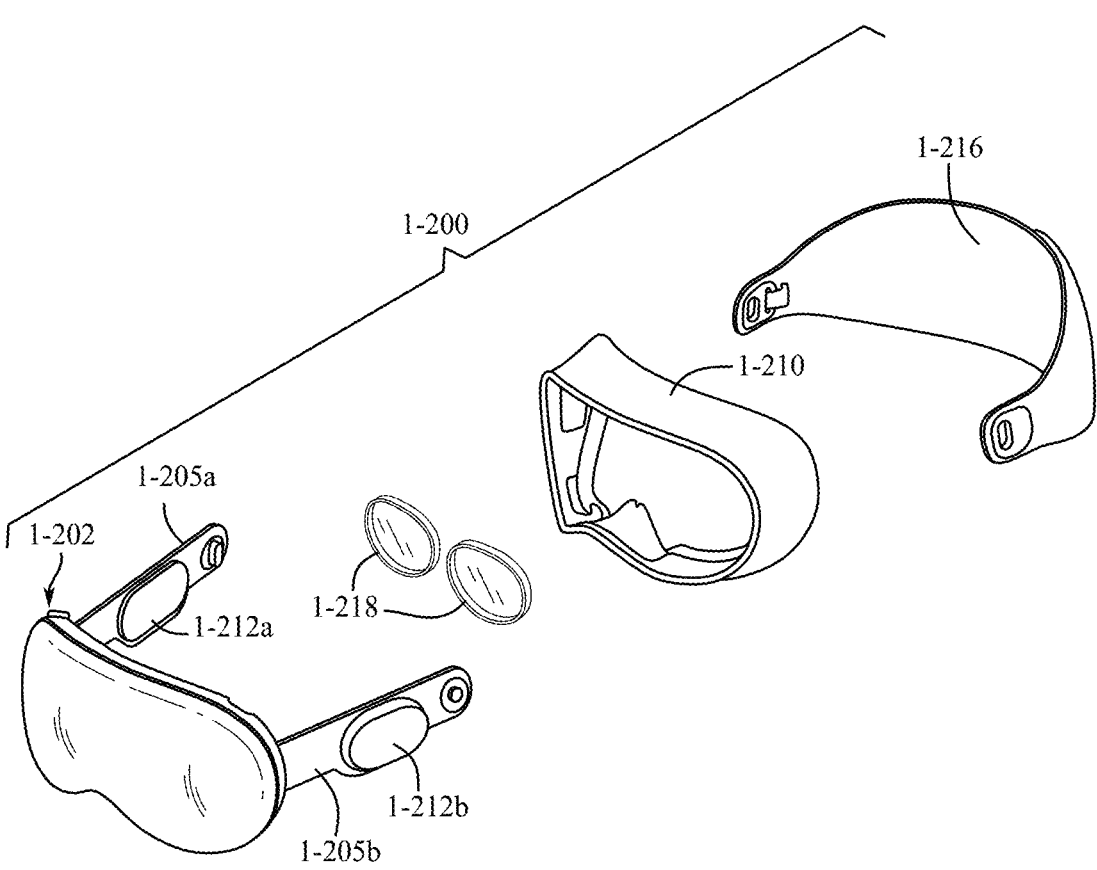
Figure 1E:
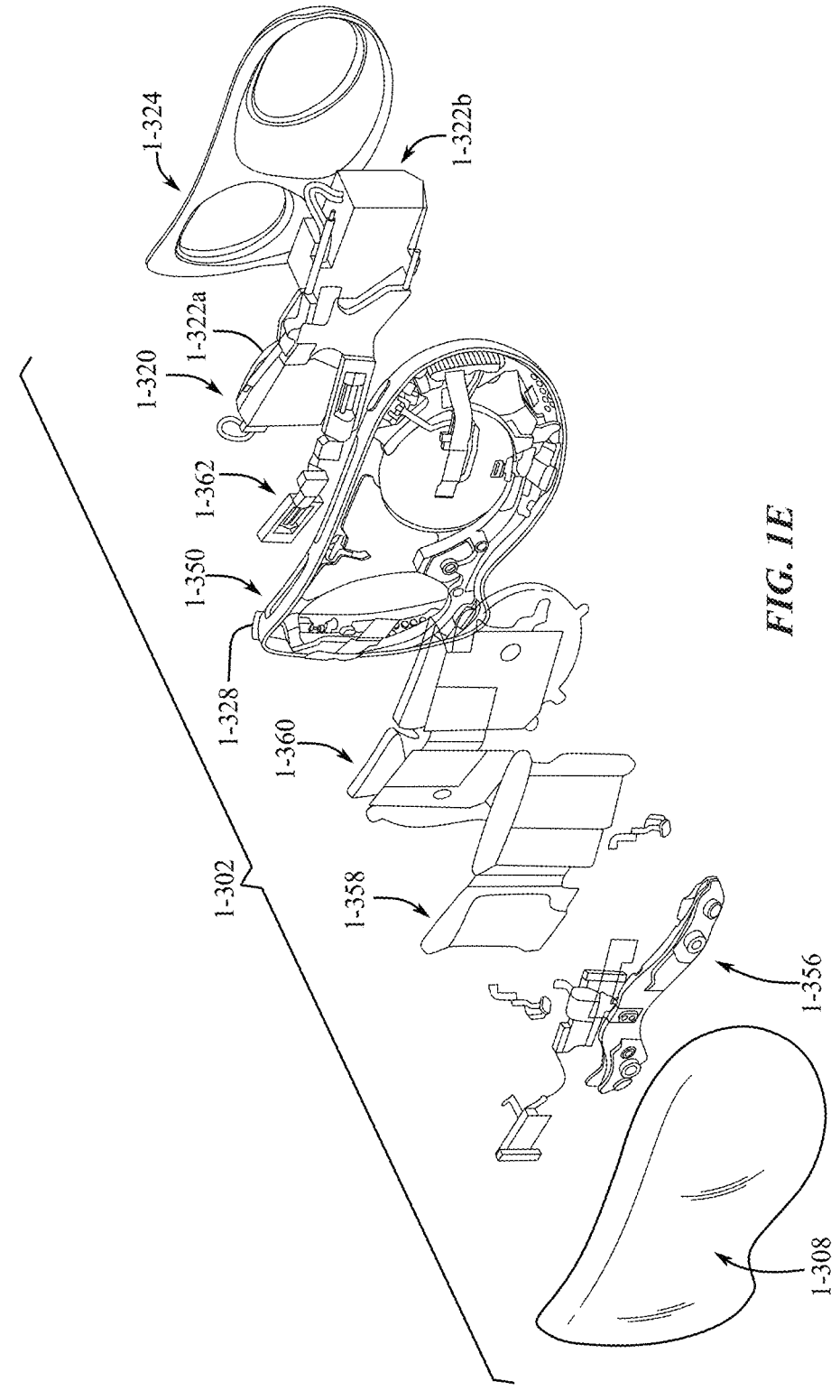
Figure 1F:
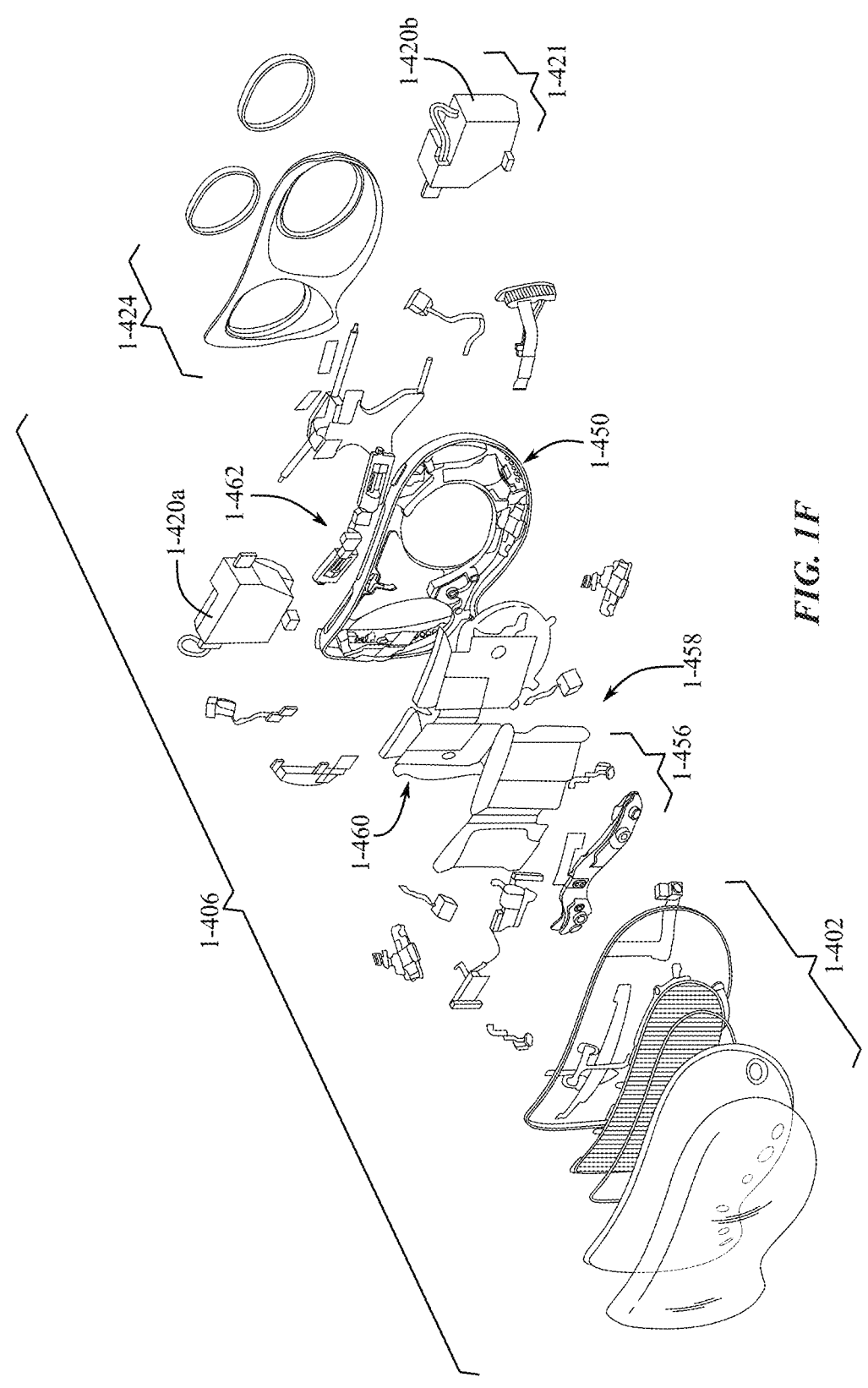
Figure 1G:
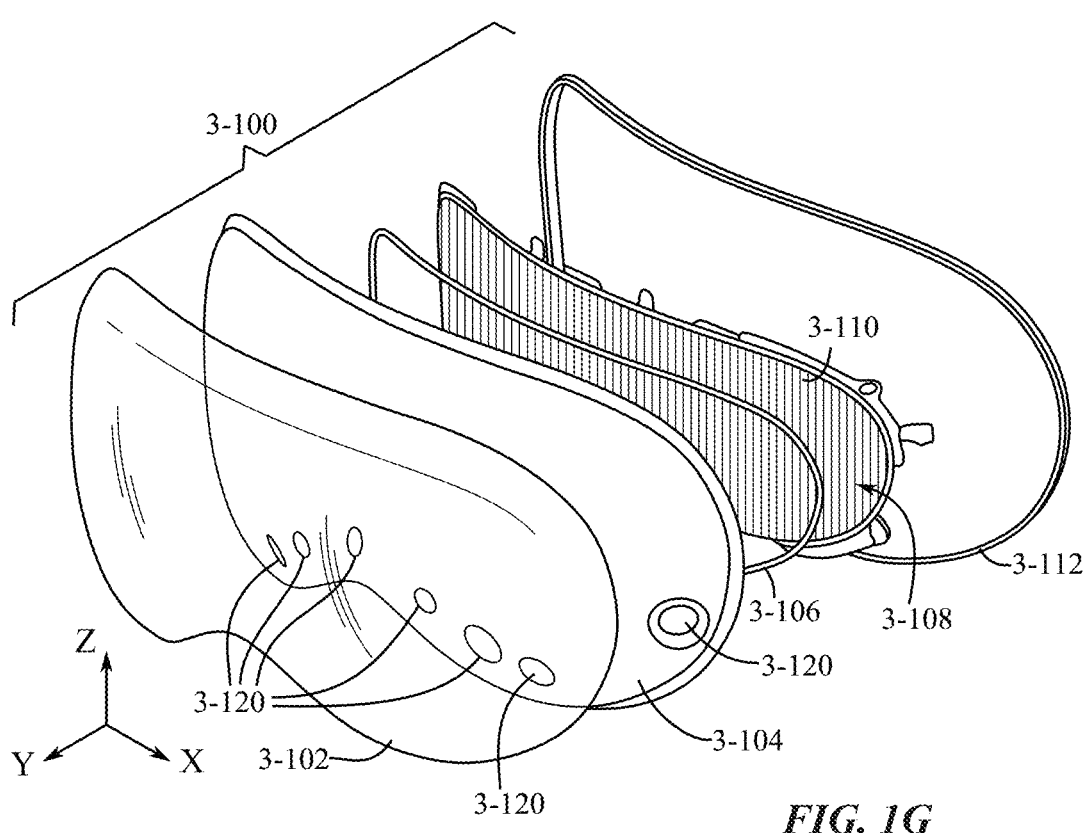
Figure 1H:
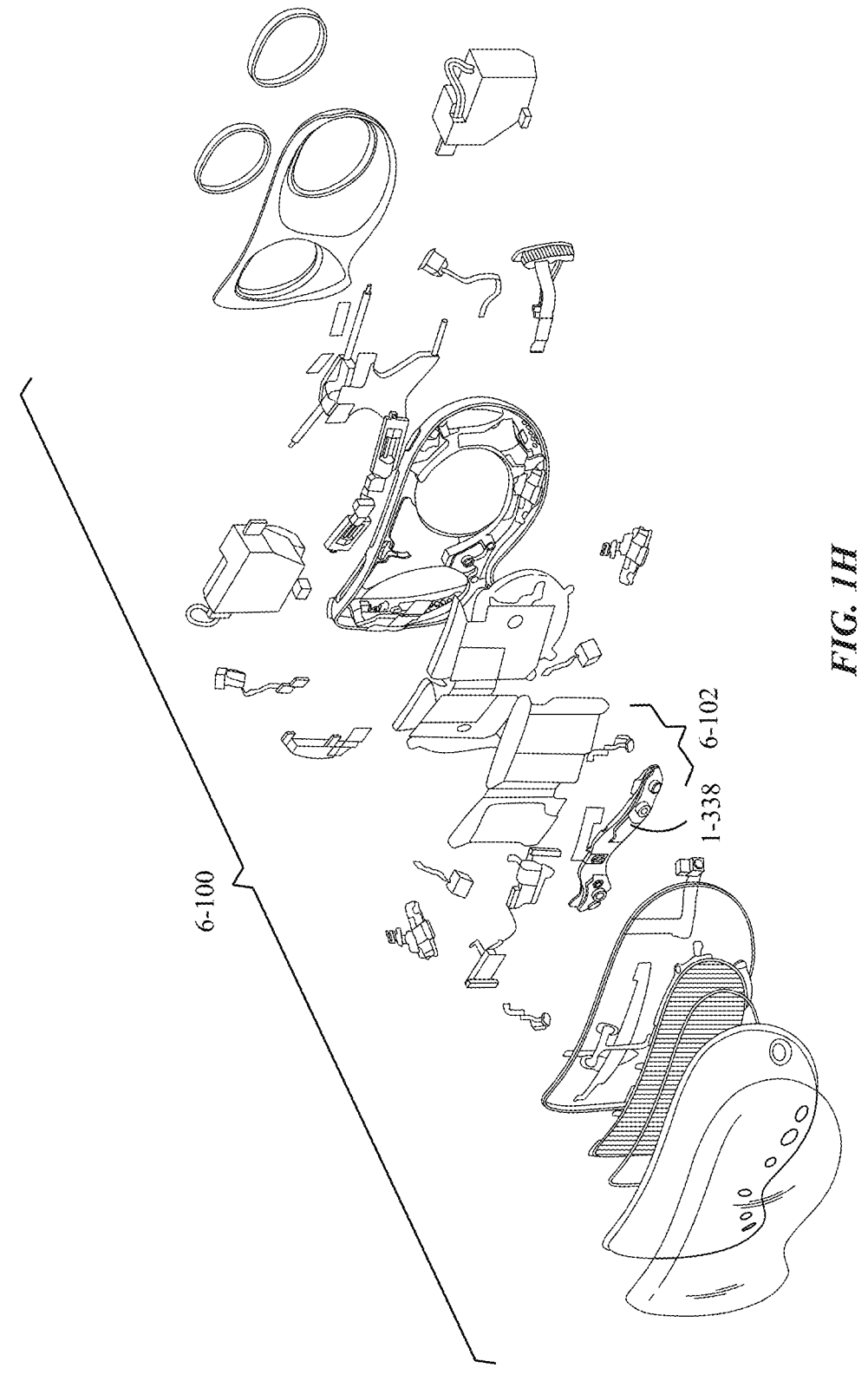
Figure 1I:
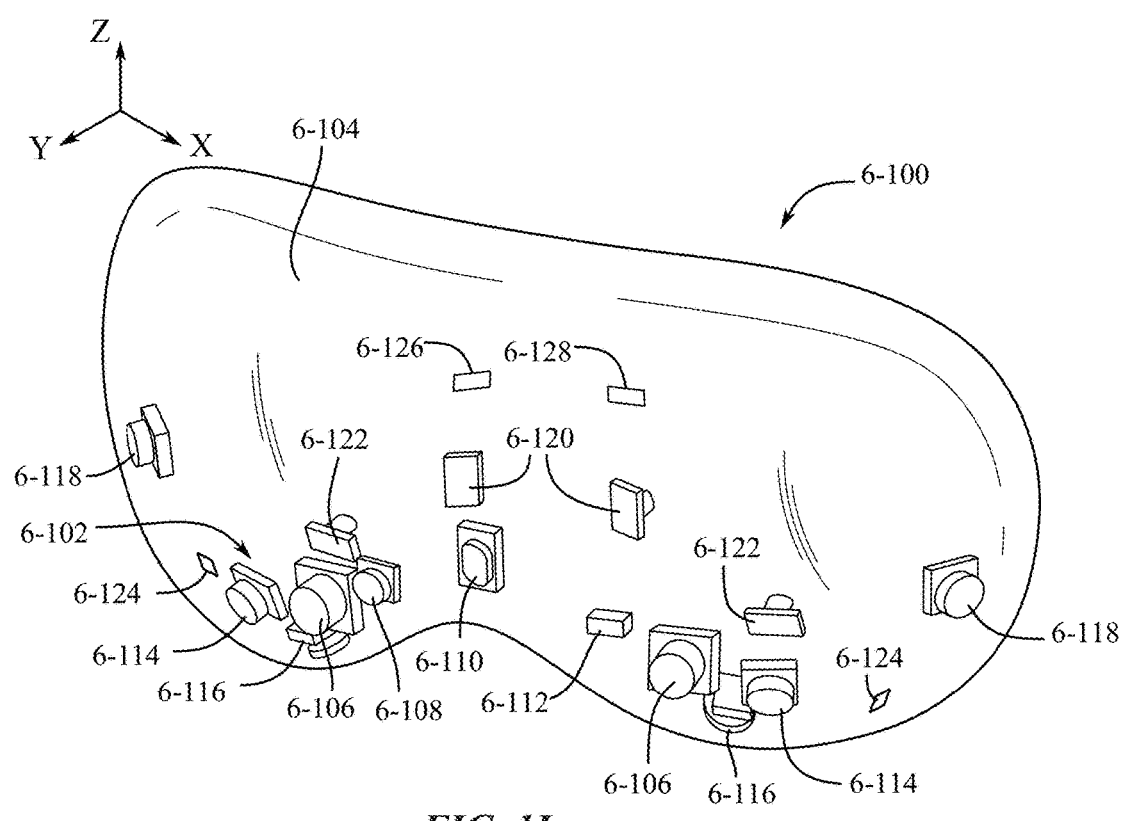
Figure 1J:
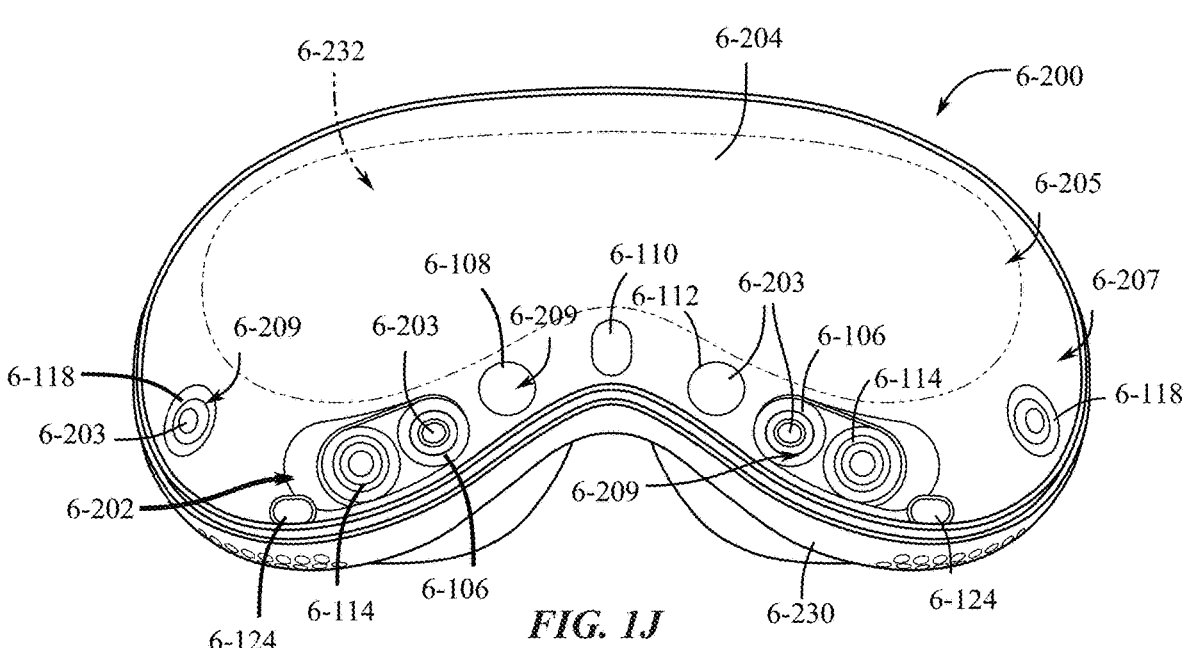
Figures 1K, 1L:
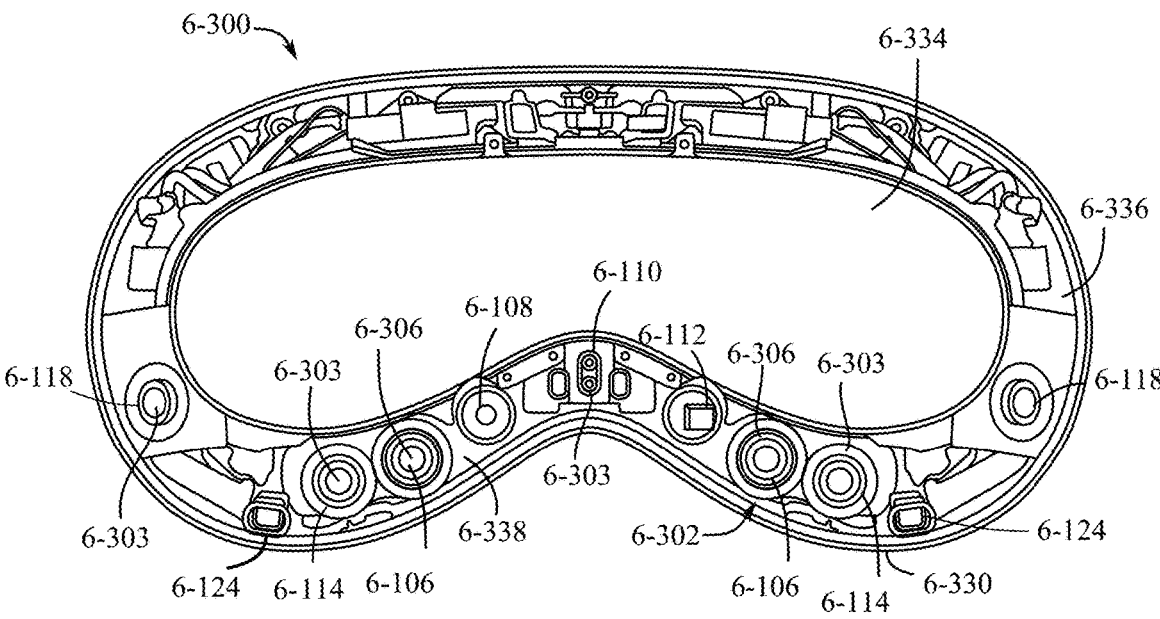
Figure 1M:
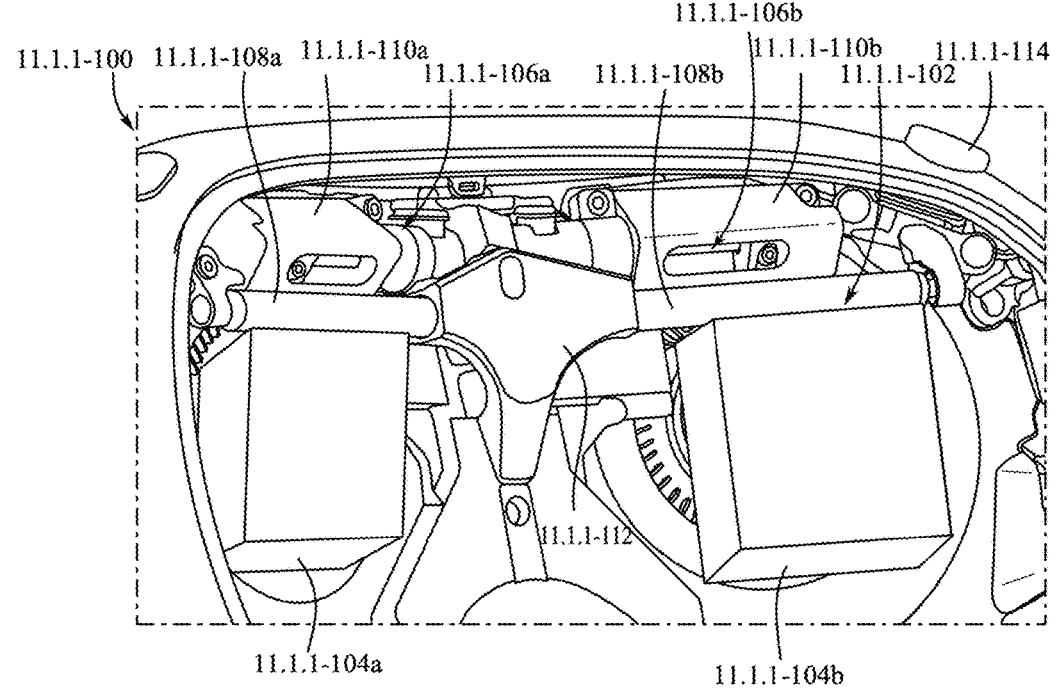
Figure 1N:
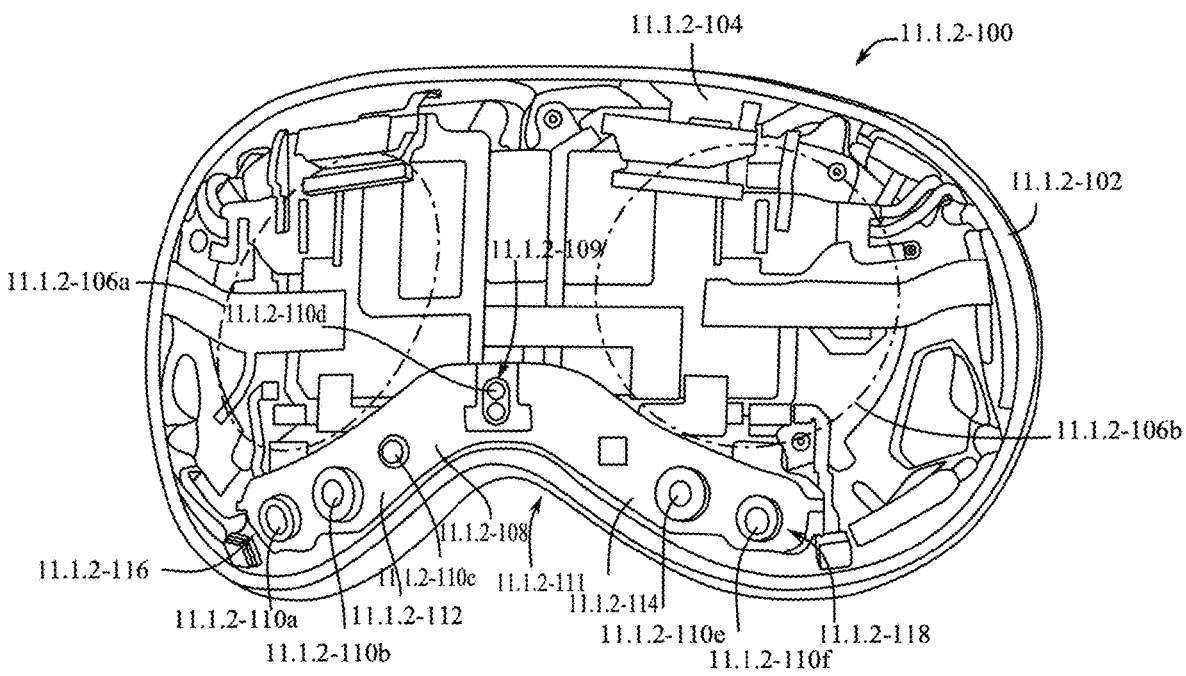
Figure 1O:
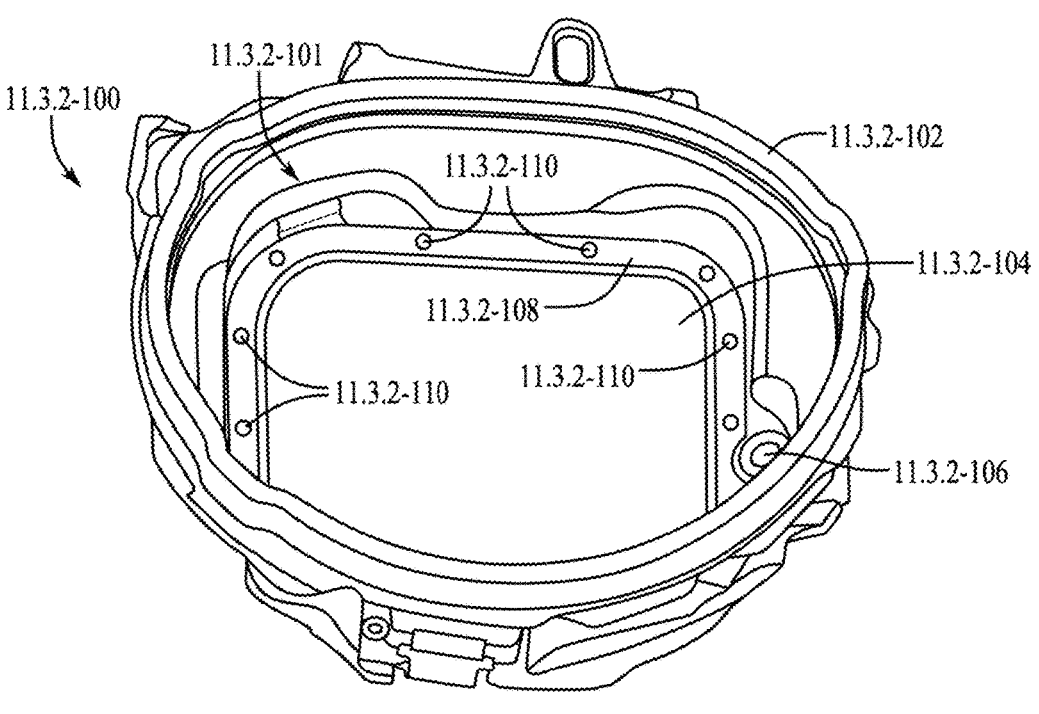
Figure 1P:
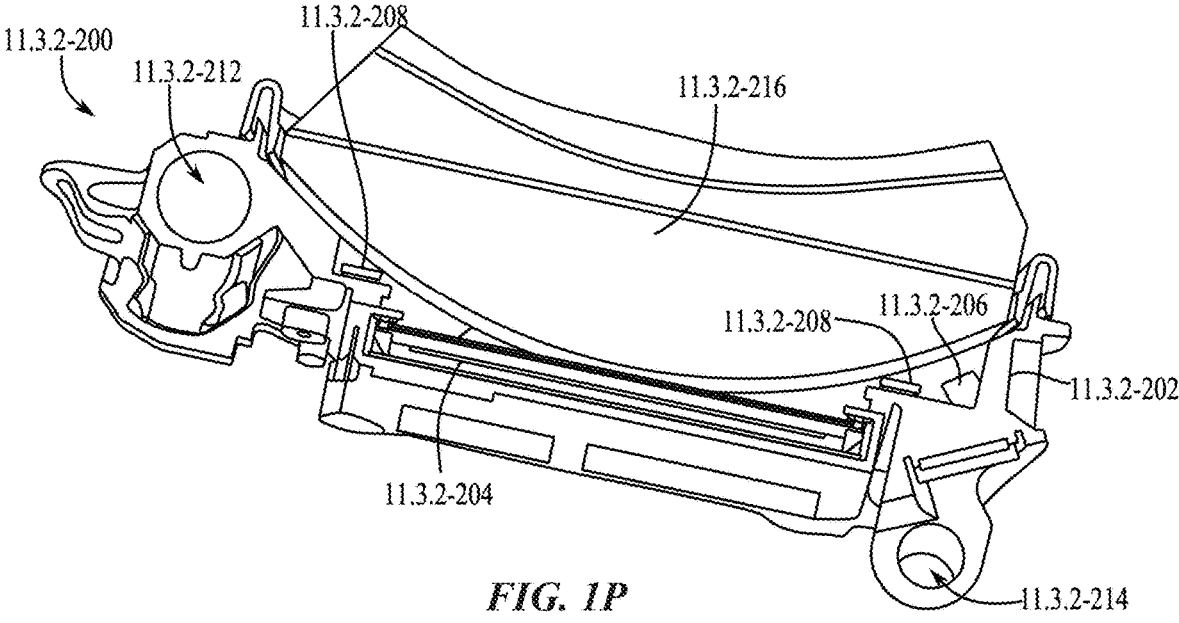
Figure 2:
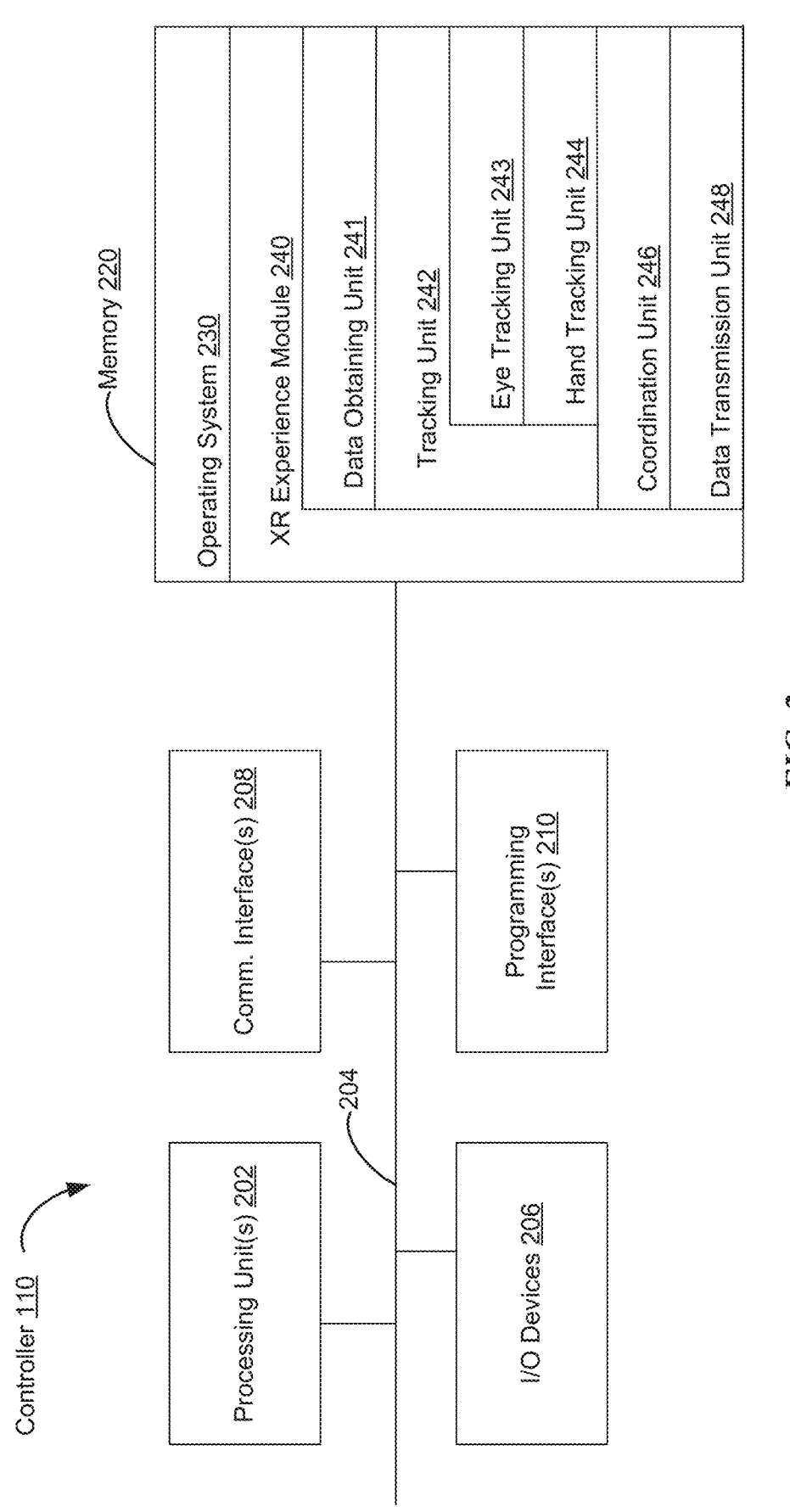
FIG. 2 is a block diagram illustrating a controller of a computer system that is configured to manage and coordinate an XR experience for the user in accordance with some embodiments.
Figure 3:
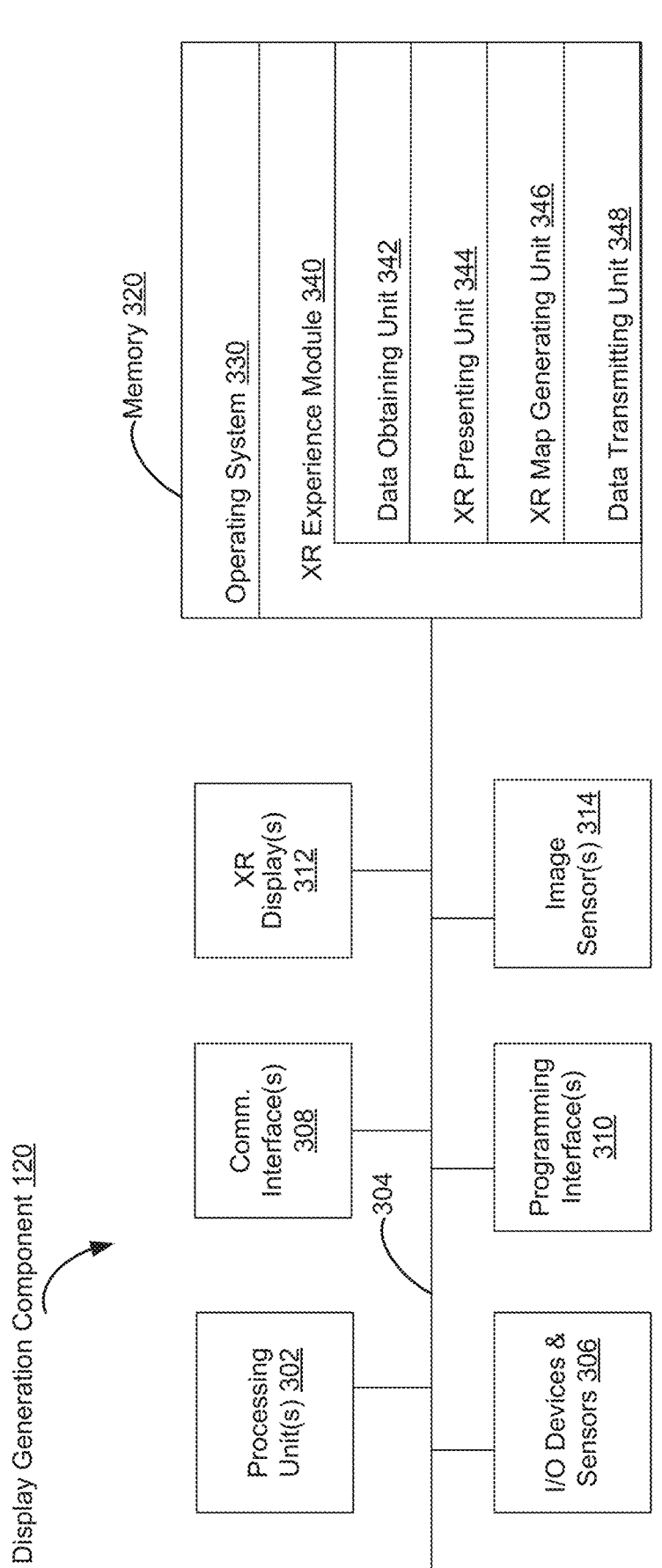
FIG. 3 is a block diagram illustrating a display generation component of a computer system that is configured to provide a visual component of the XR experience to the user in accordance with some embodiments.
Figure 11A:
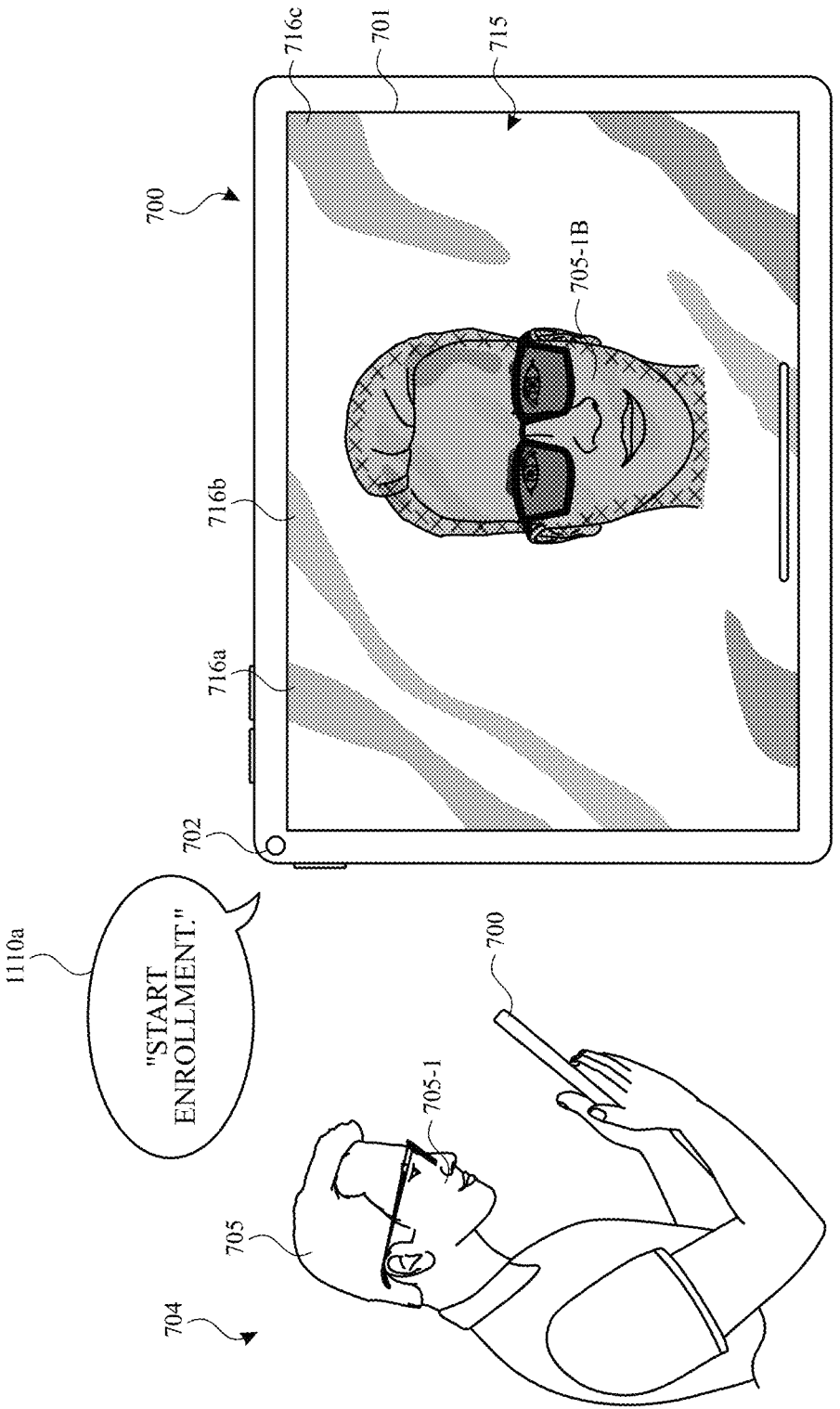

FIGS. 1A-6 provide a description of example computer systems for providing XR experiences to users. FIGS. 7A-7R illustrate example techniques for enrolling a biometric feature, in accordance with some embodiments. FIGS. 8A-8B are a flow diagram of methods of enrolling a biometric feature using a progress indicator, in accordance with some embodiments. FIG. 9 is a flow diagram of methods of enrolling a biometric feature using a cropped video feed, in accordance with some embodiments. FIG. 10 is a flow diagram of methods of enrolling a biometric feature using a multi-layer enrollment interface, in accordance with some embodiments. The user interfaces in FIGS. 7A-7R are used to illustrate the processes in FIGS. 8A, 8B, and 9-10. FIGS. 11A-11I3 illustrate example techniques for providing feedback about fixing one or more enrollment error conditions, in accordance with some embodiments. FIG. 12 is a flow diagram of methods of providing feedback about fixing one or more enrollment error conditions, in accordance with some embodiments. The user interfaces in FIGS. 11A-11I3 are used to illustrate the processes in FIG. 12.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touchscreen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR Include Virtual Reality and Mixed Reality

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user.

In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, or 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture

1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-302 of an HMD. The display unit 1-302 can include a front display assembly 1-308, a frame/housing assembly 1-350, and a curtain assembly 1-324. The display unit 1-302 can also include a sensor assembly 1-356, logic board assembly 1-358, and cooling assembly 1-360 disposed between the frame assembly 1-350 and the front display assembly 1-308. In at least one example, the display unit 1-302 can also include a rear-facing display assembly 1-320 including first and second rear-facing display screens 1-322*a*, 1-322*b* disposed between the frame 1-350 and the curtain assembly 1-324.

In at least one example, the display unit 1-302 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-302 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, cither alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of an HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the display assembly 1-108 of the HMD 1-100 shown in FIG. 1B or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HMD device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward-facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward-facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin.

In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HMD 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors 11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-

109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HMD devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior—and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105 or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller

110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, e.g., the measured z distance from the image sensors 404, with the shade of gray growing darker with increasing depth. The controller 110 processes these depth values in order to identify and segment a component of the image (e.g., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
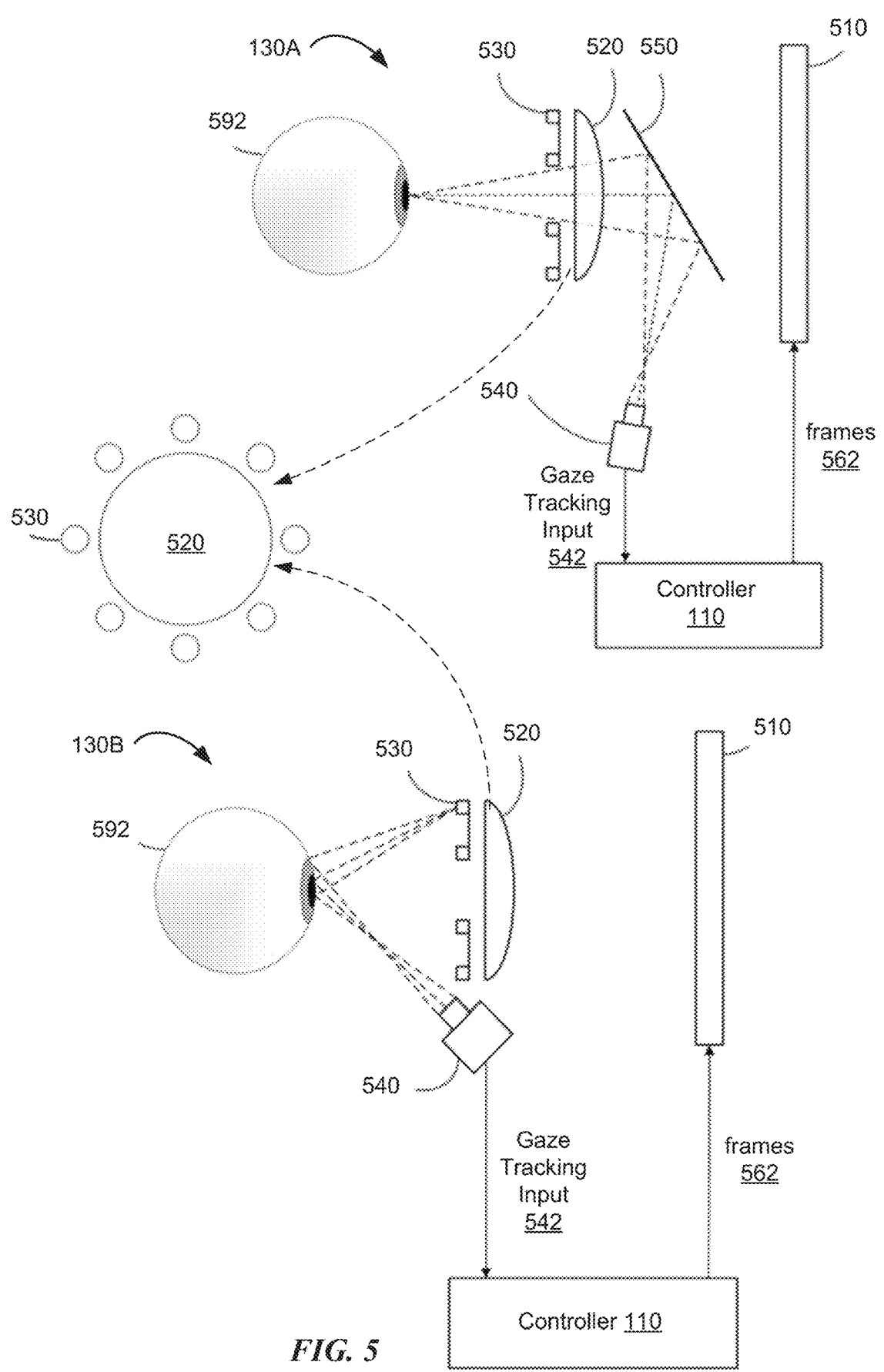
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device and is optionally used in conjunction with a head-mounted display generation component. In some embodiments, the eye tracking device 130 is not a head-mounted device and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)) mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
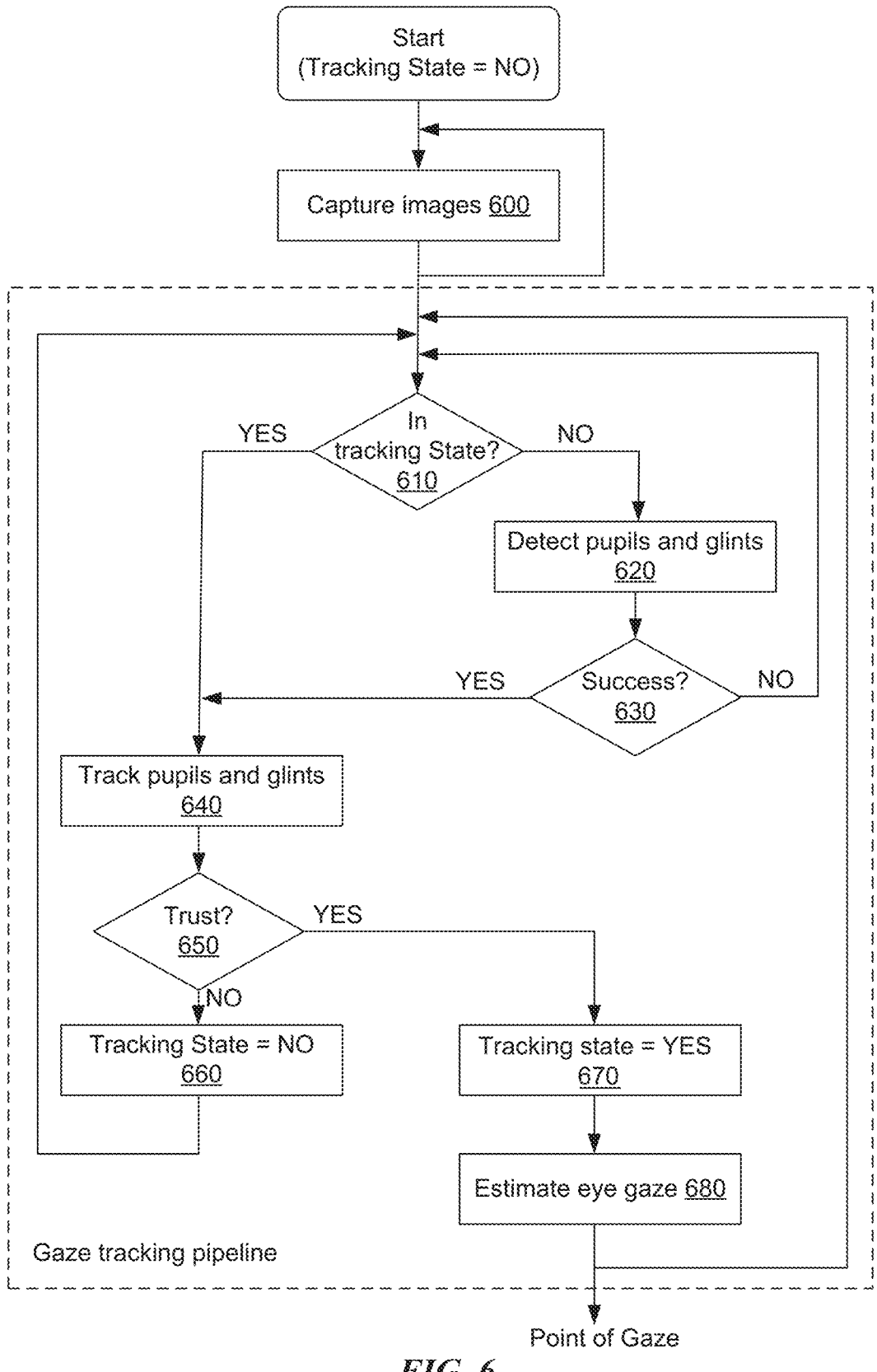
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with some embodiments.

In some embodiments, the captured portions of real-world environment 602 are used to provide an XR experience to the user, for example, a mixed reality environment in which one or more virtual objects are superimposed over representations of real-world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a set of one or more display generation components and, optionally, one or more cameras, one or more sensors, and/or one or more input devices.

FIGS. 7A-7R illustrate examples of a biometric enrollment process. FIGS. 8A-8B are a flow diagram of an exemplary method 800 for enrolling a biometric feature using a progress indicator, in some embodiments. FIG. 9 is a flow diagram of an exemplary method 900 for enrolling a biometric feature using a cropped video feed, in some embodiments. FIG. 10 is a flow diagram of an exemplary method 1000 for enrolling a biometric feature using a multi-layer enrollment interface, in some embodiments. The user interfaces in FIGS. 7A-7R are used to illustrate the processes described below, including the processes in FIGS. 8A, 8B, and 9-10.

The figures and accompanying description are provided to describe various embodiments of a biometric enrollment process. Referring briefly to FIG. 7A, the enrollment process is performed using computer system 700 (similar to computer system 101 in FIG. 1A), having display 701 and one or more cameras 702; however, other computer systems can be used for the enrollment process as discussed in greater detail below. In some embodiments, the biometric enrollment process is used to enroll a person's face (e.g., the face of user 705) or other facial features such as the person's eye, eyes, and/or a region around the eyes. In some embodiments, the biometric feature is enrolled for various purposes such as, for example, to generate an avatar that represents the person (e.g., user 705) in an XR environment and/or for biometric authentication purposes. For biometric authentication, information about the biometric feature can be used to create authentication data that is used to identify the person, create a user profile, and/or grant permissions to the person, such as permission to access a computer system (e.g., computer system 700), applications operating on a computer system, and/or a user account.

In some embodiments, the biometric feature is enrolled in order to generate an avatar that represents the person in an XR environment. The avatar can be used to represent the person for various purposes such as, for example, interacting with and/or experiencing an XR environment and/or communicating with other users in an XR environment. For example, in some embodiments, the avatar is displayed and/or otherwise used to communicate during a real-time communication session in the XR environment. In some embodiments, the real-time communication session includes real-time communication between participants of the real-time communication session, such as a user of computer system 700 (e.g., user 705) and one or more other persons (e.g., one or more other users associated with other (e.g., different) computer systems). In some embodiments, providing the real-time communication session includes displaying representations of the person's body (e.g., facial expression, body expression, body position, and/or body movement) via the avatar. In some embodiments, providing the real-time communication session includes displaying the avatar representing the person and/or outputting audio corresponding to utterances of the person in real time. In some embodiments, computer system 700 and one or more other (e.g., remote) computer systems are in communication (e.g., wireless communication) with one another to enable transmission of information indicative of the avatar of the person and/or audio corresponding to utterances of the person between computer system 700 and the one or more other computer systems. In some embodiments, the real-time communication session includes an XR experience (e.g., an XR environment). In some embodiments, the real-time communication session includes displaying the avatar of the person (and, optionally, a representation of a second person such as the second person's avatar) in an XR environment via display generation components of the computer system and the one or more other computer systems in communication via the real-time communication session.

In the embodiment depicted in FIGS. 7A-7M, computer system 700 is used to perform a first phase of a biometric enrollment process for user 705 in physical environment 704. It should be appreciated, however, that the biometric enrollment process can be performed using a different type of computer system. For example, instead of (or in addition to) using computer system 700, the computer system can be a head-mounted device (HMD) (e.g., HMD 750 in FIGS. 7N1 and 7O1, HMD 1-100 in FIGS. 7N2 and 7O2, or HMD 6-200 in FIGS. 7N3 and 7O3-7R) that can be worn by user 705 to experience an XR environment and removed to perform the biometric enrollment process. In such embodiments, the HMD includes a display component that is analogous to display 701 and one or more sensors analogous to camera 702. For example, the display can be an opaque display screen with display components and/or a transparent or translucent display through which, in some embodiments, user 705 may directly view a physical environment and, optionally, upon which virtual elements of the user experience session can be displayed or projected. In some embodiments, the display component is configured to be viewed by the user when the HMD is not placed on the head of the user and/or over the eyes of the user and/or the display component is not configured to be viewed by the user when the HMD is placed on the head of the user and/or over the eyes of the user (e.g., the display component is not a primary display for displaying user interfaces of the computer system while the computer system is in use). In some embodiments, the user interfaces described herein are optionally displayed on a lenticular display (e.g., lenticular lens array 3-110 of display assembly 3-100 in FIG. 1G) (optionally a curved lenticular display) where different sections of the lenticular display (e.g., 3-110) show different views of the user interface elements based on the perspective from which the user interface elements are being displayed. For example, as the viewpoint of user 705 changes relative to the lenticular display (e.g., 3-110), different sections of the display will become visible and these different sections show user 705 different views of the user interface that have a different appearance that corresponds to the user's viewing angle. In some embodiments, this creates a three-dimensional effect as the user's viewing angle shifts (e.g., due to the display being moved and/or due to the user moving relative to the display). In some embodiments, the HMD may further include speakers and/or other audio output devices integrated into the HMD for providing audio output and one or more cameras, microphones, and/or other sensors that are used to capture images (e.g., video and/or pictures) of physical environment 704 (e.g., including user 705) (e.g., for the biometric enrollment process, for display at the HMD, and/or for detecting input) and to receive user input in the form of hand gestures, voice gestures, gaze gestures, and/or other input forms discussed herein. While the methods for providing a biometric enrollment process are primarily discussed herein with respect to computer system 700, it should be appreciated that the methods can be performed using other computer systems, including, for example, an HMD (e.g., HMD 750 in FIGS. 7N1 and 7O1, HMD 1-100 in FIGS. 7N2 and 7O2, or HMD 6-200 in FIGS. 7N3 and 7O3-7R).

FIG. 7A depicts computer system 700, which is used, in some embodiments, to perform the biometric enrollment process for user 705. User 705 is holding computer system 700 (e.g., a tablet computer or smartphone) in physical environment 704. Computer system 700 includes display 701 and one or more cameras 702. The cameras are referred to collectively as camera 702 and are located offset from the center of display 701 (e.g., in a corner region of computer system 700). In the embodiment depicted in FIG. 7A, the biometric enrollment process has not yet started. User 705 has positioned their face 705-1 within a field of view of camera 702, and video feed 706 of camera 702 is displayed on display 701. Video feed 706 includes representation 705*a* of user 705 (including representation 705-1*a* of the user's face 705-1) and representations of other objects located in the camera field of view, such as representation 707*a* of a painting that is located behind user 705 in physical environment 704. Representation 705*a* of user 705 and representation 707*a* of the painting are portions of video feed 706 captured by camera 702 of computer system 700. In some embodiments, the biometric enrollment process includes a first phase or first portion in which a user interface, such as that depicted in FIGS. 7A-7O3, is used to assist a user with aligning their head and/or face relative to one or more cameras or sensors. In some embodiments, the biometric enrollment process includes a second phase or second portion in which a user interface, such as that depicted in FIGS.

7P-7R, is used to instruct a user to perform specific movements with their head and/or perform specific facial expressions.

Figure 7B:
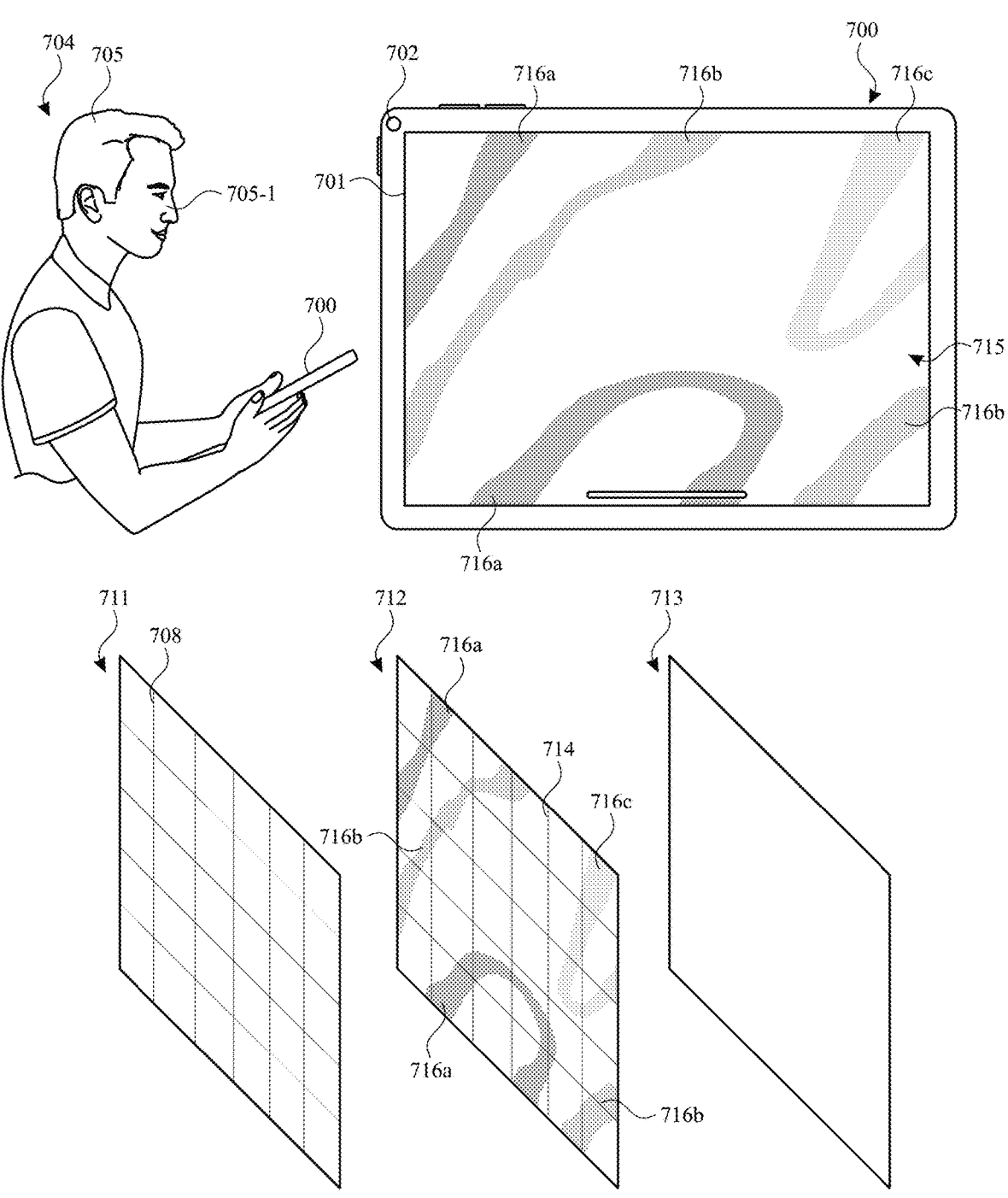
FIGS. 7A-7R illustrate example techniques for enrolling a biometric feature, in accordance with some embodiments.

In FIG. 7B, the user has initiated the biometric enrollment process, for example, by launching an application for performing the biometric enrollment. As the biometric enrollment process starts up, computer system 700 displays (via display 701) an animated color filter (represented by colors 716a, 716b, and 716c, referred to collectively as colors 716) that is part of biometric enrollment interface 715. As shown in FIGS. 7B-7M, colors 716 are animated, moving on a layer of biometric interface 715 during the biometric enrollment process. In some embodiments, colors 716a, 716b, and 716c are colors of a color palette that is used for the biometric enrollment process. In some embodiments, computer system 700 does not display a representation of the video feed from camera 702 during startup of the biometric enrollment process. In some embodiments, the animation of colors 716 is reactive to an audio signal, such as, for example, an audio output at computer system 700. For example, when an audio output (e.g., such as an audible prompt) is provided by computer system 700, the computer system animates the colors to move, pulsate, or otherwise animate based on the audio signal of the audio output, thereby indicating that the audio output is associated with the biometric enrollment interface. In some embodiments, computer system 700 displays colors 716 (or, in some embodiments, a different visual element) after the first and/or second phase(s) of the enrollment process is/are complete.

Biometric enrollment interface 715 is comprised of multiple layers that contain information for guiding the user to properly align their face 705-1 (or whichever biometric feature is being enrolled) with camera 702 in order to successfully complete the biometric enrollment process (or at least the first phase of the biometric enrollment process). These layers are represented in FIGS. 7B-7M as foreground layer 711, middle layer 712, and background layer 713. In general, foreground layer 711 includes dynamic elements that are reactive to detected changes in position of the user's face 705-1 relative to camera 702, middle layer 712 provides a color filter and indicates a target region for the enrollment process, and background layer 713 provides a cropped video feed of the user as detected in the field of view of camera 702. The layers, and elements displayed in the various layers, act an enrollment progress indicator for the biometric enrollment process by providing feedback guiding a user to complete the biometric enrollment process based on the appearance of the elements in the layers. For the sake of clarity, layers 711-713 are shown in an isometric view in the figures to illustrate each layer individually. However, it should be appreciated that the layers collectively form biometric enrollment interface 715, which is displayed, in some embodiments, on display 701 of computer system 700. Accordingly, enrollment interface 715 represents a view of layers 711-713 combined. For example, as viewed by a user of computer system 700, the layers are visually stacked upon each other (e.g., spaced apart in the z-direction) with foreground layer 711 in front of layers 712 and 713, middle layer 712 between layers 711 and 713, and background layer 713 behind layers 711 and 712. In some embodiments, the spacing of the respective layers helps to create a simulated parallax effect (e.g., based on a change in a viewpoint of user 705 and/or movement of display 701) as elements of respective layers move independently of the elements of other layers. In some embodiments (e.g., such as those shown in FIGS. 7N1-7R), the layers are curved to fit a form factor of a display device.

Figure 7C:
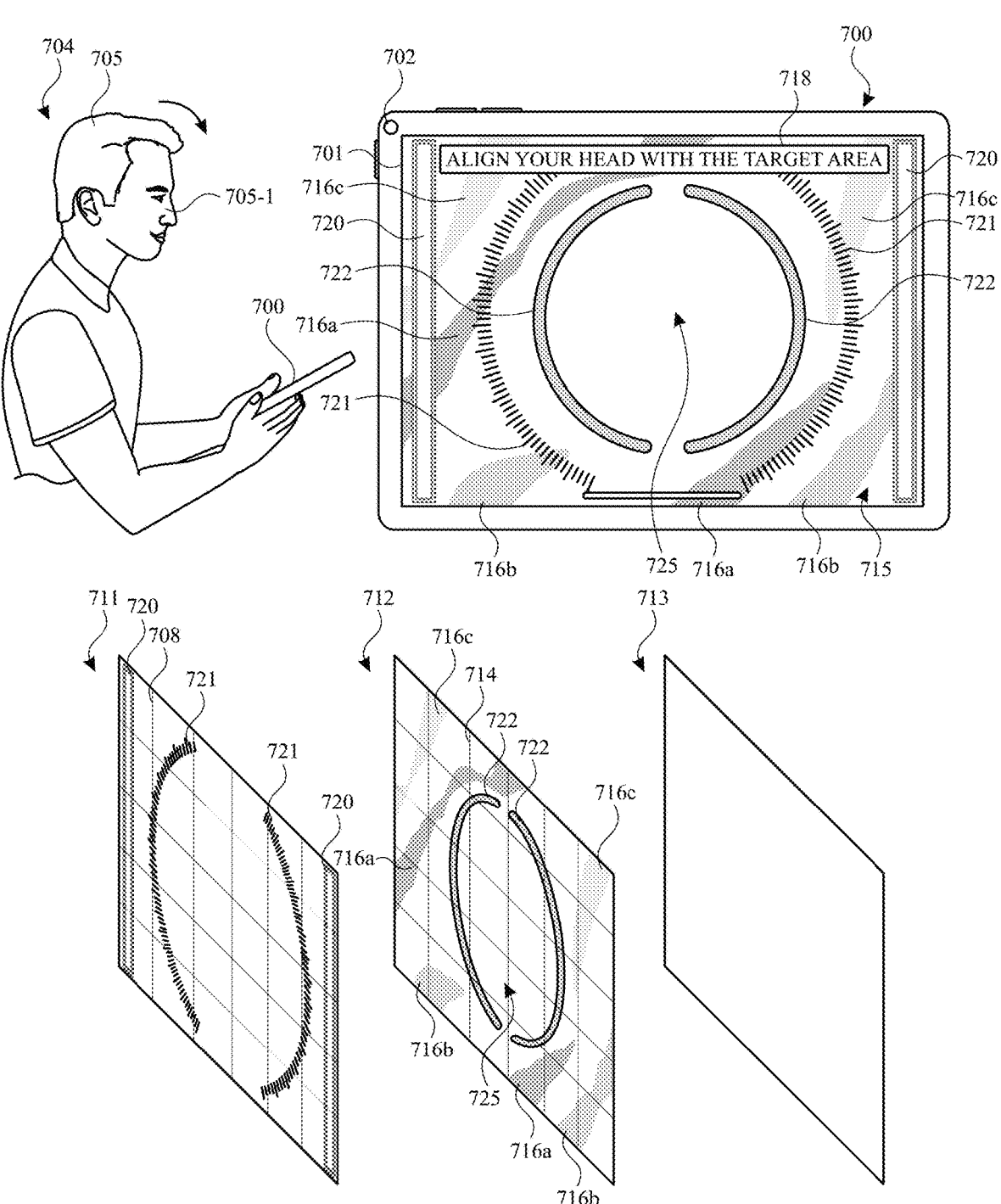

In FIG. 7C, the biometric enrollment process has started, and computer system 700 prompts user 705 (e.g., via an audio output and/or the display of prompt 718) to align their head (or, in some embodiments, to align their face) within target area 725 in biometric enrollment interface 715. In some embodiments, prompt 718 is output as an audio output and computer system 700 animates colors 716 based on the audio signal of prompt 718. The target area of enrollment interface 715 corresponds to a desired positioning of the user's biometric feature (e.g., face 705-1) relative to camera 702 such that computer system 700 can capture information about the user's biometric feature using camera 702 in order to complete the enrollment process (or at least the first phase of the enrollment process). In some embodiments, the desired positioning is a predetermined positioning of user's face 705-1 along x-, y-, and z-axes relative to camera 702. In some embodiments, as part of the biometric enrollment process computer system 700 instructs the user to perform different movements, poses, and/or facial expressions once the desired positioning of the user's face is achieved. In some embodiments, these instructions for performing the different movements, poses, and/or facial expressions are provided as part of a second phase of the biometric enrollment process, as discussed in greater detail with respect to FIGS. 7P-7R. In some embodiments, target area 725 and the video feed from camera 702 are centered on display 701 (e.g., via an asymmetric crop of the video feed and/or perspective correction to make the face appear to be in the center of the camera field of view), even if the camera is offset from the center of display 701. For example, in FIGS. 7C-7M, target area 725 is at a center location of display 701, and camera 702 is offset from the center of display 701. The centering of the target area and video feed allows for greater flexibility in placing components in the design of computer system 700 while also achieving a more natural, comfortable, and/or effective interface for guiding the user's facial positioning.

As shown in FIG. 7C, computer system 700 updates biometric enrollment interface 715 to include various displayed elements to assist user 705 with aligning their face 705-1 for biometric enrollment. For example, computer system 700 updates foreground layer 721 to include outer flares 720 and inner flares 721. Outer flares 720 are reactive to changes in a depth of the user's face 705-1 relative to camera 702 (e.g., a position of the user's face along a z-axis relative to the camera). For example, as the computer system detects the user's face moving closer to camera 702, computer system 700 displays outer flares 720 moving inwards towards target region 725 in enrollment interface 715. Conversely, as the computer system detects the user's face moving away from camera 702, computer system 700 displays outer flares 720 moving outwards away from target region 725 in enrollment interface 715. In some embodiments, outer flares 720 fade in or out based on the depth of the user's face relative to camera 702. For example, as the user's face moves closer to the target depth position, computer system 700 displays outer flares 720 fading in (e.g., increasing in brightness and/or opacity), and as the user's face moves away from the target depth position, the computer system displays outer flares 720 fading out (e.g., decreasing in brightness and/or opacity). In some embodiments, as outer flares 720 move inward towards target region 725, the computer system tilts or rotates outer flares 720 in a direction (e.g., as shown in FIG. 7F relative to FIG. 7E), and as the outer flares move outwards away from target region 725, the computer system tilts or rotates the outer flares in the opposite direction. In some embodiments, as outer flares 720 move inward towards target region 725 the computer system shrinks or reduces the size of outer flares 720, and as the outer flares move outwards away from target region 725, the computer system enlarges or increases the size of outer flares 720.

Computer system 700 also displays inner flares 721 in foreground layer 711 of enrollment interface 715. Inner flares 721 are reactive to changes in a position of the user's face 705-1 in the x-, y-, and z-axes relative to camera 702. In other words, computer system 700 displays inner flares 721 moving based on detected lateral and/or vertical movement of the user's face relative to camera 702 as well as detected depth changes in the positioning of the user's face relative to camera 702. For example, as the user's face moves in a vertical direction (e.g., along the y-axis) relative to camera 702, computer system 700 displays inner flares 721 moving vertically in enrollment interface 715 (e.g., as shown in FIG. 7F). In some embodiments, as the computer system detects the user's face moving upward, the computer system displays inner flares 721 moving downward on display 701 based on the amount of vertical displacement of the user's face in the upward direction, and as the computer system detects the user's face moving downward, the computer system displays inner flares 721 moving upward on display 701 based on the amount of vertical displacement of the user's face in the downward direction. In some embodiments, as the computer system detects the user's face moving in a lateral direction (e.g., along the x-axis) relative to camera 702, computer system 700 displays inner flares 721 rotating in enrollment interface 715 (e.g., as shown in FIG. 7G). For example, if the user turns their head to the left, computer system 700 displays inner flares rotating counter-clockwise based on the amount of lateral movement of the face, and if the user turns their head to the right, computer system 700 displays inner flares rotating clockwise based on the amount of lateral movement of the face. In some embodiments, as the computer system detects the user's face moving closer to camera 702, computer system 700 displays inner flares 721 moving inwards towards target region 725 in enrollment interface 715 (e.g., as shown in FIG. 7H). Conversely, as the computer system detects the user's face moving away from camera 702, computer system 700 displays inner flares 721 moving outwards away from target region 725 in enrollment interface 715. In some embodiments, inner flares 721 increase and/or decrease in size. For example, in some embodiments, inner flares 721 have an animated, pulsating effect whereby the inner flares repeat a shrinking and growing pattern. As another example, in some embodiments, inner flares 721 increase in size as they move away from target region 725 and decrease in size as they move towards target region 725. As yet another example, in some embodiments, inner flares 721 change size based on lighting conditions in physical environment 704 and/or based on brightness of at least a portion of the biometric feature (e.g., getting bigger as the brightness of physical environment 704 and/or user face 705-1 decreases and getting smaller as the brightness of physical environment 704 and/or user face 705-1 increases).

When the biometric enrollment process begins, computer system 700 also updates middle layer 712 of enrollment interface 715 to include target indicator 722, which is a visual indication of target region 725 located inside target indicator 722. In some embodiments, target indicator 722 remains stationary on middle layer 712 and does not react to movement of the user's face, which provides feedback to user 705 about the location of target region 725 as the user moves their face relative to camera 702. As previously discussed, colors 716 on middle layer 712 are animated over time, as depicted in FIGS. 7A-7L, providing feedback to user 705 that the biometric enrollment process is in progress. In some embodiments, colors 716 are not displayed in target region 725 during the enrollment process in order to avoid visually obstructing the target region 725. In some embodiments, regions of middle layer 712 that are located outside of target region 725 provide a blurring effect (or other visual obstruction) to content that is displayed behind middle layer 712 and outside of target region 725.

In some embodiments, some of the layers include a three-dimensional mesh that provides a depth effect (e.g., caused by three-dimensional ridges or crevices) to the respective layers. For example, foreground layer 711 includes mesh 708 and middle layer 712 includes mesh 714. As elements move on the respective layers, the elements move over the respective meshes, presenting a depth effect for the movement of the elements on the layers. For example, as outer flares 720 and/or inner flares 721 move across foreground layer 711, the flares move across mesh 708, creating a three-dimensional ripple effect as portions of the flares appear to move forward and/or backward relative to the view of user 705 during the biometric enrollment process. Similarly, as colors 716 move across middle layer 712 and over mesh 714, the colors appear to move forward and/or backward relative to the view of user 705 during the enrollment process.

Figure 7D:
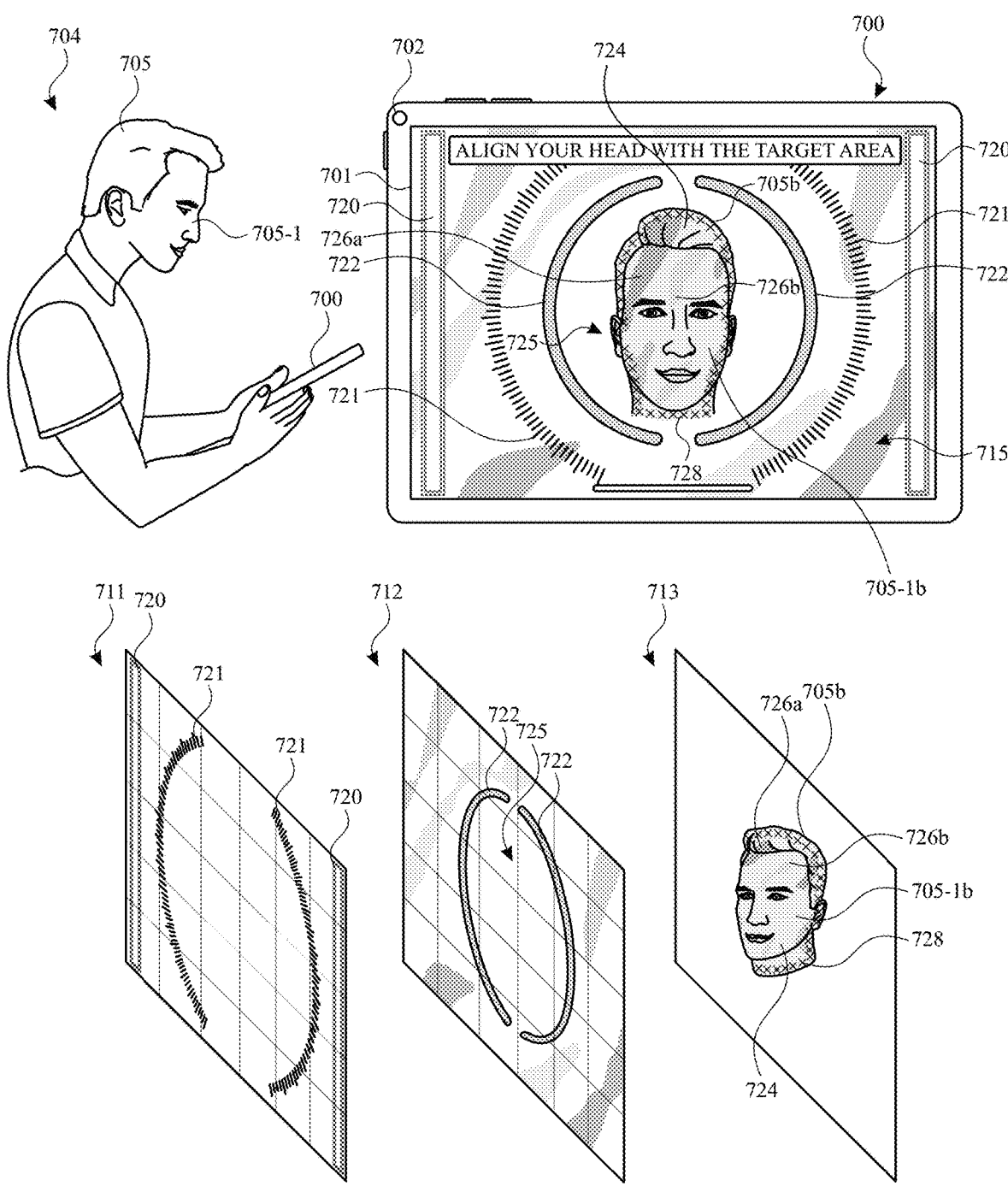
Figure 7E:
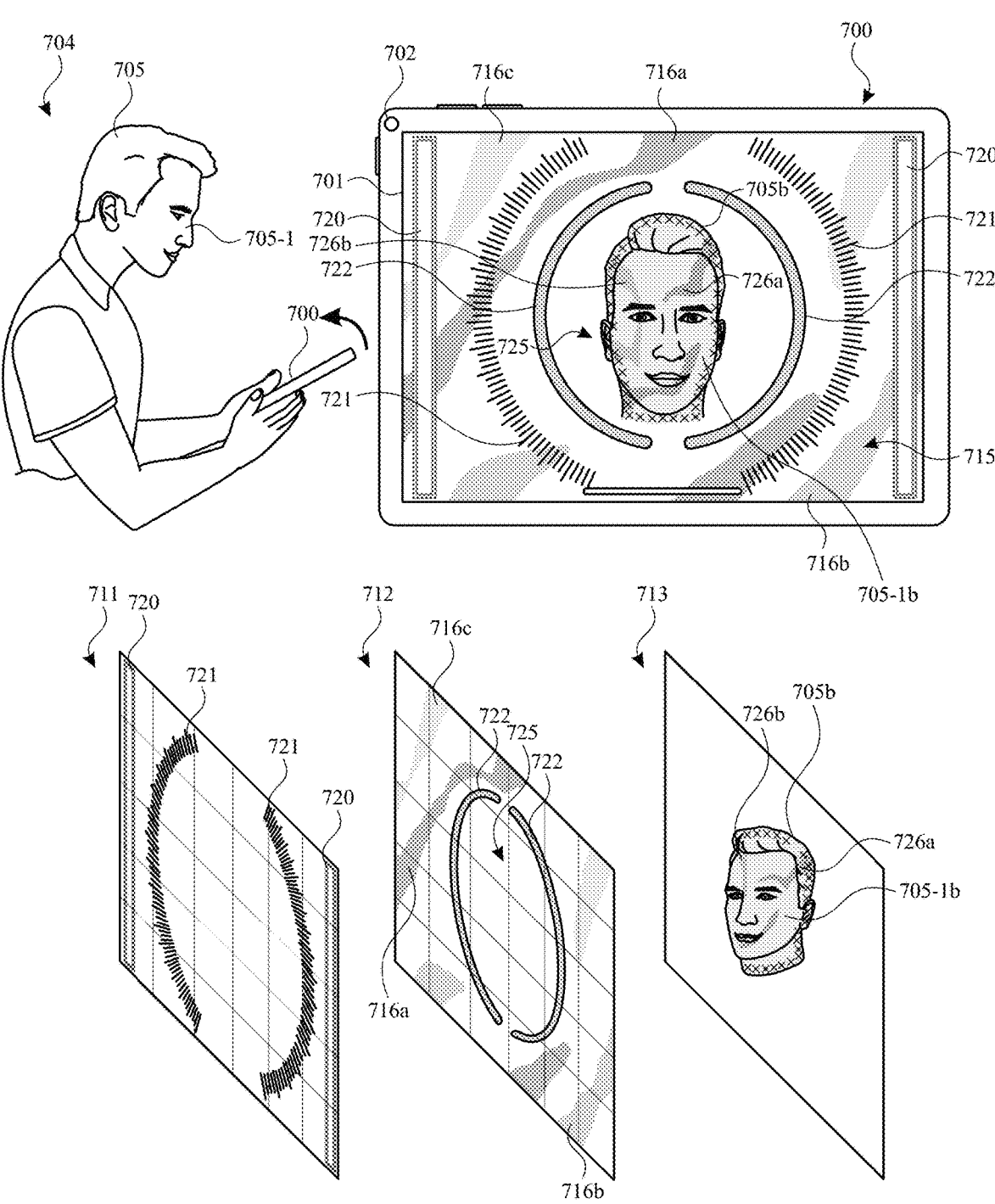
Figure 7F:
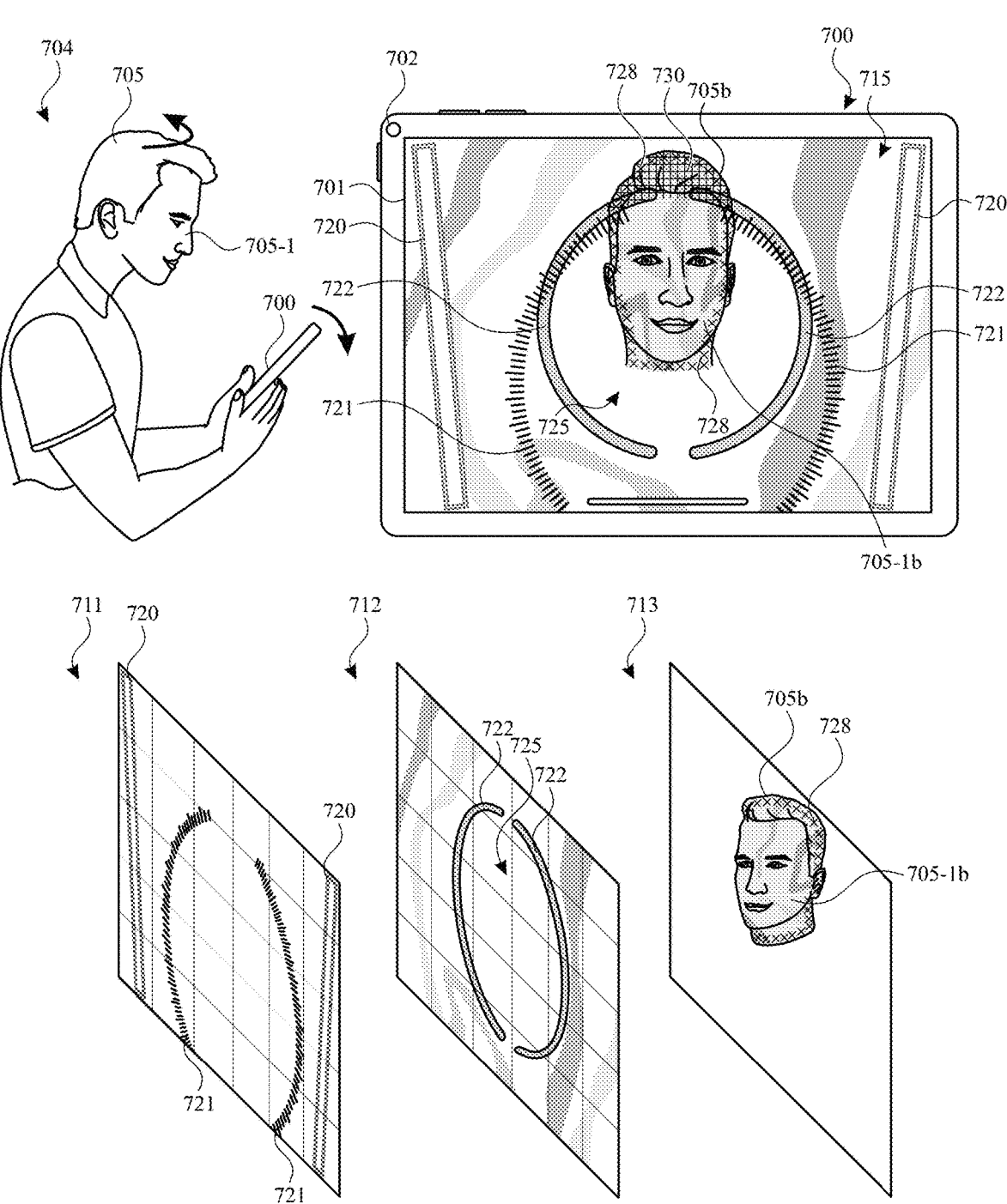
Figure 7G:
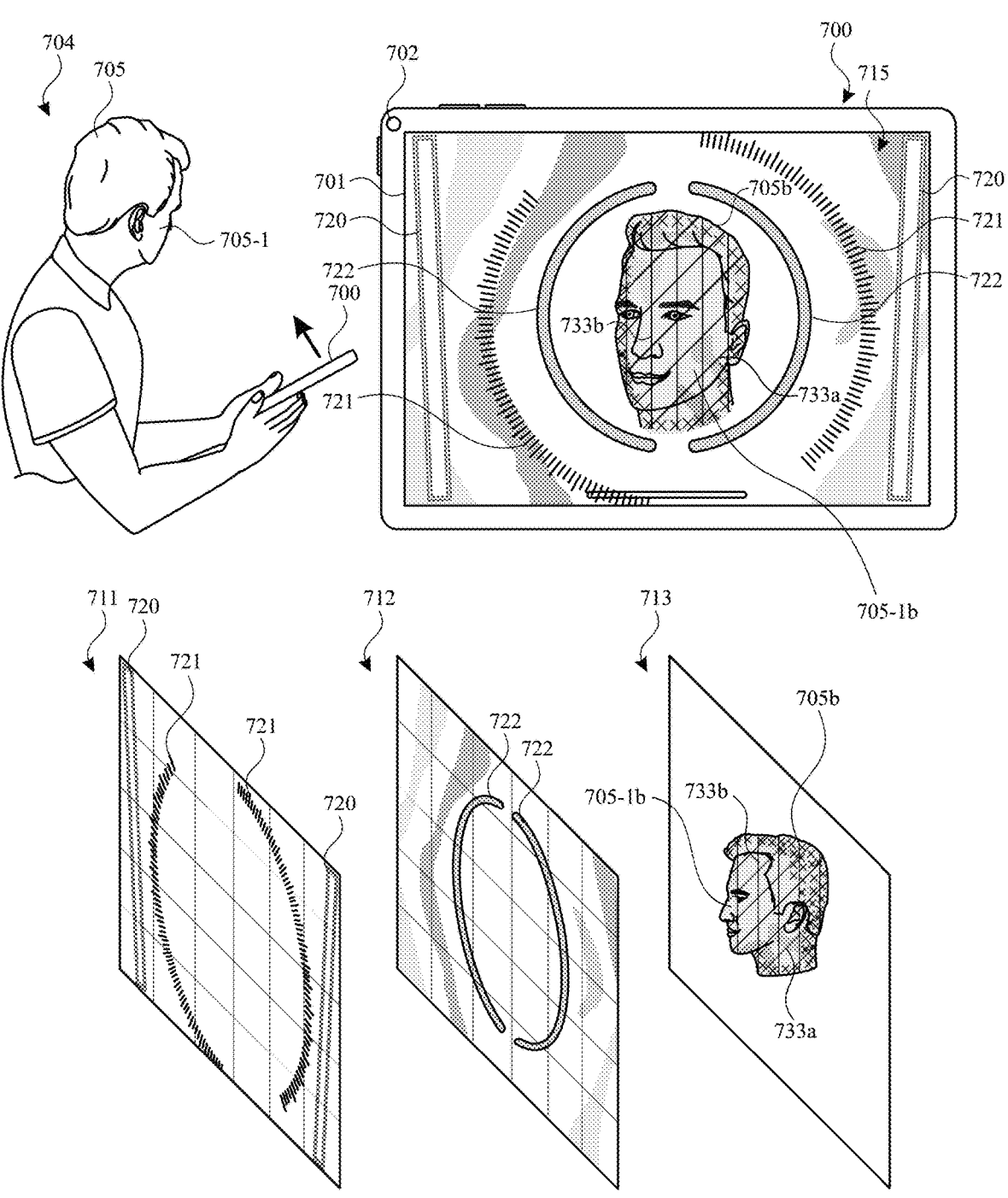
Figure 7H:
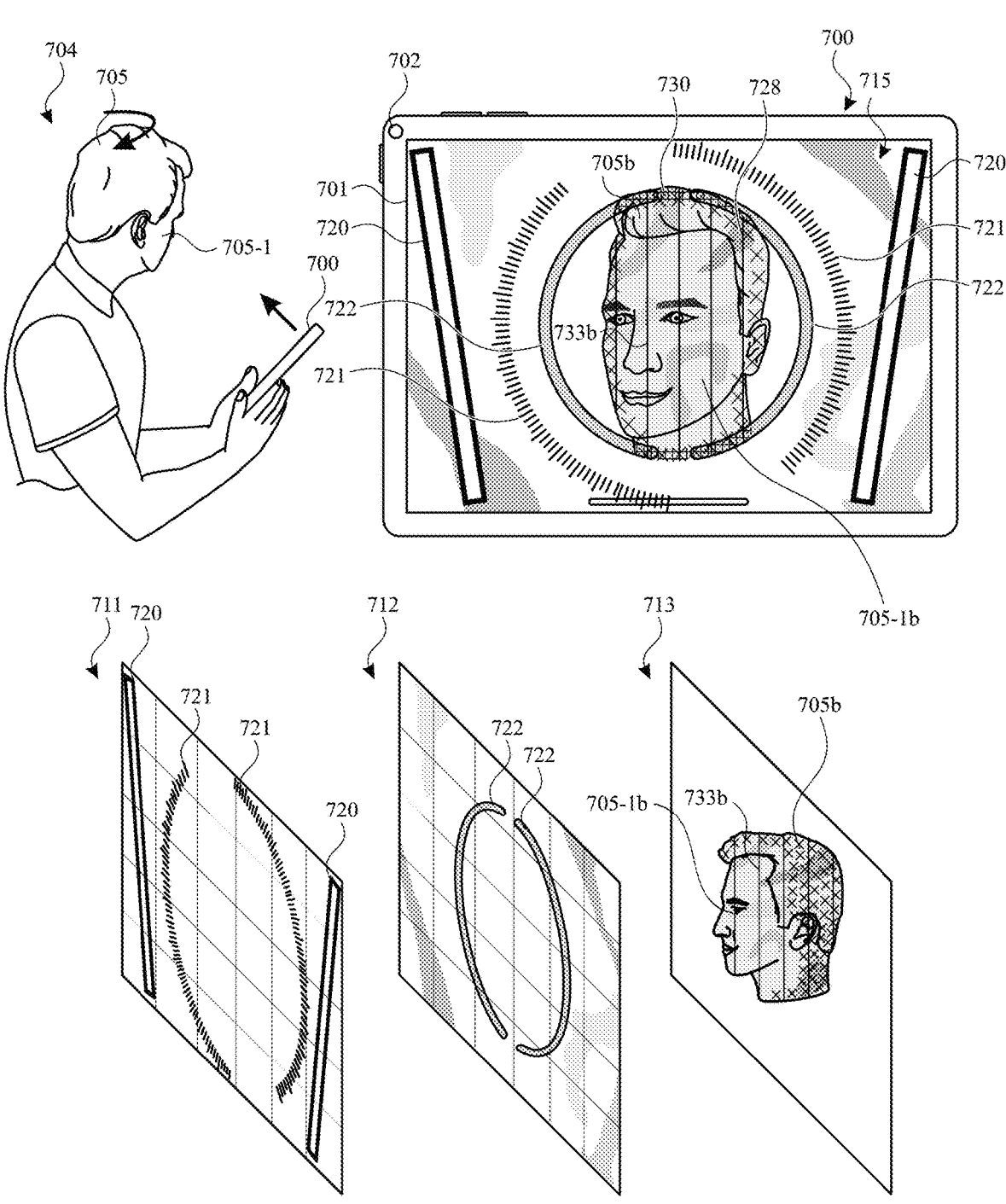

In FIG. 7D, user 705 has positioned his head (including face 705-1) within the field of view of camera 702. Accordingly, computer system 700 displays cropped representation 705b, which is a cropped portion of video feed 706 that includes a representation of the user's head, including representation 705-1b of the user's face 705-1. Computer system 700 generates cropped representation 705b by cropping representation 705a of user 705 from video feed 706, omitting portions of video feed 706 that are not relevant for the biometric enrollment process. For example, cropped representation 705b does not include background objects (e.g., representation 707a) from the video feed and various portions of representation 705a, such as torso and shoulder portions of representation 705a. As such, the resulting cropped representation 705b includes representation 705-1b of face 705-1 and surrounding portions of the representation of user in video feed 706. Computer system 700 applies various visual effects to cropped representation 705b of the user to, in some embodiments, emphasize the biometric feature for biometric enrollment (e.g., representation 705-1b of the user's face 705-1). For example, the computer system applies feathered effect 728 (represented by hatching) to outer edges of cropped representation 705b that do not include representation 705-1b of the facial region of user 705. In some embodiments, computer system 700 identifies the biometric feature (e.g., the face) of the user (e.g., using machine vision, biometric detection, and/or a depth map) and deemphasizes portions of representation 705b of the user that are not identified as part of the biometric feature (e.g., face 705-1). For example, in FIG. 7D, feathered effect 728 is applied to portions of cropped representation 705b that are not part of representation 705-1b of the user's face, thereby deemphasizing those portions of cropped representation 705b. As the position of the user's face 705-1 moves in the field of view of camera 702, computer system 700 displays cropped representation 705b moving in enrollment interface 715 while maintaining the feathered effect 728 to the non-facial portions of cropped representation 705b (e.g., regions outside of representation 705-1b). In some embodiments, computer system 700 applies various visual effects to cropped representation 705b to enhance appearance of the cropped representation for the biometric enrollment process. For example, computer system 700 displays cropped representation 705b with a modified visual characteristic 724, such as, for example, an increased visual contrast and/or a reduced natural saturation. As another example, computer system 700 applies a color layer to representation 705b, represented by colors 726a and 726b in enrollment interface 715. In some embodiments, colors 726a and 726b of the color layer on representation 705b are animated over time, similar to colors 716 in middle layer 712, as shown in FIGS. 7D-7K. In some embodiments, colors 726a and 726b are colors of a color palette that is used for the biometric enrollment process. In some embodiments, colors 726a and 726b are a subset of the colors in the color palette. In some embodiments, additional colors are provided from the color palette.

Cropped representation 705b is displayed in background layer 713 of enrollment interface 715, as shown in FIG. 7D. As the position of the user's head moves with respect to camera 702, the displayed position of cropped representation 705b moves within layer 713 accordingly. For example, as the user's face 705-1 moves closer to camera 702 (or as the video feed is resized (e.g., increased in size)), cropped representation 705b is displayed having a larger size in background layer 713 of enrollment interface 715. Conversely, as the user's face moves away from camera 702 (or as the video feed is decreased in size), cropped representation 705b is displayed having a smaller size in background layer 713 of enrollment interface 715. As another example, as the user's face 705-1 moves horizontally and/or vertically relative to camera 702, the displayed position of representation 705b also moves horizontally and/or vertically in background layer 713 of enrollment interface 715. In some embodiments, as the user's face 705-1 moves along the x-, y-, and z-axes relative to camera 702, representation 705b is displayed with one or more visual effects (e.g., blurring and/or fading) that provide visual feedback indicating that the user's face is not properly aligned with camera 702 and, in some embodiments, guiding the user to properly align their face with camera 702. When background layer 713 is displayed with foreground layer 711 and middle layer 712, as shown in enrollment interface 715, the computer system 700 provides an interactive enrollment interface that guides user 705 in positioning the biometric feature (e.g., face 705-1) to successfully complete the biometric enrollment process, as depicted in the following figures.

In FIG. 7D, user 705 has positioned their face 705-1 within the field of view of camera 702. However, the user's face is too far away from camera 702 and, therefore, has not met the criteria for completing the biometric enrollment process. In order to guide the user to move their face closer to camera 702, computer system 700 displays outer flares 720 and inner flares 721 having a position that indicates the user should move their face 705-1 closer to camera 702. For example, computer system 700 displays outer flares 720 with low brightness and/or opacity and having an outward location near the perimeter of display 701 and away from target region 725. Additionally, computer system 700 displays inner flares 721 positioned away from target region 725. Computer system 700 also displays cropped representation 705b having a small size within target indicator 722 to indicate that the user's face is too far from camera 702. However, because the user's face is properly aligned with camera 702 in the x- and y-directions, computer system 700 displays cropped representation 705b positioned within target indicator 722 and displays inner flares 721 without a rotated appearance. In some embodiments, computer system 700 displays representation 705b having a blurred or faded visual effect to indicate that the face is too far from camera 702 (e.g., along the z-axis). This provides visual feedback to the user to move their face closer to camera 702. In some embodiments, the amount of displayed blurring or fading increases as the position of the user's face moves farther from a target distance from camera 702 and decreases as the position of the user's face moves closer towards the target distance.

As previously mentioned, in some embodiments, computer system 700 displays inner flares 721 having an animated appearance in which the inner flares repeatedly grow and then shrink over time. An example of this animation is depicted in FIG. 7E, where inner flares 721 are displayed having their enlarged size as compared to the smaller size shown in FIG. 7D. In FIG. 7E, the user has not changed position and, therefore, computer system 700 does not change the appearance of enrollment interface 715 except for the animated effect of inner flares 721 and the animation of colors 716 in middle layer 712 and colors 726 on cropped representation 705b. For the sake of clarity, the animated effect of inner flares 721 is not depicted in the remaining figures, unless stated otherwise. However, it should be appreciated that the movements of inner flares 721, as depicted in the following figures, can be provided while the inner flares have the growing and shrinking animation.

In FIG. 7F, user 705 moves computer system 700 closer to the user's face 705-1 while still facing camera 702. However, while moving computer system 700, the user's face moves vertically within the field of view of camera 702 such that a portion of cropped representation 705b of the user's head is positioned outside of target region 725 in enrollment interface 715. As the user moves his head relative to camera 702 of computer system 700 as depicted in FIG. 7F, the computer system updates the display of enrollment interface 715 as the alignment of the user's face changes relative to camera 702. For example, in response to detecting user's face 705-1 moving towards camera 702 (e.g., closer to the target depth), computer system 700 displays outer flares 720 slightly increasing brightness and/or opacity, moving inward (toward target region 725) and rotating. The computer system also displays inner flares 721 moving inward and displays cropped representation 705b increasing in size in response to detecting the user's face moving closer to camera 702. Computer system 700 displays inner flares 721 without rotation because the user's face remains properly aligned with camera 702 in the x-direction. In response to detecting the user's face moving in the vertical direction relative to camera 702, computer system 700 displays inner flares 721 moving downward and cropped representation 705b shifting upward, providing a simulated parallax effect based on the relative positioning of the elements on the respective layers that are spaced apart in the z-direction. Because a portion of the user's head has moved outside of target region 725 (as indicated by the positioning of cropped representation 705b outside of target indicator 722), cropped representation 705b is at least partially covered by elements in middle layer 712 that are outside of target region 725. For example, computer system 700 displays blurring effect 730 over the portions of cropped representation 705b that are located outside of target region 725. In some embodiments, blurring effect 730 is also provided on top of feathered effect 728 at the edges of cropped representation 705b. In some embodiments, computer system 700 also applies blurring effect 730 to portions of representation 705-1b of face 705-1 that are outside target region 725. In some embodiments, colors 716 in middle layer 712 are displayed moving over cropped representation 705*b* as the colors move on middle layer 712 while portions of cropped representation 705*b* are positioned outside of target region 725. The arrangement of outer flares 720, inner flares 721, and cropped representation 705*b* (with blurring effect 730), as displayed in enrollment interface 715 in FIG. 7F, provides feedback to user 705 indicating that the user's face is properly aligned with camera 702 in the x-direction but that the user should move their face closer to the camera (in the z-direction) and downward (in the y-direction) in the field of view of camera 702 in order to successfully complete the biometric enrollment process. In some embodiments, computer system 700 displays representation 705*b* having a blurred or faded visual effect to indicate that the face is shifted (e.g., vertically and/or horizontally) relative to a target alignment (in the x and/or y direction) relative to camera 702. For example, computer system 700 displays representation 705*b* having a blurred visual effect (e.g., similar to that described below with respect to hatching 733*b*) when face 705-1 has the vertically shifted alignment depicted in FIG. 7F. The blurred appearance provides visual feedback to the user indicating that the user should shift their face along the x and/or y directions relative to camera 702 to achieve proper alignment. In some embodiments, the amount of displayed blurring or fading increases as the position of the user's face moves farther from a target alignment with respect to camera 702 and decreases as the position of the user's face moves closer towards the target alignment.

In FIG. 7G, user 705 moves computer system 700 away from his face 705-1 and turns his head leftward, positioning his head at the target position in the y-direction (e.g., vertically centered in enrollment interface 715). As the user moves his head relative to camera 702 of computer system 700 as depicted in FIG. 7G, the computer system updates the display of enrollment interface 715 as the alignment of the user's face changes relative to camera 702. For example, in response to detecting movement of the user's face in the z-direction, computer system 700 displays enrollment interface 715 with outer flares 720 moving outward away from target region 725 and with less rotation and brightness and/or opacity than shown in FIG. 7F. The computer system also decreases the displayed size of cropped representation 705*b* (compared to the size depicted in FIG. 7F) and with inner flares 721 moving outward from target region 725 (as compared to the displayed position in FIG. 7F) in response to the user's head moving away from camera 702. In response to detecting the user's head returning to a vertically centered alignment with camera 702, computer system 700 displays cropped representation 705*b* and inner flares 721 moving to a vertically centered position in target region 725 of enrollment interface 715 (and without blur effect 730 on cropped representation 705*b*). In response to detecting the user's head turning to the left, computer system 700 rotates inner flares 721 counterclockwise based on the horizontal displacement of the user's face (in the x-direction) when the head is turned and displays the cropped representation 705*b* of the user's head turning. As described in greater detail below, computer system 700 also displays a deemphasizing visual effect represented by hatching 733*a* and hatching 733*b* to indicate the improper alignment of face 705-1 relative to camera 702. In FIG. 7G, the appearance of enrollment interface 715 indicates that the user should turn their head forward (towards camera 702) and move the user's face closer to camera 702, while maintaining the current vertical alignment with camera 702, in order to complete the biometric enrollment process.

In FIG. 7H, user 705 moves computer system 700 closer to his head while his head remains turned to the left. The user's face 705-1 is properly aligned with camera 702 in a vertical direction and in distance (e.g., depth), but the user's face is not properly aligned with the camera in the horizontal direction because the user's head is turned. As the user moves computer system 700 to the position depicted in FIG. 7H, the computer system updates the display of enrollment interface 715 as the alignment of the user's face changes relative to camera 702. For example, in response to detecting the change in depth of the user's face relative to camera 702, computer system 700 displays outer flares 720 moving inward, rotating, and increasing in opacity and/or brightness as they move to the displayed state shown in FIG. 7H. The computer system also shows inner flares 721 moving inward, while remaining rotated, and increases the displayed size of cropped representation 705*b* to the size shown in FIG. 7H. Computer system 700 continues to show inner flares 721 rotated due to the horizontal displacement of the user's face 705-1 relative to camera 702. In FIG. 7H, the displayed appearances of outer flares 720, inner flares 721, and cropped representation 705*b* indicate that the user should turn their head forward towards camera 702, while maintaining the current vertical alignment and depth relative to camera 702, in order to successfully complete the biometric enrollment process. Computer system 700 also changes the amount of deemphasizing visual effect applied to representation 705*b* based on the changes in alignment when moving from the positioning in FIG. 7G to the positioning in FIG. 7H.

In some embodiments, computer system 700 displays representation 705*b* having a visual effect (e.g., blurring and/or fading) to indicate a respective offset of the alignment of the face relative to camera 702. In some embodiments, the offset is referred to herein as an alignment error, which can include different types of errors that are based on an improper alignment of the face relative to camera 702. An alignment error can include a depth error (also referred to herein as a distance error), which occurs when the user's face 705-1 has a distance (e.g., along the z-axis) from camera 702 that does not correspond to the target distance (e.g., the face it too far from, or too close to, camera 702). An alignment error can also include a shift error, which occurs when the user's face 705-1 is misaligned with camera 702 along the x- and/or y-axes, causing a lateral and/or vertical displacement or offset of the face relative to the camera. A shift error can occur when the user's face is rotated or turned away from camera 702 (e.g., sometimes referred to as a rotation error). A shift error can also occur when the user's face is tilted too far up or down relative to camera 702 (e.g., also referred to as a tilt error). In some embodiments, different alignment errors are indicated by different visual effects. For example, a depth error is indicated by fading representation 705*b* and a shift error is indicated by blurring representation 705*b* (or vice-versa). In some embodiments, a same visual effect is used for a subset of alignment errors. For example, a blurring effect is used for both a rotational error and a tilt error.

In FIG. 7G, hatching 733*a* and 733*b* represent deemphasizing visual effects that are displayed by computer system 700 in response to detecting alignment errors while the user's face is positioned as depicted in FIG. 7G. Specifically, the alignment errors include a depth error caused by the user's face being positioned too far from camera 702 and a shift error caused by the user's face being turned to the left. In the embodiment depicted in FIG. 7G, computer system 700 applies a fading effect to representation 705*b* (represented by hatching 733a) to indicate the depth error and applies a blurring effect to representation 705b (represented by hatching 733b) to indicate the shift error.

In some embodiments, the computer system 700 increases the amount or magnitude of a deemphasizing visual effect as the magnitude of the alignment error increases (e.g., moving away from the target alignment) and decreases the amount or magnitude of deemphasizing visual effect as the magnitude of the alignment error decreases (e.g., moving towards the target alignment). For example, as the user's face moves from the position in FIG. 7G to the target distance in FIG. 7H, computer system 700 gradually decreases the fading visual effect (e.g., representation 705b becomes more opaque, fading into view) as the magnitude of the depth error decreases. When the face achieves the alignment depicted in FIG. 7H, representation 705b is displayed without the fading visual effect (as indicated by the removal of hatching 733a) because the face is properly aligned in the z-direction (e.g., there is no longer a depth error). However, because the shift error of FIG. 7G is still detected, computer system 700 continues to display representation 705b with the same amount of blurring effect represented by hatching 733b. If the face moves in the opposite direction (e.g., from the position in FIG. 7H to the position in FIG. 7G) or continues to move closer to the camera (e.g., past the target depth), the computer system increases the fading visual effect as the face moves away from the target depth (e.g., causing representation 705b to fade out of view) to indicate the occurrence, and increasing magnitude, of the depth error. Similarly, if the computer system detects the user turning their face towards camera 702, the computer system gradually decreases the blurring visual effect represented by hatching 733b as the magnitude of the shift error decreases. When the proper facial alignment is achieved in the x- and y-axes, the computer system no longer displays the blurring visual effect, indicating the proper alignment of face 705-1 in the x- and y-axes. Conversely, as the magnitude of the shift error increases, the computer system increases the amount of blurring of representation 705b, indicating the occurrence, and increasing magnitude, of the shift error.

Figure 7I:
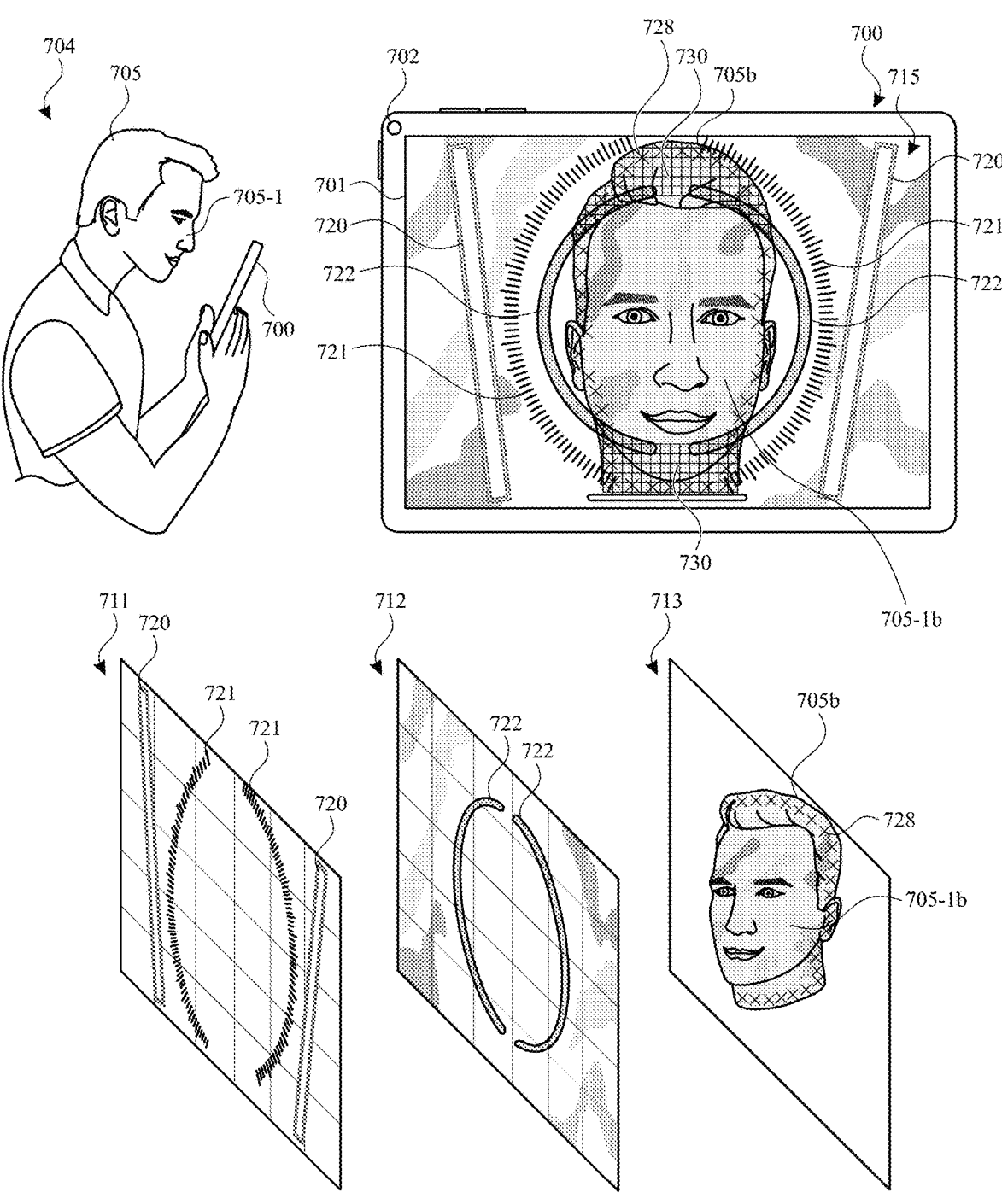

In FIG. 7I, user 705 turns his head forward and moves computer system 700 close to his face 705-1 while maintaining the vertical alignment of his face relative to camera 702. The user's face 705-1 is properly aligned with camera 702 in both the vertical and horizontal directions, but the face is too close to camera 702. As the user moves computer system 700 to the position depicted in FIG. 7I, the computer system updates the display of enrollment interface 715 as the alignment of the user's face changes relative to camera 702. For example, as the user's face moves closer to camera 702, computer system 700 displays outer flares 720 moving inward, rotating, and decreasing in brightness and/or opacity as they move away from the position in FIG. 7H to the displayed state shown in FIG. 7I. The computer system also shows inner flares 721 moving inward towards target region 725 and cropped representation 705b increasing in size. In response to detecting the user's face rotating forward towards camera 702, the computer system displays inner flares 721 rotating back to the neutral, unrotated position as shown in FIG. 7I. As the user's face moves closer to camera 702, computer system 700 displays cropped representation 705b increasing in size, which causes portions of cropped representation 705b to be displayed outside of target region 725. These portions are displayed having blur effect 730 and are at least partially obscured by target indicator 722 and inner flares 721, which indicates that the user's face is too close to camera 702. The appearances of outer flares 720, inner flares 721, and cropped representation 705b provide feedback informing the user that he should move his face away from the camera in order to successfully complete the biometric enrollment process. In some embodiments, computer system 700 displays representation 705b having a deemphasizing visual effect (e.g., a faded effect) in response to a depth error caused by face 705-1 being positioned too close to camera 702.

In some embodiments, elements of the enrollment interface are reactive to a detected brightness. For example, in FIG. 7J, a brightness of physical environment 704 is decreased (as indicated by shading 731). In response to detecting the change in brightness in environment 704 and/or the user's face 705-1, computer system 700 changes the appearance of inner flares 721. In the embodiment depicted in FIG. 7J, the computer system increases the size of inner flares 721 in response to detecting a decreased brightness of environment 704 and/or the user's face 705-1 and decreases the size of inner flares 721 in response to detecting an increased brightness of environment 704 and/or the user's face 705-1.

Figure 7J:
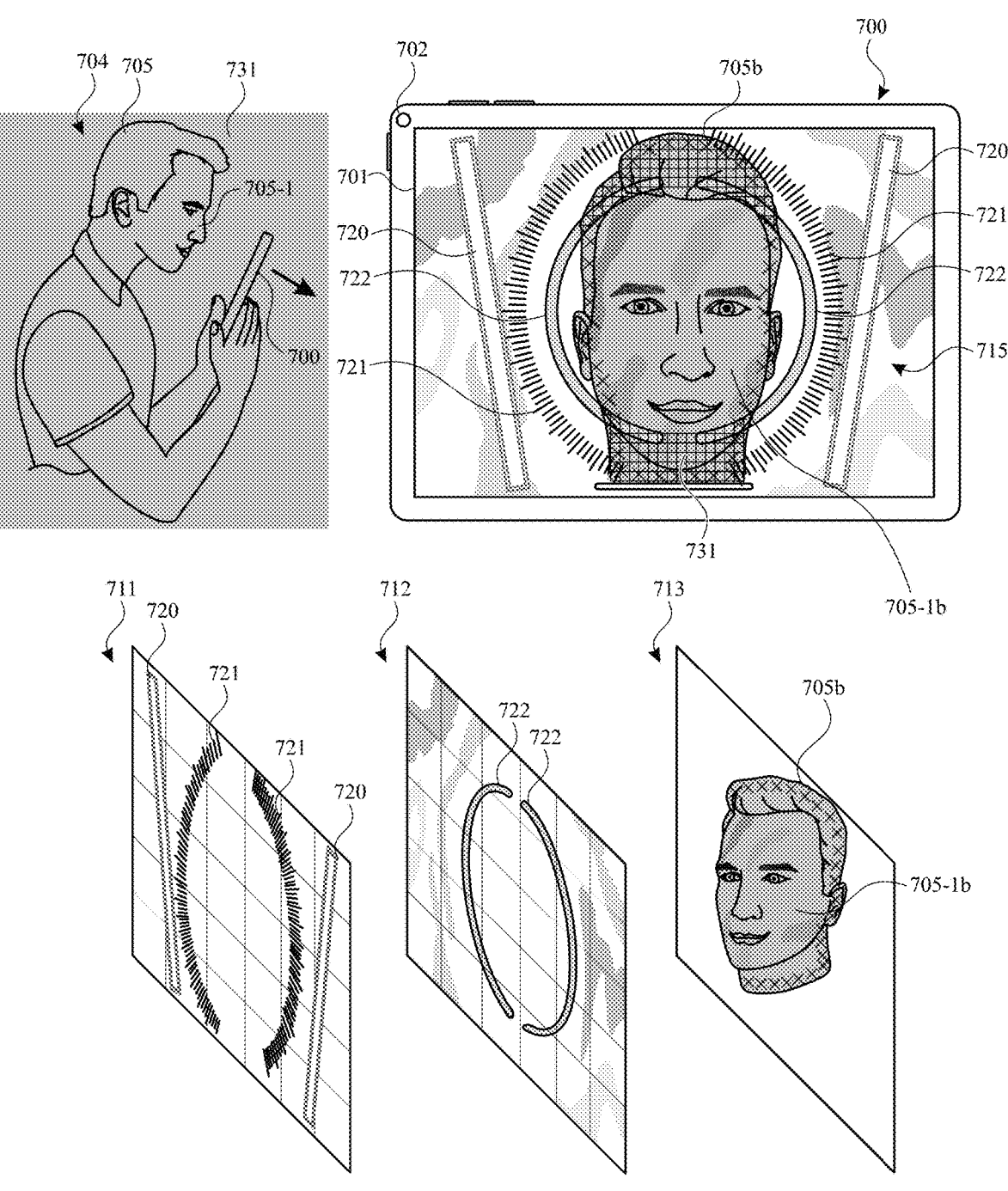
Figure 7K:
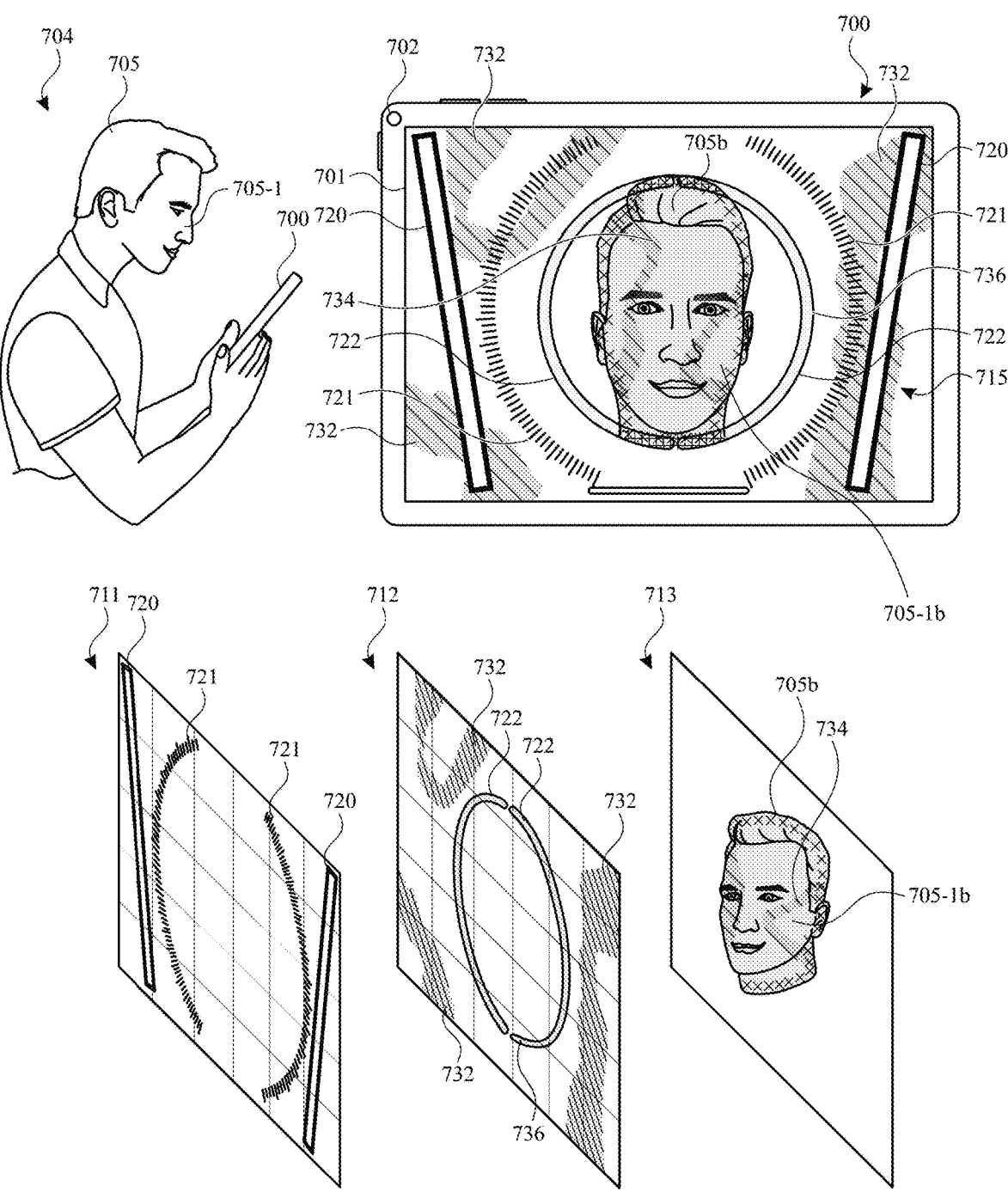
Figure 7L:
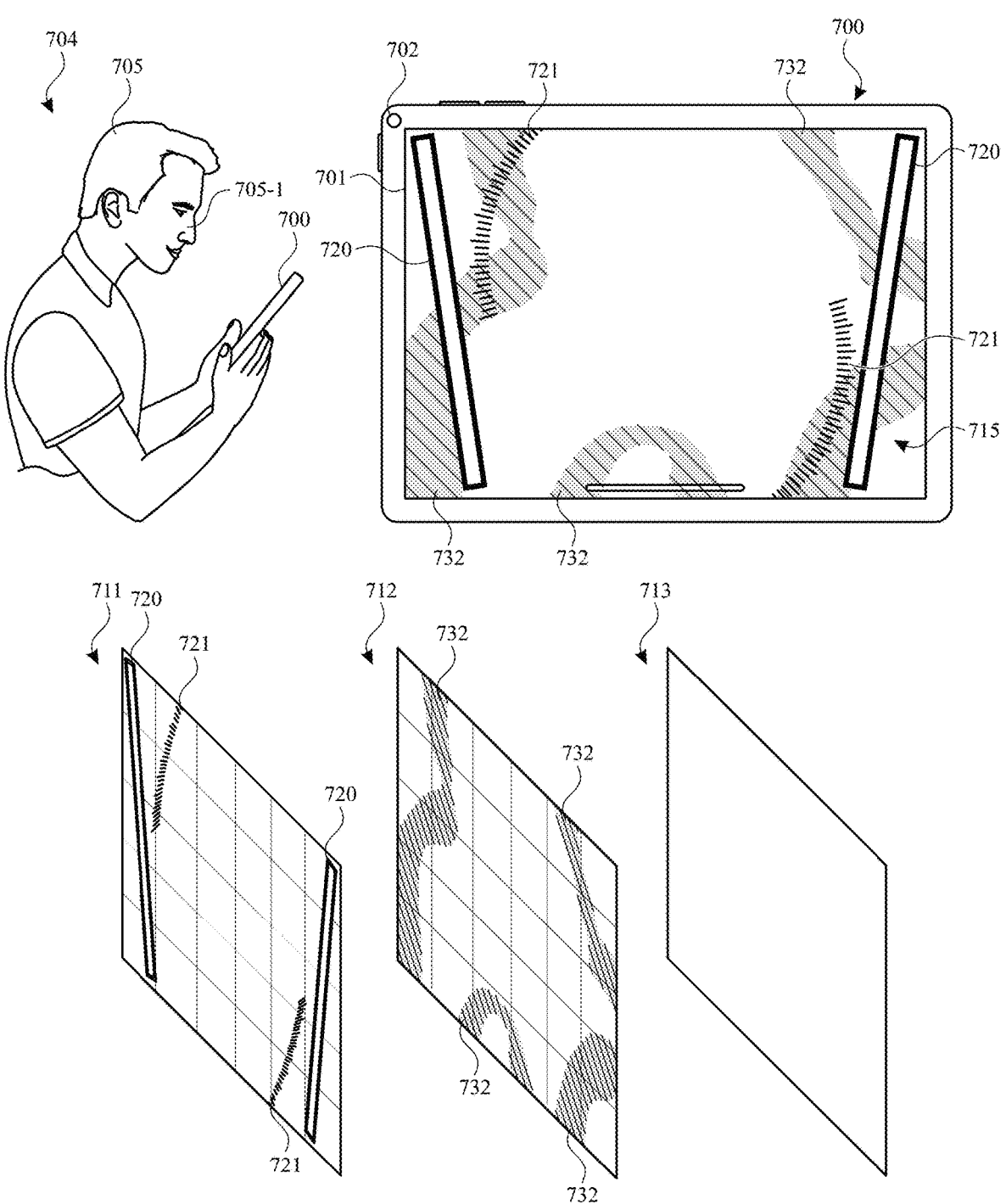
Figure 7M:
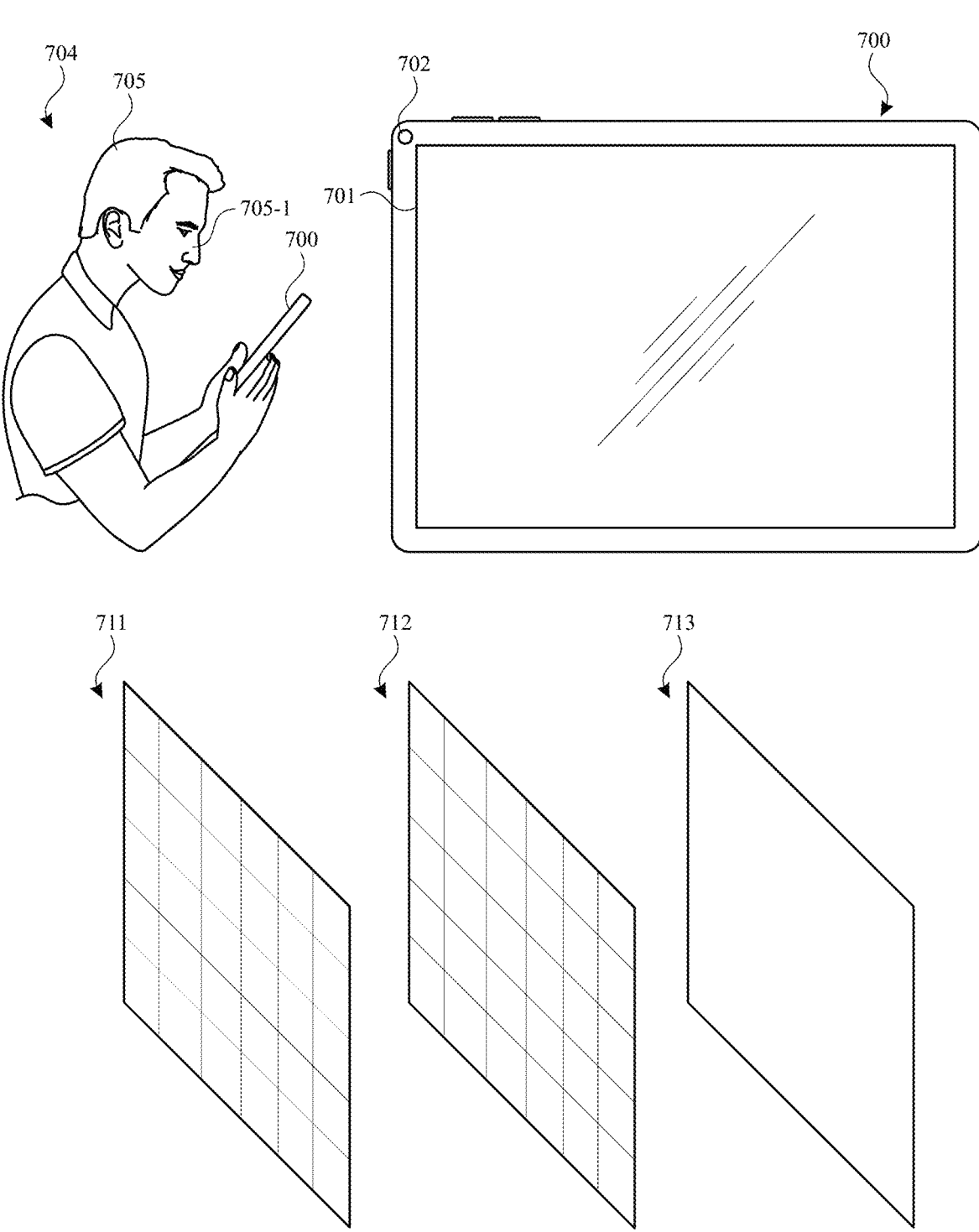

FIGS. 7K-7M depict user interfaces for the enrollment process when the biometric feature is properly aligned with camera 702. In FIG. 7K, the user's face 705-1 is properly aligned with camera 702 in all three dimensions (e.g., x-axis, y-axis, and z-axis). As the user moves computer system 700 to the position depicted in FIG. 7K, the computer system updates the display of enrollment interface 715 as the alignment of the user's face changes relative to camera 702. For example, in response to detecting the user's face 705-1 aligning with camera 702 in the z-direction, computer system 700 displays outer flares 720 rotating, increasing in brightness and/or opacity, and moving to the position depicted in FIG. 7K. The computer system also displays inner flares 721 moving to the position shown in FIG. 7K and displays cropped representation 705b changing to the size shown in FIG. 7K. Computer system 700 also removes any deemphasizing visual effect (e.g., fading) that is associated with a depth error. In response to detecting the user's face 705-1 aligning with camera 702 in the vertical direction (y-direction), the computer system displays inner flares 721 and cropped representation 705b having the vertically centered position shown in FIG. 7K. In response to detecting the user's face 705-1 aligning with camera 702 in the horizontal direction (x-direction), the computer system displays inner flares 721 having the neutral, unrotated position and displays cropped representation 705b looking forward as shown in FIG. 7K. As face 705-1 achieves a proper alignment with camera 702 along the x- and y-axes, computer system 700 removes any deemphasizing visual effect (e.g., blurring) that is associated with a shift error.

Figure 7P:
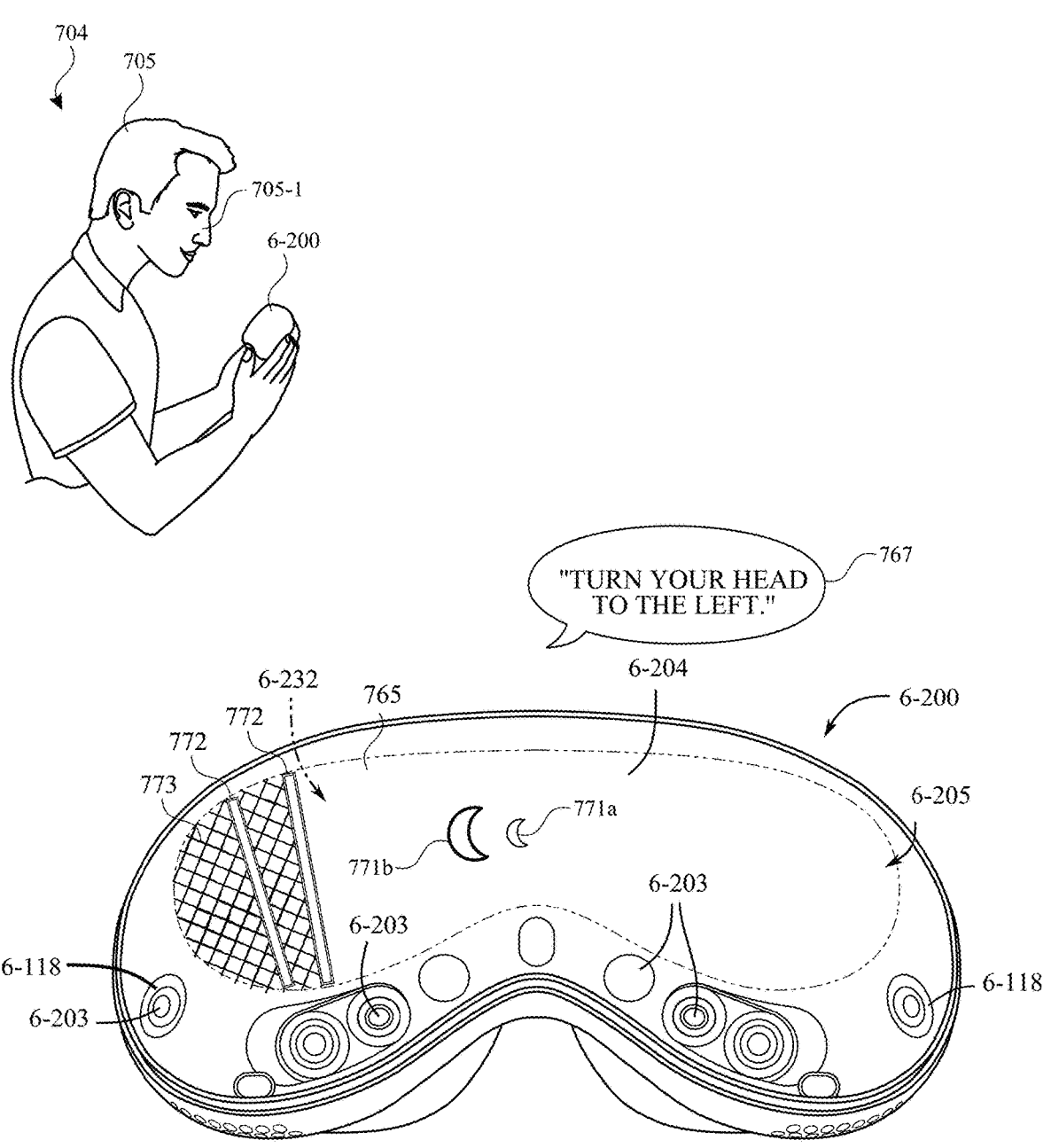

In some embodiments, computer system 700 also displays an animation when the user's face 705-1 is properly aligned with camera 702 (e.g., indicating that the biometric enrollment process is successfully completed). For example, as shown in FIG. 7K, computer system 700 changes the colors displayed in enrollment interface 715 when the target alignment is achieved. For example, the colors in middle layer 712 change to color 732 (e.g., green or some other color to indicate success of the biometric enrollment process) and colors on cropped representation 705b change to color 734 to indicate success of the biometric enrollment process. In some embodiments, color 734 is the same color as color 732 or is a color that is complementary to color 732. In some embodiments, target indicator 722 also changes color to indicate successful alignment of the biometric feature with camera 702. In some embodiments, the computer system displays portions of the progress indicator moving offscreen as part of the animation. For example, in FIG. 7L, computer system 700 displays a center wipe animation where inner flares 721 are shown moving away from a center region of display 701 and appearing to move offscreen. In some embodiments, outer flares 720 and colors 732 also move offscreen in an outward direction as part of the center wipe animation. In FIG. 7M, the first phase of the enrollment process is complete, and computer system 700 no longer displays the enrollment interface for the first phase of the enrollment process. In some embodiments, the enrollment process is complete after the first phase. In some embodiments, the enrollment process proceeds to a second phase, as depicted in FIGS. 7P-7R.

In the embodiments depicted in FIGS. 7A-7M, the biometric enrollment process is performed using computer system 700. However, it should be appreciated that the biometric enrollment process can be performed using other computer systems, such as, for example, an HMD. For example, FIGS. 7N1 and 7O1 depict the embodiments shown in FIGS. 7G and 7H as they would appear if the biometric enrollment process were to be performed using HMD 750 instead of computer system 700. HMD 750 is a head-mounted device that can be used by user 705 to perform the biometric enrollment process described above with respect to FIGS. 7A-7M and, in some embodiments, can be worn by user 705 to experience an XR session (e.g., an XR environment). HMD 750 includes display 751, which is used to display the biometric enrollment process in a manner analogous to display 701. HMD 750 also includes camera 752, which is used for the biometric enrollment process in a manner analogous to camera 702. For the sake of brevity, details are not repeated.

In FIGS. 7N1 and 7O1, display 751 is a curved lenticular display (e.g., similar to display assembly 3-100 in FIG. 1G, including lenticular lens array 3-110) that can be used to display biometric enrollment interface 755 (similar to biometric enrollment interface 715) while the user is holding HMD 750. Enrollment interface 755 is comprised of layers 761-763, which are similar to layers 711-713. Because the embodiments in FIGS. 7N1 and 7O1 use an HMD with a curved lenticular display 751, the layers of enrollment interface 755 have a curved shape that matches the form factor of display 751. It should be appreciated that the elements displayed in layers 761-763 of enrollment interface 755 are analogous to those displayed in layers 711-713 of enrollment interface 715. Accordingly, HMD 750 displays outer flares 720 and inner flares 721 in foreground layer 761 of enrollment interface 755, colors 716 and target indicator 722 (indicating target region 725) in middle layer 762 of enrollment interface 755, and cropped representation 705b of user 705 in background layer 763 of enrollment interface 755 including hatching representing the corresponding deemphasizing visual effect(s). Foreground layer 761 also includes mesh 764 (similar to mesh 708) and middle layer 762 includes mesh 766 (similar to mesh 714). These layers comprise enrollment interface 755, which is used to perform the biometric enrollment process using HMD 750 in a manner analogous to the biometric enrollment process described above for enrollment interface 715 displayed using computer system 700. For the sake of brevity, details are not repeated.

In some embodiments, HMD 750 displays elements of the enrollment interface 755 moving in a manner that conforms to the form factor of display 751. For example, as outer flares 720 move towards or away from target region 725, the flares tilt or rotate as they follow the curvature of display

751. In some embodiments, HMD 750 shrinks or enlarges outer flares 720 as they move towards or away from target region 725 in order to fit the height of display 751, which has a varying height due to the lenticular shape of the display.

In some embodiments, different sections of the lenticular display 751 (e.g., similar to lenticular lens array 3-110) show different views of the user interface elements based on the perspective from which the user interface elements are being displayed. For example, as the viewpoint of user 705 changes relative to the lenticular display, different sections of the display will become visible, and these different sections show the user different views of the user interface (e.g., enrollment interface 755) that have a different appearance that corresponds to the user's viewing angle. In some embodiments, this creates a three-dimensional effect as the user's viewing angle shifts (e.g., due to the display being moved and/or due to the user moving relative to the display).

In some embodiments, the techniques and user interfaces described in FIGS. 7A-7M are provided by one or more of the devices described in FIGS. 1A-IP. For example, FIGS. 7N2 and 7O2 depict the embodiments shown in FIGS. 7G and 7H as they would appear if the biometric enrollment process were to be performed using HMD 1-100 instead of computer system 700. HMD 1-100 is a head-mounted device (described in greater detail above with reference to FIG. 1B) that can be used by user 705 to perform the biometric enrollment process described above with respect to FIGS. 7A-7M and, in some embodiments, can be worn by user 705 to experience an XR session (e.g., an XR environment). HMD 1-100 includes display unit 1-102, which is used to display the biometric enrollment process in a manner analogous to display 701. HMD 1-100 also includes sensors, which are used for the biometric enrollment process in a manner analogous to camera 702. For the sake of brevity, details are not repeated.

In FIGS. 7N2 and 7O2, display unit 1-102 includes a curved lenticular display (e.g., lenticular lens array 3-110 of display assembly 3-100 in FIG. 1G) that can be used to display biometric enrollment interface 755 (similar to biometric enrollment interface 715) while the user is holding HMD 1-100. Enrollment interface 755 is comprised of layers 761-763, which are similar to layers 711-713. Because the embodiments in FIGS. 7N2 and 7O2 use an HMD with a curved lenticular display (e.g., 3-110), the layers of enrollment interface 755 have a curved shape that matches the form factor of the display of HMD 1-100. It should be appreciated that the elements displayed in layers 761-763 of enrollment interface 755 are analogous to those displayed in layers 711-713 of enrollment interface 715. Accordingly, HMD 1-100 displays outer flares 720 and inner flares 721 in foreground layer 761 of enrollment interface 755, colors 716 and target indicator 722 (indicating target region 725) in middle layer 762 of enrollment interface 755, and cropped representation 705b of user 705 in background layer 763 of enrollment interface 755 including hatching representing the corresponding deemphasizing visual effect(s). Foreground layer 761 also includes mesh 764 (similar to mesh 708) and middle layer 762 includes mesh 766 (similar to mesh 714). These layers comprise enrollment interface 755, which is used to perform the biometric enrollment process using HMD 1-100 in a manner analogous to the biometric enrollment process described above for enrollment interface 715 displayed using computer system 700. For the sake of brevity, details are not repeated.

In some embodiments, HMD 1-100 displays elements of the enrollment interface 755 moving in a manner that conforms to the form factor of the display of HMD 1-100

(e.g., including lenticular lens array 3-110). For example, as outer flares 720 move towards or away from target region 725, the flares tilt or rotate as they follow the curvature of the display. In some embodiments, HMD 1-100 shrinks or enlarges outer flares 720 as they move towards or away from target region 725 in order to fit the height of the display, which has a varying height due to the lenticular shape of the display.

In some embodiments, different sections of the lenticular display of HMD 1-100 (e.g., including lenticular lens array 3-110) show different views of the user interface elements based on the perspective from which the user interface elements are being displayed. For example, as the viewpoint of user 705 changes relative to the lenticular display (e.g., 3-110), different sections of the display will become visible and these different sections show the user different views of the user interface (e.g., enrollment interface 755) that have a different appearance that corresponds to the user's viewing angle. In some embodiments, this creates a three-dimensional effect as the user's viewing angle shifts (e.g., due to the display being moved and/or due to the user moving relative to the display).

FIGS. 7N3 and 7O3 depict the embodiments shown in FIGS. 7G and 7H as they would appear if the biometric enrollment process were to be performed using HMD 6-200 instead of computer system 700. HMD 6-200 is a head-mounted device (described in greater detail above with reference to FIG. 1J) that can be used by user 705 to perform the biometric enrollment process described above with respect to FIGS. 7A-7M and, in some embodiments, can be worn by user 705 to experience an XR session (e.g., an XR environment). HMD 6-200 includes display area 6-232, which is used to display the biometric enrollment process in a manner analogous to display 701. HMD 6-200 also includes cameras 6-118, which are used for the biometric enrollment process in a manner analogous to camera 702. For the sake of brevity, details are not repeated.

In FIGS. 7N3 and 7O3, HMD 6-200 includes a curved lenticular display (e.g., lenticular lens array 3-110 of display assembly 3-100 in FIG. 1G) that can be used to display biometric enrollment interface 755 (similar to biometric enrollment interface 715) while the user is holding HMD 6-200. Enrollment interface 755 is comprised of layers 761-763, which are similar to layers 711-713. Because the embodiments in FIGS. 7N3 and 7O3 use an HMD with a curved lenticular display (e.g., 3-110), the layers of enrollment interface 755 have a curved shape that matches the form factor of the display of HMD 6-200. It should be appreciated that the elements displayed in layers 761-763 of enrollment interface 755 are analogous to those displayed in layers 711-713 of enrollment interface 715. Accordingly, HMD 6-200 displays outer flares 720 and inner flares 721 in foreground layer 761 of enrollment interface 755, colors 716 and target indicator 722 (indicating target region 725) in middle layer 762 of enrollment interface 755, and cropped representation 705b of user 705 in background layer 763 of enrollment interface 755 including hatching representing the corresponding deemphasizing visual effect(s). Foreground layer 761 also includes mesh 764 (similar to mesh 708) and middle layer 762 includes mesh 766 (similar to mesh 714). These layers comprise enrollment interface 755, which is used to perform the biometric enrollment process using HMD 6-200 in a manner analogous to the biometric enrollment process described above for enrollment interface 715 displayed using computer system 700. For the sake of brevity, details are not repeated.

In some embodiments, HMD 6-200 displays elements of the enrollment interface 755 moving in a manner that conforms to the form factor of the display of HMD 6-200 (e.g., including lenticular lens array 3-110). For example, as outer flares 720 move towards or away from target region 725 the flares tilt or rotate as they follow the curvature of the display. In some embodiments, HMD 6-200 shrinks or enlarges outer flares 720 as they move towards or away from target region 725 in order to fit the height of the display, which has a varying height due to the lenticular shape of the display.

In some embodiments, different sections of the lenticular display of HMD 6-200 (e.g., including lenticular lens array 3-110) show different views of the user interface elements based on the perspective from which the user interface elements are being displayed. For example, as the viewpoint of user 705 changes relative to the lenticular display (e.g., 3-110), different sections of the display will become visible, and these different sections show the user different views of the user interface (e.g., enrollment interface 755) that have a different appearance that corresponds to the user's viewing angle. In some embodiments, this creates a three-dimensional effect as the user's viewing angle shifts (e.g., due to the display being moved and/or due to the user moving relative to the display).

FIGS. 7P-7R depict user interfaces for example embodiments in which the enrollment process includes a second phase. In the second phase of the enrollment process, the computer system instructs user 705 to perform various movements such as tilting or turning their head and/or making specific facial expressions. In some embodiments, the second phase can include a series of instructed movements and/or facial expressions. In the embodiment depicted in FIGS. 7P-7R, the computer system instructs user 705 to turn their head and displays enrollment interface 765 having various visual elements that are used to assist the user with completing the instructed movement. In FIGS. 7P-7R, the enrollment process is performed using HMD 6-200, however, the enrollment process can be performed using any of the computer systems described herein, such as, for example, computer system 700, HMD 750, or HMD 1-100.

In FIG. 7P, user 705 is facing forward (e.g., having the target alignment achieved during the first phase of the enrollment process), and HMD 6-200 displays enrollment interface 765 for the second phase of the enrollment process and outputs audio instruction 767 instructing the user to turn their head to the left. Enrollment interface 765 includes indicators 771a and 771b displayed in a center region of the interface and facing to the left and flares 772 and color region 773 displayed on a left side of the interface. In some embodiments, color region 773 can include one or more colors (e.g., similar to colors 716) that move independent of a detected change in the pose of the user. The displayed elements of enrollment interface 765 assist with guiding the user to complete instructed movements for the second phase of the enrollment process. In some embodiments, one or more of the elements are displayed with an animation that is suggestive of the instructed movement. For example, to indicate to the user that they should begin moving, indicators 771a and 771b may pulsate and/or color region 773 may include an animated movement of different colors. Additionally or alternatively, indicator 771a may move slightly towards indicator 771b to indicate a movement to the left, and flares 772 and color region 773 move to the left side of enrollment interface 765 to indicate a movement to the left. In some embodiments, enrollment interface 765 is comprised of a single layer. In some embodiments, enrollment interface 765 is comprised of multiple layers, similar to interface 755. In some embodiments, one or more layers of enrollment interface 765 include a mesh similar to mesh 764 and/or mesh 766, and elements of enrollment interface 765 are displayed with a depth effect (e.g., a three-dimensional ripple effect) as they move across a layer having a respective mesh.

In FIG. 7Q, user 705 begins to turn his head to the left. In response to detecting the leftward movement of the user's head and/or face 705-1 (e.g., using any of sensors 6-118, 6-203, and/or other sensors of HMD 6-200), HMD 6-200 modifies enrollment interface 765 by moving indicator 771*a* to the left towards indicator 771*b*. As the user continues the leftward head turn, HMD 6-200 continues to move indicator 771*a* towards indicator 771*b*. In some embodiments, HMD 6-200 also moves flares 772 closer together in a similar manner to indicate the leftward movement of the user's head. The movement of indicator 771*a* towards indicator 771*b* (and, in some embodiments, the movement of flares 772) assists in guiding user 705 to complete the leftward head turn by providing feedback to user 705 indicating that the leftward head turn is causing the respective elements to move towards a target position (e.g., indicator 771*a* is moving towards a target position indicated by indicator 771*b*) and providing a representation of progress in completing the movement (e.g., based on a position of indicator 771*a* relative to indicator 771*b*).

In FIG. 7R, user 705 has turned his head farther to the left, completing the instructed leftward head turn. In response to the continued head movement of user 705, HMD 6-200 has continued to move indicator 771*a* towards indicator 771*b* and now displays indicator 771*a* positioned inside indicator 771*b*, indicating that the leftward head turn has been completed. In some embodiments, HMD 6-200 provides additional feedback indicating that the instructed movement has been completed, such as generating an audio output (e.g., a chime and/or additional audio instruction) and/or modifying color region 773. For example, color region 773 can change colors as depicted in FIG. 7R. In some embodiments, HMD 6-200 displays an animation after the completion of each instructed movement or facial expression.

In some embodiments, after detecting completion of the instructed movement, HMD 6-200 continues to a different instructed movement or facial expression until the second phase of the biometric enrollment process is completed. In some embodiments, HMD 6-200 displays an animation (e.g., a center wipe removing the displayed elements) after the second phase of the biometric enrollment process is complete.

The embodiment depicted in FIGS. 7P-7R represents an example of user interfaces displayed for one instructed movement. HMD 6-200 can instruct user 705 to complete different movements and/or to perform specific facial expressions and to display enrollment interface 765 having a respective appearance for each of those instructed movements and/or facial expressions. For example, HMD 6-200 can instruct user 705 to turn their head to the right and display enrollment interface 765 having an appearance that is flipped horizontally (relative to that shown in FIGS. 7P-7R) such that flares 772 and color region 773 are positioned on the right side of enrollment interface 765 and indicators 771*a* and 771*b* face the right side of the interface. HMD 6-200 can move indicator 771*a* to the right towards indicator 771*b* as the user moves their head to the right.

As another example, HMD 6-200 can instruct user 705 to tilt their head upwards as part of the second phase of the enrollment process. In this example, HMD 6-200 can display indicators 771*a* and 771*b* facing up (with indicator 771*b* positioned above indicator 771*a*), with flares 772 positioned towards the left and right sides of enrollment interface 765. In some embodiments, enrollment interface 765 includes two sets of flares such that two flares are displayed on the left side of enrollment interface 765 (similar to that depicted in FIGS. 7P-7R) and two flares are displayed in a similar manner on the right side of the interface. In this example, HMD 6-200 can display two color regions that are positioned adjacent the flares and located in the top half of the enrollment interface 765. As the user tilts their head upwards, HMD 6-200 displays indicator 771*a* moving up towards indicator 771*b*.

As yet another example, HMD 6-200 can instruct user 705 to tilt their head downward as part of the second phase of the enrollment process. In this example, HMD 6-200 can display indicators 771*a* and 771*b* facing down (with indicator 771*b* positioned below indicator 771*a*), with flares 772 positioned towards the left and right sides of enrollment interface 765 (similar to the embodiment described above in which the user is instructed to look up). In this example, HMD 6-200 can display two color regions that are positioned adjacent the flares and located in the bottom half of the enrollment interface 765. As the user tilts their head down, HMD 6-200 displays indicator 771*a* moving down towards indicator 771*b*.

In some embodiments, HMD 6-200 can instruct user 705 to perform a specific facial expression as part of the second phase of the enrollment process. For example, the HMD can instruct the user to smile, open their mouth, stick out their tongue, make a sad face, make a surprised face, and the like. As part of the enrollment process, HMD 6-200 displays enrollment interface 765 having elements that move as the user achieves the instructed facial expression, providing feedback about the progress of the user achieving the facial expression, in a manner analogous to that described above with respect to FIGS. 7P-7R.

In some embodiments, after completion of the second phase of the enrollment process, HMD 6-200 displays an animation indicating that the enrollment process is complete. For example, a center wipe is displayed where the elements move outward and off screen. As another example, the elements are displayed collapsing towards a center region of enrollment interface 765 and disappearing. In some embodiments, HMD 6-200 displays a color wash (e.g., including colors 716 or 773).

Any of the features, components, and/or parts, including the arrangements and configurations thereof shown in FIGS. 1B-1P can be included, either alone or in any combination, in any of HMD 750, HMD 1-100, and/or HMD 6-200 depicted in FIGS. 7N1-7R. For example, in some embodiments, HMD 750 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display 751 includes any of the features, components, and/or parts of display unit 1-102, display unit 1-202, display unit 1-306, display unit 1-406, display generation component 120, display screens 1-122*a-b*, first and second rear-facing display screens 1-322*a* and 1-322*b*, display 11.3.2-104, first and second display assemblies 1-120*a* and 1-120*b*, display assembly 1-320, display assembly 1-421, first and second display sub-assemblies 1-420*a* and 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/ display region 6-334, either alone or in any combination. In some embodiments, HMD 750 includes a sensor (e.g., 752) that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD 750 includes one or more input devices, which include any of the features, components, and/or parts of any of first button 1-128, button 11.1.1-114, second button 1-132, and or dial or button 1-328, either alone or in any combination. In some embodiments, HMD 750 includes one or more audio output components (e.g., electronic component 1-112) for generating audio feedback (e.g., audio output), optionally generated based on detected events and/or user inputs detected by HMD 750.

Additional descriptions regarding FIGS. 7A-7R are provided below in reference to methods 800, 900, and 1000 described with respect to FIGS. 8A, 8B, and 9-10.

FIGS. 8A and 8B are a flow diagram of an exemplary method 800 for enrolling a biometric feature using a progress indicator, in some embodiments. In some embodiments, method 800 is performed at a computer system (e.g., computer system 101 in FIG. 1A, computer system 700 in FIGS. 7A-7M, HMD 750 in FIGS. 7N1 and 7O1, HMD 1-100 in FIGS. 7N2 and 7O2, and/or HMD 6-200 in FIGS. 7N3 and 7O3-7R) (e.g., a smartphone, a smartwatch, a tablet computer, a desktop computer, a laptop computer, and/or a head-mounted device (e.g., a head-mounted augmented reality and/or extended reality device)) that is in communication with (e.g., includes and/or is connected to) a set of one or more display generation components (e.g., display generation component 120 in FIGS. 1A, 3, and 4, display 701 in FIGS. 7A-7M, display 751 in FIGS. 7N1 and 7O1, display unit 1-102 in FIGS. 7N2 and 7O2, and/or display area 6-232 in FIGS. 7N3 and 7O3-7R) (e.g., a visual output device, a 3D display, a display having at least a portion that is transparent or translucent on which images can be projected (e.g., a see-through display), a display, a display controller, a monitor, a touch-sensitive display system, a display screen, a projector, a holographic display, a lenticular display (e.g., display assembly 3-100 and/or lenticular lens array 3-110) (e.g., a curved lenticular display), and/or a head-mounted display system), one or more cameras (e.g., 702, 752, and/or 6-118) (e.g., an infrared camera, a depth camera, and/or a visible light camera), and, optionally, one or more input devices (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

In some embodiments, the computer system (e.g., 101, 700, 750, 1-100, and/or 6-200) is in communication with one or more input devices (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, the computer system is a head-mounted device (e.g., 750, 1-100, and/or

6-200) and the display generation component (e.g., 751, 1-102, and/or 6-232) is configured to be viewed by the user (e.g., 705) when the head-mounted device is not placed on the head of the user and/or over the eyes of the user and/or the display generation component is not configured to be viewed by the user when the head-mounted device is placed on the head of the user and/or over the eyes of the user (e.g., the display generation component is not a primary display for displaying user interfaces of the computer system while the computer system is in use). In some embodiments, the user interfaces described herein are optionally displayed on a lenticular display (e.g., 751, 1-102, 6-232, 3-100, and/or 3-110) (optionally a curved lenticular display) where different sections of the lenticular display (e.g., 3-100 and/or 3-110) show different views of the user interface elements based on the perspective from which the user interface elements are being displayed. For example, as the viewpoint of the user changes relative to the lenticular display, different sections of the display will become visible and these different sections show the user different views of the user interface that have a different appearance that corresponds to the user's viewing angle. In some embodiments, this creates a three-dimensional effect as the user's viewing angle shifts (e.g., due to the display being moved and/or due to the user moving relative to the display).

During a biometric enrollment process (e.g., a process that includes capturing biometric data (e.g., image data, sensor data, and/or depth data) indicative of a size, shape, position, pose, color, depth, and/or other characteristic of one or more body parts and/or features of body parts of a user) that includes capturing (e.g., via the one or more cameras and/or other sensors) information (e.g., data and/or images) about a biometric feature (e.g., a face, eye, eyes, eye region, and/or head) of a person (e.g., a user of the computer system, such as a person that is holding, operating, logged into, and/or otherwise associated with the computer system), the computer system (e.g., 101, 700, 750, 1-100, and/or 6-200) displays (802) (e.g., via the one or more display generation components (e.g., 120, 701, 751, 1-102, and/or 6-232)) an enrollment user interface (e.g., 715, 755, and/or 765).

As a part of displaying the enrollment user interface (e.g., 715 and/or 755), the computer system (e.g., 101, 700, 750, 1-100, and/or 6-200) displays (e.g., concurrently) in the enrollment user interface: an enrollment progress indicator (e.g., 711, 712, 713, 716, 720, 721, 722, 726, 761, 762, and/or 763) (e.g., a graphical object, a set of graphical objects, a graphical effect, and/or an animation that changes appearance based on progress of the biometric enrollment process) that represents (e.g., a visual state (e.g., appearance, color, brightness, size, shape, and/or transparency) of the indicator is based on a state of progress of the biometric enrollment process) progress of the biometric enrollment process (e.g., based on a position of the biometric feature of the user relative to the one or more cameras); and a representation (e.g., 705b) of a view of the biometric feature (e.g., 705, 705-1) captured by the one or more cameras (e.g., 701, 751, and/or 6-118) (e.g., representing movement of the face of the user and/or facial expressions of the user). In some embodiments, the computer system updates an appearance of the enrollment progress indicator over time based on movement of the position of the biometric feature of the user relative to the one or more cameras of the computer system and/or as the enrollment process progresses over time. In some embodiments, the enrollment progress indicator provides feedback to a user of the computer system regarding the positioning of the user's face for completing the biometric enrollment process. In some embodiments, the feedback guides the user to position their face at a predefined position and/or alignment relative to the one or more cameras in order to successfully complete the biometric enrollment process. In some embodiments, the enrollment progress indicator includes a first set of one or more graphical elements (e.g., 720 and/or 721) that is reactive to an alignment of the user's face along a z-axis relative to the one or more cameras in order to guide the user to position their face at a predefined position along the z-axis in order to successfully complete at least a portion of the biometric enrollment process. In some embodiments, the enrollment progress indicator includes a second set of one or more graphical elements (e.g., 721) that is reactive to an alignment of the user's face along x-, y-, and/or z-axes relative to the one or more cameras in order to guide the user to position their face at a predefined position along the x-, y-, and/or z-axes in order to successfully complete at least a portion of the biometric enrollment process. In some embodiments, the representation of the view of the biometric feature captured by the one or more cameras is a modified video feed. In some embodiments, one or more portions of the enrollment progress indicator are reactive to lighting conditions of the view of the biometric feature captured by the one or more cameras.

While displaying the enrollment user interface (e.g., 715 and/or 755) with the representation (e.g., 705*b*) of the view of the biometric feature (e.g., 705-1) (e.g., a displayed state having an appearance that is based on a position, orientation, spacing, alignment, saturation, and/or color of the enrollment progress indicator), the computer system (e.g., 101, 700, 750, 1-100, and/or 6-200) detects (804) a change in enrollment progress (e.g., a change in progress of the biometric enrollment process). In response to detecting the change in enrollment progress, the computer system changes (806) an appearance of the enrollment user interface, including the following steps.

In accordance with a determination (808) that the enrollment progress is in a first state (e.g., an updated and/or changed state of the enrollment progress), the computer system (e.g., 101, 700, 750, 1-100, and/or 6-200) displays (810) the enrollment progress indicator (e.g., 711, 712, 713, 716, 720, 721, 722, 726, 761, 762, and/or 763) with a first appearance (e.g., as shown in FIG. 7F) (e.g., the enrollment progress indicator is displayed and/or updated to have a first position, orientation, spacing, alignment, saturation, and/or color); and displays (812) the representation (e.g., 705*b*) of the view of the biometric feature (e.g., 705-1) having a first visual effect (e.g., 724, 726, and/or 730) (e.g., filter and/or layer) that changes an appearance (e.g., color, saturation, and/or contrast) of visible portions of the representation of the view of the biometric feature, wherein the first visual effect is based on the first appearance of the progress indicator (e.g., the representation of the view of the biometric feature is displayed in a second displayed state having a first changed appearance such as a different color, different saturation, and/or different contrast).

In accordance with a determination (814) that the enrollment progress is in a second state (e.g., an updated and/or changed state of the enrollment progress) that is different from the first state: the computer system (e.g., 101, 700, 750, 1-100, and/or 6-200) displays (816) the enrollment progress indicator (e.g., 711, 712, 713, 716, 720, 721, 722, 726, 761, 762, and/or 763) with a second appearance (e.g., as shown in any of FIGS. 7G, 7H, 7I, and/or 7J) different from the first appearance (e.g., the enrollment progress indicator is displayed and/or updated to have a second position, orientation, spacing, alignment, saturation, and/or color that is different from the first position, orientation, spacing, alignment, saturation, and/or color); and displays (818) the representation (e.g., 705*b*) of the view of the biometric feature (e.g., 705-1) having a second visual effect (e.g., 724, 726, and/or 730) that changes an appearance of visible portions of the representation of the view of the biometric feature, wherein the second visual effect is based on the second appearance of the progress indicator (e.g., the representation of the view of the biometric feature is displayed in a third displayed state having a second changed appearance such as a different color, different saturation, and/or different contrast). Displaying the enrollment progress indicator with the first appearance and displaying the representation of the view of the biometric feature having the first visual effect based on the first appearance of the progress indicator when the enrollment progress is in the first state, and displaying the enrollment progress indicator with the second appearance and displaying the representation of the view of the biometric feature having the second visual effect based on the second appearance of the progress indicator when the enrollment progress is in the second state, provides improved feedback to a user of the computer system indicating a state of progress for the biometric enrollment process.

In some embodiments, the representation (e.g., 705*b*) of the view of the biometric feature (e.g., 705-1) captured by the one or more cameras (e.g., 702, 752, and/or 6-118) includes a color layer (e.g., 712, 716, 726, and/or 762) (e.g., a layer of the enrollment user interface that includes one or more layers) applied to the view of the biometric feature captured by the one or more cameras (e.g., the color layer is applied over the view of the face captured by the one or more cameras). Displaying the representation of the view of the biometric feature captured by the one or more cameras including a color layer applied to the view of the biometric feature provides improved feedback to a user of the computer system indicating that information about the biometric feature is being captured for the biometric enrollment process. In some embodiments, the color layer is animated over time (e.g., the color layer displayed over the view of the face changes over time such that the view of the face appears to have an animated color layer). Displaying the color layer animated over time provides improved feedback to a user of the computer system indicating that information about the biometric feature is being captured for the biometric enrollment process. In some embodiments, the animation of the color layer changes over time without regard to (e.g., independent of) progress of the biometric enrollment process. In some embodiments, the color layer includes a plurality of colors (e.g., 716*a*, 716*b*, 716*c*, 726*a*, and/or 726*b*) from a color palette (e.g., a predefined set of colors) that is associated with the enrollment progress indicator (e.g., 711, 712, 713, 716, 720, 721, 722, 726, 761, 762, and/or 763) (e.g., the enrollment progress indicator includes a set of colors that defines the color palette and the colors of the color layer are selected from the color palette). Displaying the color layer having a plurality of colors from a color palette that is associated with the enrollment progress indicator provides improved feedback to a user of the computer system indicating that information about the biometric feature is being captured for the biometric enrollment process and that the enrollment progress indicator is representing progress of enrollment of the biometric feature. In some embodiments, the colors in the color layer includes a subset of the color palette. In some embodiments, the colors in the color layer includes all colors of the color palette.

In some embodiments, the view (e.g., 705a) of the biometric feature (e.g., 705-1) is captured by the one or more cameras (e.g., 702, 752, and/or 6-118) having a first contrast (e.g., as shown in FIG. 7A); and the computer system (e.g., 101, 700, 750, 1-100, and/or 6-200) displays the representation (e.g., 705b) of the view of the biometric feature captured by the one or more cameras having a second contrast (e.g., 724) that is increased (or, in some embodiments, decreased) from the first contrast. Displaying the representation of the view of the biometric feature captured by the one or more cameras having an increased contrast provides improved feedback about the state of the enrollment progress by enhancing the displayed appearance of the representation of the view of the biometric feature so that the enrollment progress indicator is easier to discern in the displayed state. In some embodiments, the representation of the face is displayed with increased contrast.

In some embodiments, the view (e.g., 705a) of the biometric feature (e.g., 705-1) is captured by the one or more cameras (e.g., 702, 752, and/or 6-118) having a first saturation (e.g., as shown in FIG. 7A); and the computer system (e.g., 101, 700, 750, 1-100 and/or 6-200) displays the representation (e.g., 705b) of the view of the biometric feature captured by the one or more cameras having a second saturation (e.g., 724) that is reduced (or, in some embodiments, increased) from the first saturation. Displaying the representation of the view of the biometric feature captured by the one or more cameras having a reduced saturation provides improved feedback about the state of the enrollment progress by enhancing the displayed appearance of the representation of the view of the biometric feature so that the enrollment progress indicator is easier to discern in the displayed state. In some embodiments, the representation of the face is displayed with reduced natural saturation.

In some embodiments, the computer system (e.g., 101, 700, 750, 1-100, and/or 6-200) displays enrollment progress indicator (e.g., 711, 712, 713, 716, 721, 726, 761, 762, and/or 763) having an animated appearance that changes over time (e.g., one or more elements of the enrollment progress indicator have an animated effect such as a growing and shrinking animation and/or a pulsating animation). Displaying the enrollment progress indicator having an animated appearance that changes over time provides improved feedback to a user of the computer system indicating that information about the biometric feature is being captured for the biometric enrollment process. In some embodiments, the animated appearance changes over time without regard to (e.g., independent of) progress of the biometric enrollment process.

In some embodiments, the representation (e.g., 705b) of the view of the biometric feature (e.g., 705-1) captured by the one or more cameras (e.g., 702, 752, and/or 6-118) is a cropped view of the biometric feature (e.g., 705a) captured by the one or more cameras (e.g., an amount of the biometric feature is captured by the one or more cameras, and the representation of the view of the biometric feature is a cropped view of the amount of the biometric feature captured by the one or more cameras). Displaying a cropped view of the biometric feature captured by the one or more cameras provides improved feedback to a user of the computer system indicating portion(s) of the biometric feature for which information is being captured for the biometric enrollment process. In some embodiments, the cropped view of the biometric feature captured by the one or more cameras changes based on the displayed state of the enrollment progress indicator (e.g., 711, 712, 713, 716, 720, 721, 722, 726, 761, 762, and/or 763) (e.g., without changing the cropping of the biometric feature). For example, in some embodiments, the enrollment progress indicator changes appearance (e.g., size, position, orientation, color, saturation, and/or contrast) based on the state of the enrollment process. As the enrollment progress indicator changes, the amount of the representation of the view of the biometric feature that is displayed also changes based on being hidden or revealed by the changes to the appearance of the enrollment progress indicator. For example, as the enrollment progress indicator gets larger and/or moves over the representation of the view of the biometric feature captured by the one or more cameras, portions of the view of the biometric feature are hidden behind the enrollment progress indicator. Conversely, changes to the appearance of the enrollment progress indicator can reveal greater amounts of the representation of the view of the biometric feature, for example, as the enrollment progress indicator moves and/or shrinks in size. In some embodiments, the cropping of the biometric feature does not change while the biometric feature moves in the field of view of the one or more cameras. For example, as the biometric feature moves with respect to the one or more cameras, the cropping of the biometric feature remains stable as the cropped view of the biometric feature moves on the display generation component (in response to the movement of the biometric feature relative to the one or more cameras). In some embodiments, the cropped view of the biometric feature includes a feathered effect (e.g., 728) (e.g., a feathered effect applied to the outer edges of the cropped view). Displaying the cropped view of the biometric feature including a feathered effect provides improved feedback to a user of the computer system indicating portion(s) of the biometric feature for which information is not being captured for the biometric enrollment process. In some embodiments, a feathering effect includes fading (e.g., gradually fading and/or spatially fading) between colors of pixels and colors of surrounding pixels. In some embodiments, a feathering effect includes blending colors of pixels with colors of surrounding pixels. In some embodiments, a feathering effect includes changing a transparency and/or density over a distance (e.g., a range of pixels) at an edge (e.g., reducing the opacity and/or density at the edge in a direction away from an edge of the object or representation).

In some embodiments, the enrollment user interface (e.g., 715 and/or 755) is comprised of a plurality of layers (e.g., 711, 712, 713, 761, 762, and/or 763). In some embodiments, the enrollment progress indicator (e.g., 716, 720, 721, and/or 722) is displayed on a first layer (e.g., 711 and/or 761) (e.g., a top layer and/or a foreground layer) of the enrollment user interface. In some embodiments, the first layer is a middle layer (e.g., 712 and/or 762). In some embodiments, the representation (e.g., 705b) of the view of the biometric feature (e.g., 705-1) captured by the one or more cameras (e.g., 702, 752, and/or 6-118) is displayed on a second layer (e.g., 713 and/or 763) (e.g., a bottom layer, a background layer, and/or a layer that is positioned behind the first layer) of the enrollment user interface that is different from the first layer of the enrollment user interface (e.g., the portion of the video feed captured by the one or more cameras is displayed on a different layer than the enrollment progress indicator (e.g., a layer that is positioned behind the layer with the enrollment progress indicator and, in some embodiments, separated by one or more intermediate layers)). In some embodiments, displaying the enrollment user interface includes displaying the representation of the view of the biometric feature captured by the one or more cameras moving on the second layer and independent of the progress indicator displayed on the first layer (e.g., as shown in FIG.

7F and/or FIG. 7I) (e.g., movement of the progress indicator on the first layer does not affect movement of the representation of the view of the biometric feature on the second layer, and vice versa). Displaying the representation of the view of the biometric feature captured by the one or more cameras moving on the second layer and independent of the progress indicator displayed on the first layer provides a three-dimensional effect, which makes the enrollment process a more varied, detailed, and/or realistic user experience. In some embodiments, the view of the biometric feature is displayed on a different layer of the enrollment user interface than the progress indicator and moves separately from the progress indicator. In some embodiments, the positioning of the enrollment progress indicator on the first layer affects visibility of the representation of the view of the biometric feature displayed on the second layer. In some embodiments, the computer system simulates a parallax effect using the plurality of layers of the enrollment user interface so that the layers (e.g., and the user interface elements displayed on the respective layers) appear to shift relative to each other as the viewpoint of the user shifts relative to the display generation component and/or as the device is moved (e.g., tilted and/or shifted to the left, right, up and/or down).

In some embodiments, as a part of displaying the representation (e.g., 705b) of the view of the biometric feature (e.g., the user's head and/or face) captured by the one or more cameras (e.g., 702, 752, and/or 6-118), the computer system (e.g., 101, 700, 750, 1-100, and/or 6-200) performs the following steps. In accordance with a determination that a portion of the view of the biometric feature captured by the one or more cameras is within a target region (e.g., 705-1) of the biometric feature (e.g., a center portion of the biometric feature, a facial region, a center portion of the user's face, the user's eye, and/or a region around the user's eye or eyes), the computer system displays a representation (e.g., 705-1b) of the portion of the view of the biometric feature with a first appearance (e.g., as shown in FIG. 7D) (e.g., an appearance that is not deemphasized). In accordance with a determination that the portion of the view of the biometric feature captured by the one or more cameras is not within the target region of the biometric feature (e.g., portions of the user's head that are outside of region 705-1), the computer system displays the representation of the portion of the view of the biometric feature with a second appearance (e.g., 728) that is visually deemphasized relative to the first appearance (e.g., a deemphasized appearance compared to the first appearance such as having a feathered, blurred, hatched, obscured, faded, and/or otherwise deemphasizing visual effect). Displaying the representation of the portion of the view of the biometric feature with a first appearance when the portion is within the target region of the biometric feature, and displaying the representation of the portion of the view of the biometric feature with the second appearance when the portion is not within the target region of the biometric feature, provides improved feedback to a user of the computer system by indicating the portions of the biometric feature that are important for the biometric enrollment process. In some embodiments, the computer system concurrently displays a representation of a first portion of the video feed (e.g., the portion of the video feed that is within the target region of the biometric feature) with the first appearance and displays a second (e.g., different) portion of the video feed (e.g., the portion of the video feed that is not within the target region of the biometric feature) with the second appearance. Additional details regarding the display of the different portions of the video feed with different (e.g., emphasized/deemphasized) appearances are described with respect to method 900 and the corresponding figures. For the sake of brevity, details are not repeated.

In some embodiments, while displaying the enrollment user interface (e.g., 715 and/or 755) with the representation (e.g., 705b) of the view of the biometric feature and the enrollment progress indicator (e.g., 711, 712, 713, 716, 720, 721, 722, 726, 761, 762, and/or 763), the computer system (e.g., 101, 700, 750, 1-100, and/or 6-200) detects satisfaction of a set of alignment criteria that is based on alignment of the biometric feature (e.g., 705 and/or 705-1) relative to the one or more cameras (e.g., 702, 752, and/or 6-118). In some embodiments, the set of alignment criteria is met when the biometric feature has a predefined position (e.g., along an x-axis, y-axis, and/or z-axis) relative to the one or more cameras for at least a threshold amount of time. In response to detecting satisfaction of the set of alignment criteria, the computer system changes an appearance of the enrollment user interface, including: displaying the representation of the view of the biometric feature changing (e.g., from a first set of one or more colors) to a respective set of colors (e.g., 732, 734, and/or 736) (e.g., a set of one or more colors that is not included in the first set of one or more colors, a set of complimentary colors, colors in a particular range of colors, and/or a color palette for the enrollment progress indicator); and displaying the enrollment progress indicator changing (e.g., from the first set of one or more colors) to the respective set of colors (e.g., 732, 734, and/or 736). Displaying the representation of the view of the biometric feature and the enrollment progress indicator changing to the respective set of colors provides improved feedback about a state of the enrollment process to indicate that the alignment criteria has been satisfied for the biometric enrollment process. In some embodiments, the representation of the view of the biometric feature and the enrollment progress indicator are displayed having the respective color when the enrollment progress is in the second state (e.g., the second appearance of the enrollment progress indicator includes the respective color and the second visual effect that changes an appearance of visible portions of the representation of the view of the biometric feature includes the respective color).

In some embodiments, the biometric enrollment process is a facial enrollment process (e.g., a process for enrolling a face of a person). In some embodiments, the face is enrolled to generate an avatar that represents the person (e.g., 705) in an environment (e.g., an extended reality environment). In some embodiments, the face (e.g., 705-1) is enrolled for biometric authentication of a user of the computer system. For example, information about the face can be used to create authentication data that is used to identify the user, create a user profile, and/or grant permissions to the user such as permission to access the computer system, applications operating on the computer system, and/or a user account.

In some embodiments, the computer system (e.g., 101, 700, 750, 1-100, and/or 6-200) generates a representation of the person (e.g., 705) based on the captured information about the biometric feature (e.g., 705-1) of the person (e.g., the computer system uses the captured information about the biometric feature of the person to generate a representation (e.g., an avatar) of the person, where the representation includes a representation of a face that includes similar facial features to the facial features of the person). The representation of the person being based on the captured information about the biometric feature of the person enables the representation of the person to appear more lifelike and/or to more closely resemble the person, thereby providing a more varied, detailed, and/or realistic user experience. In some embodiments, the computer system is configured to use the information about the biometric feature of the person to generate the representation (e.g., a (2D or 3D) virtual representation, a (2D or 3D) avatar) of the person (e.g., the computer system generates a representation (e.g., an avatar) of the person that is based on the biometric feature and, optionally, other characteristics of the person, such that the representation of the person includes visual indications based on (e.g., with similar) sizes, shapes, positions, poses, colors, depths, and/or other characteristics of a body, hair, clothing, and/or other features of the person). In some embodiments, the computer system provides (e.g., outputs audio and/or displays a user interface of) a real-time (e.g., live) communication session. In some embodiments, the representation of the person is displayed and/or otherwise used to communicate during the real-time communication session. In some embodiments, a real-time communication session includes real-time communication between participants of the real-time communication session, such as a user of the computer system and one or more other persons (e.g., one or more other users associated with other (e.g., different) computer systems). In some embodiments, providing the real-time communication session includes displaying representations of the person's body (e.g., facial expression, body expression, body position, and/or body movement) via the representation of the person. In some embodiments, providing the real-time communication session includes displaying the representation of the person and/or outputting audio corresponding to utterances of the person in real time. In some embodiments, the representation of the user of the computer system is displayed to other participants via remote computer systems that are associated with those participants, while corresponding representations of the other participants are displayed to the user of the computer system via the computer system associated with the user. In some embodiments, the user can see their own representation as a "self-view" or in a representation editing user interface that includes one or more selectable or controllable options for editing the representation. In some embodiments, the computer system and one or more other (e.g., remote) computer systems are in communication (e.g., wireless communication) with one another to enable transmission of information indicative of the representation of the person and/or audio corresponding to utterances of the person between the computer system and the one or more other computer systems. In some embodiments, a real-time communication session includes an XR experience (e.g., an XR environment). In some embodiments, the real-time communication session includes displaying the representation of the person (and, optionally, a representation of a second person) in an XR environment via display generation components of the computer system and the one or more other computer systems in communication via the real-time communication session.

In some embodiments, aspects/operations of methods 800, 900, 1000, and 1200 may be interchanged, substituted, and/or added between these methods. For example, the enrollment progress indicator discussed with respect to method 800 is optionally used for the enrollment user interfaces discussed with respect to methods 900, 1000, and/or 1200. For brevity, these details are not repeated here.

FIG. 9 is a flow diagram of an exemplary method 900 for enrolling a biometric feature using a cropped video feed, in some embodiments. In some embodiments, method 900 is performed at a computer system (e.g., computer system 101 in FIG. 1A, computer system 700 in FIGS. 7A-7M, HMD 750 in FIGS. 7N1 and 7O1, HMD 1-100 in FIGS. 7N2 and 7O2, and/or HMD 6-200 in FIGS. 7N3 and 7O3-7R) (e.g., a smartphone, a smartwatch, a tablet computer, a desktop computer, a laptop computer, and/or a head-mounted device (e.g., a head-mounted augmented reality and/or extended reality device)) that is in communication with (e.g., includes and/or is connected to) a set of one or more display generation components (e.g., display generation component 120 in FIGS. 1A, 3, and 4; display 701 in FIGS. 7A-7M; display 751 in FIGS. 7N1 and 7O1; display unit 1-102 in FIGS. 7N2 and 7O2; and/or display area 6-232 in FIGS. 7N3 and 7O3-7R) (e.g., a visual output device, a 3D display, a display having at least a portion that is transparent or translucent on which images can be projected (e.g., a see-through display), a display, a display controller, a monitor, a touch-sensitive display system, a display screen, a projector, a holographic display, a lenticular display (e.g., display assembly 3-100 and/or lenticular lens array 3-110) (e.g., a curved lenticular display), and/or a head-mounted display system), one or more cameras (e.g., 702, 752, 6-118, and/or 6-203) (e.g., an infrared camera, a depth camera, and/or a visible light camera), and, optionally, one or more input devices (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

In some embodiments, the computer system (e.g., 101, 700, 750, 1-100, and/or 6-200) is in communication with one or more input devices (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, the computer system is a head-mounted device (e.g., 750, 1-100, and/or 6-200) and the display generation component (e.g., 751, 1-102, and/or 6-232) is configured to be viewed by the user (e.g., 705) when the head-mounted device is not placed on the head of the user and/or over the eyes of the user and/or the display generation component is not configured to be viewed by the user when the head-mounted device is placed on the head of the user and/or over the eyes of the user (e.g., the display generation component is not a primary display for displaying user interfaces of the computer system while the computer system is in use). In some embodiments, the user interfaces described herein are optionally displayed on a lenticular display (e.g., 751, 1-102, 6-232, 3-100, and/or 3-110) (optionally a curved lenticular display) where different sections of the lenticular display show different views of the user interface elements based on the perspective from which the user interface elements are being displayed. For example, as the viewpoint of the user changes relative to the lenticular display (e.g., 3-100 and/or 3-110), different sections of the display will become visible, and these different sections show the user different views of the user interface that have a different appearance that corresponds to the user's viewing angle. In some embodiments, this creates a three-dimensional effect as the user's viewing angle shifts (e.g., due to the display being moved and/or due to the user moving relative to the display).

During a biometric enrollment process (e.g., a process that includes capturing biometric data (e.g., image data, sensor data, and/or depth data) indicative of a size, shape, position, pose, color, depth, and/or other characteristic of one or more body parts and/or features of body parts of a user) that includes capturing (e.g., via the one or more cameras and/or other sensors) information (e.g., data and/or images) about a biometric feature (e.g., a face, head, eye, eyes, and/or eye region) of a person (e.g., 705) (e.g., a user of the computer system, such as a person that is holding, operating, logged into, and/or otherwise associated with the computer system), the computer system (e.g., 101, 700, 750, 1-100, and/or 6-200) displays (902) (e.g., via the one or more display generation components (e.g., 701, 751, 1-102, and/or 6-232)) (e.g., as a part of a biometric enrollment user interface (e.g., 715, 755, and/or 765)) a portion (e.g., 705*b* and/or 705-1*b*) of a video feed (e.g., 706) of the biometric feature (or, in some embodiments, the computer system displays a representation (e.g., 705-1*b*) of a portion of a video feed of the biometric feature) (e.g., displaying only a portion of the video feed of the representation of the biometric feature, displaying less than an entirety of the video feed of the representation of the biometric feature, and/or displaying a first portion of the video feed of the representation of the biometric feature without displaying a second (e.g., different) portion of the video feed of the representation of the biometric feature). In some embodiments, the computer system captures a video feed of the biometric feature and displays a representation of only a portion of the biometric feature.

As a part of displaying the portion (e.g., 705*b* and/or 705-1*b*) of the video feed (e.g., 706) of the biometric feature, the computer system (e.g., 101, 700, 750, 1-100, and/or 6-200) performs the following steps. In accordance with a determination that a portion of the video feed is within a target region (e.g., 705-1) of the biometric feature (e.g., a center portion of the biometric feature, a facial region, a center portion of the user's face, the user's eye, and/or a region around the user's eye or eyes), the computer system displays (904) a representation (e.g., 705-1*b*) of the portion of the video feed with a first appearance (e.g., an appearance that is not deemphasized). In accordance with a determination that the portion of the video feed is not within the target region of the biometric feature, the computer system displays (906) the representation (e.g., 705*b*) of the portion of the video feed with a second appearance (e.g., 728) that is visually deemphasized relative to the first appearance (e.g., a deemphasized appearance compared to the first appearance such as having a blurred, hatched, obscured, faded, feathered, and/or otherwise deemphasizing visual effect). Displaying the representation of the portion of the video feed with a first appearance when the portion of the video feed is within a target region of the biometric feature, and displaying the representation of the portion of the video feed with the second appearance that is visually deemphasized relative to the first appearance when the portion of the video feed is not within the target region of the biometric feature, provides improved feedback to a user of the computer system indicating portion(s) of the biometric feature for which information is not being captured for the biometric enrollment process and portion(s) for which information is being captured for the biometric enrollment process. In some embodiments, the computer system concurrently displays a representation of a first portion of the video feed (e.g., the portion of the video feed that is within the target region of the biometric feature) with the first appearance and displays a second (e.g., different) portion of the video feed (e.g., the portion of the video feed that is not within the target region of the biometric feature) with the second appearance.

In some embodiments, the target region of the biometric feature is a facial region (e.g., 705-1) of the person (e.g., 705) (e.g., a face of the person). In some embodiments, the displayed portion (e.g., 705*b*) of the video feed (e.g., 706) of the biometric feature includes a face (e.g., 705-1*b*) of the person displayed having the first appearance (e.g., an appearance that is not deemphasized) and non-facial regions (e.g., portions of the video feed of the biometric feature that are outside of the facial region) of the person displayed having the second appearance that is visually deemphasized relative to the appearance of the face. In some embodiments, the target region of the biometric feature is an eye region of the person (e.g., a region that is centered on and/or prominently features one eye or both eyes). In some embodiments, the displayed portion of the video feed of the biometric feature includes an eye region that encompasses one or both eyes of the person displayed having the first appearance (e.g., an appearance that is not deemphasized) and non-eye regions (e.g., portions of the video feed of the biometric feature that are outside of the eye region) of the person displayed having the second appearance that is visually deemphasized relative to the appearance of the eye region.

In some embodiments, as a part of displaying the portion (e.g., 705*b*) of the video feed of the biometric feature, the computer system (e.g., 101, 700, 750, 1-100, and/or 6-200) performs the following steps. In accordance with a determination that a portion of the biometric feature is within a predefined region (e.g., 725) of the video feed (e.g., a center region and/or a target region of the video feed), the computer system displays a representation (e.g., 705*b* and/or 705-1*b*) of the portion of the biometric feature with a first appearance for the portion of the biometric feature (e.g., as shown in FIG. 7G) (e.g., an appearance that is not blurred or deemphasized based on the positioning of the biometric feature relative to the predefined region). In accordance with a determination that the portion of the biometric feature is not within the predefined region of the video feed, the computer system displays the representation (e.g., 705*b* and/or 705-1*b*) of the portion of the biometric feature with a second appearance (e.g., 730) for the portion of the biometric feature that is visually deemphasized relative to the first appearance for the portion of the biometric feature (e.g., an appearance that is blurred or deemphasized when the portion of the biometric feature is not within the predefined region). Displaying the representation of the portion of the biometric feature having the first appearance for the portion of the biometric feature or the second appearance for the portion of the biometric feature that is visually deemphasized relative to the first appearance for the portion of the biometric feature based on whether the portion of the biometric feature is within the predefined region provides improved feedback to a user of the computer system indicating portion(s) of the biometric feature for which information is not being captured for the biometric enrollment process and assists with guiding the user to properly position the biometric feature for successfully completing the biometric enrollment process. In some embodiments, the representation of the portion of the biometric feature is displayed having the second appearance by displaying a blurring or other deemphasizing effect on a layer (e.g., 712) of a biometric enrollment interface (e.g., 715) that is different from a layer (e.g., 713) that includes the portion of the biometric feature.

In some embodiments, as a part of displaying the portion (e.g., 705*b*) of the video feed (e.g., 706) of the biometric feature, the computer system (e.g., 101, 700, 750, 1-100, and/or 6-200) displays a graphical element (e.g., 722) (e.g., a ring, circle, and/or other visual indication) indicating a target region (e.g., 725) that corresponds to a position of the biometric feature (e.g., 705 and/or 705-1) relative to the one or more cameras (e.g., 702, 752, and/or 6-118) for capturing information about the biometric feature for the biometric enrollment process. Displaying a graphical element indicating the target region that corresponds to a position of the biometric feature relative to the one or more cameras for capturing information about the biometric feature for the biometric enrollment process assists with guiding the user to properly position the biometric feature for successfully completing the biometric enrollment process. In some embodiments, the graphical element is displayed on a layer of a biometric enrollment interface that is different from a layer that includes the portion of the video feed of the biometric feature.

In some embodiments, the video feed (e.g., 706) of the biometric feature includes a background portion (e.g., 707*a*) that is distinct from (e.g., does not include and/or is separate from) the biometric feature (e.g., 705-1) (e.g., the biometric feature is included in a foreground portion of the video feed). In some embodiments, as a part of displaying the portion (e.g., 705*b*) of the video feed of the biometric feature, the computer system (101, 700, 750, 1-100, and/or 6-200) displays a representation (e.g., 705*b* and/or 705-1*b*) of the biometric feature without the background portion (e.g., the background portion is cropped from the video feed of the biometric feature). Displaying a representation of the biometric feature without the background portion provides improved feedback to a user of the computer system indicating portion(s) of the biometric feature for which information is being captured for the biometric enrollment process. In some embodiments, displaying the representation of the biometric feature without the background portion includes removing (e.g., omitting and/or cropping) a portion of the video feed (e.g., 706) that includes a respective portion of the biometric feature (e.g., neck region and/or a shoulder region) from the representation of the biometric feature (e.g., portions of the video feed that include the respective portions of the biometric feature are removed from the representation of the biometric feature that is displayed for the biometric enrollment process). Removing a portion of the video feed that includes the respective portion of the biometric feature from the displayed representation of the biometric feature provides improved feedback to a user of the computer system indicating portion(s) of the biometric feature for which information is being captured for the biometric enrollment process. In some embodiments, displaying the representation (e.g., 705*b* and/or 705-1*b*) of the biometric feature without the background portion includes displaying a feathered effect (e.g., 728) applied at a perimeter of the representation of the biometric feature (e.g., at the outer edges of the cropped view of the biometric feature). Displaying the feathered effect provides improved feedback to a user of the computer system indicating portion(s) of the biometric feature for which information is not being captured for the biometric enrollment process. In some embodiments, a feathered effect includes fading (e.g., gradually fading and/or spatially fading) between colors of pixels and colors of surrounding pixels. In some embodiments, a feathered effect includes blending colors of pixels with colors of surrounding pixels. In some embodiments, a feathered effect includes changing a transparency and/or density over a distance (e.g., a range of pixels) at an edge (e.g., reducing the opacity and/or density at the edge in a direction away from an edge of the object or representation).

In some embodiments, while displaying the portion (e.g., 705*b*) of the video feed of the biometric feature having a respective size (e.g., as shown in FIG. 7H), the computer system (e.g., 101, 700, 750, 1-100, and/or 6-200) detects a change in distance of the biometric feature (e.g., 705 and/or 705-1) relative to the one or more cameras (e.g., 702, 752, and/or 6-118) (e.g., the face becomes larger as it moves closer to the one or more cameras, the face becomes smaller as it moves farther away from the one or more cameras, and/or the video feed is resized causing the face to become larger or smaller in the view feed). In response to detecting the change in distance of the biometric feature relative to the one or more cameras, the computer system updates the biometric feature (e.g., 705*b*). In accordance with a determination that the change in distance of the biometric feature relative to the one or more cameras is a decrease in the distance (e.g., the face has moved closer to the one or more cameras and/or the video feed is resized such that the face is larger), the computer system increases the respective size of the biometric feature (e.g., as shown in FIG. 7I) (e.g., the displayed video feed of the face gets bigger as the face gets closer to the one or more cameras and/or as the video feed is resized to make the face larger). In accordance with a determination that the change in distance of the biometric feature relative to the one or more cameras is an increase in the distance (e.g., the face has moved farther away from the one or more cameras and/or the video feed is resized such that the face is smaller), the computer system decreases the respective size of the biometric feature (e.g., as shown in FIG. 7G) (e.g., the displayed video feed of the face gets smaller as the face gets farther from the one or more cameras and/or as the video feed is resized to make the face smaller). Increasing the respective size of the biometric feature when the change in distance of the biometric feature relative to the one or more cameras is a decrease in the distance, and decreasing the respective size of the biometric feature when the change in distance is an increase in the distance, provides improved feedback to a user of the computer system about a position of the face of the user for completing the biometric enrollment process. In some embodiments, as the face changes in size, the cropping of the video feed changes to maintain a consistent crop relative to the face in the field of view of the one or more cameras. For example, as the face moves farther away (becoming smaller in the video feed), a greater amount of the video feed is cropped in order to maintain a consistent amount of cropping for the face in the video feed. Conversely, as the face moves closer to the one or more cameras (becoming larger in the video feed), less of the video feed is cropped out in order to maintain a consistent amount of cropping for the face.

In some embodiments, the one or more cameras (e.g., 702, 752, and/or 6-118) has a first position that is offset relative to the set of one or more display generation components (e.g., 701, 751, 1-102, and/or 6-232) (e.g., the camera has a position offset from the display (e.g., offset from a center region of the display)). As a part of displaying the portion (e.g., 705*b*) of the video feed of the biometric feature, the computer system (e.g., 101, 700, 750, 1-100, and/or 6-200) displays the portion of the video feed of the biometric feature having a second position (e.g., different from the first position) that is centered (e.g., via an asymmetric crop of the video feed and/or perspective correction to make the face appear to be in the center of the field of view of the one or more cameras) relative to the set of one or more display generation components (e.g., as shown in FIG. 7D) (e.g., the video feed of the biometric feature is displayed at a center region of the display). Displaying the portion of the video feed of the biometric feature having the second position that is centered relative to the set of one or more display generation components when the one or more cameras has a first position that is offset relative to the set of one or more display generation components enables the positioning of the one or more cameras at a location away from the display generation components (thereby conserving and/or effectively utilizing real estate on the computer system by reducing the need to add an additional camera and making camera placement more flexible so that other sensors or components can be positioned in the center of the computer system) while still utilizing the display generation components in a manner that makes the computer system easy to use by centering the video feed in the display while enrolling the biometric feature, thereby reducing excessive inputs at the computer system and conserving battery life. In some embodiments, as a part of displaying the portion of the video feed of the biometric feature having the second position that is centered relative to the set of one or more display generation components, the computer system processes (e.g., applying a crop, distortion correction, and/or translation of the video feed) the video feed (e.g., 706) captured using the one or more cameras that has the first position that is offset relative to the set of one or more display generation components to shift a displayed location of the representation (e.g., 705*b*) of the biometric feature to the second position that is centered relative to the set of one or more display generation components. Processing the video feed captured using the one or more cameras that has the first position that is offset relative to the set of one or more display generation components to shift a displayed location of the representation of the biometric feature to the second position that is centered relative to the set of one or more display generation components enables the positioning of the one or more cameras at a location away from the display generation components (thereby conserving and/or effectively utilizing real estate on the computer system) while still utilizing the display generation components in a manner that makes the computer system easy to use by centering the video feed in the display while enrolling the biometric feature, thereby reducing excessive inputs at the computer system and conserving battery life.

In some embodiments, information about the biometric feature (e.g., 705 and/or 705-1) of the person is captured using a biometric detection process (e.g., a facial detection process and/or a process for detecting, locating, and/or identifying a face, eye, and/or eye region of the person) to identify the biometric feature. In some embodiments, the biometric detection process includes using machine vision to identify facial features. In some embodiments, information about the biometric feature of the person is captured using a depth map (e.g., depth data) to identify the biometric feature. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's z-axis where its corresponding two-dimensional pixel is located. In some examples, a depth map is composed of pixels wherein each pixel is defined by a value (e.g., 0-255). For example, the "0" value represents pixels that are located at the most distant place in a "three-dimensional" scene, and the "255" value represents pixels that are located closest to a viewpoint (e.g., camera) in the "three-dimensional" scene. In other examples, a depth map represents the distance between an object in a scene and the plane of the viewpoint. In some embodiments, the depth map includes information about the relative depth of various features of an object of interest in view of the depth camera (e.g., the relative depth of a face, eyes, nose, and/or mouth of a user). In some embodiments, the depth map includes information that enables the computer system to determine contours of the object of interest in a z-direction. In some embodiments, the biometric enrollment process is a facial enrollment process (e.g., a process for enrolling a face of a person). In some embodiments, the face is enrolled to generate an avatar that represents the person in an environment (e.g., an extended reality environment).

In some embodiments, the computer system (e.g., 101, 700, 750, 1-100, and/or 6-200) generates a representation of the person (e.g., 705) based on the captured information about the biometric feature of the person (e.g., the computer system uses the captured information about the biometric feature of the person to generate a representation (e.g., an avatar) of the person, where the representation includes a representation of a face that includes similar facial features to the facial features of the person). The representation of the person being based on the captured information about the biometric feature of the person enables the representation of the person to appear more lifelike and/or to more closely resemble the person, thereby providing a more varied, detailed, and/or realistic user experience. In some embodiments, the computer system is configured to use the information about the biometric feature of the person to generate the representation (e.g., a (2D or 3D) virtual representation, an (2D or 3D) avatar) of the person (e.g., the computer system generates a representation (e.g., an avatar) of the person that is based on the biometric feature and, optionally, other characteristics of the person, such that the representation of the person includes visual indications based on (e.g., with similar) sizes, shapes, positions, poses, colors, depths, and/or other characteristics of a body, hair, clothing, and/or other features of the person). In some embodiments, the computer system provides (e.g., outputs audio and/or displays a user interface of) a real-time (e.g., live) communication session and the representation of the person is displayed and/or otherwise used to communicate during the real-time communication session, as discussed above with respect to method 800.

In some embodiments, displaying the portion of the video feed of the biometric feature includes: in accordance with a determination that the biometric feature (e.g., 705 and/or 705-1) (or a portion of the biometric feature) is positioned less than a threshold distance (e.g., 2 feet, 1.5 feet, 1 foot, or 6 inches) from the one or more cameras (e.g., 702, 752, 6-118, and/or 6-203) (e.g., along a z-axis), displaying the portion of the video feed of the biometric feature (e.g., 705*b*) (or portion of the biometric feature) having a deemphasizing visual effect (e.g., 733*a* and/or 733*b*) (e.g., having a blurred, hatched, obscured, faded, feathered, and/or otherwise deemphasizing visual effect), and in accordance with a determination that the biometric feature is not positioned less than the threshold distance from the one or more cameras, forgoing displaying the portion of the video feed of the biometric feature having the deemphasizing visual effect (e.g., displaying the portion of the video feed of the biometric feature without the deemphasizing visual effect or forgoing displaying the portion of the video feed of the biometric feature (e.g., if the biometric feature is positioned too far away from the one or more cameras or is positioned outside the field of view of the one or more cameras)).

Displaying the portion of the video feed of the biometric feature having a deemphasizing visual effect when the biometric feature is positioned less than a threshold distance from the one or more cameras, and forgoing displaying the portion of the video feed of the biometric feature having the deemphasizing visual effect when the biometric feature is not positioned less than the threshold distance from the one or more cameras provides improved feedback to a user of the computer system by indicating portion(s) of the biometric feature for which information is not being captured for the biometric enrollment process and portion(s) for which information is being captured for the biometric enrollment process, and provides guidance instructing the user to properly align the biometric feature relative to the one or more cameras.

In some embodiments, displaying the portion of the video feed of the biometric feature includes: in accordance with a determination that the biometric feature (e.g., 705 and/or 705-1) (or a portion of the biometric feature) is positioned greater than a threshold distance (e.g., 2 feet, 2.5 feet, 3 feet, or 4 feet) from the one or more cameras (e.g., 702, 752, 6-118, and/or 6-203) (e.g., along a z-axis), displaying the portion of the video feed of the biometric feature (e.g., 705*b*) (or portion of the biometric feature) having a deemphasizing visual effect (e.g., 733*a* and/or 733*b*) (e.g., having a blurred, hatched, obscured, faded, feathered, and/or otherwise deemphasizing visual effect), and in accordance with a determination that the biometric feature is not positioned greater than the threshold distance from the one or more cameras, forgoing displaying the portion of the video feed of the biometric feature having the deemphasizing visual effect (e.g., displaying the portion of the video feed of the biometric feature without the deemphasizing visual effect or forgoing displaying the portion of the video feed of the biometric feature (e.g., if the biometric feature is positioned outside the field of view of the one or more cameras)). Displaying the portion of the video feed of the biometric feature having a deemphasizing visual effect when the biometric feature is positioned greater than a threshold distance from the one or more cameras, and forgoing displaying the portion of the video feed of the biometric feature having the deemphasizing visual effect when the biometric feature is not positioned greater than the threshold distance from the one or more cameras provides improved feedback to a user of the computer system by indicating portion(s) of the biometric feature for which information is not being captured for the biometric enrollment process and portion(s) for which information is being captured for the biometric enrollment process, and provides guidance instructing the user to properly align the biometric feature relative to the one or more cameras.

In some embodiments, displaying the portion of the video feed of the biometric feature includes: in accordance with a determination that the biometric feature (e.g., 705 and/or 705-1) (or a portion of the biometric feature) is positioned greater than a lateral threshold distance relative to the one or more cameras (e.g., 702, 752, 6-118, and/or 6-203) (e.g., laterally displaced from the one or more cameras (e.g., along an x-axis and/or y-axis) by greater than a threshold distance such as, for example, 3 inches, 6 inches, 1 foot, 1.5 feet, or 2 feet), displaying the portion of the video feed of the biometric feature (e.g., 705*b*) (or portion of the biometric feature) having a deemphasizing visual effect (e.g., 733*a* and/or 733*b*) (e.g., having a blurred, hatched, obscured, faded, feathered, and/or otherwise deemphasizing visual effect), and in accordance with a determination that the biometric feature is not positioned greater than the lateral threshold distance relative to the one or more cameras, forgoing displaying the portion of the video feed of the biometric feature having the deemphasizing visual effect (e.g., displaying the portion of the video feed of the biometric feature without the deemphasizing visual effect or forgoing displaying the portion of the video feed of the biometric feature (e.g., if the biometric feature is positioned outside the field of view of the one or more cameras)). Displaying the portion of the video feed of the biometric feature having a deemphasizing visual effect when the biometric feature is positioned greater than a lateral threshold distance relative to the one or more cameras, and forgoing displaying the portion of the video feed of the biometric feature having the deemphasizing visual effect when the biometric feature is not positioned greater than the lateral threshold distance relative to the one or more cameras provides improved feedback to a user of the computer system by indicating portion(s) of the biometric feature for which information is not being captured for the biometric enrollment process and portion(s) for which information is being captured for the biometric enrollment process, and provides guidance instructing the user to properly align the biometric feature relative to the one or more cameras.

In some embodiments, displaying the portion of the video feed of the biometric feature includes: in accordance with a determination that the biometric feature (e.g., 705 and/or 705-1) (or a portion of the biometric feature) is rotated (e.g., rotated, tilted, and/or turned) greater than a threshold amount relative to the one or more cameras (e.g., 702, 752, 6-118, and/or 6-203) (e.g., tilted up, tilted down, rotated or turned to the left, and/or rotated or turned to the right relative to an axis normal to the one or more cameras by greater than a threshold amount such as, for example, 30 degrees, 45 degrees, 60 degrees, or 90 degrees), displaying the portion of the video feed of the biometric feature (e.g., 705*b*) (or portion of the biometric feature) having a deemphasizing visual effect (e.g., 733*a* and/or 733*b*) (e.g., having a blurred, hatched, obscured, faded, feathered, and/or otherwise deemphasizing visual effect), and in accordance with a determination that the biometric feature is not rotated greater than the threshold amount relative to the one or more cameras, forgoing displaying the portion of the video feed of the biometric feature having the deemphasizing visual effect (e.g., displaying the portion of the video feed of the biometric feature without the deemphasizing visual effect or forgoing displaying the portion of the video feed of the biometric feature (e.g., if the biometric feature is positioned outside the field of view of the one or more cameras)). Displaying the portion of the video feed of the biometric feature having a deemphasizing visual effect when the biometric feature is rotated greater than a threshold amount relative to the one or more cameras, and forgoing displaying the portion of the video feed of the biometric feature having the deemphasizing visual effect when the biometric feature is not rotated greater than the threshold amount relative to the one or more cameras provides improved feedback to a user of the computer system by indicating portion(s) of the biometric feature for which information is not being captured for the biometric enrollment process and portion(s) for which information is being captured for the biometric enrollment process, and provides guidance instructing the user to properly align the biometric feature relative to the one or more cameras.

In some embodiments, displaying the portion of the video feed of the biometric feature includes deemphasizing (e.g., having a blurred, hatched, obscured, faded, feathered, and/or otherwise deemphasizing visual effect) the displayed portion of the video feed of the biometric feature (e.g., 705*b*) (e.g., deemphasizing an entirety of the displayed portion of the video feed of the biometric feature or deemphasizing at least a portion of the displayed portion of the video feed of the biometric feature) based on alignment of the biometric feature (e.g., 705 and/or 705-1) relative to the one or more cameras (e.g., 702, 752, 6-118, and/or 6-203) (e.g., the deemphasized appearance changes based on the alignment of the biometric feature relative to the one or more cameras). Deemphasizing the displayed portion of the video feed of the biometric feature based on alignment of the biometric feature relative to the one or more cameras provides improved feedback to a user of the computer system by indicating portion(s) of the biometric feature for which information is not being captured for the biometric enrollment process and portion(s) for which information is being captured for the biometric enrollment process, and provides guidance instructing the user to properly align the biometric feature relative to the one or more cameras. In some embodiments, the deemphasis of the displayed portion of the video feed of the biometric feature is based on a set of criteria. For example, in some embodiments, the set of criteria includes a positioned distance of the biometric feature relative to the one or more cameras, a shifted position of the biometric feature relative to the one or more cameras, and/or a rotation and/or tilt of the biometric feature relative to the one or more cameras. In some embodiments, the displayed portion of the video feed of the biometric feature is deemphasized when at least one of the criteria is met. In some embodiments, the displayed portion of the video feed of the biometric feature is deemphasized when all of the criteria are met. In some embodiments, the amount by which the displayed portion of the video feed of the biometric feature is deemphasized is determined based on how many of the criteria are met. For example, the amount of deemphasis is increased when more of the criteria are met and is decreased when fewer of the criteria are met.

In some embodiments, deemphasizing the displayed portion of the video feed of the biometric feature (e.g., 705*b*) based on alignment of the biometric feature (e.g., 705 and/or 705-1) relative to the one or more cameras (e.g., 702, 752, 6-118, and/or 6-203) includes the following. While displaying the portion of the video feed of the biometric feature having a first visual appearance (e.g., an appearance with no deemphasizing visual effect or an appearance with at least some amount of a deemphasizing visual effect (e.g., 705*b* having hatching 733*a* and 733*b* in FIG. 7G)), the computer system (e.g., 101, 700, 750, 1-100, and/or 6-200) detects movement of the biometric feature (e.g., a magnitude and/or direction of movement of the biometric feature) relative to the one or more cameras. In response to detecting movement of the biometric feature relative to the one or more cameras, the computer system updates the displayed portion of the video feed of the biometric feature (e.g., changing an amount of visual deemphasis of the portion of the video feed of the biometric feature based on the movement of the biometric feature). Updating the displayed portion of the video feed of the biometric feature includes: in accordance with a determination that the movement of the biometric feature is a first movement (e.g., movement of a first magnitude, direction, and/or type (e.g., rotation and/or shift)), displaying the portion of the video feed of the biometric feature having a second visual appearance that is visually deemphasized by a first amount (e.g., a first increased amount of visual deemphasis or a first decreased amount of visual deemphasis (e.g., 705*b* having hatching 733*b* in FIG. 7H without hatching 733*a*)) relative to the first visual appearance (e.g., increasing the visual deemphasis of the portion of the video feed of the biometric feature or decreasing the visual deemphasis of the portion of the video feed of the biometric feature based on the first movement); and in accordance with a determination that the movement of the biometric feature is a second movement different from the first movement (e.g., movement of a second magnitude and/or direction), displaying the portion of the video feed of the biometric feature having a third visual appearance that is visually deemphasized by a second amount (e.g., a second decreased amount of visual deemphasis or a second increased amount of visual deemphasis) relative to the first visual appearance, wherein the second amount of visual deemphasis is different from the first amount of visual deemphasis (e.g., decreasing the visual deemphasis of the portion of the video feed of the biometric feature or increasing the visual deemphasis of the portion of the video feed of the biometric feature based on the second movement). Displaying the portion of the video feed of the biometric feature having a second visual appearance that is visually deemphasized by a first amount relative to the first visual appearance when the movement of the biometric feature is a first movement, and displaying the portion of the video feed of the biometric feature having a third visual appearance that is visually deemphasized by a second amount relative to the first visual appearance provides improved feedback to a user of the computer system by indicating portion(s) of the biometric feature for which information is not being captured for the biometric enrollment process and portion(s) for which information is being captured for the biometric enrollment process, and provides guidance instructing the user to properly align the biometric feature relative to the one or more cameras by adjusting the amount of visual deemphasis based on the movements of the biometric feature relative to the one or more cameras.

In some embodiments, deemphasizing the displayed portion of the video feed of the biometric feature (e.g., 705*b*) based on alignment of the biometric feature relative to the one or more cameras includes the following. In accordance with a determination that an alignment of the biometric feature (e.g., 705 and/or 705-1) (or a portion of the biometric feature) relative to the one or more cameras (e.g., 702, 752, 6-118, and/or 6-203) includes a first type of alignment error (e.g., a distance error such as the face being too close or too far from the one or more cameras), the computer system (e.g., 101, 700, 750, 1-100, and/or 6-200) displays the portion of the video feed of the biometric feature (or portion of the biometric feature) having a first type of deemphasizing visual effect (e.g., 733*a*) (e.g., a faded visual effect or other deemphasizing visual effect). In accordance with a determination that the alignment of the biometric feature relative to the one or more cameras includes a second type of alignment error different from the first type of alignment error (e.g., a rotation, shift, or tilt error such as the face being turned, rotated, tilted, and/or laterally displaced by greater than a threshold amount), the computer system displays the portion of the video feed of the biometric feature (or portion of the biometric feature) having a second type of deemphasizing visual effect that is different from the first type of deemphasizing visual effect (e.g., 733*b*) (e.g., a blurring visual effect or other deemphasizing visual effect that is different from the first type of deemphasizing visual effect). Displaying the portion of the video feed of the biometric feature having a first type of deemphasizing visual effect when an alignment of the biometric feature relative to the one or more cameras includes a first type of alignment error, and displaying the portion of the video feed of the biometric feature having a second type of deemphasizing visual effect when the alignment of the biometric feature relative to the one or more cameras includes a second type of alignment error provides improved feedback to a user of the computer system by indicating portion(s) of the biometric feature for which information is not being captured for the biometric enrollment process and portion(s) for which information is being captured for the biometric enrollment process, and provides guidance instructing the user to properly align the biometric feature relative to the one or more cameras by indicating different types of alignment errors of the biometric feature. In some embodiments, an alignment error occurs when one or more of the criteria are met for deemphasizing the displayed portion of the video feed of the biometric feature. In some embodiments, the criteria include a positioned distance of the biometric feature relative to the one or more cameras, a shifted position of the biometric feature relative to the one or more cameras, and/or a rotation and/or tilt of the biometric feature relative to the one or more cameras. In some embodiments, a first type of alignment error occurs when a first one of the criteria is met and a second type of alignment error occurs when a different one of the criteria is met. In some embodiments, different deemphasizing visual effects are displayed for different types of alignment errors. For example, a faded visual effect is applied to the displayed portion of the video feed of the biometric feature when the user's face is too close or too far from the one or more cameras (e.g., a distance error) and a blurred visual effect is applied when the user's face is rotated or tilted beyond a respective threshold amount (e.g., a rotation or tilt error).

In some embodiments, deemphasizing the displayed portion of the video feed of the biometric feature (e.g., 705*b*) based on alignment of the biometric feature relative to the one or more cameras includes the following. In accordance with a determination that an alignment of the biometric feature (e.g., 705 and/or 705-1) (or a portion of the biometric feature) relative to the one or more cameras (e.g., 702, 752, 6-118, and/or 6-203) includes a first type of alignment error (e.g., a shift error such as the face being laterally shifted beyond a lateral threshold distance relative to the one or more cameras, and/or a first alignment error in a first set of alignment errors), the computer system (e.g., 101, 700, 750, 1-100, and/or 6-200) displays the portion of the video feed of the biometric feature (or portion of the biometric feature) having a first type of deemphasizing visual effect (e.g., 733*b*) (e.g., having a blurred, hatched, obscured, faded, feathered, and/or otherwise deemphasizing visual effect). In accordance with a determination that the alignment of the biometric feature relative to the one or more cameras includes a second type of alignment error different from the first type of alignment error (e.g., a rotation or tilt error such as the face being turned, rotated, and/or tilted by greater than a threshold amount, and/or a second alignment error in the first set of alignment errors), the computer system displays the portion of the video feed of the biometric feature (or portion of the biometric feature) having the first type of deemphasizing visual effect (e.g., 733*b*) (e.g., using a same kind of deemphasizing visual effect for different types of alignment errors). Displaying the portion of the video feed of the biometric feature having a first type of deemphasizing visual effect when an alignment of the biometric feature relative to the one or more cameras includes a first type of alignment error, and displaying the portion of the video feed of the biometric feature having the first type of deemphasizing visual effect when the alignment of the biometric feature relative to the one or more cameras includes a second type of alignment error provides improved feedback to a user of the computer system by indicating portion(s) of the biometric feature for which information is not being captured for the biometric enrollment process and portion(s) for which information is being captured for the biometric enrollment process, and provides guidance instructing the user to properly align the biometric feature relative to the one or more cameras by indicating alignment errors of the biometric feature. In some embodiments, an alignment error occurs when one or more of the criteria are met for deemphasizing the displayed portion of the video feed of the biometric feature. In some embodiments, the criteria include a positioned distance of the biometric feature relative to the one or more cameras, a shifted position of the biometric feature relative to the one or more cameras, and/or a rotation and/or tilt of the biometric feature relative to the one or more cameras. In some embodiments, a first type of alignment error occurs when a first one of the criteria is met and a second type of alignment error occurs when a different one of the criteria is met. In some embodiments, a same deemphasizing visual effect is displayed for different types of alignment errors. For example, a blurring visual effect is applied to the displayed portion of the video feed of the biometric feature when the user's face is laterally shifted too far relative to the one or more cameras (e.g., a shift error) and when the user's face is rotated or tilted beyond a respective threshold amount (e.g., a rotation or tilt error). In some embodiments, a same deemphasizing visual effect is displayed for different types of alignment errors that are in a first set of alignment errors, and a different deemphasizing visual effect is displayed for alignment errors that are not in the first set of alignment errors. For example, in some embodiments, the first set of alignment errors includes shift errors and rotation errors. Thus, when a shift error and/or rotation error occurs, the computer system applies a respective deemphasizing visual effect (e.g., blurring), and when a different alignment error other than a distance error or rotation error (e.g., a distance error) occurs, the computer system applies a different deemphasizing visual effect such as a fading effect.

In some embodiments, aspects/operations of methods 800, 900, 1000, and 1200 may be interchanged, substituted, and/or added between these methods. For example, the portion of the video feed having different appearances discussed with respect to method 900 is optionally used for the enrollment user interfaces discussed with respect to methods 800, 1000, and/or 1200. For brevity, these details are not repeated here.

FIG. 1O is a flow diagram of an exemplary method 1000 for enrolling a biometric feature using a multi-layer enrollment interface, in some embodiments. In some embodiments, method 1000 is performed at a computer system (e.g., computer system 101 in FIG. 1A, computer system 700 in FIGS. 7A-7M, HMD 750 in FIGS. 7N1 and 7O1, HMD 1-100 in FIGS. 7N2 and 7O2, and/or HMD 6-200 in FIGS. 7N3 and 7O3-7R) (e.g., a smartphone, a smartwatch, a tablet computer, a desktop computer, a laptop computer, and/or a head-mounted device (e.g., a head-mounted augmented reality and/or extended reality device)) that is in communication with (e.g., includes and/or is connected to) a set of one or more display generation components (e.g., display generation component 120 in FIGS. 1A, 3, and 4; display 701 in FIGS. 7A-7M; 751 in FIGS. 7N1 and 7O1; display unit 1-102 in FIGS. 7N2 and 7O2; and/or display area 6-232 in FIGS. 7N3 and 7O3-7R) (e.g., a visual output device, a 3D display, a display having at least a portion that is transparent or translucent on which images can be projected (e.g., a see-through display), a display, a display controller, a monitor, a touch-sensitive display system, a display screen, a projector, a holographic display, a lenticular display (e.g., display assembly 3-100 and/or lenticular lens array 3-110) (e.g., a curved lenticular display), and/or a head-mounted display system), one or more sensors (e.g., 702, 752, and/or 6-118) (e.g., one or more sensors in communication with the computer system such as, motion sensors, proximity sensors, cameras (e.g., an infrared camera, a depth camera, and/or a visible light camera), and/or biometric sensors (e.g., facial detection sensors, fingerprint sensors, and/or iris sensors)), and, optionally, one or more input devices (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

In some embodiments, the computer system (e.g., 101, 700, 750, 1-100, and/or 6-200) is in communication with one or more input devices (e.g., a touch-sensitive surface, keyboard, mouse, trackpad, one or more optical sensors for detecting gestures, one or more capacitive sensors for detecting hover inputs, and/or accelerometer/gyroscope/inertial measurement units). In some embodiments, the computer system is a head-mounted device (e.g., 750, 1-100, and/or 6-200) and the display generation component (e.g., 751, 1-102, and/or 6-232) is configured to be viewed by the user (e.g., 705) when the head-mounted device is not placed on the head of the user and/or over the eyes of the user and/or the display generation component is not configured to be viewed by the user when the head-mounted device is placed on the head of the user and/or over the eyes of the user (e.g., the display generation component is not a primary display for displaying user interfaces of the computer system while the computer system is in use). In some embodiments, the user interfaces described herein are optionally displayed on a lenticular display (e.g., 751, 1-102, 6-232, 3-100, and/or 3-110) (optionally a curved lenticular display) where different sections of the lenticular display show different views of the user interface elements based on the perspective from which the user interface elements are being displayed. For example, as the viewpoint of the user changes relative to the lenticular display (e.g., 3-100 and/or 3-110), different sections of the display will become visible, and these different sections show the user different views of the user interface that have a different appearance that corresponds to the user's viewing angle. In some embodiments, this creates a three-dimensional effect as the user's viewing angle shifts (e.g., due to the display being moved and/or due to the user moving relative to the display).

During a biometric enrollment process (e.g., a process that includes capturing biometric data (e.g., image data, sensor data, and/or depth data) indicative of a size, shape, position, pose, color, depth, and/or other characteristic of one or more body parts and/or features of body parts of a user) that includes capturing (e.g., via the one or more cameras and/or other sensors) information (e.g., data and/or images) about a biometric feature (e.g., 705 and/or 705-1) (e.g., a head, face, eye, eyes, and/or eye region) of a person (e.g., 705) (e.g., a user of the computer system, such as a person that is holding, operating, logged into, and/or otherwise associated with the computer system), the computer system (e.g., 101, 700, 750, 1-100, and/or 6-200) displays (1002) (e.g., via the one or more display generation components (e.g., 701, 751, 1-102, and/or 6-232)) an enrollment user interface (e.g., 715, 755, and/or 765) having a plurality of layers (e.g., 711, 712, 713, 761, 762, and/or 763) that provide information (e.g., data and/or feedback) about alignment of the biometric feature with the one or more sensors (e.g., 702, 752, and/or 6-118). Displaying the enrollment user interface includes the following steps.

In accordance with a determination that the alignment of the biometric feature (e.g., 705 and/or 705-1) with the one or more sensors (e.g., 702, 752, and/or 6-118) has a first value of a first alignment characteristic (e.g., movement, position, and/or depth of the biometric feature relative to the one or more sensors) of the biometric feature (e.g., the alignment is a first alignment with respect to the first alignment characteristic), the computer system (e.g., 101, 700, 750, 1-100, and/or 6-200) displays (1004) a first layer (e.g., 711 and/or 761) of the enrollment user interface (e.g., 715 and/or 755) having a first appearance for the first layer (e.g., as shown in FIG. 7D) (e.g., an appearance that corresponds to a position, movement, and/or depth of the biometric feature relative to the one or more sensors when the alignment has the first value of the first alignment characteristic) (e.g., an appearance that includes one or more dynamic elements that change in appearance as the biometric feature moves relative to the one or more sensors).

In accordance with a determination that the alignment of the biometric feature (e.g., 705 and/or 705-1) with the one or more sensors (e.g., 702, 752, and/or 6-118) has a second value of the first alignment characteristic of the biometric feature that is different from the first value of the first alignment characteristic of the biometric feature (e.g., the alignment is a second alignment (e.g., different from the first alignment) with respect to the first alignment characteristic), the computer system (e.g., 101, 700, 750, 1-100, and/or 6-200) displays (1006) the first layer (e.g., 711 and/or 761) of the enrollment user interface (e.g., 715 and/or 755) having a second appearance for the first layer that is different from the first appearance for the first layer (e.g., as shown in FIG. 7G) (e.g., an appearance that corresponds to a movement, position, and/or depth of the biometric feature relative to the one or more sensors when the alignment has the second value of the first alignment characteristic).

In accordance with a determination that the alignment of the biometric feature (e.g., 705 and/or 705-1) with the one or more sensors (e.g., 702, 752, and/or 6-118) has a first value of a second alignment characteristic (e.g., an alignment of the biometric feature relative to a displayed graphical element and/or target region) of the biometric feature, the computer system (e.g., 101, 700, 750, 1-100, and/or 6-200) displays (1008) a second layer (e.g., 713 and/or 763) of the enrollment user interface (e.g., 715 and/or 755) having a first appearance for the second layer (e.g., as shown in FIG. 7D) (e.g., an appearance that includes a representation of the biometric feature that is based on the first value of the second alignment characteristic (e.g., one or more portions of the representation of the biometric feature are displayed having a respective position on the second layer based on the value of the second alignment characteristic)).

In accordance with a determination that the alignment of the biometric feature (e.g., 705 and/or 705-1) with the one or more sensors (e.g., 702, 752, and/or 6-118) has a second value of the second alignment characteristic of the biometric feature that is different from the first value of the second alignment characteristic of the biometric feature, the computer system (e.g., 101, 700, 750, 1-100, and/or 6-200) displays (1010) the second layer (e.g., 713 and/or 763) of the enrollment user interface (e.g., 715 and/or 755) having a second appearance for the second layer that is different from the first appearance for the second layer (e.g., as shown in FIG. 7G) (e.g., an appearance that includes a representation of the biometric feature that is based on the second value of the second alignment characteristic). Displaying the first layer of the enrollment user interface having a first or second appearance for the first layer based on the alignment of the biometric feature with the one or more sensors having a first or second value of the first alignment characteristic, and displaying the second layer of the enrollment user interface having a first or second appearance for the second layer based on the alignment of the biometric feature with the one or more sensors having a first or second value of the second alignment characteristic, provides improved feedback about the biometric enrollment process and assists with guiding the user to properly position the biometric feature for successfully completing the biometric enrollment process.

In some embodiments, the second layer (e.g., 713 and/or 763) of the enrollment user interface (e.g., 715 and/or 755) includes a representation (e.g., 705b and/or 705-1b) of the biometric feature. Displaying the second layer of the enrollment user interface including a representation of the biometric feature provides improved feedback about the biometric enrollment process and assists with guiding the user to properly position the biometric feature for successfully completing the biometric enrollment process. In some embodiments, the first or second appearance for the second layer includes a representation of the biometric feature that is based on the first or second value of the second alignment characteristic. In some embodiments, the representation of the biometric feature is displayed having a relative position on the second layer that is determined based on the first or second value of the second alignment characteristic. In some embodiments, as a part of displaying the second layer of the enrollment user interface having the first appearance for the second layer, the computer system (e.g., 101, 700, 750, 1-100, and/or 6-200) displays the representation of the biometric feature having a first position relative to a graphical element (e.g., 720, 721, and/or 722) (e.g., an element of an enrollment progress indicator) of the enrollment user interface that is based on the first value of the second alignment characteristic (e.g., the representation of the face is displayed having a first position relative to the enrollment progress indicator). In some embodiments, as a part of displaying the second layer of the enrollment user interface having the second appearance for the second layer, the computer system displays the representation of the biometric feature having a second position relative to the graphical element of the enrollment user interface that is different from the first position and is based on the second value of the second alignment characteristic (e.g., the representation of the face is displayed having a second position relative to the enrollment progress indicator). Displaying the representation of the biometric feature having a first or second position relative to the graphical element of the enrollment user interface that is based on the first value or the second value of the second alignment characteristic provides improved feedback about the biometric enrollment process and assists with guiding the user to properly position the biometric feature for successfully completing the biometric enrollment process. In some embodiments, the representation of the biometric feature is displayed having a position relative to an enrollment progress indicator that is determined based on the alignment of the biometric feature with the one or more sensors.

In some embodiments, the computer system (e.g., 101, 700, 750, 1-100, and/or 6-200) displays the enrollment user interface (e.g., 715 and/or 755) including a third layer (e.g., 712 and/or 762). In some embodiments, the third layer includes an animated effect (e.g., colors 716) (e.g., an animation of a color wash that moves within the third layer). In some embodiments, the animated effect is applied to a portion of the third layer. In some embodiments, the animated effect is not applied to a center region of the third layer that is used for aligning the biometric feature with the one or more sensors. In some embodiments, the third layer includes a graphical indication (e.g., 722) of a target region (e.g., 725) (e.g., a center region of the third layer) for aligning the biometric feature with the one or more sensors (e.g., 702, 752, and/or 6-118) (e.g., an indication of a location for aligning the biometric feature for successfully completing the biometric enrollment process). Displaying the third layer including the animated effect and the graphical indication of the target region for aligning the biometric feature with the one or more sensors provides improved feedback about the state of the computer system during the biometric enrollment process and assists with guiding the user to properly position the biometric feature for successfully completing the biometric enrollment process. In some embodiments, the third layer is displayed between the first layer and the second layer. In some embodiments, the animated effect of the third layer changes over time independent of changes in a respective value of the first alignment characteristic and independent of changes in a respective value of the second alignment characteristic (e.g., the animation of the color wash in the third layer changes over time without regard to movement of the biometric feature relative to the one or more sensors). Displaying the animated effect of the third layer changing over time independent of changes in values of the first alignment characteristic and the second alignment characteristic provides improved feedback to a user of the computer system indicating that information about the biometric feature is being captured for the biometric enrollment process.

In some embodiments, the first layer (e.g., 711 and/or 761) (e.g., a foreground layer) of the enrollment user interface (e.g., 715 and/or 755) includes a set of one or more dynamic graphical elements (e.g., 720 and/or 721) that change in appearance (e.g., size, location, rotation, brightness, position, orientation, color, and/or opacity) based on (e.g., in response to) movement of the biometric feature (e.g., 705 and/or 705-1) relative to the one or more sensors (e.g., 702, 752, and/or 6-118) (e.g., movement of the biometric feature along an x-, y-, and/or z-axis relative to the one or more sensors). Displaying the first layer including the set of one or more dynamic graphical elements that change in appearance based on movement of the biometric feature relative to the one or more sensors provides improved feedback about the state of the computer system during the biometric enrollment process and assists with guiding the user to properly position the biometric feature for successfully completing the biometric enrollment process. In some embodiments, the computer system detects movement of the biometric feature relative to the one or more sensors (e.g., a change in depth, horizontal alignment, and/or vertical alignment) and, in response to the detected movement of the biometric feature relative to the one or more sensors, in accordance with a determination that the movement is a first movement (e.g., a first change in depth, horizontal alignment, and/or vertical alignment), the computer system displays the set of one or more dynamic graphical elements having a first changed appearance, and in accordance with a determination that the movement is a second movement (e.g., a second change in depth, horizontal alignment, and/or vertical alignment) different from the first movement, the computer system displays the set of one or more dynamic graphical elements having a second changed appearance different from the first changed appearance. In some embodiments, the set of one or more dynamic graphical elements includes a dynamic graphical element that changes appearance based on a change in depth of the biometric feature relative to the one or more sensors. In some embodiments, the set of one or more dynamic graphical elements includes a dynamic graphical element that changes appearance based on a change in horizontal alignment of the biometric feature relative to the one or more sensors. In some embodiments, the set of one or more dynamic graphical elements includes a dynamic graphical element that changes appearance based on a change in vertical alignment of the biometric feature relative to the one or more sensors. In some embodiments, the set of one or more dynamic graphical elements includes a dynamic graphical element that changes appearance based on a change in depth, horizontal alignment, and/or vertical alignment of the biometric feature relative to the one or more sensors.

In some embodiments, the first alignment characteristic is a distance (e.g., along a z-axis) of the biometric feature (e.g., 705 and/or 705-1) from the one or more sensors (e.g., 702, 752, and/or 6-118) (e.g., the first value of the first alignment characteristic is a first distance (e.g., a first z-value along the z-axis) of the biometric feature from the one or more sensors and the second value of the first alignment characteristic is a second distance (e.g., a second z-value along the z-axis) of the biometric feature from the one or more sensors that is different from the first distance). In some embodiments, displaying the first layer (e.g., 711 and/or 761) of the enrollment user interface (e.g., 715 and/or 755) having the first appearance for the first layer includes displaying a first dynamic graphical element (e.g., 720 and/or 721) from the set of one or more dynamic graphical elements having a first appearance (e.g., size, location, rotation, brightness, position, orientation, color, and/or opacity) that is determined based on a first distance of the biometric feature from the one or more sensors (e.g., as shown in FIG. 7G) (e.g., the first dynamic graphical element is displayed having a respective size, location, rotation, brightness, position, orientation, color, and/or opacity that is determined based on the first distance of the biometric feature from the one or more sensors). In some embodiments, displaying the first layer of the enrollment user interface having the second appearance for the first layer includes displaying the first dynamic graphical element having a second appearance (e.g., size, location, rotation, brightness, position, orientation, color, and/or opacity) that is different from the first appearance and is determined based on a second distance of the biometric feature from the one or more sensors (e.g., as shown in FIG. 7H) (e.g., the first dynamic graphical element is displayed having a respective size, location, rotation, brightness, position, orientation, color, and/or opacity that is determined based on the second distance of the biometric feature from the one or more sensors). Displaying the first dynamic graphical element having a first or second appearance that is determined based on a first or second distance of the biometric feature from the one or more sensors provides improved feedback about the biometric enrollment process and assists with guiding the user to properly position the biometric feature for successfully completing the biometric enrollment process. In some embodiments, a respective dynamic graphical element of the first layer changes appearance based on changes in distance of the biometric feature from the one or more sensors. In some embodiments, in response to detecting a change in distance of the biometric feature relative to the one or more sensors, the computer system updates an appearance of a first dynamic graphical element from the set of one or more dynamic graphical elements, including, in accordance with a determination that the biometric feature is a first distance from the one or more sensors, displaying the first dynamic graphical element having a first appearance for the first dynamic graphical element, and in accordance with a determination that the biometric feature is a second distance from the one or more sensors that is different from the first distance, displaying the first dynamic graphical element having a second appearance for the first dynamic graphical element that is different from the first appearance for the first dynamic graphical element. In some embodiments, the first appearance of the first dynamic graphical element is a first displayed orientation of the first dynamic graphical element, and wherein the second appearance of the first dynamic graphical element is a second displayed orientation of the first dynamic graphical element that is different from the first displayed orientation (e.g., the first dynamic graphical element changes orientation based on the distance of the biometric feature from the one or more sensors). Displaying the first dynamic graphical element having a first or second displayed orientation that is determined based on a first or second distance of the biometric feature from the one or more sensors provides improved feedback about the biometric enrollment process and assists with guiding the user to properly position the biometric feature for successfully completing the biometric enrollment process.

In some embodiments, the first alignment characteristic is a horizontal alignment (e.g., a position along an x-axis) of the biometric feature (e.g., 705 and/or 705-1) relative to the one or more sensors (e.g., 702, 752, and/or 6-118) (e.g., the first value of the first alignment characteristic is a first horizontal alignment (e.g., a first x-value along the x-axis) of the biometric feature relative to the one or more sensors and the second value of the first alignment characteristic is a second horizontal alignment (e.g., a second x-value along the x-axis) of the biometric feature relative to the one or more sensors that is different from the first horizontal alignment). In some embodiments, displaying the first layer (e.g., 711 and/or 761) of the enrollment user interface (e.g., 715 and/or 755) having the first appearance for the first layer includes displaying a second dynamic graphical element (e.g., 721) from the set of one or more dynamic graphical elements (e.g., the first dynamic graphical element or a dynamic graphical element that is different from the first dynamic graphical element) having a first appearance (e.g., size, location, rotation, brightness, position, orientation, color, and/or opacity) that is determined based on a first horizontal alignment of the biometric feature relative to the one or more sensors (e.g., as shown in FIG. 7H) (e.g., the second dynamic graphical element is displayed having a respective size, location, rotation, brightness, position, orientation, color, and/or opacity that is determined based on the first horizontal alignment of the biometric feature relative to the one or more sensors). In some embodiments, displaying the first layer of the enrollment user interface having the second appearance for the first layer includes displaying the second dynamic graphical element having a second appearance (e.g., size, location, rotation, brightness, position, orientation, color, and/or opacity) that is different from the first appearance and is determined based on a second horizontal alignment of the biometric feature relative to the one or more sensors (e.g., as shown in FIG. 7I) (e.g., the second dynamic graphical element is displayed having a respective size, location, rotation, brightness, position, orientation, color, and/or opacity that is determined based on the second horizontal alignment of the biometric feature relative to the one or more sensors). Displaying the second dynamic graphical element having a first or second appearance that is determined based on a first or second horizontal alignment of the biometric feature relative to the one or more sensors provides improved feedback about the biometric enrollment process and assists with guiding the user to properly position the biometric feature for successfully completing the biometric enrollment process. In some embodiments, a respective dynamic graphical element of the first layer changes appearance based on changes in horizontal alignment of the biometric feature relative to the one or more sensors. In some embodiments, in response to detecting a change in horizontal alignment of the biometric feature relative to the one or more sensors, the computer system updates an appearance of a second dynamic graphical element from the set of one or more dynamic graphical elements, including, in accordance with a determination that the biometric feature has a first horizontal alignment relative to the one or more sensors, displaying the second dynamic graphical element having a first appearance for the second dynamic graphical element, and in accordance with a determination that the biometric feature has a second horizontal alignment relative to the one or more sensors that is different from the first horizontal alignment, displaying the second dynamic graphical element having a second appearance for the second dynamic graphical element that is different from the first appearance for the second dynamic graphical element.

In some embodiments, the first alignment characteristic is a vertical alignment (e.g., a position along a y-axis) of the biometric feature (e.g., 705 and/or 705-1) relative to the one or more sensors (e.g., 702, 752, and/or 6-118) (e.g., the first value of the first alignment characteristic is a first vertical alignment (e.g., a first y-value along the y-axis) of the biometric feature relative to the one or more sensors and the second value of the first alignment characteristic is a second vertical alignment (e.g., a second y-value along the y-axis) of the biometric feature relative to the one or more sensors that is different from the first vertical alignment). In some embodiments, displaying the first layer (e.g., 711 and/or 761) of the enrollment user interface (e.g., 715 and/or 755) having the first appearance for the first layer includes displaying a third dynamic graphical element (e.g., 721) from the set of one or more dynamic graphical elements (e.g., the first dynamic graphical element, the second dynamic graphical element, or a dynamic graphical element that is different from the first and second dynamic graphical elements) having a first appearance (e.g., size, location, rotation, brightness, position, orientation, color, and/or opacity) that is determined based on a first vertical alignment of the biometric feature relative to the one or more sensors (e.g., as shown in FIG. 7D) (e.g., the third dynamic graphical element is displayed having a respective size, location, rotation, brightness, position, orientation, color, and/or opacity that is determined based on the first vertical alignment of the biometric feature relative to the one or more sensors). In some embodiments, displaying the first layer of the enrollment user interface having the second appearance for the first layer includes displaying the third dynamic graphical element having a second appearance (e.g., size, location, rotation, brightness, position, orientation, color, and/or opacity) that is different from the first appearance and is determined based on a second vertical alignment of the biometric feature relative to the one or more sensors (e.g., as shown in FIG. 7F) (e.g., the third dynamic graphical element is displayed having a respective size, location, rotation, brightness, position, orientation, color, and/or opacity that is determined based on the second vertical alignment of the biometric feature relative to the one or more sensors). Displaying the third dynamic graphical element having a first or second appearance that is determined based on a first or second vertical alignment of the biometric feature relative to the one or more sensors provides improved feedback about the biometric enrollment process and assists with guiding the user to properly position the biometric feature for successfully completing the biometric enrollment process. In some embodiments, a respective dynamic graphical element of the first layer changes appearance based on changes in vertical alignment of the biometric feature relative to the one or more sensors. In some embodiments, in response to detecting a change in vertical alignment of the biometric feature relative to the one or more sensors, the computer system updates an appearance of a third dynamic graphical element from the set of one or more dynamic graphical elements, including, in accordance with a determination that the biometric feature has a first vertical alignment relative to the one or more sensors, displaying the third dynamic graphical element having a first appearance for the third dynamic graphical element, and in accordance with a determination that the biometric feature has a second vertical alignment relative to the one or more sensors that is different from the first vertical alignment, displaying the third dynamic graphical element having a second appearance for the third dynamic graphical element that is different from the first appearance for the third dynamic graphical element.

In some embodiments, the set of one or more dynamic graphical elements includes a first respective element (e.g., 720 or 721) that changes appearance (e.g., size, location, rotation, brightness, position, orientation, color, and/or opacity) in a first manner based on movement of the biometric feature (e.g., 705 and/or 705-1) relative to the one or more sensors (e.g., 702, 752, and/or 6-118) and a second respective element (e.g., 720 or 721), different from the first respective element, that changes appearance (e.g., size, location, rotation, brightness, position, orientation, color, and/or opacity) in a second manner, different from the first manner, based on movement of the biometric feature relative to the one or more sensors. Displaying the first layer having a first respective element that changes appearance in a first manner based on movement of the biometric feature relative to the one or more sensors, and displaying a second respective element that changes appearance in a second manner based on movement of the biometric feature relative to the one or more sensors, provides improved feedback about the biometric enrollment process and assists with guiding the user to properly position the biometric feature for successfully completing the biometric enrollment process. In some embodiments, the computer system detects movement of the biometric feature relative to the one or more sensors, and in response updates an appearance of a first respective element from the set of one or more dynamic graphical elements and an appearance of a second respective element from the set of one or more dynamic graphical elements, including, in accordance with a determination that the movement of the biometric feature is a first movement relative to the one or more sensors, displaying the first respective element changing in appearance in a first manner for the first movement and displaying the second respective element changing in appearance in a second manner for the first movement that is different from the first manner, and in accordance with a determination that the movement of the biometric feature is a second movement relative to the one or more sensors, displaying the first respective element changing in appearance in the first manner for the second movement and displaying the second respective element changing in appearance in the second manner for the second movement. In some embodiments, the first manner of changing appearance of the first respective element includes rotating the first respective element (e.g., 721) based on movement of the biometric feature relative to the one or more sensors. In some embodiments, the first respective element rotates based on movement of the biometric feature that includes a change in horizontal alignment of the biometric feature relative to the one or more sensors. In some embodiments, the second manner of changing appearance of the second respective element includes adjusting (e.g., increasing or decreasing) a displayed size of the second respective element (e.g., 720) based on movement of the biometric feature relative to the one or more sensors. Rotating the first respective element based on movement of the biometric feature relative to the one or more sensors, and adjusting the displayed size of the second respective element based on movement of the biometric feature relative to the one or more sensors, provides improved feedback about different movements of the biometric feature for the biometric enrollment process and assists with guiding the user to properly position the biometric feature for successfully completing the biometric enrollment process. In some embodiments, the size of the second respective element is adjusted based on movement of the biometric feature that includes a change in distance of the biometric feature relative to the one or more sensors. In some embodiments, the first manner of changing appearance of the first respective element (e.g., 720 or 721) includes increasing a displayed size of the first respective element based on movement of the biometric feature relative to the one or more sensors. In some embodiments, the first respective element grows (e.g., increases in size) when the biometric feature moves closer to the one or more sensors. In some embodiments, the second manner of changing appearance of the second respective element (e.g., 720 or 721) includes decreasing a displayed size of the second respective element based on movement of the biometric feature relative to the one or more sensors. Increasing the displayed size of the first respective element based on movement of the biometric feature relative to the one or more sensors, and decreasing the displayed size of the second respective element based on movement of the biometric feature relative to the one or more sensors, provides improved feedback about different movements of the biometric feature for the biometric enrollment process and assists with guiding the user to properly position the biometric feature for successfully completing the biometric enrollment process. In some embodiments, the second respective element shrinks (e.g., decreases in size) when the biometric feature moves closer to the one or more sensors.

In some embodiments, the set of one or more dynamic graphical elements includes an element (e.g., 721) that moves without regard to the alignment of the biometric feature (e.g., 705 and/or 705-1) with the one or more sensors (e.g., 702, 752, and/or 6-118) (e.g., independent of a position of the biometric feature and/or movement of the biometric feature relative to the one or more sensors). Displaying an element that moves without regard to the alignment of the biometric feature with the one or more sensors provides improved feedback to a user of the computer system indicating that information about the biometric feature is being captured for the biometric enrollment process. In some embodiments, the element moves based on an animated effect applied to the element (e.g., a growing/shrinking animation) as shown in FIG. 7E. In some embodiments, the element moves based on a change in brightness of a representation of the biometric feature captured by the one or more sensors as shown in FIG. 7J. In some embodiments, the change in appearance based on movement of the biometric feature relative to the one or more sensors includes a change in size (e.g., increasing and/or decreasing), location (e.g., a change in position on the display generation component), rotation (e.g., a change in orientation), and/or brightness of a dynamic graphical element (e.g., 720 and/or 721) in the set of one or more dynamic graphical elements. Displaying the dynamic graphical element changing in size, location, rotation, and/or brightness provides improved feedback about the state of the computer system during the biometric enrollment process and assists with guiding the user to properly position the biometric feature for successfully completing the biometric enrollment process.

In some embodiments, the information captured about the biometric feature (e.g., 705 and/or 705-1) of the person includes brightness data associated with an environment (e.g., 704) of the person (e.g., a brightness of the physical environment that is detected by the one or more sensors). In some embodiments, the first layer (e.g., 711 and/or 761) of the enrollment user interface (e.g., 715 and/or 755) includes a set of one or more reactive graphical elements (e.g., 721) that change in appearance (e.g., size, location, rotation, brightness, position, orientation, color, and/or opacity) based on (e.g., in response to) a detected change in the brightness data associated with the environment of the person (e.g., as shown in FIG. 7J). Displaying the first layer including the set of one or more reactive graphical elements that change in appearance based on a detected change in the brightness data associated with the environment of the person provides improved feedback about the state of the computer system and lighting conditions of the environment of the user during the biometric enrollment process and assists with guiding the user to properly position the biometric feature for successfully completing the biometric enrollment process. In some embodiments, the computer system detects a change in the brightness data associated with the environment of the person, and in response, changes an appearance of the set of one or more reactive graphical elements, including, in accordance with a determination that the change in brightness data is a first change in brightness (e.g., an increase in brightness), displaying the set of one or more reactive graphical elements having a first changed appearance (e.g., a first change in size, location, rotation, brightness, position, orientation, color, and/or opacity), and in accordance with a determination that the change in brightness data is a second change in brightness (e.g., a decrease in brightness) that is different from the first change in brightness, displaying the set of one or more reactive graphical elements having a second changed appearance that is different from the first changed appearance. In some embodiments, the brightness data associated with the environment of the person includes a brightness for a portion (e.g., 705-1) of the biometric feature captured using the one or more sensors (e.g., 702, 752, and/or 6-118) (e.g., a brightness of a portion of the biometric feature (e.g., a facial region and/or an orbital region of the face) captured in the video feed), and displaying the enrollment user interface having the plurality of layers that provide information about alignment of the biometric feature with the one or more sensors includes the following steps. In accordance with a determination that the brightness for the portion of the biometric feature captured using the one or more sensors has a first brightness value, the computer system (e.g., 101, 700, 750, 1-100, and/or 6-200) displays the set of one or more reactive graphical elements having a first appearance (e.g., a first size, location, rotation, brightness, position, orientation, color, and/or opacity) in the first layer of the enrollment interface (e.g., inner flares 721 as shown in FIG. 7D). In accordance with a determination that the brightness for the portion of the biometric feature captured using the one or more sensors has a second brightness value that is different from the first brightness value, the computer system displays the set of one or more reactive graphical elements (e.g., 721) having a second appearance (e.g., a second size, location, rotation, brightness, position, orientation, color, and/or opacity) in the first layer of the enrollment interface that is different from the first appearance of the set of one or more reactive graphical elements (e.g., inner flares 721 as shown in FIG. 7J). Displaying the set of one or more reactive graphical elements having a first or second appearance that is determined based on the brightness of the portion of the biometric feature having a first brightness value or a second brightness value provides improved feedback about the biometric enrollment process and assists with guiding the user to properly position the biometric feature for successfully completing the biometric enrollment process. In some embodiments, the computer system detects a change in the brightness for the portion of the biometric feature captured using the one or more sensors, and in response updates the enrollment user interface having the plurality of layers that provide information about alignment of the biometric feature with the one or more sensors, including, in accordance with a determination that the brightness for the portion of the biometric feature captured using the one or more sensors has a first brightness value, displaying the set of one or more reactive graphical elements having a first appearance (e.g., a first size, location, rotation, brightness, position, orientation, color, and/or opacity) in the first layer of the enrollment interface; and in accordance with a determination that the brightness for the portion of the biometric feature captured using the one or more sensors has a second brightness value that is different from the first brightness value, displaying the set of one or more reactive graphical elements having a second appearance (e.g., a second size, location, rotation, brightness, position, orientation, color, and/or opacity) in the first layer of the enrollment interface that is different from the first appearance of the set of one or more reactive graphical elements.

In some embodiments, one or more of the plurality of layers (e.g., 711, 712, 761, and/or 762) of the enrollment user interface (e.g., 715 and/or 755) includes a three-dimensional mesh (e.g., 708, 714, 764, and/or 766). Including a three-dimensional mesh in one or more of the plurality of layers of the enrollment user interface provides a three-dimensional effect, which makes the enrollment process a more varied, detailed, and/or realistic user experience. In some embodiments, the three-dimensional mesh provides a depth effect to a layer of the enrollment user interface. In some embodiments, displaying the enrollment user interface having the plurality of layers that provide information about alignment of the biometric feature with the one or more sensors includes displaying a respective one of the plurality of layers (e.g., 712 and/or 762) that includes a three-dimensional mesh (e.g., 714 and/or 766) having one or more colors (e.g., 716*a*, 716*b*, and/or 716*c*) that move over the three-dimensional mesh in the respective one of the plurality of layers. Displaying a respective one of the plurality of layers that includes a three-dimensional mesh having one or more colors that move over the three-dimensional mesh provides improved feedback indicating that the enrollment process is active and provides a three-dimensional effect, which makes the enrollment process a more varied, detailed, and/or realistic user experience. In some embodiments, the mesh provides a depth effect (e.g., 3D ridges or crevices) such that colors moving over the mesh appear to move forward and/or backward relative to the representation of the biometric feature as the colors move over the mesh on the respective layer. In some embodiments, the one or more of the plurality of layers of the enrollment user interface includes a first enrollment interface layer (e.g., 711 or 761) having a first three-dimensional mesh (e.g., 708 or 764) and a second enrollment interface layer (e.g., 712 or 762) (e.g., different from the first enrollment interface layer) having a second three-dimensional mesh (e.g., 714 or 766) different from the first three-dimensional mesh. Including a first enrollment interface layer having a three-dimensional mesh and a second enrollment interface layer having a second three-dimensional mesh in the plurality of layers of the enrollment user interface provides a three-dimensional effect for the layers, which makes the enrollment process a more varied, detailed, and/or realistic user experience.

In some embodiments, the plurality of layers (e.g., 711, 712, 713, 761, 762, and/or 763) of the enrollment user interface (e.g., 715 and/or 755) are displayed having a respective depth (e.g., a simulated depth between the plurality of layers) between the layers (e.g., a simulated spacing of the layers in a z-direction relative to the one or more display generation components). Displaying a respective depth between the plurality of layers of the enrollment user interface provides a three-dimensional effect for the enrollment process, which makes the enrollment process a more varied, detailed, and/or realistic user experience and assists with guiding the user to properly position the biometric feature for successfully completing the biometric enrollment process. In some embodiments, displaying the enrollment user interface having the plurality of layers that provide information about alignment of the biometric feature with the one or more sensors includes displaying one or more of the layers moving relative to other layers in the enrollment user interface (e.g., based on a change in a viewpoint of the user and/or movement of one or more components of the computer system (e.g., the one or more display generation components and/or one or more sensors)) to create a simulated parallax effect for the enrollment user interface (e.g., as shown in FIG. 7F). Displaying the layers moving relative to other layers in the enrollment user interface to create a simulated parallax effect provides a three-dimensional effect for the enrollment process, which makes the enrollment process a more varied, detailed, and/or realistic user experience and assists with guiding the user to properly position the biometric feature for successfully completing the biometric enrollment process.

In some embodiments, the display generation component (e.g., 701 and/or 752) is a curved display (e.g., display assembly 3-100 and/or lenticular lens array 3-110) (e.g., the display generation component is a lenticular display that includes curvature (e.g., convex curvature) to facilitate a lenticular effect that enables different images and/or different visual elements to be viewed on the display when viewing the display from different angles (e.g., different viewing perspectives having different angles with respect to the display)). The display generation component including a curved display enables the computer system to more closely fit and/or align with a face of the user of the computer system, thereby improving the ergonomics of the computer system. In some embodiments, the display generation component is a lenticular display (e.g., 3-100 and/or 3-110) (e.g., a display including one or more lenses (e.g., a lenticular lens film formed over an array of pixels) that enable different images and/or different visual elements to be viewed on the display when viewing the display from different angles (e.g., different viewing perspectives having different angles with respect to the display)) that is configured to display the plurality of layers of the enrollment user interface with a three-dimensional effect (e.g., the layers of the enrollment user interface appear to extend along three different axes (e.g., an x-axis, a y-axis, and a z-axis) with respect to the lenticular display). Displaying the layers of the enrollment user interface with a three-dimensional effect on a lenticular display generation component allows the enrollment user interface to appear more lifelike, which provides a more varied, detailed, and/or realistic user experience. In some embodiments, the lenticular display is configured to enable stereoscopic viewing of the display, such that a user perceives the enrollment user interface as being three-dimensional. In some embodiments, as the viewpoint of the user changes relative to the display, different sections of the display will become visible, and these different sections show the user different views of the user interface that have a different appearance that corresponds to the user's viewing angle. In some embodiments, this creates a three-dimensional effect as the user's viewing angle shifts (e.g., due to the display being moved and/or due to the user moving relative to the display).

In some embodiments, displaying the enrollment user interface (e.g., 715, 755, and/or 765) having the plurality of layers that provide information about alignment of the biometric feature (e.g., 705 and/or 705-1) with the one or more sensors includes the following. While the biometric enrollment process is in a first phase of the biometric enrollment process (e.g., as depicted in FIGS. 7C-7M) (e.g., an initial phase of the enrollment process and/or a phase during which the user is instructed to align the biometric feature with the one or more sensors), the computer system (e.g., 101, 700, 750, 1-100, and/or 6-200) displays a representation of the biometric feature (e.g., 705*b*) (e.g., displaying the enrollment user interface with a representation of the biometric feature). While the biometric enrollment process is in a second phase of the biometric enrollment process different from the first phase (e.g., as depicted in FIGS. 7P-7R) (e.g., a subsequent phase of the enrollment process and/or a phase during which the user is instructed to perform movements of the biometric feature (e.g., tilting, shifting, and/or rotating the biometric feature relative to the one or more sensors) and/or performing facial expressions), the computer system ceases display of the representation of the biometric feature (e.g., displaying the enrollment user interface without the representation of the biometric feature). Displaying a representation of the biometric feature while the biometric enrollment process is in a first phase, and ceasing display of the representation of the biometric feature while the biometric enrollment process is in a second phase provides improved feedback about the state of the computer system during the biometric enrollment process and assists with guiding the user to properly position the biometric feature for successfully completing the biometric enrollment process. In some embodiments, during the second phase of the biometric enrollment process, the computer system ceases displaying the representation of the biometric feature. In some embodiments, during the second phase of the biometric enrollment process, the computer system instructs the user to move the biometric feature (e.g., their head and/or face). For example, in some embodiments, the computer system instructs the user to tilt, rotate, and/or shift their head in a particular direction. In some embodiments, the computer system instructs the user to make a particular facial expression or pose. In some embodiments, during the second phase of the biometric enrollment process, the computer system displays visual indications that move based on alignment of the biometric feature relative to the one or more sensors. For example, in some embodiments, a first visual indication and/or a second visual indication is displayed, via the one or more display generation components, as moving based on a user tilting, shifting, rotating, and/or otherwise changing a position of the face of the user and/or the one or more sensors relative to each other. In some embodiments, in response to detecting the tilt, shift, and/or rotation of the user's head relative to the one or more sensors changing in a first direction, the computer system moves the first visual indication or the second visual indication in a second direction that is based on the first direction. In some embodiments, in response to detecting the tilt, shift, and/or rotation of the user's head relative to the one or more sensors changing in a third direction, different from the first direction, the computer system moves the first visual indication or the second visual indication in a fourth direction that is based on the third direction, wherein the third direction is different from the second direction. In some embodiments, in response to detecting the tilt, shift, and/or rotation of the user's head relative to the one or more sensors changing by a first amount, the computer system moves the first visual indication or the second visual indication a second amount that is based on the first amount. In some embodiments, in response to detecting the tilt, shift, and/or rotation of the user's head relative to the one or more sensors changing by a third amount, different from the first amount, the computer system moves the first visual indication or the second visual indication a fourth amount that is based on the third amount, wherein the fourth amount is different from the second amount. In some embodiments, the computer system moves the first visual indication or the second visual indication a first amount and/or in a first direction that is based on a second amount of movement and/or a second direction associated with a change (e.g., a detected change) in the tilt, shift, and/or rotation of the user's head relative to the one or more sensors. In some embodiments, the computer system prompts the user to make one or more facial expressions (e.g., one or more particular and/or predetermined facial expressions (e.g., smile with mouth closed, smile with mouth open, and/or raised eyebrow expression) and/or general facial expressions (e.g., a prompt guiding the user to move a position of eyes, eyebrows, lips, forehead, and/or cheeks of a face of the user over time without providing an indication of one or more particular and/or predetermined facial expression)). After prompting the user to make the one or more facial expressions, the computer system detects (via the one or more sensors) information about the facial features of the user (e.g., an indication associated with a detected, estimated, approximated, and/or sensed orientation of one or more features (e.g., eyes, eyebrows, lips, mouth, and/or checks) of a face of the user with respect to a position of the computer system within a physical environment in which the computer system and/or the user is located). In some embodiments, the information about the facial features of the user is used for the biometric enrollment process. For example, in some embodiments, the computer system uses the information to generate an avatar.

In some embodiments, while the biometric enrollment process is in the first phase, the computer system (e.g., 101, 700, 750, 1-100, and/or 6-200) detects a transition from the first phase of the biometric enrollment process to the second phase of the biometric enrollment process. In response to detecting the transition from the first phase of the biometric enrollment process to the second phase of the biometric enrollment process, the computer system displays a visual transition (e.g., as depicted in FIGS. 7K-7M) (e.g., a center wipe or other graphical element and/or animation that indicates a transition from the first phase to the second phase) that originates from a central (or center) region of the enrollment user interface. Displaying a visual transition that originates from a central region of the enrollment user interface in response to detecting the transition from the first phase to the second phase of the biometric enrollment process provides improved feedback about the state of the computer system during the biometric enrollment process (e.g., by indicating a state in which the computer system is transitioning from the first phase of the biometric enrollment process to the second phase of the biometric enrollment process).

In some embodiments, displaying the enrollment user interface (e.g., 715, 755, and/or 765) having the plurality of layers that provide information about alignment of the biometric feature (e.g., 705 and/or 705-1) with the one or more sensors includes displaying, during the biometric enrollment process (e.g., during the second phase and/or a phase during which the user is instructed to perform movements of the biometric feature (e.g., shifting, tilting, and/or rotating the biometric feature relative to the one or more sensors) and/or performing facial expressions), a set of one or more graphical elements (e.g., 771a and/or 771b) having an animation indicative of a suggested movement of the biometric feature relative to the one or more sensors (e.g., 6-118 and/or 6-203) (e.g., the set of one or more graphical elements are slightly animated to suggest a user action during enrollment such as shifting the user's head, tilting the user's head, rotating the user's head, and/or making a facial expression). Displaying a set of one or more graphical elements having an animation indicative of a suggested movement of the biometric feature relative to the one or more sensors provides improved feedback about the state of the computer system during the biometric enrollment process (e.g., by indicating a state in which the computer system is configured to capture information about the biometric feature).

In some embodiments, prior to capturing information about the biometric feature of the person (e.g., before the biometric enrollment process starts), the computer system (e.g., 101, 700, 750, 1-100, and/or 6-200) displays (e.g., via the one or more display generation components) a first status visual element (e.g., 716) (e.g., a set of one or more graphical elements that indicate a status or state of the biometric enrollment process) that does not change appearance in response to detecting (e.g., via the one or more sensors) changes in alignment of the biometric feature (e.g., 705 and/or 705-1) relative to the one or more sensors (e.g., 702, 752, 6-118, and/or 6-203) (e.g., the first status visual element is not responsive to the orientation of the biometric feature relative to the one or more sensors). Displaying a first status visual element that does not change appearance in response to detecting changes in alignment of the biometric feature relative to the one or more sensors provides improved feedback about the state of the computer system prior to the biometric enrollment process (e.g., by indicating a state in which the computer system is not currently configured to capture information about the biometric feature). In some embodiments, the first status visual element indicates that the biometric enrollment process is in an initialization or setup state. In some embodiments, the first status visual element indicates that the biometric enrollment process has not yet started (e.g., information about the biometric feature is not yet being captured).

In some embodiments, after completing the biometric enrollment process, the computer system (e.g., 101, 700, 750, 1-100, and/or 6-200) displays (e.g., via the one or more display generation components) a second status visual element (e.g., 716 and/or 773) (e.g., the first status visual element or a different status visual element) that does not change appearance in response to detecting (e.g., via the one or more sensors) changes in alignment of the biometric feature relative to the one or more sensors (e.g., the second status visual element is not responsive to the orientation of the biometric feature relative to the one or more sensors). Displaying a second status visual element that does not change appearance in response to detecting changes in alignment of the biometric feature relative to the one or more sensors provides improved feedback about the state of the computer system after completing the biometric enrollment process (e.g., by indicating a state in which the computer system is not currently configured to capture information about the biometric feature). In some embodiments, the second status visual element indicates that the biometric enrollment process is complete or ending. In some embodiments, the second status visual element has a same appearance as the first status visual element.

In some embodiments, the first status visual element (e.g., 716 and/or 773) has an animated visual effect (e.g., the status visual element is animated). Displaying the first status visual element with an animated visual effect provides improved feedback about the state of the computer system during the biometric enrollment process (e.g., by indicating a state in which the computer system is configured to capture information about the biometric feature). In some embodiments, the animated visual effect includes an animation of the first status visual element that is based on an audio signal of audio instructions.

In some embodiments, the first status visual element (e.g., 716 and/or 773) is displayed while audio instructions (e.g., 718 and/or 767) for the biometric enrollment process are output (e.g., via an audio generation component that is in communication with the computer system). Displaying the first status visual element while audio instructions for the biometric enrollment process are output provides improved feedback about the state of the computer system during the biometric enrollment process (e.g., by indicating that the biometric enrollment user interface is associated with the audio instructions that are being output). In some embodiments, the computer system is in communication with an audio generation component (e.g., a speaker and/or a bone conduction audio output device). In some embodiments, the computer system outputs audio instructions for performing the biometric enrollment process (e.g., instructions telling the user to move or position their head and/or instructions for the user to make a facial expression). In some embodiments, the audio instructions are output while the status visual element is displayed.

In some embodiments, the computer system (e.g., 101, 700, 750, 1-100, and/or 6-200) animates an appearance of the first status visual element (e.g., 716 and/or 773) based on an audio signal (e.g., 718 and/or 767) of the audio instructions. Animating an appearance of the first status visual element based on an audio signal of the audio instructions provides improved feedback about the state of the computer system during the biometric enrollment process (e.g., by indicating that the biometric enrollment user interface is associated with the audio instructions that are being output).

In some embodiments, the first status visual element is animated to have a movement or changing visual effect that corresponds to a rhythm, pattern, and/or sound waveform of the audio instructions.

In some embodiments, aspects/operations of methods 800, 900, 1000, and 1200 may be interchanged, substituted, and/or added between these methods. For example, the plurality of layers that provide information about alignment of the biometric feature with the one or more sensors as discussed with respect to method 1000 are optionally used for the enrollment user interfaces discussed with respect to methods 800, 900, and/or 1200. For brevity, these details are not repeated here.

FIGS. 11A-11I3 illustrate example techniques for providing feedback about fixing one or more enrollment error conditions, in some embodiments. FIG. 12 is a flow diagram of methods of providing feedback about fixing one or more enrollment error conditions, in some embodiments. The user interfaces in FIGS. 11A-11I3 are used to illustrate the processes in FIG. 12.

FIG. 11A depicts computer system 700, which is used to perform the biometric enrollment process for user 705. User 705 is holding computer system 700 (e.g., a tablet computer or smartphone) in physical environment 704. Computer system 700 includes display 701 and one or more cameras 702. The cameras are referred to collectively as camera 702 and are located offset from the center of display 701 (e.g., in a corner region of computer system 700). In FIG. 11A, the user has initiated the biometric enrollment process, for example, by launching an application for performing the biometric enrollment. As the biometric enrollment process starts up, computer system 700 displays (via display 701) an animated color filter (represented by colors 716a, 716b, and 716c, referred to collectively as colors 716) that is part of biometric enrollment interface 715 and computer system 700 prompts user 705 (e.g., via audio output 1110a and/or a displayed prompt) that the process is starting. As shown in FIGS. 11A-11I3, colors 716 are animated, moving on a layer of biometric interface 715 during the biometric enrollment process.

In FIG. 11A, user 705 has positioned his head (including face 705-1) within the field of view of camera 702. Accordingly, computer system 700 displays cropped representation 705b, which is a cropped portion of video feed 706 that includes a representation of the user's head, including representation 705-1b of the user's face 705-1.

Figure 11B:
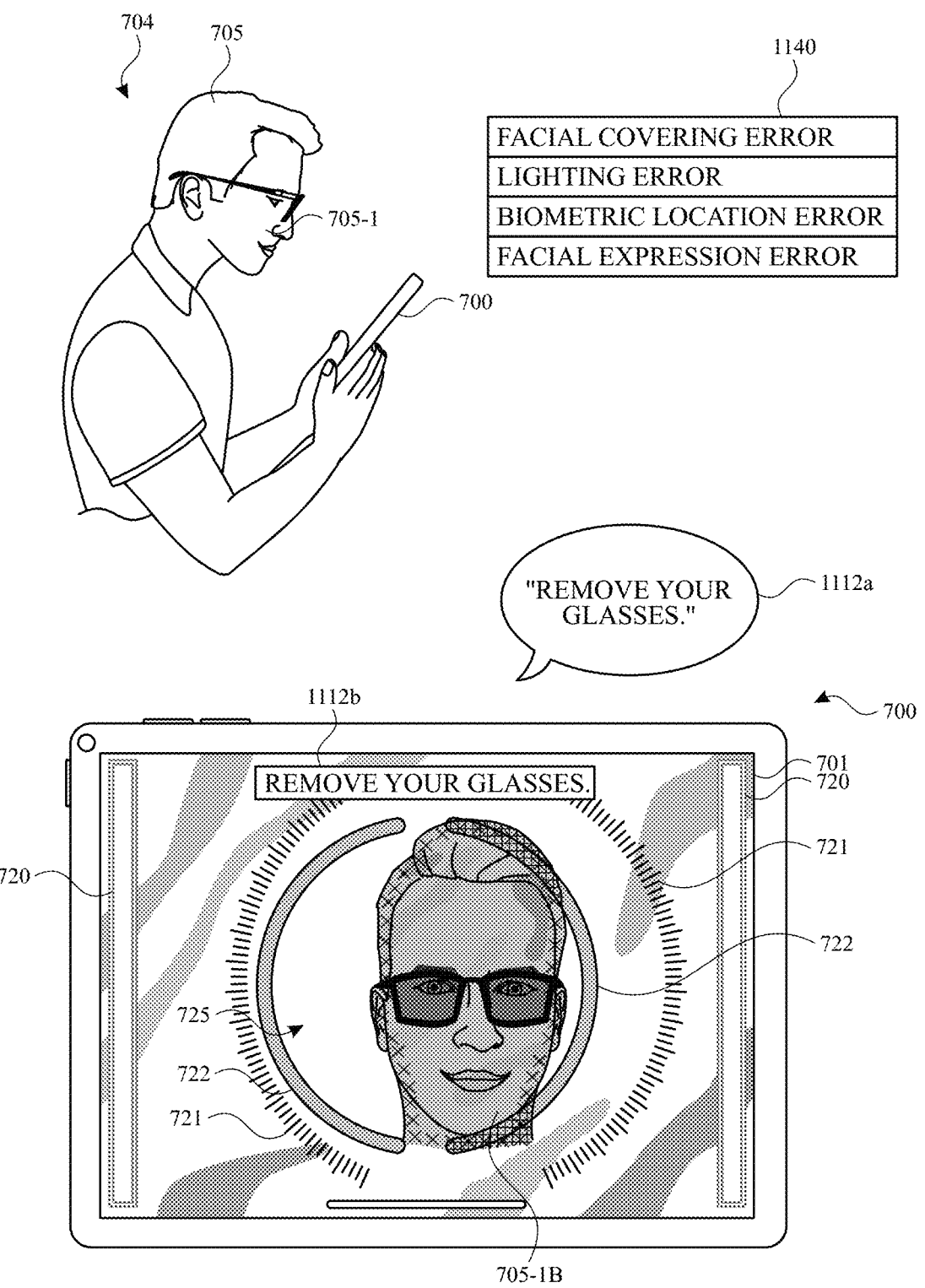

As shown in FIG. 11B, computer system 700 updates biometric enrollment interface 715 to include various displayed elements to assist user 705 with aligning their face 705-1 for biometric enrollment, including outer flares 720, inner flares 721, and target indicator 722. Outer flares 720, inner flares 721, and target indicator 722 are described in detail with respect to FIGS. 7A-7L, above.

At FIG. 11B, computer system 700 is detecting multiple enrollment error conditions, listed in table 1140 for case of reference. Computer system 700 has prioritized the multiple enrollment error conditions such that computer system 700 can provide the user with feedback of the highest priority enrollment error condition, without providing feedback about lower priority enrollment error conditions. In table

1120, the list of enrollment error conditions is ordered based on priority from top (highest priority) to bottom (lowest priority). In particular, at FIG. 11B, computer system 700 is detecting four concurrent enrollment error conditions: facial covering error condition, lighting error condition, biometric location error condition, and facial expression error condition, with the facial covering error condition being the highest priority. The facial covering error condition occurs when the user is wearing a facial covering, such as glasses (as shown in FIG. 11B) and/or a mask, that covers a portion of the biometric feature that is being enrolled. The lighting error condition occurs when the amount of light (e.g., ambient light) exceeds a certain threshold (e.g., it is too dark (as shown in FIG. 11B) or it is too bright). The biometric location error condition occurs when representation 705-1b of the user's face 705-1 is not within target region 725 (e.g., off to the right, as shown in FIG. 11B). The facial expression error condition occurs when the user is making a facial expression (e.g., smiling, as shown in FIG. 11B) that is different from a desired facial expression (e.g., a neutral facial expression).

In response to computer system 700 detecting the four concurrent enrollment error conditions and based on the facial covering error condition being the highest priority of the four enrollment error conditions, computer system 700 provides user 705 with feedback to fix the facial covering error condition without providing feedback to fix the lighting error condition, the biometric location error condition, or the facial expression error condition. As shown in FIG. 11B, the feedback includes verbal feedback 1112a and displayed textual feedback 1112b telling user 705 to remove their glasses. In some embodiments, display 701 does not have a sufficiently high enough resolution to support display of the text illustrated throughout FIGS. 11B-11H, and thus the feedback does not include displayed text, such as textual feedback 1112b.

After providing feedback 1112a-1112b, computer system 700 provides a delay to give user 705 time to fix the error. In some embodiments, the amount of time that computer system 700 delays before providing additional feedback is based on the error for which computer system 700 provided the feedback. For example, computer system 700 delays longer for errors that may take longer for the user to fix than for errors that the user can fix quickly.

Figure 11C:
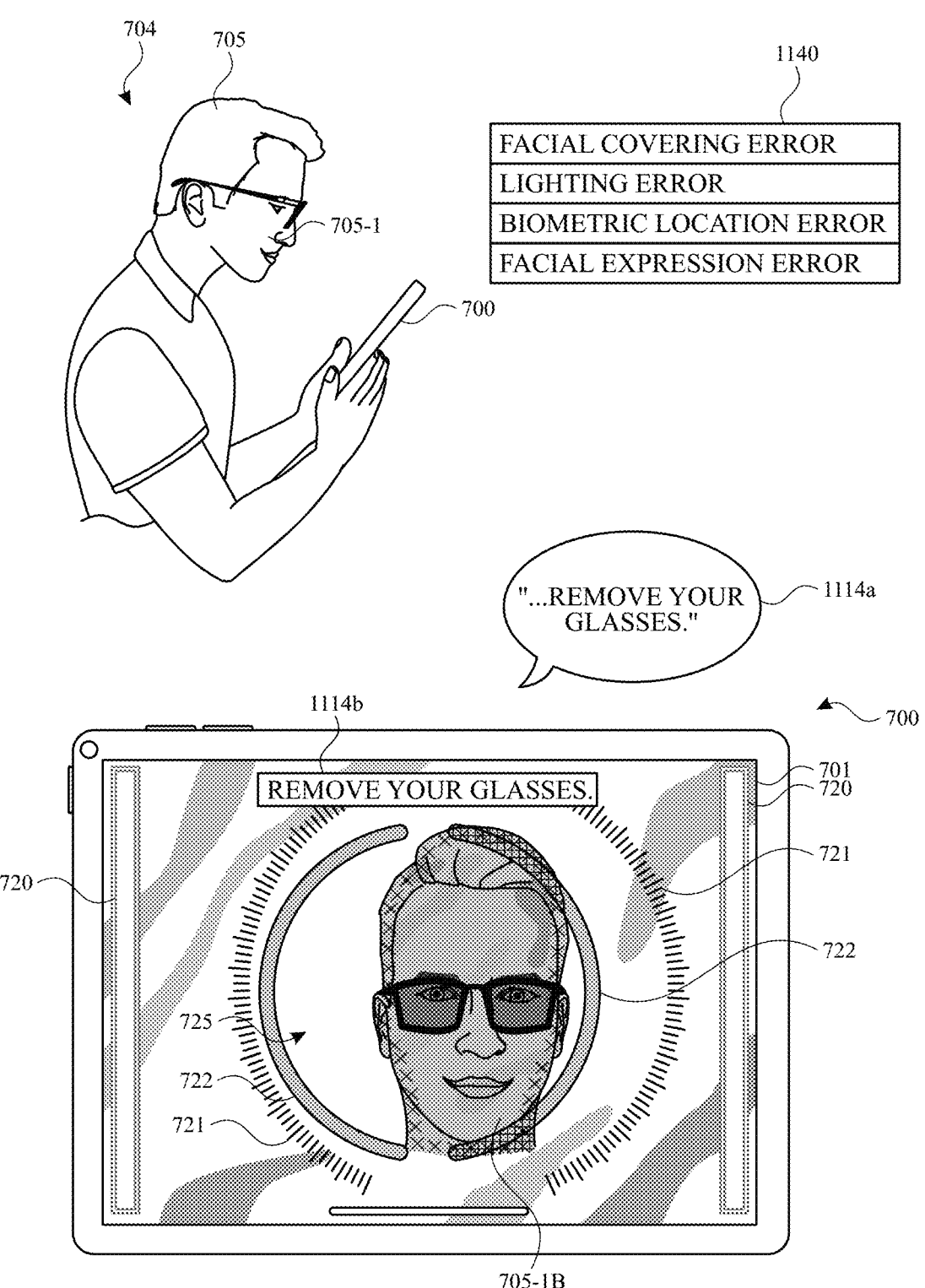

At FIG. 11C, after the delay has ended, computer system 700 detects the same four enrollment error conditions, as shown in table 1140. After the delay, in response to computer system 700 detecting the four concurrent enrollment error conditions and based on the facial covering error condition being the highest priority of the four enrollment error conditions, computer system 700 again provides user 705 with feedback 1114a-1114b to fix the facial covering error condition without providing feedback to fix the lighting error condition, the biometric location error condition, or the facial expression error condition. As shown in FIG. 11C, feedback 1114a is a repeated of feedback 1112a and feedback 1114b is a repeat of feedback 1112b, telling user 705 to remove their glasses.

Figure 11D:
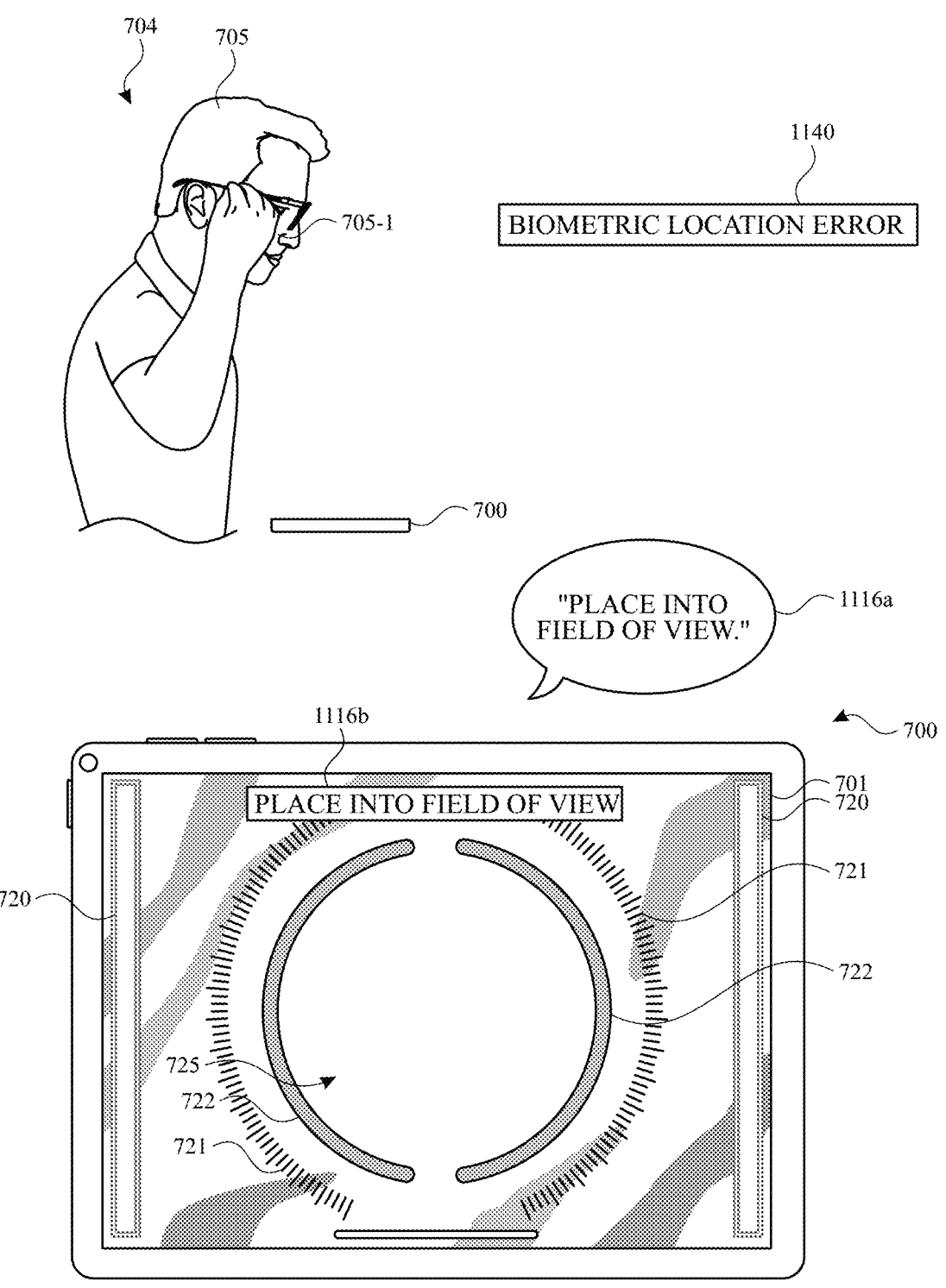

As shown in FIG. 11D, user 705 has placed computer system 700 to free up their hands as they take off their glasses. As a result, the user's face 705-1 is no longer within a field of view of camera 702. In some embodiments, when the user's face 705-1 is not within the field of view of camera 702 after computer system 700 has provided feedback to fix an error, computer system 700 delays providing additional feedback until the user's face 705-1 is at least partially back into the field of view of camera 702 (e.g., feedback 1116a-

1116*b* would not be provided). In some embodiments, as shown in FIG. 11D, computer system 700 provides a delay after providing feedback 1114*a*-1114*b* before providing additional feedback (e.g., 1116*a*-1116*b*).

At FIG. 11D, computer system 700 is detecting a single enrollment error condition, a biometric location error condition based on the user's face 705-1 not being within the field of view of camera 702. In response, computer system 700 provides user 705 with feedback to fix the biometric location error condition. As shown in FIG. 11D, the feedback includes verbal feedback 1116*a* and displayed textual feedback 1116*b*, telling user 705 to come into the field of view of computer system 700.

Figure 11E:
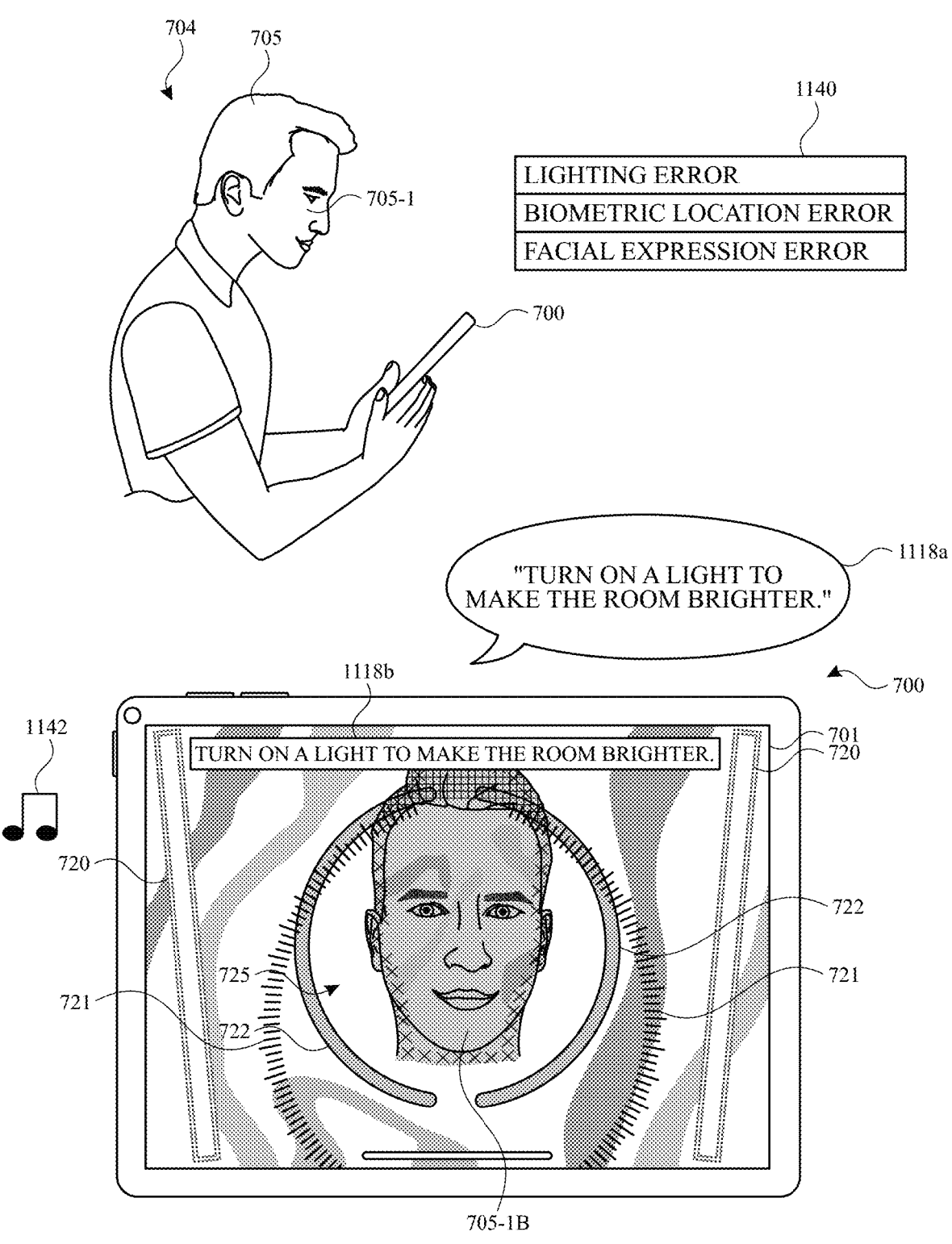

At FIG. 11E, user 705 has removed their glasses and picked up computer system 700. Accordingly, user 705 is back in a field of view of camera 702. In response to detecting that user 705 is no longer wearing glasses and, that therefore the facial covering error condition is no longer occurring, computer system 700 outputs success audio 1142 (e.g., a "ding" sound and/or a tone) to indicate that the error has been resolved. At FIG. 11E, although the facial covering error condition is no longer detected, computer system 700 is detecting multiple enrollment error conditions, listed in table 1140 for case of reference.

In particular, computer system 700 is detecting three concurrent enrollment error conditions: lighting error condition, biometric location error condition, and facial expression error condition, with the lighting error condition being the highest priority. In response to computer system 700 detecting the three concurrent enrollment error conditions and based on the lighting error condition being the highest priority of the three enrollment error conditions, computer system 700 provides user 705 with feedback to fix the lighting error condition without providing feedback to fix the biometric location error condition or the facial expression error condition. As shown in FIG. 11E, the feedback includes verbal feedback 1118*a* and displayed textual feedback 1118*b* telling user 705 to make the room brighter.

In some embodiments, as illustrated in FIG. 11F, when a set of one or more conditions is met, computer system 700 ceases displaying outer flares 720, inner flares 721, and/or target indicator 722. In some embodiments, when the set of one or more conditions is met, computer system 700 restarts the biometric enrollment process. In some embodiments, the set of one or more conditions includes a condition that is met when computer system 700 has detected more than a threshold number of errors (e.g., concurrent or consecutive) during the biometric enrollment process. As shown in FIG. 11F, the biometric enrollment process restarts. In some embodiments, user 705 has opted to skip one or more portions of the biometric enrollment process and, at FIG. 11F, has restarted the biometric enrollment process to complete those previously skipped portions.

Figure 11G:
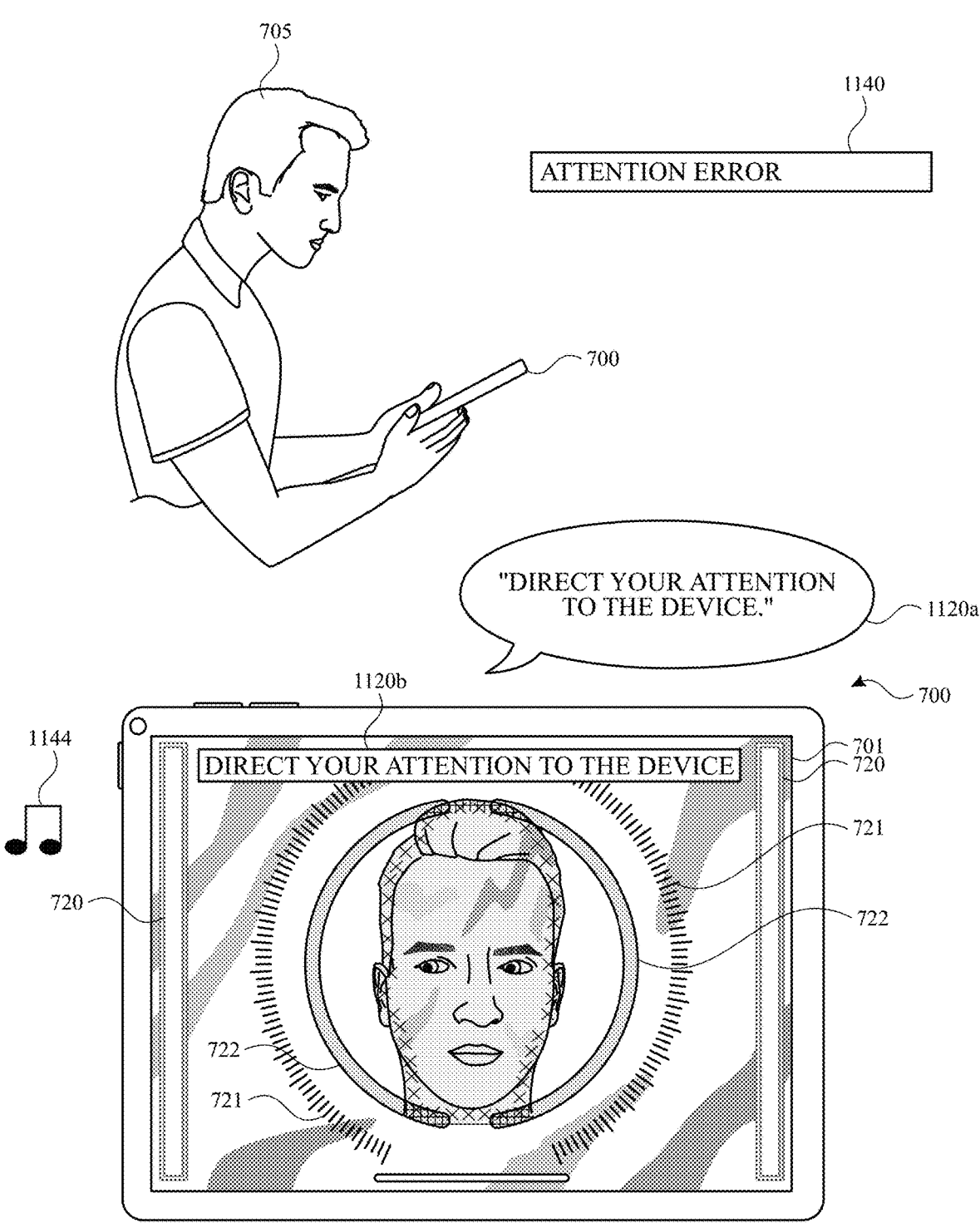

At FIG. 11G, user 705 has turned on a light in physical environment 704, causing the lighting error condition to be fixed (e.g., as shown by the brighter representation 705-1*b* of the user's face 705-1). In some embodiments, FIG. 11G is a continuation from FIG. 11E, and in response to detecting that there is sufficient light and, that therefore the lighting error condition is no longer occurring, computer system 700 outputs success audio 1144 (e.g., a "ding" sound and/or a tone, same as or different from 1142) to indicate that the error has been resolved. In addition to the lighting error condition being resolved, computer system 700 detects that the representation 705-1*b* of the user's face 705-1 is within target area 725 (resolving the biometric location error condition) and user 705 has a neutral facial expression (resolving the facial expression error condition). For example, user 705 getting up to turn on a light also allowed user 705 to reposition their face with respect to computer system 700, thereby resolving multiple errors without the need for computer system 700 to output feedback for each of the errors.

At FIG. 11G, although the lighting error condition, biometric location error condition, and facial expression error condition are no longer detected, computer system 700 is detecting an attention enrollment error condition, listed in table 1140 for case of reference. The attention enrollment error condition occurs when the user's attention is not directed to computer system 700 (e.g., when the user's attention should be directed to computer system 700). In response to computer system 700 detecting the attention error condition and based on the attention error condition being the highest priority (e.g., the only enrollment error condition) of the enrollment error conditions, computer system 700 provides user 705 with feedback to fix the attention error condition. As shown in FIG. 11G, the feedback includes verbal feedback 1120*a* and displayed textual feedback 1120*b* telling user 705 to direct their attention to computer system 700.

Figure 11H:
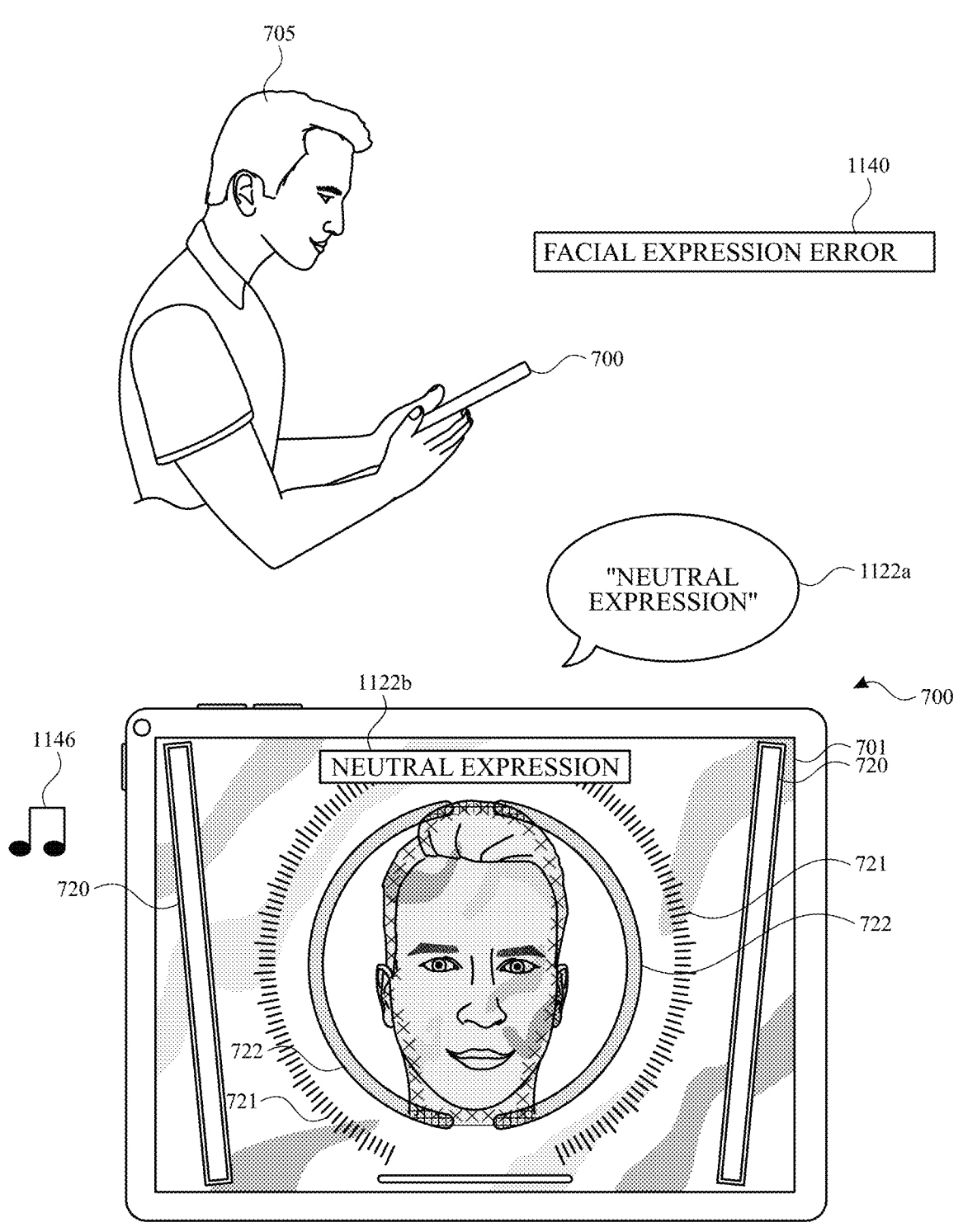

At FIG. 11H, user 705 is directing their attention to computer system 700 but is not maintaining a neutral facial expression (e.g., is smiling), as needed for this portion of the biometric enrollment process. In response to detecting that the user is looking at computer system 700, and that therefore the attention error condition is no longer occurring, computer system 700 outputs success audio 1146 (e.g., a "ding" sound and/or a tone, same as or different from 1142-1144) to indicate that the attention error condition has been resolved. In response to computer system 700 detecting the facial expression error condition and based on the facial expression error condition being the highest priority (e.g., the only enrollment error condition) of the enrollment error conditions, computer system 700 provides user 705 with feedback to fix the facial expression error condition. As shown in FIG. 11H, the feedback includes verbal feedback 1122*a* and displayed textual feedback 1122*b* telling user 705 to maintain a neutral facial expression.

In the embodiments depicted in FIGS. 11A-11H, the biometric enrollment process is performed using computer system 700. However, it should be appreciated that the biometric enrollment process can be performed using other computer systems such as, for example, an HMD. For example, FIG. 11I depicts the embodiment shown in FIG. 11H as it would appear if the biometric enrollment process were to be performed using HMD 750 instead of computer system 700. HMD 750 is a head-mounted device that can be worn and can be used by user 705 to perform the biometric enrollment process described above with respect to FIGS. 11A-11H and, in some embodiments, to experience an XR session (e.g., an XR environment). HMD 750 includes display 751, which is used to display the biometric enrollment process in a manner analogous to display 701. In some embodiments, display 751 is a curved lenticular display (e.g., similar to display assembly 3-100 in FIG. 1G, including lenticular lens array 3-110). HMD 750 also includes camera 752, which is used for the biometric enrollment process in a manner analogous to camera 702. The user holds HMD 750 and HMD 750 provides feedback to the user about biometric enrollment error conditions that are occurring, such as by HMD 750 detecting multiple concurrent enrollment error conditions and providing feedback for the highest priority enrollment error condition, without providing feedback for lower priority enrollment error conditions. For the sake of brevity, details about the process are not repeated.

In some embodiments, the techniques and user interfaces described in FIGS. 11A-11H are provided by one or more of the devices described in FIGS. 1A-IP. For example, FIG. 11I2 depicts the embodiment shown in FIG. 11H as it would appear if the biometric enrollment process were to be performed using HMD 1-100 instead of computer system 700. HMD 1-100 is a head-mounted device that can be worn and can be used by user 705 to perform the biometric enrollment process described above with respect to FIGS. 11A-11H and, in some embodiments, to experience an XR session (e.g., an XR environment). HMD 1-100 includes display unit 1-102, which is used to display the biometric enrollment process in a manner analogous to display 701. In some embodiments, HMD 1-100 includes a curved lenticular display (e.g., similar to display assembly 3-100 in FIG. 1G, including lenticular lens array 3-110). HMD 1-100 also includes sensors, which are used for the biometric enrollment process in a manner analogous to camera 702. The user holds HMD 1-100 and HMD 1-100 provides feedback to the user about biometric enrollment error conditions that are occurring, such as by HMD 1-100 detecting multiple concurrent enrollment error conditions and providing feedback for the highest priority enrollment error condition, without providing feedback for lower priority enrollment error conditions. For the sake of brevity, details about the process are not repeated.

FIG. 11I3 depicts the embodiment shown in FIG. 11H as it would appear if the biometric enrollment process were to be performed using HMD 6-200 instead of computer system 700. HMD 6-200 is a head-mounted device that can be worn and can be used by user 705 to perform the biometric enrollment process described above with respect to FIGS. 11A-11H and, in some embodiments, to experience an XR session (e.g., an XR environment). HMD 6-200 includes display area 6-232, which is used to display the biometric enrollment process in a manner analogous to display 701. In some embodiments, HMD 6-200 includes a curved lenticular display (e.g., similar to display assembly 3-100 in FIG. 1G, including lenticular lens array 3-110). HMD 6-200 also includes cameras 6-118, which are used for the biometric enrollment process in a manner analogous to camera 702. The user holds HMD 6-200 and HMD 6-200 provides feedback to the user about biometric enrollment error conditions that are occurring, such as by HMD 6-200 detecting multiple concurrent enrollment error conditions and providing feedback for the highest priority enrollment error condition, without providing feedback for lower priority enrollment error conditions. For the sake of brevity, details about the process are not repeated.

Additional descriptions regarding FIGS. 11A-11I3 are provided below in reference to method 1200 described with respect to FIG. 12.

FIG. 12 is a flow diagram of methods of providing feedback about fixing one or more enrollment error conditions, in some embodiments. In some embodiments, method 1200 is performed at a computer system (e.g., computer system 101 in FIG. 1A, computer system 700 in FIGS. 11A-11H, HMD 750 in FIG. 11I1, HMD 1-100 in FIG. 11I2, and/or HMD 6-200 in FIG. 11I3) (e.g., a smartphone, a smartwatch, a tablet computer, a desktop computer, a laptop computer, and/or a head-mounted device (e.g., a head-mounted augmented reality and/or extended reality device)) that is in communication with (e.g., includes and/or is connected to) a set of one or more display generation components (e.g., 701, 751, 1-102, and/or 6-232) (e.g., a visual output device, a 3D display, a display having at least a portion that is transparent or translucent on which images can be projected (e.g., a see-through display), a display, a display controller, a monitor, a touch-sensitive display system, a display screen, a projector, a holographic display, a lenticular display (e.g., display assembly 3-100 and/or lenticular lens array 3-110) (e.g., a curved lenticular display), and/or a head-mounted display system) (and, optionally, one or more cameras (e.g., an infrared camera, a depth camera, and/or a visible light camera) and/or one or more audio output devices).

In some embodiments, the computer system is a head-mounted device (e.g., 750, 1-100, and/or 6-200) and the display generation component (e.g., 751, 1-102, and/or 6-232) is configured to be viewed by the user (e.g., 705) when the head-mounted device is not placed on the head of the user and/or over the eyes of the user and/or the display generation component is not configured to be viewed by the user when the head-mounted device is placed on the head of the user and/or over the eyes of the user (e.g., the display generation component is not a primary display for displaying user interfaces of the computer system while the computer system is in use). In some embodiments, the user interfaces described herein are optionally displayed on a lenticular display (e.g., display assembly 3-100 and/or lenticular lens array 3-110) (optionally a curved lenticular display) where different sections of the lenticular display (e.g., 3-110) show different views of the user interface elements based on the perspective from which the user interface elements are being displayed. For example, as the viewpoint of the user changes relative to the lenticular display, different sections of the display will become visible, and these different sections show the user different views of the user interface that have a different appearance that corresponds to the user's viewing angle. In some embodiments, this creates a three-dimensional effect as the user's viewing angle shifts (e.g., due to the display being moved and/or due to the user moving relative to the display). In some embodiments, method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A), 700, 750, 1-100, and/or 6-200. Some operations in method 1200 are, optionally, combined and/or the order of some operations is, optionally, changed.

During a biometric enrollment process (1202) (e.g., a process that includes capturing biometric data (e.g., image data, sensor data, and/or depth data) indicative of a size, shape, position, pose, color, depth and/or other characteristic of one or more body parts and/or features of body parts of a user) that includes capturing (e.g., via the one or more cameras and/or other sensors) information (e.g., data and/or images) about a biometric feature (e.g., 705-1) of a person (e.g., 705) (e.g., a user of the computer system, such as a person that is holding, operating, logged into, and/or otherwise associated with the computer system) and while a plurality of enrollment error conditions (e.g., 1140 at FIG. 11B) are concurrently occurring (e.g., while the plurality of enrollment error conditions are concurrently detected), including a first enrollment error condition and a second enrollment error condition different from the first enrollment error condition (e.g., the computer system determines that the first enrollment error condition and the second enrollment error condition are concurrently occurring), the computer system (e.g., 700, 750, 1-100, and/or 6-200) provides

(1204) feedback about fixing one or more enrollment error conditions, including, in accordance with a determination that the first enrollment error condition is a higher priority error than the second enrollment error condition (e.g., the first enrollment error condition is the highest priority error from among the plurality of enrollment error conditions), the computer system (e.g., 700, 750, 1-100, and/or 6-200) outputs (1206) (e.g., via the one or more audio output devices, one or more speakers, and/or headphones) feedback (e.g., 1112a) (e.g., a first verbal prompt) to fix the first enrollment error condition (e.g., corresponding to how to fix and/or corresponding to fix) without outputting feedback (e.g., 1118a) (e.g., a second verbal prompt that is different from the first verbal prompt) to fix the second enrollment error condition, and in accordance with a determination that the second enrollment error condition is a higher priority error than the first enrollment error condition (e.g., the second enrollment error condition is the highest priority error from among the plurality of enrollment error conditions), the computer system (e.g., 700, 750, 1-100, and/or 6-200) outputs (1208) (e.g., via the one or more audio output devices, one or more speakers, and/or headphones) feedback (e.g., 1118a) (e.g., a second verbal prompt) to fix the second enrollment error condition (e.g., corresponding to how to fix and/or corresponding to fix) without outputting feedback (e.g., 1112a) (e.g., the first verbal prompt) to fix the first enrollment error condition. Prioritizing different enrollment error conditions enables the computer system to provide the user with feedback to correct/mitigate more important error conditions before providing the user with feedback about less important error conditions.

In some embodiments, the first enrollment error condition and the second enrollment error condition are error conditions listed in the following table, which lists exemplary enrollment error conditions in priority order. An enrollment error condition, when listed higher in the table, is higher priority as compared to another enrollment error condition. For example, when two enrollment error conditions (e.g., lighting error condition and occlusion error condition) from the following table are concurrently occurring, the computer system (e.g., 700, 750, 1-100, and/or 6-200) outputs feedback for the higher priority (e.g., priority #2) enrollment error condition (e.g., lighting error condition) without outputting feedback for the lower priority (e.g., priority #5) enrollment error condition (e.g., occlusion error condition).

| Enrollment Error Condition | Priority |
|---|---|
| facial covering error condition | 1 |
| lighting error condition | 2 |
| biometric location error condition | 3 |
| biometric tilt error condition | 4 |
| occlusion error condition | 5 |
| facial expression error condition | 6 |
| attention error condition | 7 |
| posture error condition | 8 |

It should be understood that the error conditions listed in the table above are one example of a set of relative priorities between enrollment error conditions. In some embodiments, one or more error conditions is removed from this list. In some embodiments, one or more error conditions is added to this list. In some embodiments, the order of priority of one or more error conditions is changed.

In some embodiments, the plurality of enrollment error conditions (e.g., 1140) include: an attention error condition that occurs when (e.g., the computer system detects that) an attention of a user (e.g., 705, as in FIG. 11G) of the computer system (e.g., 700, 750, 1-100, and/or 6-200) is not being directed to the computer system (e.g., 700, 750, 1-100, and/or 6-200) (e.g., to a display of the computer system and/or to a particular user interface element) and a posture error condition that occurs when (e.g., the computer system detects that) a posture of the user (e.g., 705) does not meet a set of one or more posture conditions (e.g., the user's position is outside of a range of acceptable positions). In some embodiments, the attention error condition is a higher priority error than the posture error condition. Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, the plurality of enrollment error conditions (e.g., 1140) include: an attention error condition that occurs when (e.g., the computer system detects that) an attention of a user (e.g., 705 at FIG. 11G) of the computer system is not being directed to the computer system (e.g., to a display of the computer system and/or to a particular user interface element) and a facial expression error condition that occurs when (e.g., the computer system detects that) a facial expression of the user (e.g., 705 at FIG. 11B, FIG. 1111, FIG. 11I2, and/or FIG. 11I3) does not meet a set of one or more facial expression conditions (e.g., the user's facial expression is outside of a range of acceptable expressions, the user is not smiling, the user does not have a neutral facial expression, the user is not raising their eyebrows, and/or the user's teeth are not visible). In some embodiments, the facial expression error condition is a higher priority error than the attention error condition (e.g., instructions for correcting the facial expression error condition are provided before instructions for correcting the attention error condition in the same way that instructions for correcting the first error condition are provided before instructions for correcting the second error condition are provided). In some embodiments, the user's facial expression not meeting the one or more facial expression conditions is optionally also a higher priority error than the attention of the user not being directed to the computer system. Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, the set of one or more facial expression conditions includes a condition that is met when the user has a neutral facial expression (e.g., met at FIG. 11G when user 705 has a neutral facial expression, not met at FIG. 11H when user is smiling) (e.g., during an initial portion of the biometric enrollment process). In some embodiments, the facial expression error condition occurs when (e.g., the computer system detects that) a facial expression of the user is not a neutral facial expression (e.g., during an initial and/or first portion of the biometric enrollment process). Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, the set of one or more facial expression conditions includes a condition that is met when the user (e.g., 705) exhibits one or more requested (e.g., identified to the user by the computer system via audio and/or visual output) facial expressions (e.g., smiling, frowning, raising eyebrows, and/or showing teeth) (e.g., during a secondary portion of the biometric enrollment process). In some embodiments, the second enrollment error condition occurs when (e.g., the computer system detects that) a facial expression of the user does not match a requested facial expression (e.g., during a secondary portion of the biometric enrollment process). Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, the plurality of enrollment error conditions (e.g., 1140) include: an occlusion error condition that occurs when (e.g., the computer system detects that) hair (e.g., head hair) of a user (e.g., 705) of the computer system (e.g., 700, 750, 1-100, and/or 6-200) is occluding (e.g., preventing a camera (e.g., 702, 752, and/or 6-118) of the computer system from detecting a portion of and/or more than a defined percentage of) a face of the user and a facial expression error condition that occurs when (e.g., the computer system detects that) a facial expression of the user (e.g., 705 at FIG. 11B, FIG. 11I1, FIG. 11I2, and/or FIG. 11I3) does not meet a set of one or more facial expression conditions (e.g., the user's facial expression is outside of a range of acceptable expressions, the user is not smiling, the user does not have a neutral facial expression, and/or the user's teeth are not visible). In some embodiments, the occlusion error condition is a higher priority error than the facial expression error condition (e.g., instructions for correcting the occlusion error condition are provided before instructions for correcting the facial expression error condition in the same way that instructions for correcting the first error condition are provided before instructions for correcting the second error condition are provided). In some embodiments, the user's hair occluding the user's face is optionally a higher priority error than: the user's facial expression not meeting the one or more facial expression conditions and the attention of the user not being directed to the computer system. Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, the plurality of enrollment error conditions (e.g., 1140) include: an occlusion error condition that occurs when (e.g., the computer system detects that) hair (e.g., head hair) of a user (e.g., 705) of the computer system (e.g., 700, 750, 1-100, and/or 6-200) is occluding (e.g., preventing a camera of the computer system from detecting a portion of and/or more than a defined percentage of) a face (e.g., 705-1) of the user and a biometric tilt error condition that occurs when (e.g., the computer system detects that) a tilt (e.g., tilt up or tilt down) of a biometric feature (e.g., 705-1) of the user (e.g., 705) exceeds a threshold tilt (e.g., a tilt the user's face and/or head within a field of view of one or more sensors (e.g., cameras) and/or relative to a body of the user). In some embodiments, the biometric tilt error condition is a higher priority error than the occlusion error condition (e.g., instructions for correcting the biometric tilt error condition are provided before instructions for correcting the occlusion error condition in the same way that instructions for correcting the first error condition are provided before instructions for correcting the second error condition are provided). In some embodiments, the tilt of the biometric feature of the user exceeding the threshold tilt is optionally a higher priority error than: the user's hair occluding the user's face, the user's facial expression not meeting the one or more facial expression conditions, and the attention of the user not being directed to the computer system. Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, the plurality of enrollment error conditions (e.g., 1140) include: a biometric location error condition that occurs when (e.g., the computer system detects that) a location of a biometric feature (e.g., 705-1) (e.g., face, eye, iris, nose, and/or ear) of a user (e.g., 705) of the computer system (e.g., 700, 750, 1-100, and/or 6-200) is outside of a defined location (e.g., 725 as shown in FIG. 11C) of (e.g., outside of a defined box within or outside of a defined circle within) a field of view of a sensor (e.g., 702, 752, and/or 6-118) (e.g., a camera sensor, a depth sensor, a biometric sensor) a biometric tilt error condition that occurs when (e.g., the computer system detects that) a tilt (e.g., tilt up or tilt down) of a biometric feature (e.g., 705-1) of the user (e.g., 705) exceeds a threshold tilt (e.g., a tilt of the user's face and/or head within a field of view of one or more cameras and/or relative to a body of the user). In some embodiments, the biometric location error condition is a higher priority error than the biometric tilt error condition (e.g., instructions for correcting the biometric location error condition are provided before instructions for correcting the biometric tilt error condition in the same way that instructions for correcting the first error condition are provided before instructions for correcting the second error condition are provided). In some embodiments, the location of the biometric feature of the user being at the location within the field of view of the sensor is optionally a higher priority error than: the tilt of the biometric feature of the user exceeding the threshold tilt, the user's hair occluding the user's face, the user's facial expression not meeting the one or more facial expression conditions, and the attention of the user not being directed to the computer system. Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, the plurality of enrollment error conditions (e.g., 1140) include: a biometric location error condition that occurs when (e.g., the computer system detects that) a location of a biometric feature (e.g., 705-1) (e.g., face, eye, iris, nose, and/or ear) of a user (e.g., 705) of the computer system (e.g., 700, 750, 1-100, and/or 6-200) is outside of a defined location (e.g., 725) of (e.g., outside of a defined box within or outside of a defined circle within) a field of view of a sensor (e.g., 702, 752, and/or 6-118) (e.g., a camera sensor, a depth sensor, a biometric sensor) and a lighting error condition that occurs when (e.g., the computer system detects that) a lighting condition (e.g., an amount of ambient light) does not meet a lighting condition threshold (e.g., not met FIG. 11F, met in FIG. 11G) (e.g., the amount of ambient light is below a first threshold amount or the amount of light exceeds a second threshold amount). In some embodiments, the lighting error condition is a higher priority error than the biometric location error condition (e.g., instructions for correcting the lighting error condition are provided before instructions for correcting the biometric location error condition in the same way that instructions for correcting the first error condition are provided before instructions for correcting the second error condition are provided). In some embodiments, the lighting conditions not meeting the lighting condition threshold is optionally a higher priority error than: the location of the biometric feature of the user being at the location within the field of view of the sensor, the tilt of the biometric feature of the user exceeding the threshold tilt, the user's hair occluding the user's face, the user's facial expression not meeting the one or more facial expression conditions, and the attention of the user not being directed to the computer system. Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, the plurality of enrollment error conditions (e.g., 1140) include: a facial covering error condition that occurs when (e.g., the computer system detects that) a facial covering (e.g., glasses, sunglasses, and/or a mask) is covering (as shown in FIG. 11B) (e.g., occluding a view of a sensor) a biometric feature (e.g., 705-1) (e.g., face, eye, iris, nose, and/or ear) of a user (e.g., 705) of the computer system (e.g., 700, 750, 1-100, and/or 6-200) and a lighting error condition that occurs when (e.g., the computer system detects that) a lighting condition (e.g., an amount of ambient light) does not meet a lighting condition threshold (e.g., not met FIG. 11F, met in FIG. 11G) (e.g., the amount of ambient light is below a first threshold amount or the amount of light exceeds a second threshold amount). In some embodiments, the facial covering error condition is a higher priority error than the lighting error condition (e.g., instructions for correcting the facial covering error condition are provided before instructions for correcting the lighting error condition in the same way that instructions for correcting the first error condition are provided before instructions for correcting the second error condition are provided). In some embodiments, a biometric feature of the user being obstructed/covered by a facial covering is optionally a higher priority error than: the lighting conditions not meeting the lighting condition threshold, the location of the biometric feature of the user being at the location within the field of view of the sensor, the tilt of the biometric feature of the user exceeding the threshold tilt, the user's hair occluding the user's face, the user's facial expression not meeting the one or more facial expression conditions, and the attention of the user not being directed to the computer system. Prioritizing different enrollment error conditions enables the computer system to provide the user with feedback to correct/mitigate more important error conditions before providing the user with feedback about less important error conditions and also avoids confusing the user by giving too many conflicting instructions. Additionally, the error conditions are optionally ordered so that it is more likely that lower priority error conditions are fixed while fixing higher priority error conditions.

In some embodiments, subsequent to providing feedback about fixing one or more enrollment error conditions, the computer system (e.g., 700, 750, 1-100, and/or 6-200) detects that a respective enrollment error condition of the one or more enrollment error conditions has been fixed (e.g., facial covering error condition fixed in FIG. 11E). In response to detecting that the respective enrollment error condition has been fixed, the computer system (e.g., 700, 750, 1-100, and/or 6-200) outputs audio feedback (e.g., 1142) indicating that the respective enrollment error condition has been corrected (e.g., a chime and/or spoken feedback). In some embodiments, the audio feedback is based on the respective enrollment error condition that was fixed. For example, a first audio feedback is output when a first error condition is corrected and a (different) second audio feedback is output when a second error condition is corrected. In some embodiments the same audio feedback is provided for the correction of multiple different (or all different) error conditions. Providing audio confirmation when an error is corrected provides the user with audio feedback that the error has been corrected, thereby providing improved feedback.

In some embodiments, the first enrollment error condition (e.g., facial covering error condition in FIG. 11C) is a higher priority error than the second enrollment error condition (e.g., lighting error condition in FIG. 11C). After providing feedback (e.g., 1114a) about fixing the one or more enrollment error conditions, including outputting feedback (e.g., feedback that includes a prompt such as a first verbal prompt) to fix the first enrollment error condition without outputting feedback to fix the second enrollment error condition, the computer system (e.g., 700, 750, 1-100, and/or 6-200) detects that the first enrollment error condition is no longer occurring (e.g., is fixed) (at FIG. 11E). After (e.g., in response to) detecting that the first enrollment error condition is no longer occurring and in accordance with a determination that the second enrollment error condition (e.g., the highest remaining occurring enrollment error condition) is occurring (and, optionally, that no other higher priority enrollment errors are occurring), the computer system (e.g., 700, 750, 1-100, and/or 6-200) outputs (e.g., via the one or more audio output devices, one or more speakers, and/or headphones) feedback (e.g., 1118a) (e.g., feedback that includes a prompt such as a second verbal prompt) to fix the second enrollment error condition (e.g., corresponding to how to fix and/or corresponding to fix) (e.g., without outputting feedback (e.g., the first verbal prompt) to fix the first enrollment error condition or another enrollment error condition). Providing feedback to correct a lower priority error after a higher priority error has been corrected provides the user with feedback about the error states of the computer system, thereby providing improved feedback.

In some embodiments, after (e.g., in response to) detecting that the first enrollment error condition is no longer occurring and in accordance with a determination that the second enrollment error condition (e.g., the highest remaining occurring enrollment error condition) is occurring (and, optionally, that no other higher priority enrollment errors are occurring), the computer system (e.g., 700, 750, 1-100, and/or 6-200) delays outputting the feedback (e.g., 1118a) to fix the second enrollment error condition until at least a threshold amount of time (e.g., 0.1, 0.2, 0.5, 1, 2, 5, 10, 15, 30, or 60 seconds) has elapsed since the last feedback (e.g., 1114a and/or 1116a) to fix an enrollment condition was output (e.g., such that the start of the feedback to fix the second enrollment error condition is at least a threshold duration (e.g., 1 second or 2 seconds) after completion of outputting feedback to fix the first enrollment error condition). In some embodiments, if the first enrollment error condition is fixed after less than the threshold duration after the end of the feedback to fix the first enrollment error condition, the computer system adds a delay before outputting the feedback to fix the second enrollment error condition so that the duration between the end of the feedback to fix the first enrollment error condition and the start of the feedback to fix the second enrollment error condition is at least the threshold duration. In some embodiments, the computer system outputs a chime (without introducing a delay) in response to detecting that the first enrollment error condition has been fixed. Providing a delay between instructions for one error and instructions for another error enables the computer system to give the user time to focus their attention on correcting the next task, thereby improving the man-machine interface.

In some embodiments, the plurality of enrollment error conditions that are occurring concurrently with the first enrollment error condition and the second enrollment error condition include a third enrollment error condition (e.g., biometric location error condition as in FIG. 11F) (e.g., that is the next highest priority after the first and second enrollment error conditions) that is different from the first enrollment error condition and the second enrollment error condition. After providing feedback about fixing the one or more enrollment error conditions, including outputting feedback (e.g., a verbal prompt) to fix the first enrollment error condition and the second enrollment error condition, the computer system (e.g., 700, 750, 1-100, and/or 6-200) detects that the third enrollment error condition is no longer occurring (e.g., as in FIG. 11G) (e.g., was fixed when the user fixed the first enrollment error condition or the second enrollment error condition) and the computer system (e.g., 700, 750, 1-100, and/or 6-200) forgoes outputting (e.g., via the one or more audio output devices, one or more speakers, and/or headphones) feedback to fix the third enrollment error condition (e.g., corresponding to how to fix and/or corresponding to fix). In some embodiments, after providing feedback about fixing the one or more enrollment error conditions, the computer system outputs feedback about fixing another (e.g., currently occurring) error condition, such as a lower priority error condition that is still occurring after the first enrollment error condition, the second enrollment error condition, and the third enrollment error condition have been corrected, without outputting the feedback to fix the third enrollment error condition (e.g., since the computer system has detected that the third enrollment error condition is no longer occurring). In some embodiments, the third enrollment error condition is one of: the attention error condition, the facial expression error condition, the occlusion error condition, the biometric tilt error condition, the biometric location error condition, the lighting error condition, the facial covering error condition. Skipping providing instructions for errors that are fixed when a higher priority error is fixed reduces the outputs the computer system provides and reduces the need for the user to provide additional inputs, thereby improving the man-machine interface.

In some embodiments, after providing feedback (e.g., 1112a) about fixing the one or more enrollment error conditions, including outputting feedback (e.g., a first verbal prompt) to fix the first enrollment error condition without outputting feedback to fix the second enrollment error condition, the computer system (e.g., 700, 750, 1-100, and/or 6-200) detects, after a delay period (e.g., 0.2 seconds, 0.5 seconds, 1 second, 2 seconds, 5 seconds, 10 seconds, 15 seconds, 30 seconds, 60 seconds, or 90 seconds), that the first enrollment error condition is occurring (e.g., is not fixed and continues to occur) (e.g., as in FIG. 11C). In response to detecting that the first enrollment error condition is occurring after the delay period, the computer system (e.g., 700, 750, 1-100, and/or 6-200) outputs (as in FIG. 11C) (e.g., via the one or more audio output devices, one or more speakers, and/or headphones) additional feedback (e.g., 1114a) (e.g., repeating the first verbal prompt or outputting a variation on the first verbal prompt) to fix the first enrollment error condition (e.g., corresponding to how to fix and/or corresponding to fix) without outputting feedback (e.g., the second verbal prompt) to fix the second enrollment error condition. Outputting additional feedback to fix the error provides the user with additional feedback about the error, thereby providing improved feedback.

In some embodiments, the delay period (e.g., 0.2 seconds, 0.5 seconds, 1 second, 2 seconds, 5 seconds, 10 seconds, 15 seconds, 30 seconds, 60 seconds, or 90 seconds) for outputting additional feedback (e.g., 1114a) to fix an enrollment error condition for which prior feedback (e.g., 1112a) to fix has been provided is longer than a delay (e.g., 0.1 seconds, 0.2 seconds, 1 second, 2 seconds, 5 seconds, 10 seconds, 15 seconds, 30 seconds, or 60 seconds) between an end of feedback to fix a previous enrollment error condition and a start of feedback to fix a next enrollment error condition. In some embodiments, the delay between repeating prompts to fix the same error condition is longer than the delay between prompts to fix different error conditions. Providing delay between repeats of outputs that is longer than outputs for correcting different errors provides the user with additional time to correct the error condition, thereby improving the man-machine interface.

In some embodiments, the delay period is a first delay period (e.g., as in FIG. 11C) (e.g., 0.2 seconds, 0.5 seconds, 1 second, 2 seconds, 5 seconds, 10 seconds, 15 seconds, 30 seconds, or 60 seconds) when a respective enrollment error condition is a first respective enrollment error condition the delay period is a second delay period (e.g., as in FIG. 11E) (e.g., 0.5 seconds, 1 second, 2 seconds, 5 seconds, 10 seconds, 15 seconds, 30 seconds, 60 seconds, or 90 seconds), different from the first delay period, when the respective enrollment error condition is a second respective enrollment error condition that is different from the first respective enrollment error conditions. In some embodiments, the computer system provides different lengths of delay period for different types of error conditions (e.g., longer delay for more complicated corrections such as moving a head of the user in a particular pattern or changing a facial expression than for simpler corrections such as moving the computer system relative to the user). Providing different lengths of delay between repeats of outputs for different types of error conditions provides the user with additional time to correct more complex error conditions without slowing the process for less complex error conditions, thereby improving the man-machine interface.

In some embodiments, the delay period for outputting additional feedback (e.g., 1118a) continues (e.g., the computer system does not output 1116a at FIG. 11D) until a user of the computer system (e.g., 700) is within a field of view of one of more sensors (e.g., 702, 752, and/or 6-118) (e.g., camera sensor and/or depth sensor) of the computer system (e.g., 700, 750, 1-100, and/or 6-200). In some embodiments, while the user is fixing an error condition that involves the computer system ceasing to detect the user (e.g., the user puts the device down so that the user can remove their glasses), the computer system delays outputting the next feedback until user is detected again. Delaying the next feedback to the user while the user is not detected by the one or more sensors provides the user with additional time to fix the error condition before the computer system attempts to provide additional feedback, thereby improving the man-machine interface.

In some embodiments, after outputting additional feedback (e.g., 1114a) to fix the first enrollment error condition, the computer system (e.g., 700, 750, 1-100, and/or 6-200) detects, after a subsequent delay period (e.g., 0.1 seconds, 5 seconds, 8 seconds, 10 seconds, 15 seconds, 45 seconds, 90 seconds, or 120 seconds), that the first enrollment error condition is occurring (e.g., is still not fixed and continues to occur). In response to detecting that the first enrollment error condition is occurring after the subsequent delay period and in accordance with a determination that a current segment of the biometric enrollment process is an optional segment, the computer system (e.g., 700, 750, 1-100, and/or 6-200) outputs (e.g., via the one or more audio output devices, one or more speakers, and/or headphones) feedback (e.g., verbal prompt) that the current segment of the biometric enrollment process can be skipped. Providing the user with feedback that a segment of the biometric enrollment process can be skipped enables the user to progress the enrollment process without need to resolve the error condition, thereby improving the man-machine interface.

In some embodiments, in response to detecting that the first enrollment error condition is occurring after the subsequent delay period and in accordance with a determination that the current segment of the biometric enrollment process is not an optional segment (e.g., at FIGS. 11C-11D), the computer system (e.g., 700, 750, 1-100, and/or 6-200) forgoes outputting (e.g., via the one or more audio output devices, one or more speakers, and/or headphones) feedback (e.g., verbal prompt) that the current segment of the biometric enrollment process can be skipped. Not providing the user with feedback that a segment of the biometric enrollment process can be skipped when that segment is not skip-able allows the user to focus on resolving the error condition, thereby improving the man-machine interface.

In some embodiments, subsequent to outputting feedback that the current segment of the biometric enrollment process can be skipped, the computer system (e.g., 700, 750, 1-100, and/or 6-200) detects a request (e.g., from the user) (e.g., press of a hardware button of the computer system) to skip the current segment of the biometric enrollment process (e.g., had the user requested to skip the segment at FIG. 11H, FIG. 11I1, FIG. 11I2, and/or FIG. 11I3). In response to detecting the request to skip the current segment of the biometric enrollment process, the computer system (e.g., 700, 750, 1-100, and/or 6-200) proceeds to a different segment of the biometric enrollment process without completing the current segment of the biometric enrollment process. In some embodiments, a user input (e.g., press of a hardware button of the computer system) is required to skip the current segment. In some embodiments, the computer system receives user input and, in response, returns to a skipped segment of the biometric enrollment process (e.g., by revisiting the skipped segment(s) or re-starting the enrollment process). Requiring additional user input to skip the segment enables the computer system to give the user an opportunity to resolve the error condition or, if the user prefers, to skip the segment, thereby providing an improved man-machine interface.

In some embodiments, after outputting additional feedback (e.g., 1114a) to fix the first enrollment error condition, the computer system (e.g., 700, 750, 1-100, and/or 6-200) detects, after a respective delay period (e.g., 0.2 seconds, 1 seconds, 2 seconds, 5 seconds, 10 seconds, 12 seconds, 40 seconds, 100 seconds, or 150 seconds), that the first enrollment error condition is occurring (e.g., is still not fixed and continues to occur). In response to detecting that the first enrollment error condition is occurring after the respective delay period (e.g., before outputting feedback that the current segment of the biometric enrollment process can be skipped), the computer system (e.g., 700, 750, 1-100, and/or 6-200) outputs (e.g., via the one or more audio output devices, one or more speakers, and/or headphones) feedback (e.g., verbal prompt) prompting a user of the computer system to place the computer system in a particular orientation relative to a portion of a body of the user (e.g., the computer system is a headset and the feedback prompts the user to place the headset back on the user's head) in order to receive additional guidance (e.g., on how to fix the first enrollment error condition). In some embodiments, placing the computer system in the particular orientation relative to the portion of the body of the user enables the user to view a display (e.g., an internal display of a headset) of the computer system. Prompting the user to wear the computer system enables the computer system to provide the user with additional (more detailed and/or different) guidance on how to resolve the error condition, thereby providing an improved man-machine interface.

In some embodiments, after outputting feedback prompting the user (e.g., 705) of the computer system (e.g., 700, 750, 1-100, and/or 6-200) to wear the computer system (e.g., 700, 750, 1-100, and/or 6-200) for more guidance, the computer system (e.g., 700, 750, 1-100, and/or 6-200) detects that the computer system is being worn. In response to detecting that the computer system is being worn, the computer system (e.g., 700, 750, 1-100, and/or 6-200) provides (e.g., via audio output and/or visual output, while the computer system is being worn by the user) guidance on how the user (e.g., 705) can fix the first enrollment error condition. After providing guidance on how the user can fix the first enrollment error condition, the computer system (e.g., 700, 750, 1-100, and/or 6-200) proceeds with the biometric enrollment process (e.g., after detecting that the computer system has been removed from a head of the user and/or detecting that the computer system is no longer being worn). In some embodiments, the computer system provides the user with more guidance on how to overcome the enrollment error while the user is wearing the headset, the user then removes the headset, and the computer system picks up again where the enrollment process previously left off (when the user put the headset on). Proceeding with the biometric enrollment process after the user ceases wearing the computer system enables the computer system to continue with the enrollment process to collect biometric information about the user.

In some embodiments, in response to detecting that the computer system (e.g., 700, 750, 1-100, and/or 6-200) is being worn, the computer system (e.g., 700, 750, 1-100, and/or 6-200) provides (e.g., via audio output and/or visual output, while the computer system is being worn by the user) an option (e.g., a displayed selectable button) to skip a current segment of the biometric enrollment process. The computer system (e.g., 700, 750, 1-100, and/or 6-200) detects activation of the option to skip the current segment and, in response to detecting activation of the option to skip the current segment, the computer system (e.g., 700, 750, 1-100, and/or 6-200) skips the current segment of the biometric enrollment process. Providing the user with an option to skip the current segment of the biometric enrollment process enables the user to proceed with the enrollment process without resolving the enrollment error condition, thereby allowing the enrollment to progress and improving the man-machine interface.

In some embodiments, the plurality of enrollment error conditions (e.g., 1140) include a third enrollment error condition that is different from the first enrollment error condition and the second enrollment error condition. In some embodiments, providing feedback about fixing one or more enrollment error conditions includes in accordance with the determination that the first enrollment error condition is a higher priority error than the second enrollment error condition (e.g., the first enrollment error condition is the highest priority error from among the plurality of enrollment error conditions), the computer system (e.g., 700, 750, 1-100, and/or 6-200) outputs (e.g., via the one or more audio output devices, one or more speakers, and/or headphones) feedback (e.g., a first verbal prompt) to fix the third enrollment error condition (e.g., corresponding to how to fix and/or corresponding to fix). Thus, in some embodiments, the computer system outputs feedback in the form of compound instructions to fix multiple errors (e.g., "Raise the computer system and lower your head"). Providing compound instructions to the user enables the user to concurrently correct two enrollment error conditions, thereby reducing the number of interactions required with the computer system and improving the man-machine interface.

In some embodiments, the computer system (e.g., 700, 750, 1-100, and/or 6-200) outputs feedback to fix the first enrollment error condition includes outputting first verbal feedback (e.g., 1112a and/or 1114a) (e.g., telling the user how to fix the error that is optionally provided in conjunction with visual feedback on how to fix the error) and outputting feedback to fix the second enrollment error condition includes outputting second verbal feedback (e.g., 1116a and/or 1118a) (e.g., telling the user how to fix the error that is optionally provided in conjunction with visual feedback on how to fix the error). In some embodiments, outputting feedback to fix the third enrollment error includes outputting third verbal feedback. Providing verbal feedback to the user enables the computer system to give the user feedback even when the user is not looking at the computer system, thereby providing improved visual feedback.

In some embodiments, the computer system is configured to communicate with one or more display generation components (e.g., 701, 751, 1-102, and/or 6-232). In some embodiments, outputting feedback to fix the first enrollment error condition includes outputting, via the one or more display generation components, first visual feedback (e.g.,

1112b, 1114b, 720, 721, and/or 722) (e.g., displayed text, images, animation, and or videos showing the user how to fix the error that is optionally provided in conjunction with verbal feedback on how to fix the error) and outputting feedback to fix the second enrollment error condition includes outputting, via the one or more display generation components (e.g., 701, 751, 1-102, and/or 6-232), second visual feedback (e.g., 1116b, 1118b, 720, 721, and 722) (e.g., displayed text, images, animation, and/or videos). In some embodiments, outputting feedback to fix the third enrollment error condition includes outputting third visual feedback (e.g., displayed text, images, animation, and/or videos showing the user how to fix the error that is optionally provided in conjunction with verbal feedback on how to fix the error). In some embodiments, as described above with respect to FIGS. 7-10, the computer system (e.g., 700, 750, 1-100, and/or 6-200) provides visual feedback to the user about error conditions, including movement and/or positions of outer flares 720, inner flares 721, and target indicator 722. Providing visual feedback to the user enables the computer system to give the user more detailed or illustrative feedback, thereby providing improved visual feedback.

In some embodiments, displaying (e.g., via the one or more display generation components) an enrollment user interface that includes: an enrollment progress indicator (e.g., a graphical object, a set of graphical objects, a graphical effect, and/or an animation that changes appearance based on progress of the biometric enrollment process) that represents (e.g., a visual state (e.g., appearance, color, brightness, size, shape, and/or transparency) of the indicator is based on a state of progress of the biometric enrollment process) progress of the biometric enrollment process and a representation of a view of the biometric feature captured by one or more cameras (e.g., of the computer system). In some embodiments, in response to a condition being satisfied (e.g., reaching a particular point of the biometric enrollment process, detecting that the plurality of enrollment error conditions are concurrently occurring, and/or receiving user input), ceasing to display the enrollment user interface. In some embodiments, the feedback (e.g., a first verbal prompt, first visual feedback, a second verbal prompt, and/or second visual feedback) about fixing the one or more enrollment error conditions of the plurality of enrollment error conditions is provided (e.g., output via a display generation component and/or an audio output device) in response to the condition being satisfied. Replacing the enrollment user interface with feedback about the error conditions enables the computer system to provide the user with feedback about error conditions of the computer system, thereby providing improved feedback.

In some embodiments, after ceasing to display the enrollment user interface, the computer system (e.g., 700, 750, 1-100, and/or 6-200) detects that the one or more enrollment error conditions have been fixed. In response to detecting that the one or more enrollment error conditions have been fixed, the computer system (e.g., 700, 750, 1-100, and/or 6-200) redisplays the enrollment user interface (e.g., via the one or more display generation components) and, optionally resumes an enrollment process that was ongoing prior to detecting the one or more error conditions (e.g., as described above with reference to FIGS. 7-10).

In some embodiments, aspects/operations of methods 800, 900, 1000, and 1200 may be interchanged, substituted, and/or added between these methods. For example, the same computer system is being used throughout the methods. For another example, the biometric enrollment process is the same biometric enrollment process throughout the methods.

For another example, user 705 is the same user throughout the methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve biometric enrollment processes. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for biometric enrollment processes. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of biometric enrollment processes, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way that minimizes risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A computer system configured to communicate with a set of one or more display generation components and one or more cameras, the computer system comprising:

one or more processors; and memory storing one or more programs configured to be executed by the one or more processors, the one or more programs including instructions for:

during a biometric enrollment process that includes capturing information about a biometric feature of a person, displaying an enrollment user interface, including displaying, in the enrollment user interface:

an enrollment progress indicator that represents progress of the biometric enrollment process; and a representation of a view of the biometric feature captured by the one or more cameras;

while displaying the enrollment user interface with the representation of the view of the biometric feature, detecting a change in enrollment progress; and in response to detecting the change in enrollment progress, changing an appearance of the enrollment user interface, including:

in accordance with a determination that the enrollment progress is in a first state:

displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the enrollment progress indicator and the first visual effect is maintained over a respective portion of the biometric feature while the biometric feature is moved relative to the one or more cameras to complete a first portion of enrollment of the biometric feature that corresponds to the first state of enrollment progress; and in accordance with a determination that the enrollment progress is in a second state that is different from the first state:

displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the enrollment progress indicator and the second visual effect is maintained over a respective portion of the biometric feature while the biometric feature is moved relative to the one or more cameras to complete a second portion of enrollment of the biometric feature that corresponds to the second state of enrollment progress.

2. The computer system of claim 1, wherein the representation of the view of the biometric feature captured by the one or more cameras includes a color layer applied to the view of the biometric feature captured by the one or more cameras.

3. The computer system of claim 2, wherein the color layer is animated over time.

4. The computer system of claim 2, wherein the color layer includes a plurality of colors from a color palette that is associated with the enrollment progress indicator.

5. The computer system of claim 1, wherein:

the view of the biometric feature is captured by the one or more cameras having a first contrast; and the representation of the view of the biometric feature captured by the one or more cameras is displayed having a second contrast that is increased from the first contrast.

6. The computer system of claim 1, wherein:

the view of the biometric feature is captured by the one or more cameras having a first saturation; and the representation of the view of the biometric feature captured by the one or more cameras is displayed having a second saturation that is reduced from the first saturation.

7. The computer system of claim 1, wherein the enrollment progress indicator is displayed having an animated appearance that changes over time without regard to progress of the biometric enrollment process.

8. The computer system of claim 1, wherein the representation of the view of the biometric feature captured by the one or more cameras is a cropped view of the biometric feature captured by the one or more cameras.

9. The computer system of claim 8, wherein the cropped view of the biometric feature includes a feathered effect.

10. The computer system of claim 1, wherein:

the enrollment user interface is comprised of a plurality of layers;

the enrollment progress indicator is displayed on a first layer of the enrollment user interface;

the representation of the view of the biometric feature captured by the one or more cameras is displayed on a second layer of the enrollment user interface that is different from the first layer of the enrollment user interface; and displaying the enrollment user interface includes displaying the representation of the view of the biometric feature captured by the one or more cameras moving on the second layer and independent of the enrollment progress indicator displayed on the first layer.

11. The computer system of claim 1, wherein displaying the representation of the view of the biometric feature captured by the one or more cameras includes:

in accordance with a determination that a portion of the view of the biometric feature captured by the one or more cameras is within a target region of the biometric feature, displaying a representation of the portion of the view of the biometric feature with a first appearance; and in accordance with a determination that the portion of the view of the biometric feature captured by the one or more cameras is not within the target region of the biometric feature, displaying the representation of the portion of the view of the biometric feature with a second appearance that is visually deemphasized relative to the first appearance.

12. The computer system of claim 1, the one or more programs further including instructions for:

while displaying the enrollment user interface with the representation of the view of the biometric feature and the enrollment progress indicator, detecting satisfaction of a set of alignment criteria that is based on alignment of the biometric feature relative to the one or more cameras; and in response to detecting satisfaction of the set of alignment criteria, changing an appearance of the enrollment user interface, including:

displaying the representation of the view of the biometric feature changing to a respective set of colors; and displaying the enrollment progress indicator changing to the respective set of colors.

13. The computer system of claim 1, wherein the biometric enrollment process is a facial enrollment process.

14. The computer system of claim 1, the one or more programs further including instructions for:

generating a representation of the person based on the captured information about the biometric feature of the person.

15. A non-transitory computer-readable storage medium storing one or more programs configured to be executed by one or more processors of a computer system that is in communication with a set of one or more display generation components and one or more cameras, the one or more programs including instructions for:

during a biometric enrollment process that includes capturing information about a biometric feature of a person, displaying an enrollment user interface, including displaying, in the enrollment user interface:

an enrollment progress indicator that represents progress of the biometric enrollment process; and a representation of a view of the biometric feature captured by the one or more cameras;

while displaying the enrollment user interface with the representation of the view of the biometric feature, detecting a change in enrollment progress; and in response to detecting the change in enrollment progress, changing an appearance of the enrollment user interface, including:

in accordance with a determination that the enrollment progress is in a first state:

displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the enrollment progress indicator and the first visual effect is maintained over a respective portion of the biometric feature while the biometric feature is moved relative to the one or more cameras to complete a first portion of enrollment of the biometric feature that corresponds to the first state of enrollment progress; and in accordance with a determination that the enrollment progress is in a second state that is different from the first state:

displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the enrollment progress indicator and the second visual effect is maintained over a respective portion of the biometric feature while the biometric feature is moved relative to the one or more cameras to complete a second portion of enrollment of the biometric feature that corresponds to the second state of enrollment progress.

16. The non-transitory computer-readable storage medium of claim 15, wherein the representation of the view of the biometric feature captured by the one or more cameras includes a color layer applied to the view of the biometric feature captured by the one or more cameras.

17. The non-transitory computer-readable storage medium of claim 15, wherein:

the view of the biometric feature is captured by the one or more cameras having a first contrast; and the representation of the view of the biometric feature captured by the one or more cameras is displayed having a second contrast that is increased from the first contrast.

18. The non-transitory computer-readable storage medium of claim 15, wherein:

the view of the biometric feature is captured by the one or more cameras having a first saturation; and the representation of the view of the biometric feature captured by the one or more cameras is displayed having a second saturation that is reduced from the first saturation.

19. The non-transitory computer-readable storage medium of claim 15, wherein the enrollment progress indicator is displayed having an animated appearance that changes over time without regard to progress of the biometric enrollment process.

20. The non-transitory computer-readable storage medium of claim 15, wherein the representation of the view of the biometric feature captured by the one or more cameras is a cropped view of the biometric feature captured by the one or more cameras.

21. The non-transitory computer-readable storage medium of claim 15, wherein:

the enrollment user interface is comprised of a plurality of layers;

the enrollment progress indicator is displayed on a first layer of the enrollment user interface;

the representation of the view of the biometric feature captured by the one or more cameras is displayed on a second layer of the enrollment user interface that is different from the first layer of the enrollment user interface; and displaying the enrollment user interface includes displaying the representation of the view of the biometric feature captured by the one or more cameras moving on the second layer and independent of the enrollment progress indicator displayed on the first layer.

22. The non-transitory computer-readable storage medium of claim 15, wherein displaying the representation of the view of the biometric feature captured by the one or more cameras includes:

in accordance with a determination that a portion of the view of the biometric feature captured by the one or more cameras is within a target region of the biometric feature, displaying a representation of the portion of the view of the biometric feature with a first appearance; and in accordance with a determination that the portion of the view of the biometric feature captured by the one or more cameras is not within the target region of the biometric feature, displaying the representation of the portion of the view of the biometric feature with a second appearance that is visually deemphasized relative to the first appearance.

23. The non-transitory computer-readable storage medium of claim 15, the one or more programs further including instructions for:

while displaying the enrollment user interface with the representation of the view of the biometric feature and the enrollment progress indicator, detecting satisfaction of a set of alignment criteria that is based on alignment of the biometric feature relative to the one or more cameras; and in response to detecting satisfaction of the set of alignment criteria, changing an appearance of the enrollment user interface, including:

displaying the representation of the view of the biometric feature changing to a respective set of colors; and displaying the enrollment progress indicator changing to the respective set of colors.

24. The non-transitory computer-readable storage medium of claim 15, wherein the biometric enrollment process is a facial enrollment process.

25. The non-transitory computer-readable storage medium of claim 15, the one or more programs further including instructions for:

generating a representation of the person based on the captured information about the biometric feature of the person.

26. A method, comprising:

at a computer system that is in communication with a set of one or more display generation components and one or more cameras:

during a biometric enrollment process that includes capturing information about a biometric feature of a person, displaying an enrollment user interface, including displaying, in the enrollment user interface:

an enrollment progress indicator that represents progress of the biometric enrollment process; and a representation of a view of the biometric feature captured by the one or more cameras;

while displaying the enrollment user interface with the representation of the view of the biometric feature, detecting a change in enrollment progress; and in response to detecting the change in enrollment progress, changing an appearance of the enrollment user interface, including:

in accordance with a determination that the enrollment progress is in a first state:

displaying the enrollment progress indicator with a first appearance; and displaying the representation of the view of the biometric feature having a first visual effect that changes an appearance of visible portions of the representation of the view of the biometric feature, wherein the first visual effect is based on the first appearance of the enrollment progress indicator and the first visual effect is maintained over a respective portion of the biometric feature while the biometric feature is moved relative to the one or more cameras to complete a first portion of enrollment of the biometric feature that corresponds to the first state of enrollment progress; and in accordance with a determination that the enrollment progress is in a second state that is different from the first state:

displaying the enrollment progress indicator with a second appearance different from the first appearance; and displaying the representation of the view of the biometric feature having a second visual effect that changes an appearance of visible portions of the representation of the view of the biometric feature, wherein the second visual effect is based on the second appearance of the enrollment progress indicator and the second visual effect is maintained over a respective portion of the biometric feature while the biometric feature is moved relative to the one or more cameras to complete a second portion of enrollment of the biometric feature that corresponds to the second state of enrollment progress.

27. The method of claim 26, wherein the representation of the view of the biometric feature captured by the one or more cameras includes a color layer applied to the view of the biometric feature captured by the one or more cameras.

28. The method of claim 26, wherein:

the view of the biometric feature is captured by the one or more cameras having a first contrast; and the representation of the view of the biometric feature captured by the one or more cameras is displayed having a second contrast that is increased from the first contrast.

29. The method of claim 26, wherein:

the view of the biometric feature is captured by the one or more cameras having a first saturation; and the representation of the view of the biometric feature captured by the one or more cameras is displayed having a second saturation that is reduced from the first saturation.

30. The method of claim 26, wherein the enrollment progress indicator is displayed having an animated appearance that changes over time without regard to progress of the biometric enrollment process.

31. The method of claim 26, wherein the representation of the view of the biometric feature captured by the one or more cameras is a cropped view of the biometric feature captured by the one or more cameras.

32. The method of claim 26, wherein:

the enrollment user interface is comprised of a plurality of layers;

the enrollment progress indicator is displayed on a first layer of the enrollment user interface;

the representation of the view of the biometric feature captured by the one or more cameras is displayed on a second layer of the enrollment user interface that is different from the first layer of the enrollment user interface; and displaying the enrollment user interface includes displaying the representation of the view of the biometric feature captured by the one or more cameras moving on the second layer and independent of the enrollment progress indicator displayed on the first layer.

33. The method of claim 26, wherein displaying the representation of the view of the biometric feature captured by the one or more cameras includes:

in accordance with a determination that a portion of the view of the biometric feature captured by the one or more cameras is within a target region of the biometric feature, displaying a representation of the portion of the view of the biometric feature with a first appearance; and in accordance with a determination that the portion of the view of the biometric feature captured by the one or more cameras is not within the target region of the biometric feature, displaying the representation of the portion of the view of the biometric feature with a second appearance that is visually deemphasized relative to the first appearance.

34. The method of claim 26, further comprising:

while displaying the enrollment user interface with the representation of the view of the biometric feature and the enrollment progress indicator, detecting satisfaction of a set of alignment criteria that is based on alignment of the biometric feature relative to the one or more cameras; and in response to detecting satisfaction of the set of alignment criteria, changing an appearance of the enrollment user interface, including:

displaying the representation of the view of the biometric feature changing to a respective set of colors; and displaying the enrollment progress indicator changing to the respective set of colors.

35. The method of claim 26, wherein the biometric enrollment process is a facial enrollment process.

36. The method of claim 26, further comprising:

generating a representation of the person based on the captured information about the biometric feature of the person.

\* \* \* \* \*